US010560583B2

(12) United States Patent
Sharma

(10) Patent No.: US 10,560,583 B2
(45) Date of Patent: Feb. 11, 2020

(54) TOLL-FREE NUMBERS METADATA TAGGING, ANALYSIS AND REPORTING

(71) Applicant: Somos, Inc., Bridgewater, NJ (US)

(72) Inventor: Sriram Sharma, Herndon, VA (US)

(73) Assignee: Somos, Inc., East Brunswick, NJ (US)

(*) Notice: Subject to any disclaimer, the term of this patent is extended or adjusted under 35 U.S.C. 154(b) by 0 days.

(21) Appl. No.: 16/177,842

(22) Filed: Nov. 1, 2018

(65) Prior Publication Data

US 2019/0312979 A1    Oct. 10, 2019

Related U.S. Application Data

(63) Continuation of application No. 15/720,922, filed on Sep. 29, 2017, now Pat. No. 10,165,128, which is a (Continued)

(51) Int. Cl.
*H04M 15/00* (2006.01)
*H04W 40/02* (2009.01)
(Continued)

(52) U.S. Cl.
CPC .. *H04M 15/8061* (2013.01); *G06F 16/24573* (2019.01); *G06Q 30/0201* (2013.01); *H04L 45/125* (2013.01); *H04L 45/22* (2013.01); *H04M 3/2218* (2013.01); *H04M 3/2263* (2013.01); *H04M 3/36* (2013.01); *H04M 3/367* (2013.01); *H04M 3/42153* (2013.01);
(Continued)

(58) Field of Classification Search
CPC ............... H04M 3/42; H04M 3/42136; H04M 3/42153; H04M 15/00

USPC ............ 379/112.09, 112.04, 114.24, 201.12, 379/112.01, 112.02, 111, 112.06, 114.01; 370/352
See application file for complete search history.

(56) References Cited

U.S. PATENT DOCUMENTS 5,528,672 A    6/1996  Wert et al.
5,586,175 A    12/1996 Hogan et al.
(Continued)

FOREIGN PATENT DOCUMENTS

WO    2000059197 A1    10/2000
WO    2016070095 A1    5/2016
(Continued)

OTHER PUBLICATIONS

U.S. Appl. No. 16/108,409, filed Aug. 22, 2018, Pending.
(Continued)

*Primary Examiner* — Thjuan K Addy
(74) *Attorney, Agent, or Firm* — GTC Law Group PC & Affiliates

(57) ABSTRACT

A toll-free tagging service is provided that includes a subscription-based service that is made available to responsible organizations, consumers and businesses. The toll-free tagging service may provide the ability to tag a toll-free number (or group of numbers), and once a number is tagged, to track updates to that number that may then be distributed to customers through emails/text messages or other means. Subscribers of the toll-free tagging service may also have the ability to create, view, update and delete tags through a web application, mobile application, or some other user interface.

20 Claims, 40 Drawing Sheets

Related U.S. Application Data continuation of application No. 14/984,436, filed on Dec. 30, 2015, now Pat. No. 9,800,742, which is a continuation of application No. 14/960,312, filed on Dec. 4, 2015, now Pat. No. 9,553,997, which is a continuation-in-part of application No. 14/928,575, filed on Oct. 30, 2015, now Pat. No. 9,549,066.

(60) Provisional application No. 62/073,976, filed on Nov. 1, 2014, provisional application No. 62/088,406, filed on Dec. 5, 2014, provisional application No. 62/172,791, filed on Jun. 8, 2015.

(51) Int. Cl.

| | | |
|---|---|---|
| *H04M 3/22* | (2006.01) | |
| *H04M 3/36* | (2006.01) | |
| *G06Q 30/02* | (2012.01) | |
| *H04M 3/51* | (2006.01) | |
| *H04M 3/42* | (2006.01) | |
| *H04L 12/707* | (2013.01) | |
| *H04L 12/729* | (2013.01) | |
| *H04M 15/08* | (2006.01) | |
| *H04Q 3/00* | (2006.01) | |
| *H04W 4/14* | (2009.01) | |
| *G06F 16/2457* | (2019.01) | |

(52) U.S. Cl.
CPC ... *H04M 3/42161* (2013.01); *H04M 3/42178* (2013.01); *H04M 3/42306* (2013.01); *H04M 3/42357* (2013.01); *H04M 3/5175* (2013.01); *H04M 15/08* (2013.01); *H04M 15/09* (2013.01); *H04M 15/47* (2013.01); *H04M 15/58* (2013.01); *H04M 15/72* (2013.01); *H04M 15/755* (2013.01); *H04M 15/8083* (2013.01); *H04M 15/8214* (2013.01); *H04Q 3/0087* (2013.01); *H04Q 3/0091* (2013.01); *H04W 4/14* (2013.01); *H04W 40/02* (2013.01); *H04M 2203/555* (2013.01)

(56) References Cited

U.S. PATENT DOCUMENTS

| | | | |
|---|---|---|---|
| 6,115,462 | A | 9/2000 | Servi et al. |
| 6,173,279 | B1 | 1/2001 | Levin et al. |
| 6,236,851 | B1 | 5/2001 | Fougnies et al. |
| 6,393,283 | B1 | 5/2002 | Morgan |
| 6,473,500 | B1 | 10/2002 | Risafi et al. |
| 6,574,661 | B1 | 6/2003 | Delano et al. |
| 6,654,451 | B1 | 11/2003 | Ward et al. |
| 6,763,376 | B1 | 7/2004 | Devine et al. |
| 7,092,888 | B1 | 8/2006 | McCarthy et al. |
| 7,099,453 | B2 | 8/2006 | Crockett et al. |
| 7,298,833 | B2 | 11/2007 | Klein et al. |
| 7,542,553 | B2 | 6/2009 | Gurfein et al. |
| 7,643,627 | B2 | 1/2010 | Starling et al. |
| 8,379,531 | B2 | 2/2013 | Farris et al. |
| 8,401,161 | B2 | 3/2013 | Terpstra et al. |
| 8,619,961 | B2 | 12/2013 | Starling et al. |
| 9,531,886 | B2 | 12/2016 | Wong et al. |
| 9,549,066 | B2 | 1/2017 | Sharma et al. |
| 9,553,997 | B2 | 1/2017 | Sharma et al. |
| 9,571,666 | B2 | 2/2017 | Sharma |
| 9,571,667 | B2 | 2/2017 | Kimmel |
| 9,635,191 | B2 | 4/2017 | Sharma et al. |
| 9,654,648 | B2 | 5/2017 | Sharma |
| 9,654,649 | B2 | 5/2017 | Sharma |
| 9,716,799 | B2 | 7/2017 | Sharma |
| 9,800,742 | B2 | 10/2017 | Sharma |
| 9,807,251 | B2 | 10/2017 | Sharma et al. |
| 9,930,189 | B2 | 3/2018 | Chauhan |
| 9,992,352 | B2 | 6/2018 | Sharma et al. |
| 10,097,698 | B2 | 10/2018 | Sharma et al. |
| 2002/0186825 | A1 | 12/2002 | Marchand et al. |
| 2003/0048889 | A1 | 3/2003 | Marchead et al. |
| 2004/0213392 | A1* | 10/2004 | Crockett ........... H04M 3/42144 379/114.01 |
| 2005/0058270 | A1 | 3/2005 | Allen et al. |
| 2006/0115061 | A1 | 6/2006 | Wilson et al. |
| 2011/0249666 | A1 | 10/2011 | Holbrook et al. |
| 2012/0288078 | A1 | 11/2012 | Starling et al. |
| 2013/0094640 | A1 | 4/2013 | McClure et al. |
| 2013/0151314 | A1 | 6/2013 | Kugler et al. |
| 2013/0177142 | A1 | 7/2013 | Allen et al. |
| 2013/0195102 | A1* | 8/2013 | Kyle ..................... H04L 12/66 370/352 |
| 2014/0006218 | A1 | 1/2014 | Muthu |
| 2014/0307730 | A1 | 10/2014 | Friedman et al. |
| 2016/0127539 | A1 | 5/2016 | Sharma |
| 2016/0127540 | A1 | 5/2016 | Sharma et al. |
| 2016/0127541 | A1 | 5/2016 | Sharma |
| 2016/0127548 | A1 | 5/2016 | Sharma |
| 2016/0127549 | A1 | 5/2016 | Sharma |
| 2016/0127552 | A1 | 5/2016 | Sharma et al. |
| 2016/0127562 | A1 | 5/2016 | Chauhan |
| 2016/0127566 | A1 | 5/2016 | Sharma et al. |
| 2016/0127567 | A1 | 5/2016 | Kimmel |
| 2016/0127569 | A1 | 5/2016 | Karnas et al. |
| 2016/0127808 | A1 | 5/2016 | Wong et al. |
| 2016/0191716 | A1 | 6/2016 | Sharma |
| 2017/0085724 | A1 | 3/2017 | Sharma et al. |
| 2017/0094066 | A1 | 3/2017 | Sharma et al. |
| 2017/0180567 | A1 | 6/2017 | Sharma et al. |
| 2018/0027129 | A1 | 1/2018 | Sharma |
| 2018/0249016 | A1 | 8/2018 | Sharma et al. |
| 2019/0028595 | A1 | 1/2019 | Chauhan |

FOREIGN PATENT DOCUMENTS

| | | |
|---|---|---|
| WO | 2016090338 A1 | 6/2016 |
| WO | 2016090338 A9 | 3/2017 |

OTHER PUBLICATIONS

U.S. Appl. No. 15/966,042, filed Apr. 30, 2018, Pending.
PCT/US2015/058401, "International Application Serial No. PCT/US2015/058401 International Search Report and Written Opinion dated Feb. 17, 2016", SMS/800, Inc., 5 pages.
PCT/US2015/058401, "International Application Serial No. PCT/US2015/058401, International Preliminary Report on Patentability and Written Opinion dated May 11, 2017", Somos, Inc., 7 Pages.
PCT/US2015/064135, "International Application Serial No. PCT/US2015/064135, International Preliminary Report on Patentability and Written Opinion dated Jun. 15, 2017", Somos, Inc., 12 Pages.
PCT/US2015/064135, "International Application Serial No. PCT/US2015/064135, International Search Report and Written Opinion dated Mar. 31, 2016", Somos, Inc., 15 pages.

* cited by examiner

FIG. 22

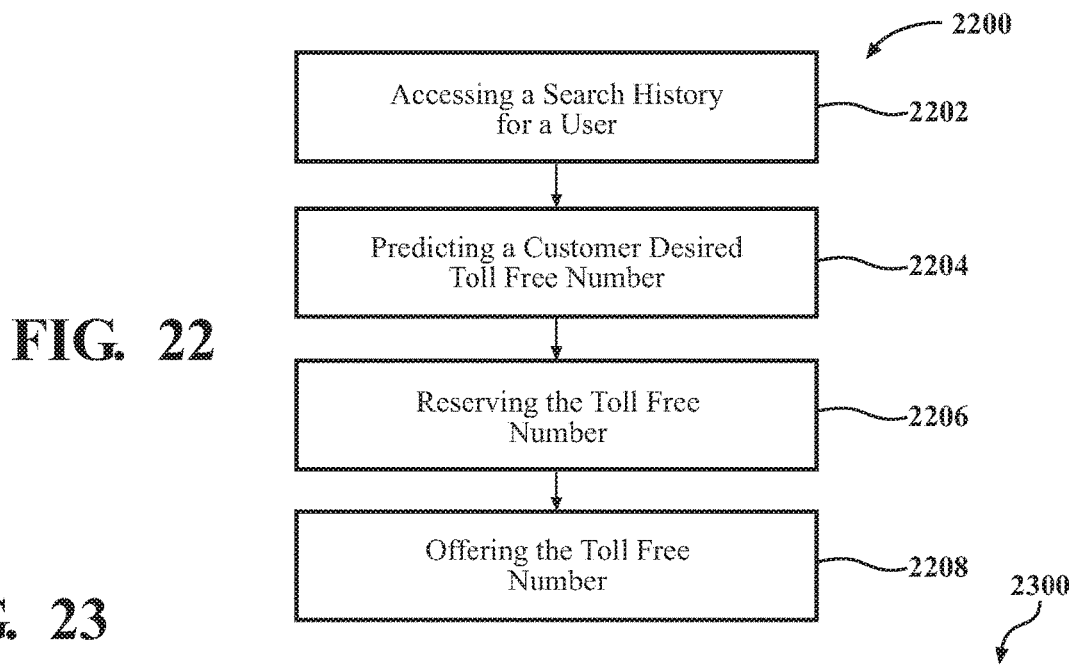

FIG. 23

| Functional Descriptions | | |
|---|---|---|
| Function | FunctionCriteria | Response Criteria |
| Search for a Number<br><br>MFS 1 | Search for completely random number(s) | Return a number or list of numbers meeting the search criteria (1-configurable max number) with status. The number is not locked until a reserve is executed. |
| | Search for multiple consecutive numbers with any criteria as specified below | |
| | Search for numbers in a specific NPA (i.e., 800, 888, 877, ...) | |
| | Search using wildcards to represent any number (i.e., 800-***-CARS) | |
| | Search for numbers with duplicated numbers in them (i.e., 855-354-&&&& where & means a duplicate numbers like 2222 or 5555) | |
| | Search for numbers containing a specific string of numbers at any point in the number (i.e.***-777-0000) | |
| | Search for numbers starting with a specific string (i.e., 855-234-****) | |
| | Search for numbers ending with a specific string (i.e., 855-***-5555 | |
| | Search for numbers using alpha characters as well as numbers (i.e., 888-234-CARS) | |

| Starting Point | Starting Point Value | Possible Search Result |
|---|---|---|
| NXX | NXX=321 | NPA-321-XXXX to NPA-999-XXXX, where NPA is any valid Toll-free NPA and XXXX is 0000-9999 |
| XXXX | XXXX=1234 | NPA-NXX-1234 to NPA-NXX-9999, where NPA is any valid Toll-free NPA and NXX is any valid NXX in the NPA |
| NXX and XXXX | NXX=321 and XXXX=1234 | NPA-321-1234 to NPA-999-9999, excluding XXXX=0000-1233, where NPA is any valid Toll-free NPA Note: NPA-322-0000 is a valid response for this search |
| NXX-XXXX | NXX-XXXX=321-1234 | NPA-321-1234 to NPA-999-9999, where NPA is any valid Toll-free NPA Note: NPA-322-0000 is a valid response for this search |

FIG. 24

| Mask Character | Usage | Example Mask | Possible Search Results |
|---|---|---|---|
| wildcard-* | Number returned in search results can include any digit in the indicated position | 800-456-78** | 888-456-7800 to 888-456-7899 |
| repeat wildcard- & | Number returned in search results include the same digit in each of the positions indicated | 800-456-&23& | 800-456-0230 800-456-1231 800-456-2222 800-456-3233 800-456-4234 800-456-5235 800-456-6236 800-456-7237 800-456-8238 800-456-9239 |
| number-0-9 | Number returned in search results include the specified digit in the position(s) | ***-87*-**** | NPA-870-0000 to NPA-879-9999 Where NPA is a valid Toll-free NPA |
| Alpha-A-Z | Number returned in search results include a digit that maps to the letter specified in the position(s) indicated, based on the mapping provided by a standard telephone keypad | 866-***-TEAM | 866-NXX-8326 where NXX is a valid NXX |

FIG. 25

| Example Masks and Search Results for a Consecutive-Number SearchMask | Valid Quantity of Consecutive Numbers | Quantity of Numbers Requested | Example Valid Search Results | Example Invalid Search Results |
|---|---|---|---|---|
| 888-234-567* | 2-9 | 4 | 888-234-5673<br>888-234-5674<br>888-234-5675<br>888-234-5676 | 888-234-5678<br>888-234-5679<br>888-234-5680<br>888-234-5681 |
| 888-234-56** | 2-99 | 4 | 888-234-5678<br>888-234-5679<br>888-234-5680<br>888-234-5681 | 888-234-5698<br>888-234-5699<br>888-234-5700<br>888-234-5701 |
| 888-234-5&&* | 2-9 | 4 | 888-234-5111<br>888-234-5112<br>888-234-5113<br>888-234-5114<br>Or<br>888-234-5885<br>888-234-5886<br>888-234-5887<br>888-234-5888 | 888-234-5888<br>888-234-5889<br>888-234-5890<br>888-234-5891 |

Search - Reserve - Activate

RESP ORG BRSAC | USER ID BRSACAU2    Return    Reset

Search

Quantity: [01] Number or Mask Entry

Consecutive: ☐

TollFree NPA: [▼]

Templates [ ]

Effective Date and Time: [ ] [HH▼][MM▼][AM▼]
TimeZone [▼] Now

Number of Lines: [ ]
Service order No.: [ ]
Templates: [ ] Select [▼]

Contact Information

Contact Name: UBRS
Contact Number: ACAU2BRSAC
Comments: [ ]

Result

Toll Free [ ] Status

[ Search Reserve Activate ]    [ Refresh ]

FIG. 39

TOLL-FREE NUMBERS METADATA TAGGING, ANALYSIS AND REPORTING

RELATED APPLICATIONS

This application is a Continuation of U.S. patent application Ser. No. 15/720,922, filed Sep. 29, 2017, now U.S. Pat. No. 10,165,128, issued Dec. 25, 2018 which is a Continuation of U.S. patent application Ser. No. 14/984,436, filed Dec. 30, 2015, now U.S. Pat. No. 9,800,742, issued Dec. 30, 2015, which is a Continuation of U.S. patent application Ser. No. 14/960,312 filed Dec. 4, 2015, now U.S. Pat. No. 9,553,997, issued Jan. 24, 2017, which is a Continuation-In-Part of U.S. patent application Ser. No. 14/928,575 filed Oct. 30, 2015, now U.S. Pat. No. 9,549,066, issued Jan. 17, 2017, which claims priority to U.S. Provisional Patent Application 62/073,976 filed Nov. 1, 2014. U.S. patent application Ser. No. 14/960,312 filed Dec. 4, 2015 further claims priority to U.S. Provisional Patent Application 62/088,406 filed Dec. 5, 2014, and U.S. Provisional Patent Application 62/172,791 filed Jun. 8, 2015.

Each of the above applications is hereby incorporated by reference in its entirety.

FIELD

This disclosure is related to the operation, control and management of toll-free telecommunication lines.

BACKGROUND

Businesses increasingly use toll-free telephone numbers for providing customers with a convenient and cost-free means of communicating with them and their various departments, such as customer service and technical support representatives. With the proliferation of toll-free numbers and advanced business analytics for receiving, routing, and logging, the use of such numbers has come increased complexity in managing toll-free numbers.

SUMMARY

A method according to one disclosed non-limiting embodiment of the present disclosure can include receiving a one-click activate request from a user via a customizable dashboard, wherein the request includes at least a customer record template reference and an indication of when to activate a toll-free telecommunications number associated with the request; searching a responsible organization record to determine the presence of a defined customer template record relating to the user request, wherein the responsible organization is associated with toll-free telecommunications; retrieving at least one customer template record, wherein the customer template record is a defined customer template record for the responsible organization; and activating the user request, wherein the activation includes at least one of activating or reserving the toll-free telecommunications number.

A further embodiment of the present disclosure may include, wherein the request is received from a mobile client device.

A further embodiment of the present disclosure may include, wherein the activation occurs over a hybrid network.

A further embodiment of the present disclosure may include, wherein the hybrid network includes a cellular network and a distributed, cloud network.

A further embodiment of the present disclosure may include, wherein the hybrid network includes a cellular network, a distributed, cloud network, and an on-premise enterprise data network.

A further embodiment of the present disclosure may include, wherein the enterprise data network is associated with a telecommunications network.

A further embodiment of the present disclosure may include, wherein the activation includes receiving from the user a time and date at which the toll-free telecommunications number will be activated.

A method according to one disclosed non-limiting embodiment of the present disclosure can include presenting to a user a widget operable within a webpage to access a user interface associated with a toll-free number reservation system; receiving from the user a log in credential associated with the toll-free number reservation system; receiving from the user a toll-free number search parameter through the toll-free number reservation system; identifying a toll-free number relating to the toll-free number search parameter; and receiving an activation request from the user, wherein the activation request causes the number to be reserved for the user and operable to receive toll-free calls.

A further embodiment of the present disclosure may include, wherein the widget is lazy loaded.

A further embodiment of the present disclosure may include, wherein the log in credential is authenticated and a token provided to the user upon successful authentication.

A further embodiment of the present disclosure may include, wherein the search parameter relates to a category of toll-free numbers.

A further embodiment of the present disclosure may include, wherein the category relates to an industry category.

A further embodiment of the present disclosure may include, wherein the category is based at least in part on metadata associated with a toll-free number.

A further embodiment of the present disclosure may include, wherein the metadata is tagged to toll-free numbers.

A further embodiment of the present disclosure may include, wherein the metadata tag is based at least in part on historical data associated with toll-free numbers.

A further embodiment of the present disclosure may include, wherein the widget provides one-click functionality.

A method according to one disclosed non-limiting embodiment of the present disclosure can include presenting to a user a widget operable within a webpage to access a user interface associated with a toll-free number reservation system; receiving from the user a log in credential associated with the toll-free number reservation system; searching a responsible organization record, based at least in part on the credential, to determine the presence of a defined customer template record, wherein the responsible organization is associated with toll-free telecommunications; retrieving at least one customer template record, wherein the customer template record is a defined customer template record for the responsible organization; producing a customer pointer record based at least in part on the customer template record; and assigning a toll-free number to the user wherein the number is further assigned to the responsible organization as associated with the customer pointer record.

A further embodiment of the present disclosure may include assigning a plurality of toll-free numbers to a user.

A further embodiment of the present disclosure may include, wherein assigning the plurality of toll-free numbers is associated with a plurality of customer pointer records.

A further embodiment of the present disclosure may include, wherein the assignment of the toll-free number includes activating the toll-free number so that it is able to receiving calls.

A method according to one disclosed non-limiting embodiment of the present disclosure can include receiving data relating to at least one of a dip rate or dip volume that is associated with a toll-free telecommunications number; receiving social media data relating to usage of the toll-free telecommunications number; analyzing the combined data and social media data to create a valuation metadata tag that is associated with the toll-free telecommunications number, wherein the valuation metadata is a quantitative summary of the demand associated with the toll-free telecommunications number; and distributing a communication to an entity regarding the current valuation of the toll-free telecommunications number.

A further embodiment of the present disclosure may include, wherein the data is data sniffer data.

A further embodiment of the present disclosure may include, wherein the tag includes data related to a category of toll-free number.

A further embodiment of the present disclosure may include, wherein the category related to an industry segment.

A further embodiment of the present disclosure may include, wherein the tag includes data relating to popularity as derived at least in part from the search history associated with the toll-free number.

A further embodiment of the present disclosure may include, wherein the tag includes location information associated with the toll-free number.

A further embodiment of the present disclosure may include, wherein the tag includes financial information associated with the toll-free number.

A further embodiment of the present disclosure may include, wherein the social media data includes data relating to a plurality of social media user profiles.

A further embodiment of the present disclosure may include, wherein the plurality of social media user profiles includes demographic data.

A further embodiment of the present disclosure may include, wherein the plurality of social media user profiles includes financial data.

A further embodiment of the present disclosure may include, wherein the plurality of social media user profiles includes geographic data.

A method according to one disclosed non-limiting embodiment of the present disclosure can include analyzing data relating to a toll-free number and social media data to create a valuation metadata tag that is associated with the toll-free number, wherein the valuation metadata is a quantitative summary of the inferred economic activity associated with the toll-free telecommunications number; inferring a rating of a second toll-free number based at least in part on the valuation metadata, wherein the toll-free number and the second toll-free number share an attribute; and storing the inferred rating of the second toll-free number.

A further embodiment of the present disclosure may include, wherein the data is data sniffer data.

A further embodiment of the present disclosure may include, wherein the inferred rating is presented to a user in a user interface upon the user submitting a toll-free number query.

A further embodiment of the present disclosure may include, wherein the inferred rating is used to order the second toll-free number within a plurality of toll-free numbers presented to a user.

A further embodiment of the present disclosure may include, wherein the ordered listing presented to the user includes presenting the rating that is associated with each of the plurality of toll-free numbers.

A further embodiment of the present disclosure may include, wherein the inferred rating generates an alert to a user if it exceeds a given rating value.

A further embodiment of the present disclosure may include, wherein the alert is sent to a user sharing the attribute.

A method according to one disclosed non-limiting embodiment of the present disclosure can include receiving data relating to at least one of a dip rate or dip volume that is associated with a toll-free telecommunications number; receiving social media data relating to usage of the toll-free telecommunications number; analyzing the combined data and social media data to create a valuation metadata tag that is associated with the toll-free telecommunications number, wherein the valuation metadata is a quantitative summary of the demand associated with the toll-free telecommunications number; and initiating a toll-free number reservation based on the current valuation of the toll-free telecommunications number.

A further embodiment of the present disclosure may include, wherein the data is data sniffer data.

A method according to one disclosed non-limiting embodiment of the present disclosure can include receiving data relating to usage of a toll-free telecommunications number; analyzing the received data to create a metadata tag that is associated with the toll-free telecommunications number, wherein the metadata tag is a quantitative summary associated with the toll-free telecommunications number; and distributing a communication to an entity regarding the toll-free telecommunications number in response to the quantitative summary A further embodiment of the present disclosure may include, wherein the metadata tag facilitates tracking of updates to the toll-free telecommunications number.

A further embodiment of the present disclosure may include, wherein tracking of updates includes at least one of a change in ownership, a change in availability, and an increase in search statistics.

A further embodiment of the present disclosure may include modifying the metadata tag through at least one of a web application, a mobile application, or some other user interface.

A further embodiment of the present disclosure may include, wherein the metadata tag includes data relating to popularity as derived at least in part from the search history associated with the toll-free number.

A further embodiment of the present disclosure may include, wherein the metadata tag includes location information associated with the toll-free number.

A further embodiment of the present disclosure may include, wherein the metadata tag includes financial information associated with the toll-free number.

A further embodiment of the present disclosure may include receiving data relating to at least one of a dip rate or dip volume that is associated with the toll-free telecommunications number.

A further embodiment of the present disclosure may include, wherein distributing the communication to an entity is performed via at least one of a text message and an email.

A method according to one disclosed non-limiting embodiment of the present disclosure can include receiving data relating to usage of a toll-free telecommunications number; receiving data associated with the toll-free telecommunications number; creating a custom metadata tag based on keywords; analyzing the received data to create a metadata tag that is associated with the toll-free telecommunications number, wherein the metadata tag is a quantitative summary associated with the toll-free telecommunications number; and distributing a communication to an entity regarding the toll-free telecommunications number in response to the quantitative summary.

A further embodiment of the present disclosure may include, wherein creating the metadata tag includes utilizing one or more keywords A further embodiment of the present disclosure may include, wherein creating the metadata tag includes utilizing category based tagging.

A further embodiment of the present disclosure may include, wherein creating the metadata tag includes location based tagging.

A further embodiment of the present disclosure may include, wherein creating the metadata tag is related to popularity.

A further embodiment of the present disclosure may include, wherein creating the metadata tag is related to social media mentions.

A further embodiment of the present disclosure may include, wherein creating the metadata tag is related to suggestive tags.

A method according to one disclosed non-limiting embodiment of the present disclosure can include receiving data relating to at least one of a dip rate or dip volume that is associated with a toll-free telecommunications number; ingesting data from a plurality of sources relating to usage of the toll-free telecommunications number; analyzing the received and ingested data to create a valuation metadata tag that is associated with the toll-free telecommunications number, wherein the valuation metadata is a quantitative summary of the demand associated with the toll-free telecommunications number; and initiating a toll-free number reservation based on the current valuation of the toll-free telecommunications number.

A further embodiment of the present disclosure may include, wherein initiating the toll-free number reservation is segregated into tiers.

A further embodiment of the present disclosure may include, wherein the metadata tag provides for alerting based on a specified latency.

A further embodiment of the present disclosure may include, wherein initiating the toll-free number reservation provides for low latency alerting.

A method according to one disclosed non-limiting embodiment of the present disclosure can include creating at least two toll-free call routing tables based on a congestion threshold criterion node in a call routing tree, wherein the first of the two call routing tables is to be used when toll-free call volumes occurring within a toll-free telecommunications carrier network are below the congestion threshold, and the second of the two call routing tables is to be used when toll-free call volumes occurring within a toll-free telecommunications carrier network are equal to or above the congestion threshold; providing the call routing tables to at least one service control point that is associated with the toll-free telecommunications carrier network; monitoring toll-free call volumes and durations occurring within a toll-free telecommunications carrier network; receiving at least one of a call count datum or call duration datum from the toll-free telecommunications carrier network wherein the call count datum or call duration datum indicates a change in call volumes over the toll-free telecommunications carrier network from below the congestion threshold to above the congestion threshold; and instructing the service control point to switch from using the first call routing table to the second call routing table without a need to change the routing tree.

A further embodiment of the present disclosure may include, wherein the call volume is expressed as a percentage of the total call volume occurring over the network.

A further embodiment of the present disclosure may include, wherein the call volume is a indication of a network failure to transmit calls.

A further embodiment of the present disclosure may include, wherein the call volume is specific to an entity.

A further embodiment of the present disclosure may include, wherein the entity is a carrier.

A further embodiment of the present disclosure may include, wherein the entity is a call center.

A further embodiment of the present disclosure may include, wherein the entity is a service control point.

A further embodiment of the present disclosure may include, wherein the switch to the second call routing table occurs in real time with no additional changes to routing tree required.

A further embodiment of the present disclosure may include, wherein decision nodes of the first and second call routing tables are loaded into the service control point.

A further embodiment of the present disclosure may include, wherein the call volumes are used to create a call path score for a possible call route path that is available on the network.

A further embodiment of the present disclosure may include, wherein the call path score is based at least in part on a call travel distance estimate.

A further embodiment of the present disclosure may include, wherein the call path score is based at least in part on a call travel speed estimate.

A further embodiment of the present disclosure may include, wherein the call path score is used in association with the congestion threshold criterion to determine the switch to the second call route table.

A method according to one disclosed non-limiting embodiment of the present disclosure can include associating a toll-free telecommunications network congestion threshold criterion, wherein the congestion threshold criterion indicates a level of toll-free call volumes occurring within the toll-free telecommunications network; associating the congestion threshold criterion with a first rule regarding the usage of a plurality of call routing tables, and a second rule regarding the usage of a plurality of telecommunications carriers; and switching toll-free calls across the telecommunications carriers based at least on the congestion threshold criterion, wherein the switched calls are further routing according to at least one of the plurality of call routing tables.

A further embodiment of the present disclosure may include, wherein the switching of the toll-free calls is automated.

A further embodiment of the present disclosure may include, wherein the congestion threshold indicates a level of toll-free call volumes and toll-free call durations.

A further embodiment of the present disclosure may include, wherein the switching across the telecommunications carriers is determined at least in part based on historical data associated with the telecommunications carriers.

A method according to one disclosed non-limiting embodiment of the present disclosure can include creating at least two toll-free call routing tables based on a congestion threshold criterion, wherein the first of the two call routing tables is to be used when toll-free call volumes occurring within a toll-free telecommunications carrier network are below the congestion threshold, and the second of the two call routing tables is to be used when toll-free call volumes occurring within a toll-free telecommunications carrier network are equal to or above the congestion threshold; providing the call routing tables to at least one service control point that is associated with the toll-free telecommunications carrier network; monitoring toll-free call volumes and durations occurring within a toll-free telecommunications carrier network; receiving at least one of a call count datum or call duration datum from the toll-free telecommunications carrier network wherein the call count datum or call duration datum indicates a change in call volumes over the toll-free telecommunications carrier network from below the congestion threshold to above the congestion threshold; creating a second congestion threshold criterion based on the data received from the toll-free telecommunications network; and creating a third call routing table based on the second congestion threshold criterion.

A further embodiment of the present disclosure may include, wherein the toll-free call traffic occurring within a toll-free telecommunications network is switched based at least in part on one of the first or second congestion threshold criterion.

A further embodiment of the present disclosure may include, wherein the third call routing table is used to route an incoming toll-free call received subsequent to the creation of the third call routing table.

A method of identifying and storing an identifier associated with a toll-free-communication entity according to one disclosed non-limiting embodiment of the present disclosure can include locating an identifier within the header portion of an SMS text message routed over a toll-free telecommunications line, the identifier located based at least in part through latent semantic indexing; comparing the located identifier with metadata stored on a server, the metadata associated with a plurality of entities; selecting an entity from among the plurality of entities based at least in part on the comparison; and storing a code associated with the entity within a translation table associated with a toll-free telecommunications management platform.

A further embodiment of the present disclosure may include, wherein the code is an FCC code.

A further embodiment of the present disclosure may include, wherein the entity is engaged in multimedia content distribution.

A further embodiment of the present disclosure may include, wherein the multimedia content is video content.

A further embodiment of the present disclosure may include, wherein the entity is an ad agency.

A further embodiment of the present disclosure may include, wherein the entity is an ad network.

A further embodiment of the present disclosure may include, wherein the entity is a telecommunications carrier.

A further embodiment of the present disclosure may include, wherein the translation table pertains to routing voice data.

A further embodiment of the present disclosure may include, wherein the translation table pertains to routing voice and video content.

A further embodiment of the present disclosure may include, wherein the translation table pertains to routing multimedia data.

A further embodiment of the present disclosure may include, wherein the translation table pertains to routing sponsored content.

A method of creating and storing an identifier associated with a toll-free-communication entity according to one disclosed non-limiting embodiment of the present disclosure can include locating data within the header portion of an SMS text message routed over a toll-free telecommunications line, the data located based at least in part through latent semantic indexing; creating an entity identifier based at least on the data; storing a code associated with the entity identifier and an entity within a translation table associated with a toll-free telecommunications management platform; and associating the entity and entity identifier with a call routing table.

A further embodiment of the present disclosure may include, wherein the call routing table is configured to include multiple carriers.

A further embodiment of the present disclosure may include, wherein the call routing table is configured to have at least on rule pertaining to the time of day at which a call occurs.

A further embodiment of the present disclosure may include, wherein the call routing table is configured to have at least one rule pertaining to the location from which a call is received.

A further embodiment of the present disclosure may include, wherein the call routing table is configured to have at least one rule pertaining to the proximity of a caller to the entity.

A further embodiment of the present disclosure may include, wherein the call routing table is configured to have at least one rule pertaining to historical data relating to a caller.

A method of identifying and storing an identifier associated with a toll-free-communication entity according to one disclosed non-limiting embodiment of the present disclosure can include identifying a toll-free call route trend among a plurality of toll-free calls taking place within a toll-free telecommunications network; wherein the call route trend is identified at least in part by call routings among toll-free numbers sharing an attribute; creating a call route template based at least in part on the trend; identifying an entity using at least one toll-free number with the shared attribute; prepopulating a call route tree for the entity based on the call route template.

A further embodiment of the present disclosure may include, wherein the trend is automatically updated at a pre-defined time interval.

A further embodiment of the present disclosure may include, wherein the automated update generates an alert that is sent to an entity notifying them of the updated trend.

A method according to one disclosed non-limiting embodiment of the present disclosure can include storing a taxonomy of abuse events that may occur regarding the usage of a toll-free telecommunications number; storing a rule regarding an action to take upon receipt of a reported abuse event, wherein the rule specifies a routing rule defining how a call that is associated with the abuse event is to be routed over a toll-free telecommunications system; receiving a report of abuse of a toll-free telecommunications number; identifying at least one abuse event within the stored taxonomy and routing rule that is related to content of the abuse report; and automatically routing a call that is the subject of the abuse report according to the routing rule.

A further embodiment of the present disclosure may include, wherein the report of abuse derives from a call center.

A further embodiment of the present disclosure may include, wherein the report of abuse derives from a telecommunications carrier.

A further embodiment of the present disclosure may include, wherein the report of abuse derives from a business entity.

A further embodiment of the present disclosure may include, wherein the routing rule is integrated within a call routing template.

A further embodiment of the present disclosure may include, wherein the call routing template is shared with an entity other than that generating the report of abuse.

A further embodiment of the present disclosure may include, wherein the routing of the call is manual instead of automatic.

A further embodiment of the present disclosure may include, wherein the report of abuse includes data relating to a responsible organization.

A further embodiment of the present disclosure may include, wherein the report of abuse includes data relating to a time of the abuse event.

A further embodiment of the present disclosure may include, wherein the report of abuse includes data relating to an originating number.

A further embodiment of the present disclosure may include, wherein the report of abuse includes data relating to a geographic location of an originating number.

A further embodiment of the present disclosure may include, wherein the report of abuse includes data relating to a geographic location of a terminating number.

A method according to one disclosed non-limiting embodiment of the present disclosure can include receiving a report of abuse of a toll-free telecommunications number; identifying an absence of an abuse event definition within a stored taxonomy that is related to the type of abuse reported; storing a new definition of the abuse event within the taxonomy; and creating a routing rule defining how a call that is associated with the abuse event is to be routed over a toll-free telecommunications system.

A further embodiment of the present disclosure may include, wherein the routing rule specifies an alternate terminating number to which to route an incoming call.

A further embodiment of the present disclosure may include, wherein the routing rule prevents further call routing over the toll-free telecommunications number.

A further embodiment of the present disclosure may include, wherein the stored definition is further associated with third party industry data.

A method according to one disclosed non-limiting embodiment of the present disclosure can include storing a taxonomy of abuse events that may occur regarding the usage of a toll-free telecommunications number; associating the abuse events in the taxonomy with a toll-free telecommunications number rating action; receiving a report of abuse of a toll-free telecommunications number; identifying at least one abuse event within the stored taxonomy and rating action that is related to content of the abuse report; automatically computing a rating for the toll-free telecommunications number based on the rating action; and reporting the rating to an entity.

A further embodiment of the present disclosure may include, wherein the rating is associated with a call routing rule.

A further embodiment of the present disclosure may include, wherein the call routing rule is shared with a service provider.

A further embodiment of the present disclosure may include, wherein the rating is used as metadata to tag the toll-free telecommunications number.

A mobile device according to one disclosed non-limiting embodiment of the present disclosure can include a unique toll-free ID (TFID) present in the mobile device, the TFID operable to facilitate toll-free communication between the mobile device and a manufacturer, the TFID hard flashed in the mobile device.

A further embodiment of the present disclosure may include, wherein the TFID is present at the time of manufacture of the mobile device.

A further embodiment of the present disclosure may include, wherein the TFID is operable to identify a customer.

A further embodiment of the present disclosure may include, wherein the TFID is operable to identify a toll free provider that is providing the toll free communication.

A further embodiment of the present disclosure may include, wherein the TFID is provided via a standard support app that is natively installed.

A further embodiment of the present disclosure may include, wherein the TFID is agnostic of type of mobile device.

A further embodiment of the present disclosure may include, wherein the TFID facilitates a consumer's ability to at least one of talk, message, view, and browse support related features associated with merchandise at a point of sale.

A further embodiment of the present disclosure may include, wherein the TFID facilitates a registration process toll-free call without incurring cost to the user.

A further embodiment of the present disclosure may include, wherein the TFID facilitates a warranty process toll-free call without incurring cost to the user.

A further embodiment of the present disclosure may include a TFID Mobile App resident on the mobile device, the TFID Mobile App operable with the TFID.

A further embodiment of the present disclosure may include, wherein the TFID Mobile App facilitates reading of at least one of a QR code, Barcode, RFID, and a serial number via a camera of the mobile device A method of communication via a toll-free service according to one disclosed non-limiting embodiment of the present disclosure can include associating at least one mobile device to merchandise purchased from a manufacturer via a unique toll-free ID (TFID) hard flashed in the mobile device, the TFID operable to facilitate toll-free communication between the mobile device and the manufacturer.

A further embodiment of the present disclosure may include reading of at least one of a QR code, Barcode, RFID, and a serial number via a camera of the mobile device.

A further embodiment of the present disclosure may include associating at least one of the QR code, Barcode, RFID, and the serial number with the TFID via a TFID Mobile App.

A further embodiment of the present disclosure may include identifying a customer via the TFID.

A further embodiment of the present disclosure may include identifying a toll free provider that is providing the toll free service via the TFID.

A mobile device according to one disclosed non-limiting embodiment of the present disclosure can include a unique toll-free ID (TFID) hard flashed in the mobile device, the TFID operable to facilitate toll-free communication between the mobile device and a manufacturer, the TFID used to associate a product with a toll-free number that includes metadata associated with the product.

A further embodiment of the present disclosure may include, wherein the TFID facilitates a customer service toll-free call without incurring cost to the user.

A further embodiment of the present disclosure may include, wherein the customer service toll-free call includes allowing the user to access multimedia content.

A further embodiment of the present disclosure may include, wherein the toll-free communication occurs in a location where the toll-free communication prevents incurring international roaming expenses on the device placing the communication A method according to one disclosed non-limiting embodiment of the present disclosure can include receiving data relating to toll-free number call activity from a toll-free telecommunications system, wherein the data includes at least one of call volume, call duration or call count data; receiving third party data relating to macroeconomic activity; modeling at least one of call duration or call count data with the third party data to derive a macroeconomic trend; receiving a request from a client device to present the macroeconomic trend; and presenting a representation of the macroeconomic trend to a user interface on the client device.

A further embodiment of the present disclosure may include, wherein the toll-free telecommunications system is a toll-free service provider.

A further embodiment of the present disclosure may include, wherein the toll-free telecommunications system is a service control point.

A further embodiment of the present disclosure may include, wherein the toll-free telecommunications system is an interexchange carrier.

A further embodiment of the present disclosure may include, wherein the third party data is stock market data.

A further embodiment of the present disclosure may include, wherein the third party data is Bloomberg data.

A further embodiment of the present disclosure may include, wherein the third party data is government data.

A further embodiment of the present disclosure may include, wherein the third party data is social media data.

A further embodiment of the present disclosure may include, wherein the third party data is credit card processing data.

A further embodiment of the present disclosure may include, wherein there is a temporal delay between the time of the request and the time of the presentation of long enough duration that the client device enters a sleep mode as regards the interaction, and the client device is activated out of sleep mode upon the presentation.

A method according to one disclosed non-limiting embodiment of the present disclosure can include receiving data relating to toll-free number call activity from a toll-free telecommunications system, wherein the data includes at least one of call duration or call count data; receiving metadata about the toll-free numbers that are the subject of the call activity, wherein the metadata includes data pertaining to at least one of business type or location; modeling at least one of call duration or call count data with the metadata to derive a macroeconomic trend; receiving a request from a client device to present the macroeconomic trend; and presenting a representation of the macroeconomic trend to a user interface on the client device.

A further embodiment of the present disclosure may include, wherein the business type is a governmental office.

A further embodiment of the present disclosure may include, wherein the governmental office is an unemployment office.

A method of distributing a macroeconomic data trend over a network to a remote client device, the method according to one disclosed non-limiting embodiment of the present disclosure can include providing a user interface dashboard to a user for installation on the remote client device; receiving third party social media data; modeling at least one of call duration or call count data with the third party social media data to derive a macroeconomic trend; receiving a request from the remote client device to present the macroeconomic data trend; generating an alert from the macroeconomic data trend that contains a stock name, stock price and a universal resource locator (URL), which specifies the location of the data source; transmitting the alert over a communication channel to the remote client device associated with the user based upon a destination address and transmission schedule that is associated with the remote client device, wherein the alert activates the user interface dashboard to cause the alert to display on the remote client device and to enable connection with the user interface dashboard when the remote client device is activated.

A further embodiment of the present disclosure may include, wherein the macroeconomic trend is a measure of customer sentiment.

A further embodiment of the present disclosure may include, wherein the macroeconomic trend includes an economic prediction based at least in part on the macroeconomic trend.

A further embodiment of the present disclosure may include, wherein the economic prediction is a probability of an economic activity's occurrence.

A further embodiment of the present disclosure may include, wherein the economic activity is increased consumer spending.

A further embodiment of the present disclosure may include, wherein the economic prediction is further associated with geographic data, wherein the geographic data is obtained at least in part from historical data relating to toll-free number usage.

A further embodiment of the present disclosure may include, wherein the economic prediction is further associated with geographic data, wherein the geographic data is obtained at least in part from historical data relating to social media usage.

A method according to one disclosed non-limiting embodiment of the present disclosure can include receiving data relating to toll-free number call activity from a toll-free telecommunications system; receiving third party data; modeling the data relating to toll-free number call activity with the third party data to derive a trend; comparing the trend with historical trend data; creating a trend confidence score based at least in part on the comparison; receiving a request from a client device to present the trend; and presenting a representation of the trend and the confidence score to a user interface on the client device.

A further embodiment of the present disclosure may include, wherein the trend is a macroeconomic trend.

A further embodiment of the present disclosure may include, wherein the data relating to toll-free number call activity includes at least one of call duration data or call count data.

A further embodiment of the present disclosure may include, wherein the toll-free telecommunications system is a toll-free service provider.

A further embodiment of the present disclosure may include, wherein the toll-free telecommunications system is a service control point.

A further embodiment of the present disclosure may include, wherein the toll-free telecommunications system is an interexchange carrier.

A further embodiment of the present disclosure may include, wherein the third party data is stock market data.

A further embodiment of the present disclosure may include, wherein the third party data is Bloomberg data.

A further embodiment of the present disclosure may include, wherein the third party data is government data.

A further embodiment of the present disclosure may include, wherein the third party data is social media data.

A further embodiment of the present disclosure may include, wherein the third party data is credit card processing data.

A further embodiment of the present disclosure may include, wherein there is a temporal delay between the time of the request and the time of the presentation of long enough duration that the client device enters a sleep mode as regards the interaction, and the client device is activated out of sleep mode upon the presentation.

A method according to one disclosed non-limiting embodiment of the present disclosure can include sampling toll-free number call activity from a toll-free telecommunications system; repeating the call sampling during a tuning period until a statistically significant data store is created; receiving metadata about the toll-free numbers that are the subject of the call activity; modeling the data relating to toll-free number call activity with the metadata to derive a macroeconomic trend; receiving a request from a client device to present the macroeconomic trend; and presenting a representation of the macroeconomic trend to a user interface on the client device.

A further embodiment of the present disclosure may include, wherein the metadata includes data pertaining to at least one of business type or location A further embodiment of the present disclosure may include, wherein the business type is a governmental office.

A further embodiment of the present disclosure may include, wherein the governmental office is an unemployment office.

A further embodiment of the present disclosure may include, wherein the metadata about the toll-free numbers is tied to a forward-looking indicator.

A further embodiment of the present disclosure may include, wherein the metadata about the toll-free numbers includes historical changes in the macroeconomic data.

A method according to one disclosed non-limiting embodiment of the present disclosure can include sampling toll-free number call activity from a toll-free telecommunications system; repeating the call sampling during a tuning period until a statistically significant data store is created; receiving metadata about the toll-free numbers that are the subject of the call activity; receiving third party data; modeling the data relating to toll-free number call activity to derive a toll-free call activity trend; modeling the third party data to derive a macroeconomic trend; comparing the toll-free call activity trend with the macroeconomic trend; creating a trend score based at least in part on the comparison, wherein the trend score expresses an association between the toll-free call activity trend and the macroeconomic trend; an presenting the trend score to a user interface on a client device.

A further embodiment of the present disclosure may include, wherein the toll-free telecommunications system includes a plurality of carriers.

A method of searching for a toll-free number according to one disclosed non-limiting embodiment of the present disclosure can include storing a user's toll-free number search history, wherein the search history includes at least one search parameter entered by the user when searching for an available toll-free number; identifying criteria of a customer-desired toll-free number based at least in part on the search parameter; associating each of a toll-free number inventory with at least one search parameter; searching the inventory for a toll-free number matching the criteria of the customer-desired toll-free number; and sending an offer to the user, wherein the offer includes a notification of the available toll free number matching the criteria of the customer desired toll-free number.

A further embodiment of the present disclosure may include, wherein identifying the search number history includes identifying the frequency of a search for a particular toll free number.

A further embodiment of the present disclosure may include identifying toll free numbers that are to become available.

A further embodiment of the present disclosure may include identifying a toll free number associated with the search history with at least one toll free number that is to become available.

A further embodiment of the present disclosure may include presenting predictive search results at each future user login.

A further embodiment of the present disclosure may include presenting predictive search results to the user on a recurring basis.

A further embodiment of the present disclosure may include presenting predictive search results to the user via email on a subscription basis.

A further embodiment of the present disclosure may include examining toll-free numbers that are going to become available and determine if the toll-free numbers meet a pattern to which the user has expressed interest.

A further embodiment of the present disclosure may include, wherein the search number history includes at least one of searching a current responsible organization inventory, an overall search history, and a list of upcoming available toll free numbers.

A further embodiment of the present disclosure may include automatically reserving the toll free number associated with the previous search number history to the user.

A further embodiment of the present disclosure may include, wherein offer facilitates automatically reserving the toll-free number as a fee-based function.

A method of searching for a toll-free number according to one disclosed non-limiting embodiment of the present disclosure can include storing a listing of toll-free numbers that are associated with a responsible organization, wherein the association is based at least in part on a toll-free number being managed by the responsible organization; entering a search parameter for an available toll-free number, wherein the search parameter is associated with a characteristic of a toll-free number being managed by the responsible organization; receiving a toll-free number search result, based at least in part on the search parameter, wherein the toll-free number in the search result is among toll-free numbers that are available for reservation; and sending an offer to reserve the toll-free number in the search result.

A method of searching for a toll-free number according to one disclosed non-limiting embodiment of the present disclosure can include entering a search parameter for an available toll-free number; receiving a listing of toll-free numbers in a search result, based at least in part on the search parameter, wherein the toll-free numbers in the search result are ordered according to their availability for reservation and include toll-free numbers bearing a relation to the search parameter that are currently available for reservation and numbers that are not currently available for reservation but will become available within a time frame defined a user performing the search; and presenting the listing to the user.

A further embodiment of the present disclosure may include presenting an offer to reserve a toll-free number in response to the presenting the listing.

A further embodiment of the present disclosure may include presenting a means for the user to activate a toll-free number within the listing.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE FIGURES

Various features will become apparent to those skilled in the art from the following detailed description of the disclosed non-limiting embodiments. The drawings that accompany the detailed description can be briefly described as follows:

FIGS. 22-26 depict a schematic view of a system for search result population based on customer profile/behavior.

FIG. 27 depicts a simplified view of a toll-free Management Architecture.

FIGS. 36-39 are schematic views of a one-click activation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the methods and systems disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art. The claims should be consulted to ascertain the true scope of the disclosure.

Figure 1:
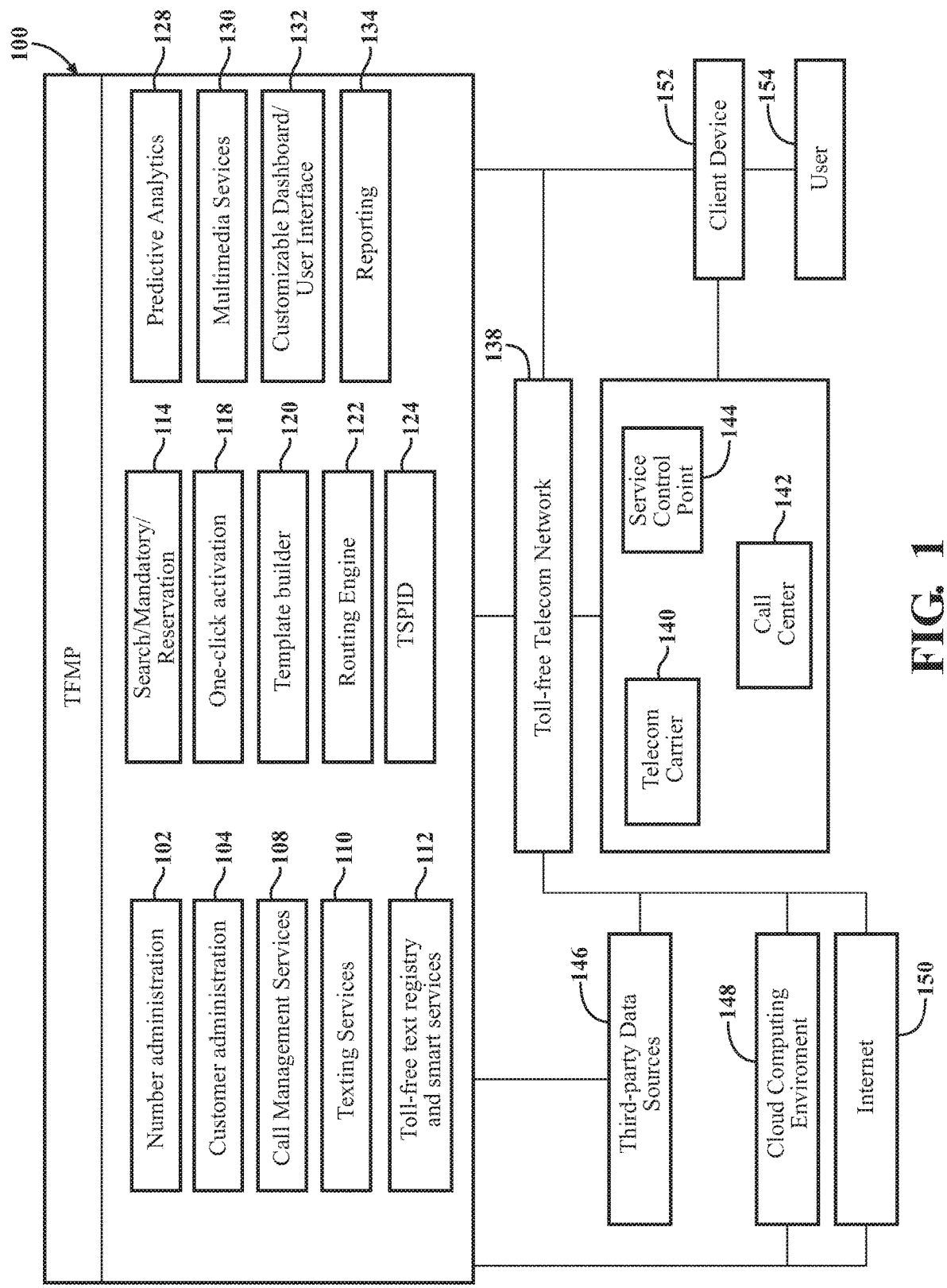
FIG. 1 depicts a high level view of a toll-free management platform.

With reference to FIG. 1, a Toll-Free Management Platform (TFMP) 100 includes methods and systems for number administration 102, customer administration 104, call management services 108, texting services 110 and text registry, and a smart services registry 112, as described herein. The TFMP may allow users to search for, receive recommendations for, and make reservations of toll-free numbers 114. A user interface may allow activating a toll-free number, for example through a one-click activation function 118, as described herein. Users may access the TFMP to create and access existing templates 120 of toll-free call routing templates, and utilize a routing tree engine 122 to create customized call routing trees for the toll-free numbers of interest to the user. A Toll-Free Service Provider ID "TSPID," 124 may provide an aggregate identifier for Service Registrars, who provide services such as, but not limited to, SMS, MMS, video conferencing, and streaming content. Predictive analytic services 128 may be provided that allow a user 154 through a customizable user interface, or "dashboard," 132 to access third party data sources 144 and information derived from toll-free telecommunications networks, including but not limited to telecommunications carriers 140, service control points 144, call centers 142, or other parties affiliated with a toll-free telecommunication network 138. Access to third party data sources 146 outside of the TFMP 100 may be, for example, through the Internet 150, a cloud computing environment 148, a virtual private network, or some other connectivity. A user 154 may access the reporting capabilities of the TFMP through a client device 152, such as a personal computer, mobile phone, tablet computer, or some other computing facility, and receive data, including multimedia to the user's client device. Functionalities of the TFMP include, but are not limited to, Number Administration (NA) and Customer Record (CR) administration (FIG. 2).

Figure 2:
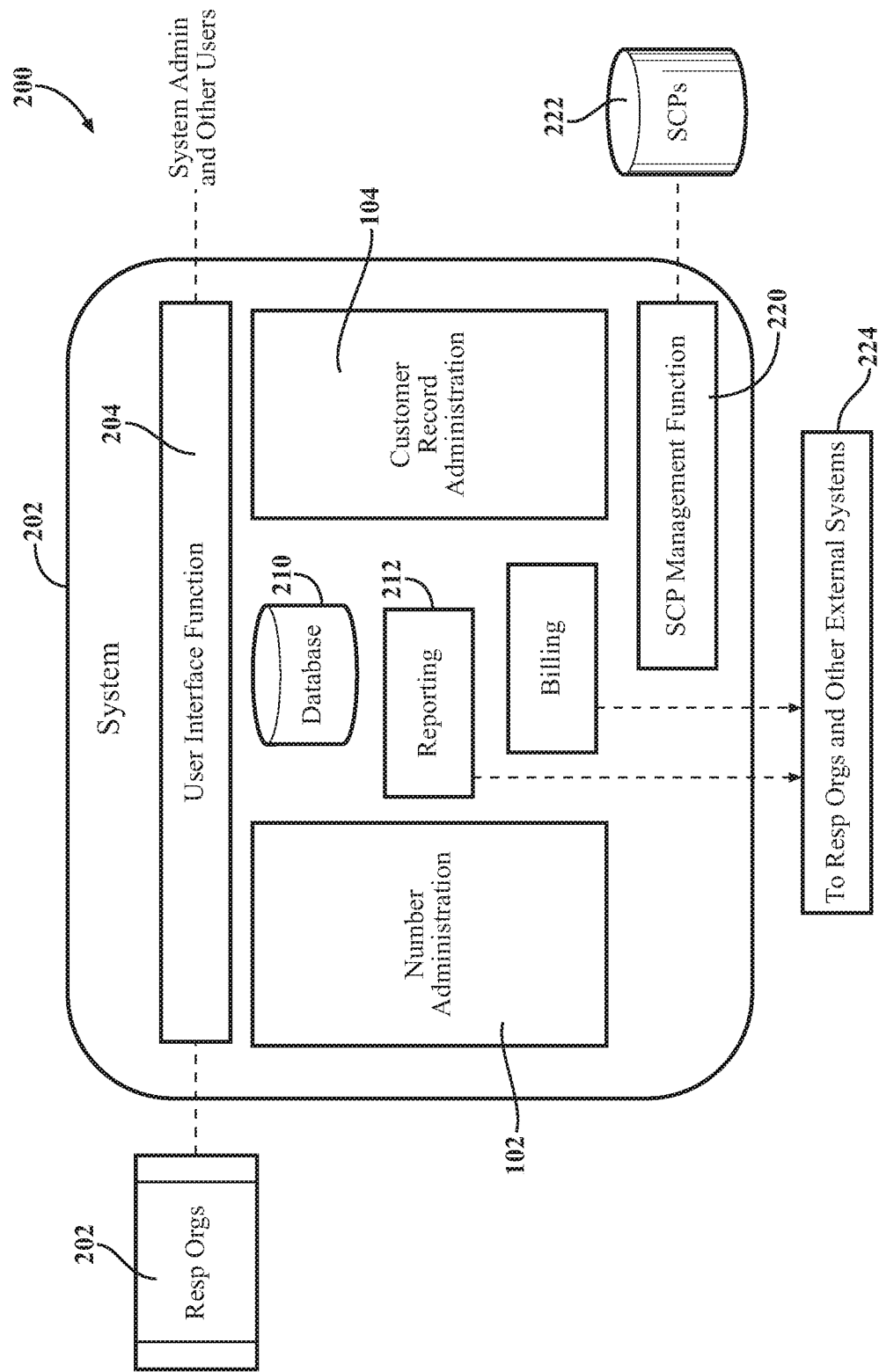
FIG. 2 depicts a simplified illustration of a toll-free management platform.

With reference to FIG. 2, the main functional components of the TFMP 100, illustrating examples of the functionality provided by the TFMP and interfaces 204 to the TFMP 100. The NA function 102 may allow toll-free providers to search a pool of toll-free numbers using specified criteria and reserve numbers that will be used by toll-free subscribers, and perform CR administration 104. This functionality may include, but is not limited to, storing toll-free provider and telecommunications data 210, reporting processes 212, billing, and service control point (SCP), and management functionality 220 for the coordination with SCPs 222.

Responsible organizations, also referred to herein as "RespOrgs," 202, may utilize the TFMP 100. Reporting from the TFMP 100 may be back to RespOrgs or to other systems and platforms 124 that are external to the TFMP 100. The TFMP enables searching for any random number or to search for a plurality of numbers that are consecutive and/or include an indicated combination of digits. Since certain toll-free number codes (e.g. 800) and combinations of digits (e.g. repeating digits, digits whose corresponding telephone keypad letter values spell a word or phrase) may be considered most desirable, the NA function 102 includes capabilities for searches and reservations to be handled so that a toll-free provider does not gain an advantage to reserve a given toll-free number.

The TFMP 100 also enables tracking the overall assignment of numbers for each toll-free provider to enforce regulations for toll-free number allocation specified by a tariff. NA may maintain a status for each number that reflects whether it has been reserved and whether a customer record has been created and sent to SCPs. It is possible to query the TFMP 100 for status and reservation information associated with a toll free number.

A view of the main functional components which is intended to illustrate the functionality provided by embodiments of the system and is not intended to reflect design or implementation of the current system or a potential replacement system. In addition to the functional components embodiments may alternatively or additionally provide Operations, Administration, Maintenance, and Provisioning (OAM&P) capabilities to configure, maintain, monitor and audit the system.

The NA function 102 facilitates toll-free service providers to search the pool of toll-free numbers using specified criteria and reserve numbers that can be used by toll-free subscribers. It is possible to search for any random number or to search for a number or numbers that may be consecutive and/or include an indicated combination of digits. Numbers may be reserved on a First In-First Out basis. It is also necessary to track the overall assignment of numbers for each toll-free service provider in order to enforce regulations for toll-free number allocation specified by a tariff.

The NA function 102 may maintain a status for each number that reflects whether it has been reserved and whether a customer record has been created and sent to SCPs. It is possible to query embodiments of the system for status and reservation information associated with a number.

A reserved toll-free number becomes active when routing information for the number, specified in a CR, is uploaded into SCPs. The CR administration 104 function facilitates toll-free service providers to create a CR and to specify when the information should be sent to SCPs. Records can be updated or deleted and the send time can be updated prior to sending. Once a CR has been sent, a record can be created to update or delete the routing specified by the previous record. The routing information specified in a customer record may typically includes:

An Area of Service (AOS) that specifies from where the toll-free number can receive calls;
The carrier that can route calls to the toll-free number;
The terminating number that can receive calls to the toll-free number; and
Optionally, a set of rules that specifies different routing based on criteria like time of day and area from where the call originated.

Carriers who have arrangements to carry calls for a toll-free service provider may approve the CR when routing for a toll-free number has been assigned to the carrier. The CR administration 104 maintains a list of carriers and preferences for whether approval is required when a toll-free service provider indicates the carrier in a CR. A notification is sent carrier when approval of a CR is required. Each CR has an associated status. CRs can be queried to view the status and information contained in the record, based on the permissions of the user.

The user interface function facilitates manual access for human users and mechanized access for systems to make use of the NA and CR functions. The mechanized interface provided by a current system is known as Mechanized Generic Interface (MGI). Capabilities may be required for external users to establish data connectivity with embodiments of the system and gain access to the available functions. In embodiments, the system can maintain logins and passwords to provide security to limit system access to only authorized users. Permission levels that restrict access to system functions and to proprietary data may be assigned for each authorized user. In addition, the user interface function may provide notifications and other information to external users using mechanisms such as email and File Transfer Protocol (FTP).

In embodiments, interfaces are maintained to send routing information from CRs to SCPs. The SCP Management Function manages interactions with SCPs, including maintaining data connectivity, sending CR information at the specified date and time and monitoring responses in order to update customer record status. The SCP interface is specified by TM-STS-00798, CMSDB/SMS Interface Specification Manual and Interface Message Manual.

The SCP Administration functions allow users to establish and modify SCP-related reference data in embodiments of the system and send messages to the SCP node and the Call Management Services Database (CMSDB) within the SCP to manage data tables at the SCP.

Network management functions for toll-free database service involves the management of various automatic capabilities intended to monitor and control toll-free query traffic and calling volumes at the Service Control Points, Service Switching Points, terminating switches and terminating subscriber lines. When various call volume thresholds may be exceeded, the SCPs trigger Automatic Code Gapping (ACG) controls at the originating SSPs. The Network Management functions allow network managers to configure and adjust the relevant control parameters. Data collection at the SCPs can be requested to provide network managers with relevant surveillance information useful to monitor traffic and analyze problems, such as the detection of SCP overloads and excessive calling or excessive ineffective attempts to dialed codes.

To track user actions, system events, and performance statistics and format the information into reports for toll-free service providers and system administrators, embodiments of the system may provide capabilities for users to request reports and for delivery of report results in various formats. Reports may be requested online by users as per the assigned permissions and delivered over the interface on which the report was requested. It is also possible for users to request reports offline. Offline reports may be compiled in embodiments by the system administrator using information provided by the system. It should be appreciated that other requests may be performed.

The disclosed embodiment may track and report on events that can result in charges to toll-free service providers. A tariff specifies the rate elements that can result in charges on a monthly bill and the rate to be charged. A tariff specifies the rate elements that can result in charges on a monthly bill and the rate to be charged. These include establishment of a system logon ID, monthly access to the system, reservation of a toll-free number, and report requests. Information provided by embodiments of the system is needed to calculate monthly charges and create monthly bills that may be sent to each toll-free service provider.

The user interface function facilitates manual access for human users and mechanized access for systems to make use of the NA and CR functions provided by the disclosed embodiment. The mechanized interface provided by the current system is known as Mechanized Generic Interface (MGI). Capabilities may be required for external users to establish data connectivity with the system and gain access to the available functions. The system maintains logins and passwords to provide security to limit system access to only authorized users. Permission levels that restrict access to system functions and to proprietary data may be assigned for each authorized user. In addition, the user interface function provides notifications and other information to external users using mechanisms such as email and File Transfer Protocol (FTP).

The security function defines a security framework that identifies the aspects of a system or service that require security and the methods available to address the security threats for each. From a security perspective, a system or service can be viewed as consisting of user, control and Management planes. Each plane includes infrastructure, services, and application layers.

Toll free may have unique IP requirements. The North American Numbering Plan Administration (NANPA) administers geographic numbers. Number portability is handled through the Number Portability Administration Center (NPAC). Toll-free numbers require enhanced number management capabilities for the following primary reasons:

The significantly higher search load on NPAC due to unique toll-free search patterns diluting and distracting from its core purpose.

Toll-free numbers have strict rules around hoarding, bartering, auctioning and fair trade practices.

Toll-free numbers differ in their access patterns compared to geographic numbers:

Toll-free numbers have to go through an allocation process for assignment and sparing, as specified by the FCC.

Toll-free numbers have strict rules around hoarding, bartering, auctioning and fair trade practices.

Prior to assigning toll-free numbers, owners traverse a validation and vetting process to establish identity compared to straight number allocation for a geographic number. Vanity toll-free numbers typically may be searched millions of times during a day compared to $100s$ of searches for a geographic number in an entire year.

Toll-free number portability has its own set of rules that may be more strict and different from geographic numbers. Relying solely on the geographic number NPAC would be inadequate since toll-free numbers differ in their use and management from geographic numbers.

The NA function 102 may allow toll-free providers to search a pool of toll-free numbers using specified criteria and reserve numbers that will be used by toll-free subscribers, and perform CR administration 218. This functionality may include, but is not limited to, storing toll-free provider and telecommunications data 210, reporting processes 212, billing, service control point (SCP), and management functionality 220 for the coordination with SCPs 222. Responsible organizations, also referred to herein as "RespOrgs," 202, may utilize the TFMP 100. Reporting from the TFMP 100 may be back to RespOrgs or to other systems and platforms 224 that are external to the TFMP 100. The TFMP 100 facilitates searching for any random number or to search for a plurality of numbers that are consecutive and/or include an indicated combination of digits. Since certain toll-free number codes (e.g. 800) and combinations of digits (e.g. repeating digits, digits whose corresponding telephone keypad letter values spell a word or phrase) may be considered most desirable, the NA function 102 includes capabilities for searches and reservations to be handled so that a toll-free provider does not gain an advantage to reserve a given toll-free number. The TFMP also enables tracking the overall assignment of numbers for each toll-free provider in order to enforce regulations for toll-free number allocation specified by a tariff. The NA function 102 may maintain a status for each number that reflects whether it has been reserved and whether a customer record has been created and sent to SCPs. It is possible to query the TFMP 100 for status and reservation information associated with a number.

The TFMP 100 enables customer record administration, allowing toll-free providers to create a customer record and to specify when the information should be sent to SCPs. A reserved toll-free number may become active when routing information for the number, specified in a customer record, is uploaded into SCPs. Customer records may be updated or deleted and the send time updated prior to sending. Once a customer record has been sent, a new record may be created to update or delete the routing specified by the previous record. The routing information specified in a customer record may include, but is not limited to:

An Area of Service (AOS) that specifies from where the toll-free number can receive calls The carrier that will route calls to the toll-free number The terminating number that will receive calls to the toll-free number A set of rules that specifies different routing based on criteria like time of day and area from where the call originated Carriers who have arrangements to carry calls for a toll-free provider may wish to approve customer records when routing for a toll-free number has been assigned to the carrier. The customer record function may maintain a list of carriers and preferences for whether approval is required when a toll-free provider indicates the carrier in a customer record. A notification may be sent to a carrier when approval of a customer record is required. In embodiments, each customer record may have an associated status. Customer records may be queried to view the status and information contained in the record, based on the permissions of the user.

In another disclosed non-limiting embodiment, the TFMP may include a user interface functionality that allows manual access for human users and mechanized access for systems (such as an application programming interface) to make use of the NA and CR functions provided by the TFMP. The user interface functionality may be embodied in a distributed computing environment, such as a "cloud" based computing network. In another embodiment, the user interface functionality may be embodied in hybrid networks, including usage of a cellular telephone network (and associated mobile communication devices, such as smart phones), a distributed, cloud network and an enterprise network associated with a carrier or other business organization (and any combination or sub-combination of such networks). The mechanized interface provided by the TFMP may also allow external users to establish data dynamic connectivity with the platform and gain access to its available functions. The TFMP may maintain logins, passwords, encryption, authentication, and the like to provide security to limit system access to only authorized users. Permission levels that restrict access to TFMP's functions and to proprietary data may be assigned for each authorized user, and stored locally or remotely to an enterprise utilizing the TFMP, including within a computing storage facility that is remote to, but operatively coupled, with the TFMP. In embodiments, the user interface functionality may provide real time notifications and other information to external users using mechanisms such as email and File Transfer Protocol (FTP).

In another disclosed non-limiting embodiment, the TFMP may provide an interface to send routing information from CRs to SCPs. The SCP Management Function of the TFMP may enable management of interactions with SCPs, including maintaining data connectivity, sending CR information at the specified date and time, and monitoring responses in order to update customer record status. The SCP interface may include an interface that is based on the specification provided by TM-STS-00798, CMSDB/SMS Interface Specification Manual and Interface Message Manual.

In another disclosed non-limiting embodiment, the SCP administration functions of the TFMP may allow users to establish and modify SCP-related reference data in the system and send messages to the SCP node and the Call Management Services Data Base (CMSDB) within the SCP to manage data tables at the SCP. Network management functions for toll-free database services may involve the management of various automatic capabilities intended to monitor and control toll-free query traffic and calling volumes at the SCPs, Service Switching Points, terminating switches, terminating subscriber lines, and the like. When various call volume thresholds are exceeded, the SCPs may trigger Automatic Code Gapping (ACG) controls at the originating SSPs. The TFMP's management functions may allow network managers to configure and adjust relevant control parameters. Data collection at the SCPs may be requested through the TFMP to provide network managers with surveillance information that is useful to monitor traffic and analyze problems, such as the detection of SCP overloads and excessive calling or excessive ineffective attempts to dialed codes.

In another disclosed non-limiting embodiment, the TFMP may enable reporting functionalities that allow tracking user actions, system events, performance statistics, and other events and formatting the information into reports for toll-free providers and system administrators. The TFMP may provide capabilities for users to request reports and for delivery of report results in a plurality of formats. Reports may be requested online by users as per the assigned permissions and delivered over the interface on which the report was requested. Requests may be made from any computing facility, including, but not limited to, a personal computer, laptop computer, tablet, mobile communication facility (such as a smart phone), or some other type of computing device. It may also be possible for users to request reports off-line using the TFMP. For example, a system administrator using information provided by the platform may dynamically compile off-line reports. In embodiments, the TFMP may track and report on real time events that will result in charges to toll-free providers. A tariff specifies the rate elements that may result in charges on a monthly bill and the rate to be charged. These may include, but are not limited by, establishment of a system logon ID, monthly access to the system, reservation of a toll-free number, report requests, or some other type of element. Information provided by the TFMP may be needed to calculate monthly charges and create monthly bills that are sent to each toll-free provider.

The current practice of managing toll-free numbers and activities, and the tools currently available to users for building a complex customer record, are very often single threaded and cumbersome. In addition, the current industry practices do not provide the ability to define a default customer record for a user, in part because it may not be intuitive to build a complex customer record. According to the methods and systems presently disclosed, the TFMP may provide tools that work intelligently with the user, allowing a natural language input, such as English words, to translate and map such language to signifiers that may be less familiar to a user, such as call routing codes. This translation and mapping of natural language to toll-free number management information and data may produce a dynamic, complex customer record, including using existing user records and usage data, to populate information for the user. This may speed the creation of complex routing and other metadata that is associated with a toll-free line, based at least in part on the TFMP enabling the dynamic querying of the real time status of data that is associated with a toll-free number, guide the user in providing the necessary natural language information that allows the TFMP to map such language to toll-free number metadata (e.g., routing codes), and store and implement a complex decision tree describing the actions to take for a given toll-free number.

In an example, the TFMP may provide a user interface in which a user types a command such as "Route all incoming calls made to toll-free numbers having the extension 571 to the technical support staff" The TFMP may take this natural language input and map it to routing codes or other data corresponding to the natural language. In another example, the natural language may be selected from a menu that is provided in the user interface of the TFMP, provided via voice command using voice recognition software, via scanned text that is input to the TFMP, or using some other means of conveying natural language. The Customer Record Template Builder (CRTB) of the TFMP may allow building a complex customer record template using a user interface, enabling that record to be designated as the default customer record. Using the TFMP, a toll-free provider may build multiple complex customer record templates for their use and define a record as the default customer record, allowing the user to select the default with a single click, thus reducing their work effort.

In another disclosed non-limiting embodiment, the CRTB may lead a user through an initial customer data population (known as the Customer Administrative Data (CAD) portion), and also the call routing logic (Call Processing Record; known as the CPR portion) that is associated with a toll-free number, by utilizing the TFMP user interface to construct a decision tree logic structure with defined data nodes derived from the user's natural language inputs.

Based upon the decisions at the nodes in the decision tree that is constructed by the TFMP, the user interface may drive down a branch to a new decision node ultimately driving the customer record decision logic to the lowest level. In embodiments, decision trees constructed by the TFMP based on a user's input may represent a series of decision points. Each decision point may be called a node and off of each node may be one of more branches. The point at which there are no more decisions to be made may be referred to as a leaf and used as the "end point" of a branching structure.

Figure 3:
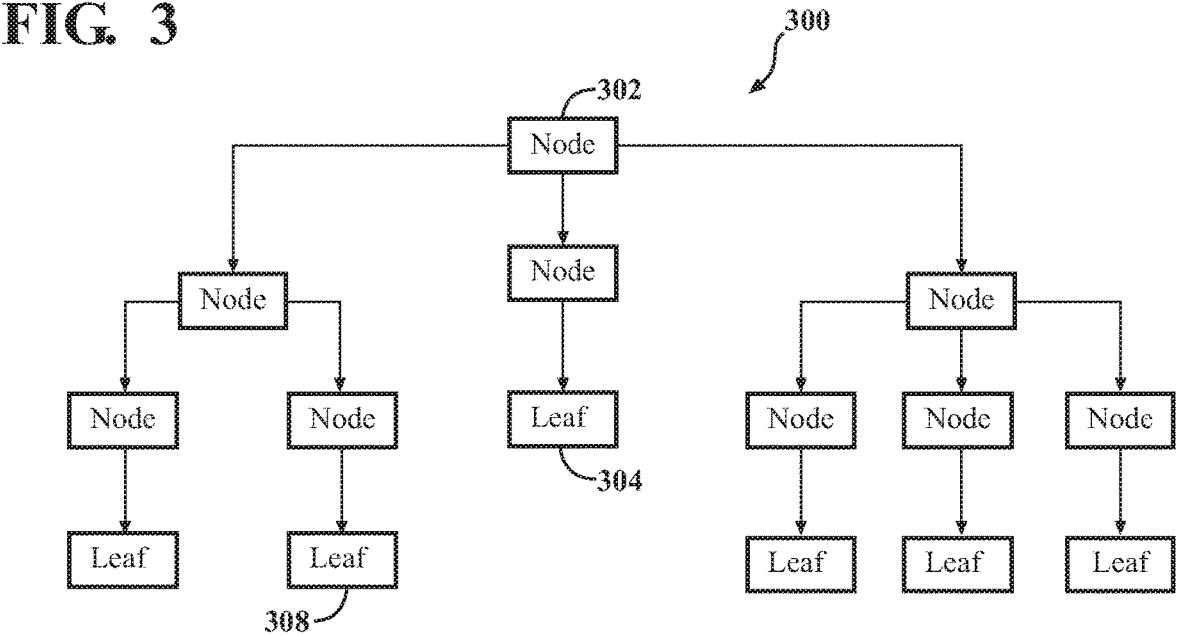
FIG. 3 depicts a schematic view for a decision tree for the Customer Record Template Builder (CRTB).

FIG. 3 illustrates an example generic visualization of one possible decision tree structure 300 created by the TFMP 100. For example, a call to a particular toll-free number may initially have a node 302 based on the area code from which the toll-free number is called, to segregate an East Coast or West Coast technical support staff. Then, the next node may be a time node to segregate the time of day between business hours where the call is routed to the technical support staff, or after business hours where the call is routed to a voicemail system. The decision tree may further branch into "leaves" 304, 308 to indicate additional routing rules, such as specifying a single termination number for a received call to be routed to, a particular department within an organization, or some other routing tree rule. The TFMP performs such routing essentially instantaneously or near instantaneously.

In another disclosed non-limiting embodiment, the CAD portion of the CRTB may logically lead a user to populate information including, but not limited to, the following:
Administrative data about the toll-free customer
  Toll-Free Number
  Effective Date and Time
  Control Toll Free Provider Identifier
  End Customer Name
  End Customer Address
Area of Service (AOS)
List of destination telephone number(s)
Carrier Identification Codes (CICs) for IntraLATA and InterLATA traffic In another disclosed non-limiting embodiment, complex customer record (CPR) decision nodes that may be supported by the TFMP include, but are not limited to, the following:
Originating State
Originating Numbering Plan Area (NPA)
Originating LATA
Originating Plain Old Telephone System (POTS) Central Office Exchange (NXX)
Originating POTS NPANXX
Originating POTS number
Specific date
Day(s) of the week
Time-of-day range
Percent load share, which may be used to automatically direct different percentages of processed queries (calls) to different branches below the node.

In another disclosed non-limiting embodiment, the "leaves" that may be supported by the TFMP data model at the ends of a given branch include, but are not limited to, the following:
Destination Telephone Number
Carrier
Announcement Treatment With reference to FIG. 4, a simplified depiction of a customer record routing, created using the TFMP, is provided. In this simple example, starting from the left-most branched path, the three decision paths corresponding to the decision trees branched paths may be represented as a routing from a toll-free number 400, detecting an area code 402, an exchange 404, carrier 408, and terminating telephone number 410, as in the following example:
  Area Code=732, NXX={699,494}, Carrier=ATX-0288, Tel #=800-234-5678
  Area Code=732, NXX=Other, Carrier=MCI-0222, Tel #=800-234-5678
  Area Code=Other, NXX=<null>, Carrier=MCI-0222, Tel #=800-234-5678.

Figure 4:
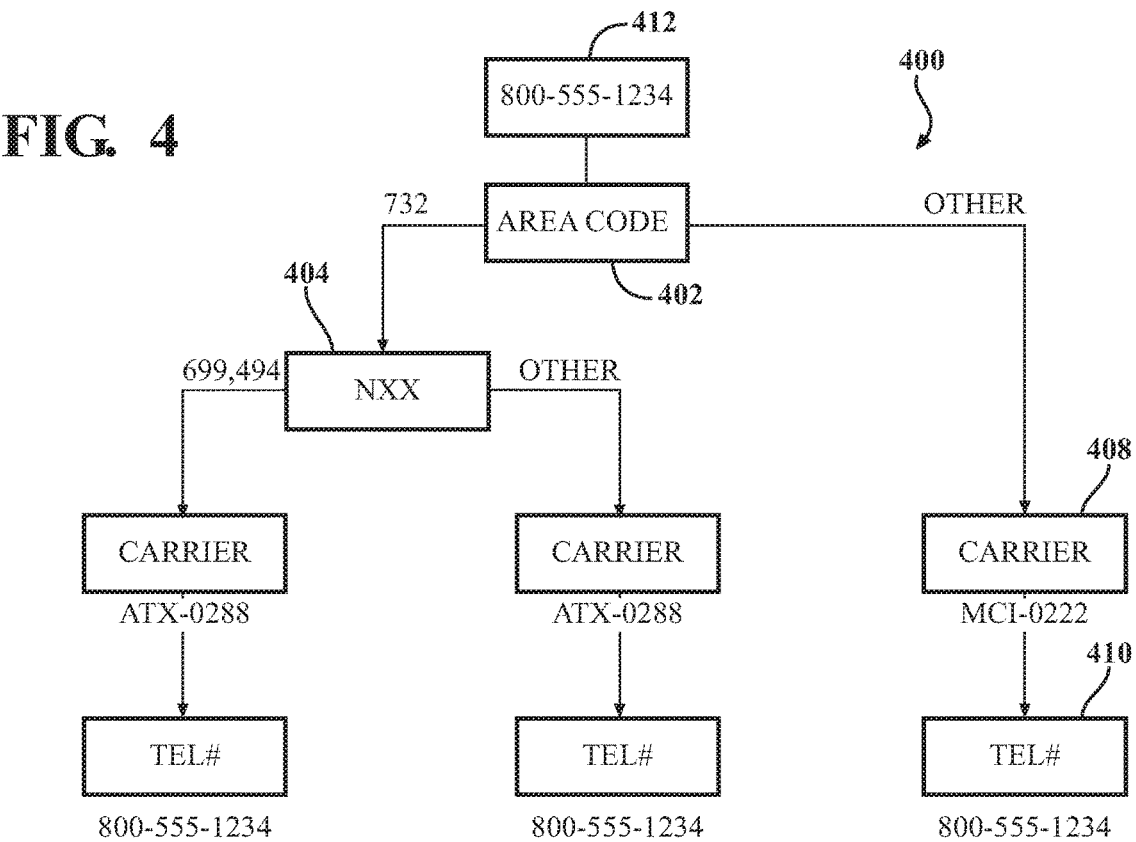
FIG. 4 depicts a schematic of an example conceptual Call Processing Record (CPR) Routing Tree.

Continuing the example of FIG. 4 using the TFMP, the CRTB toll may be built in such a manner to allow a user to work though the decision tree and anticipate/prepopulate information based upon the information already provided in this build or also information provided in previous customer record entries. Once a default customer record template is built, the TFMP may invoke this template when creating a customer record for a new number, thus reducing the time and effort for a subsequent customer record to be built. Invocation of the default customer record template by the TFMP may also serve to reduce human error associated with the manual creation of such records insofar as the template may already embody necessary data, thereby not requiring a user to remember or retrieve the same.

Figure 5:
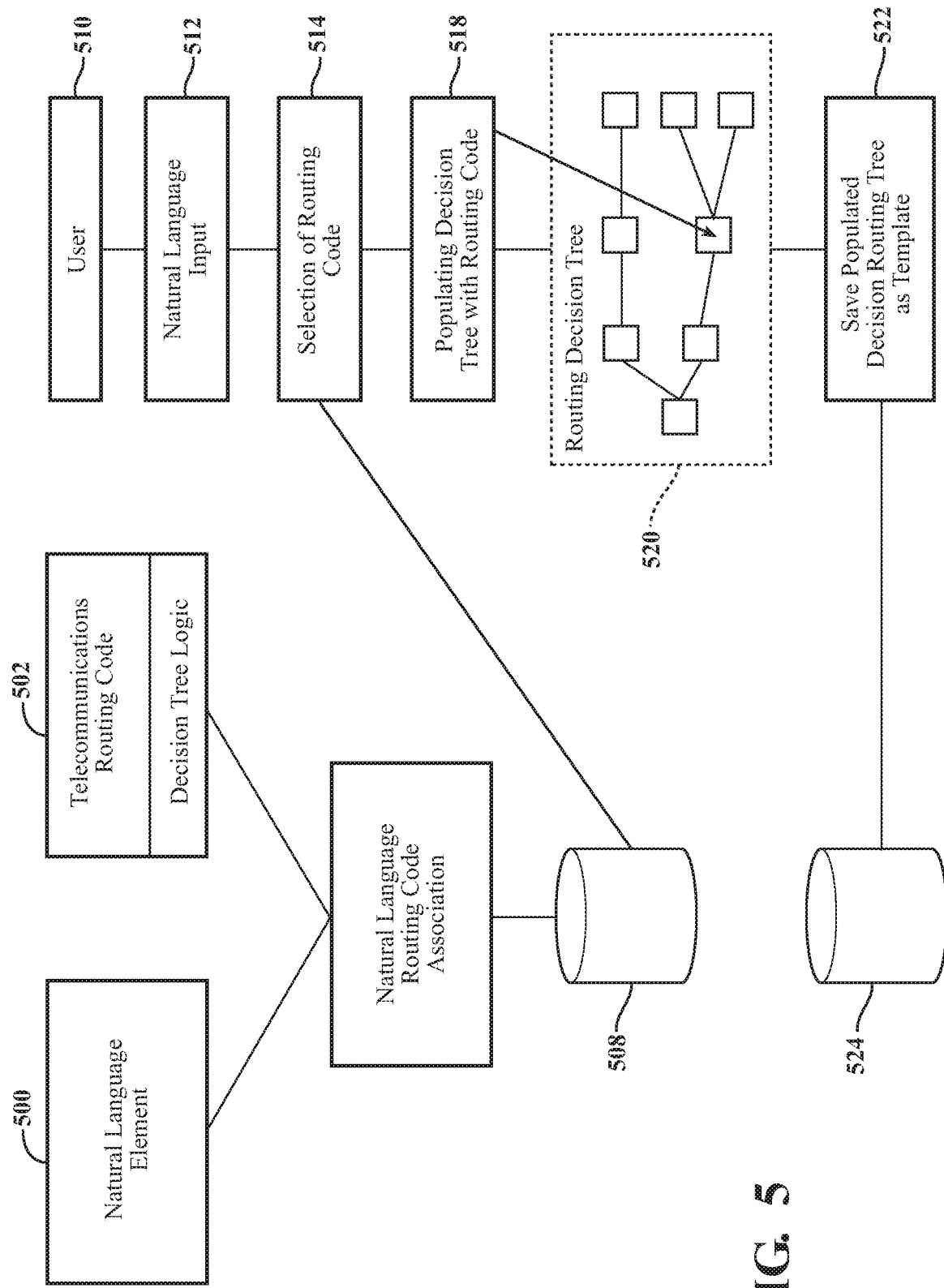
FIG. 5 depicts a simplified flow diagram for constructing a call routing template based at least part on natural language inputs from a user.

With reference to FIG. 5, the methods and systems of the present disclosure may provide for pre-populating a call routing template based on natural language inputs including, associating a natural language element 500 with a telecommunications routing code 502, the telecommunications routing code associated with decision tree logic associating routing of incoming calls to a toll-free number 504; storing the association in a database 508 that is associated with a toll-free telecommunications system; receiving a natural language input 512 from a user 510, the natural language input 512 may include the natural language element 500; selecting the telecommunications routing code 514 based at least in part on the stored association 504; populating the telecommunications routing code 518 at a node of a call routing decision tree 520 to generate a populated call routing decision tree 522; and storing the populated call routing decision tree as a call routing template 524 that may be identified and presented to a user interface based at least in part on the natural language input.

In embodiments, a natural language input may be a text or voice element. A text element may be a scanned text element. A voice element may be obtained by voice recognition software.

In embodiments, the decision tree logic may determine the call path taken by an incoming toll-free call to a termination number, the call path taken by an incoming toll-free call based at least in part on the time of day the incoming call is received, the call path taken by an incoming toll-free call based at least in part on the geographic location of the device from which the incoming call is received, the call path taken by an incoming toll-free call within a business entities telecommunications system, or some other call path outcome.

Further provided herein are methods and systems for creating a call routing decision tree, the system comprising a user device of a user configured to receive a natural language input from a user; select a stored call routing template, wherein the selection is based at least in part on a stored association of the call routing template and a natural language element that is included in the natural language input; present the stored call routing template to the user within a graphic user interface; receive a command from the user, through the graphic user interface, to associate the selected call routing template with a toll-free number indicated by the user; and store the association between the call routing template and the toll-free number.

In embodiments, the command from the user may be text-based, such as a text-based item that is presented within the graphic user interface in a menu or other location. In embodiments, the command may be a voice command.

The following are illustrative clauses demonstrating non-limiting embodiments of the disclosure described herein:

A method of pre-populating a call routing template based on natural language inputs comprising:
  associating a natural language element with a telecommunications routing code, the telecommunications routing code associated with decision tree logic associating routing of incoming calls to a toll-free number;
  storing the association;
  receiving a natural language input from a user, wherein the natural language input includes the natural language element;
  selecting the telecommunications routing code based at least in part on the stored association;
  populating the telecommunications routing code at a node of a call routing decision tree to generate a populated call routing decision tree;
  storing the populated call routing decision tree as a call routing template that may be identified and presented to a user interface based at least in part on the natural language input.

A system for creating a call routing decision tree, the system comprising:
  a user device of a user configured to:
  receive a natural language input from a user;
  select a stored call routing template, wherein the selection is based at least in part on a stored association of the call routing template and a natural language element that is included in the natural language input;
  present the stored call routing template to the user within a graphic user interface;
  receive a command from the user, through the graphic user interface, to associate the selected call routing template with a toll-free number indicated by the user; and
  store the association between the call routing template and the toll-free number.

Figure 6:
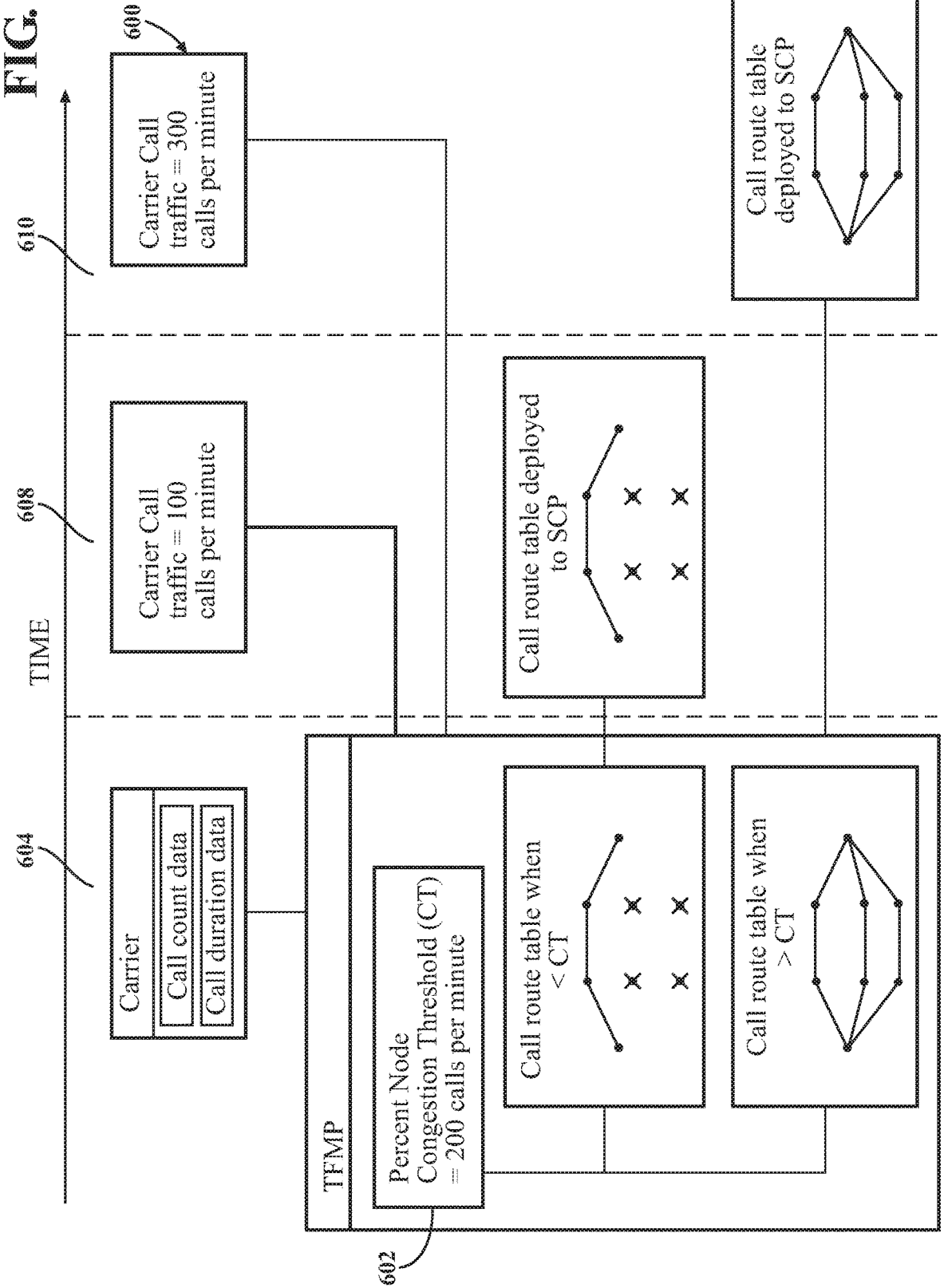
FIG. 6 depicts a schematic view of a routing tree based disaster recovery and performance statistic structure.

In embodiments, and with reference to FIG. 6, the TFMP may facilitate determining toll-free network congestion in real-time. The TFMP system may include a subsystem, referred to as a "node," and in this example embodiment called the Percent (%) Node 602. This node may be used to build a decision tree that is downloaded to the SCPs. The Percent Node may allow a tree to be built so that a certain percentage of the calls are routed to different branches on the call tree. The Percentage may be whole numbers and can range from 0% to 100%, with the total percentage for all sibling branches not to exceed 100%. This may allow Resp Orgs to use the TFMP as their disaster recovery routing for a toll-free number. In an example, a call routing tree may be built with multiple branches to different locations, such as terminating numbers. In a normal situation, 100% of the calls may go to a main location 604. In a disaster, which could be a carrier system failure, for example, and which may originate outside of the carrier itself, a call routing table created according to the Percent Node and related rules may allow that all calls are diverted to another branch 608, 610 on the tree that uses a different carrier.

In embodiments, real time network data may be used by the TFMP to create, and allow Resp Orgs to use, a "congestion threshold" node in the call routing tree. This may allow a Resp Org to determine with an end subscriber the appropriate congestion threshold for each branch in a call routing table. For example, if one call center can only handle 200 calls per minute before calls are placed in queue, and statistics show for this end subscriber that wait times start to creep up to 20 minutes when 1000 calls per minutes are received, and they do not want this to occur, the ability to obtain real time call counts/congestion will allow the SCP to route the calls using call counts/congestion in addition to all the other possible call decision nodes. Call counts may be very specific to an end subscriber, and congestion thresholds may differ and depend on congestion on the line as a whole. The congestion measurement and threshold value may allow detecting congestion issues and routing to another branch, including one that may be in a different area, should a congestion threshold be reached. This may occur in real-time without a need to change the routing tree. The TFMP may confirm real-time call count information that is available from SCPs and use such data to confirm real-time network congestion. Call count information may be further organized and analyzed by TSPID to permit tracking, for example, by service provider.

In embodiments, nodes in a call routing table may be mapped to real-time information in the SCPs from the network. With the decision nodes embedded in the call tree and loaded into the SCPs, real-time routing may be provided by the TFMP. In embodiments, a call routing table may be a crowd-sourced translation table associated with the TSS that may enable mapping of service providers to unique identifiers, as described herein. Such a mapping would enable a registry that may be used by third parties to locate the plurality of identifiers that may be associated with a service provider or plurality of service providers.

In embodiments, nodes in a call routing table may be used to facilitate predictive analytic services that may be provided to allow a user, through the customizable user interface, or "dashboard," to access third party data services, sponsored data and information derived from toll-free telecommunications networks, including but not limited to telecommunications carriers, service control points, call centers, or other parties affiliated with a toll-free telecommunication network. Nodes in a call routing table may also be utilized with origination data that may be combined with social media and other public domain third party data, and near real-time, apply a valuation model to display a trends and prices on an interactive map via the TFMP.

In embodiments, nodes in a call routing table may be used to facilitate reporting capabilities of the TFMP through a client device, such as a personal computer, mobile phone, tablet computer, or some other computing facility, and receive data, including multimedia to the user's client device. Functionalities of the TFMP include, but are not limited to, Number Administration (NA) and Customer Record (CR) administration.

In embodiments, the TFMP may determine accessibility among VoIP and tandem calls. For example, with VoIP the TFMP may ping an IP address at regular intervals to determine status. Using real-time network information and static call routing information, the TFMP may create a real-time call path score. SCPs may also be a source of real-time call routing data. SCPs are in the call path of every toll-free call. The ability to collect real-time data about every call, and every carrier, based on dates, times, day of week, and locations are available to SCPs. Using this information it is possible to extrapolate and determine uptime, downtime, congestion, geographical movement and economic movement of people communicating via calls. Based on real-time data that can be obtained from the SCPs and from the network, the TFMP may create a score that can be assigned to each call decision node. Similar to a mapping algorithm that uses distance and speed limit, given a starting point and a destination, the quickest or shortest map may be mapped. Changes in the call routing tree may be dependent upon an update to the routing tree that is then validated by the TFMP and then downloaded to the SCPs. With the use of real-time data, and more network decisions nodes added to a call routing tree based on the needs of the end subscriber, the TFMP may provide the ability to allow an end subscriber to have real-time business continuity for their toll-free number instead of having to contact their service provider, or getting a ticket opened to update their routing tree, and then having it download to all the SCPs for the new routing to take place.

In embodiments, a call path score and real-time routing may be based on the best possible availability score. This may also be modified by the TFMP to allow for lowest cost score, based on the per-call and per-minute cost for particular carrier. The call score may be updated during low activity periods with a date/time stamp associated with it. This may allow real-time, or near real time, detection of a path's status. Upon completion of a call down a particular path, the TFMP may also update the call path score, thereby keeping the score up-to-date.

In embodiments, nodes in a call routing table may be used to facilitate determination of the call path score such that real-time routing may be displayed via a distributed computing environment, such as a cloud-based computing network. In another embodiment, such systems may be hybrid networks, including usage of a cellular telephone network (and associated mobile communication devices, such as smart phones), a distributed, cloud network and an enterprise network associated with a carrier or other business organization (and any combination or sub-combination of such networks).

The following are illustrative clauses demonstrating non-limiting embodiments of the disclosure described herein:

A method comprising:
 creating at least two toll-free call routing tables based on a congestion threshold criterion, wherein the first of the two call routing tables is to be used when toll-free call volumes occurring within a toll-free telecommunications carrier network are below the congestion threshold, and the second of the two call routing tables is to be used when toll-free call volumes occurring within a toll-free telecommunications carrier network are equal to or above the congestion threshold;
 providing the call routing tables to at least one service control point that is associated with the toll-free telecommunications carrier network;
 monitoring toll-free call volumes and durations occurring within a toll-free telecommunications carrier network;
 receiving at least one of a call count datum or call duration datum from the toll-free telecommunications carrier network wherein the call count datum or call duration datum indicates a change in call volumes over the toll-free telecommunications carrier network from below the congestion threshold to above the congestion threshold; and
 instructing the service control point to switch from using the first call routing table to the second call routing table.

A method comprising:
 associating a toll-free telecommunications network congestion threshold criterion with a first rule regarding the usage of a plurality of call routing tables, and a second rule regarding the usage of a plurality of telecommunications carriers, wherein the congestion threshold criterion indicates a level of toll-free call volumes occurring within the toll-free telecommunications network; and
 switching toll-free calls across the telecommunications carriers based at least on the congestion threshold criterion, wherein the switched calls are further routing according to at least one of the plurality of call routing tables.

A method comprising:
 creating at least two toll-free call routing tables based on a congestion threshold criterion, wherein the first of the two call routing tables is to be used when toll-free call volumes occurring within a toll-free telecommunications carrier network are below the congestion threshold, and the second of the two call routing tables is to be used when toll-free call volumes occurring within a toll-free telecommunications carrier network are equal to or above the congestion threshold;
 providing the call routing tables to at least one service control point that is associated with the toll-free telecommunications carrier network;

monitoring toll-free call volumes and durations occurring within a toll-free telecommunications carrier network;

receiving at least one of a call count datum or call duration datum from the toll-free telecommunications carrier network wherein the call count datum or call duration datum indicates a change in call volumes over the toll-free telecommunications carrier network from below the congestion threshold to above the congestion threshold;

creating a second congestion threshold criterion based on the data received from the toll-free telecommunications network; and creating a third call routing table based on the second congestion threshold criterion.

In the current industry practice, updates and additions to toll-free providers numbers are not available through conventional platform reporting capabilities for up to 24 hours. This makes it difficult for end users to call up information about work done on the current day. If a toll-free number is reserved and for whatever reason the user does not record the actual number, there is often no way to find it, or a laborious search is required to assemble the necessary data elements for retrieval. One reason for the delay in the ability to report is that reporting is sourced from a Report History Data Base (RHDB) that is only populated with updates once a day. Additionally, most reporting from the RHDB is run in the background, thus in some cases, still further delaying the response.

Figure 7:
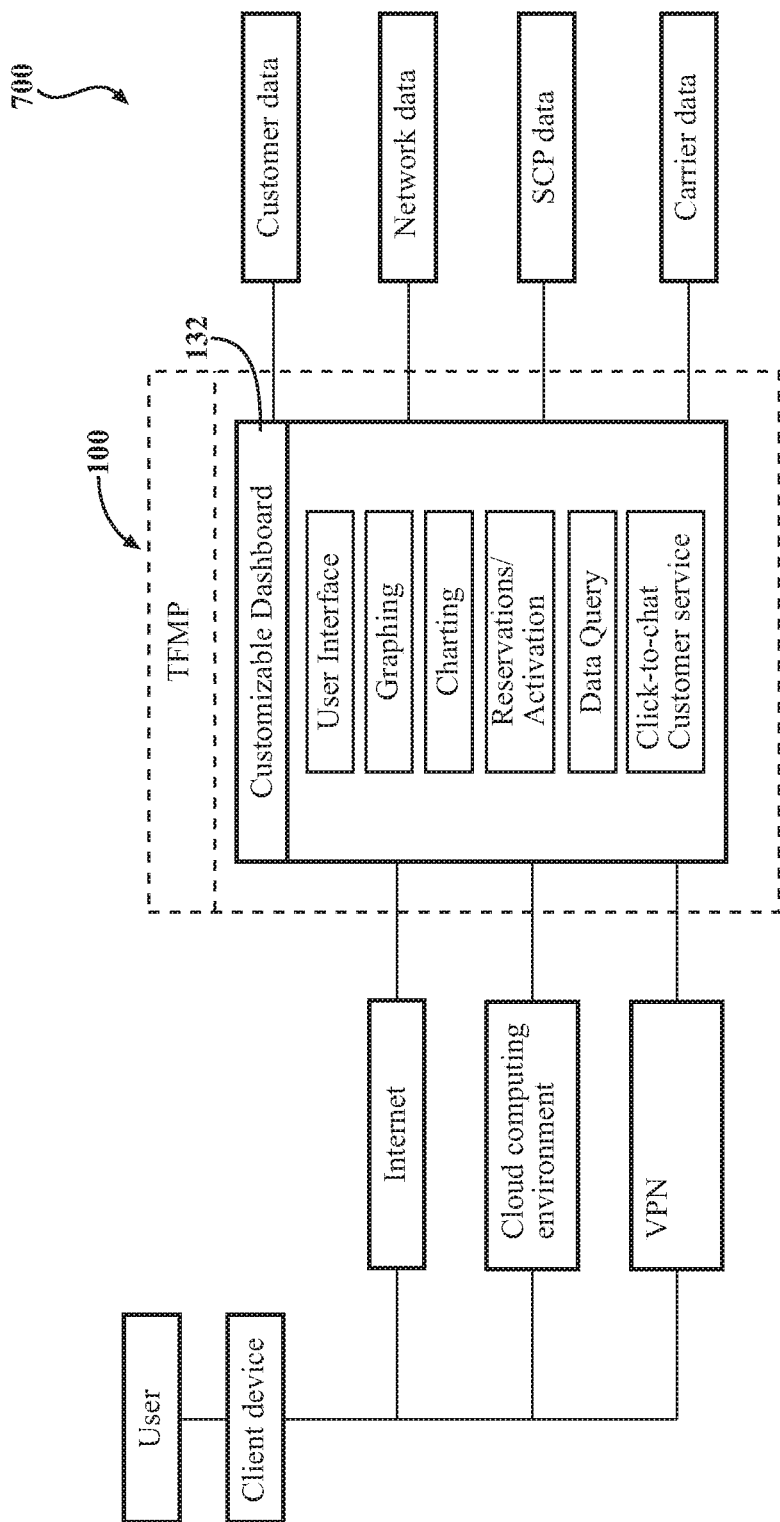
FIG. 7 depicts a schematic view of a customer dashboard structure.

With reference to FIG. 7, in another disclosed non-limiting embodiment, the TFMP 100 provides the user with the ability to report on its number portfolio in real time or near real time via an online customer dashboard 132. The online customer dashboard 132 may display simulated gauges and dials, business graphics such as pie charts, bar charts and graphs to provide overview that summarizes all pertinent data in one or two screens or views. The gauges and dials may be based upon real time data that is stored within the TFMP. The TFMP may include a subsystem, referred to as a "node," that may be used to build a decision tree that is downloaded to the SCPs for use with the dashboard. The decision tree may be used in various manners as otherwise described to facilitate call efficiency.

The online customer dashboard may allow the user to see all its customer data and drill down in the details in near real time. To do so, a data source for the dashboard may maintain the data in real time or near real time. The online customer dashboard may also be associated with a user profile and security administration that grants permissions to different groups of users to access embodiments of the system to create, view, update and activate certain functions. The platform or system can implement a role-based access control mechanism.

The online customer dashboard 132 may provide the user with a view into the user portfolio of toll-free number information. This may allow a user to see basic number information about the toll-free numbers the user has the authority to view. Predictive analytic services may also be provided that allow a user, through the customizable user interface, or dashboard, to access third party data services, sponsored data and information derived from toll-free telecommunications networks, including but not limited to telecommunications carriers, service control points, call centers, or other parties affiliated with a toll-free telecommunication network. As elsewhere described, origination data may be combined with social media and other public domain third party data, and near real-time, apply a valuation model to display a trends and prices on an interactive map via the TFMP.

A user may also access the reporting capabilities of the TFMP through a client device, such as a personal computer, mobile phone, tablet computer, or some other computing facility, and receive data, including multimedia to the user's client device. Functionalities of the TFMP include, but are not limited to, Number Administration (NA) and Customer Record (CR) administration. Such systems may alternatively or additionally be embodied in a distributed computing environment, such as a cloud based computing network. In another embodiment, such systems may be hybrid networks, including usage of a cellular telephone network (and associated mobile communication devices, such as smart phones), a distributed, cloud network and an enterprise network associated with a carrier or other business organization (and any combination or sub-combination of such networks).

The online customer dashboard may utilize real time network statistics, sourced from carriers and the public domain, within an algorithm that provides a call path score. This call path score may be provided to LCR and SCPs to determine the net value of a route for display.

The online customer dashboard may also provide an alert system similar to Internet alerts for toll-free numbers. Numbers, or groups of numbers, may be tagged based on tag groups. The alert system for toll-free numbers may use a subscription prioritization engine and offer premium services for service prioritization.

The online customer dashboard for a toll-free voice registry may share reserved, assigned, and working numbers with the Toll-Free Texting and Smart Services Registry (TSS)

The online customer dashboard may initially provide a main dashboard screen from which the user may drill down within a specific toll-free number to investigate more detailed information thereof. In one example, the main dashboard screen may provide a base set, or minimum list of data elements that are available, including, but not limited to, the following:

User Information
        Toll Free Provider
        User Id
        Last Login
        Amount of numbers reserved
    Number Information (a list of all toll free numbers associated with this provider)
        Toll Free Number
        Number Status
        Date Reserved
        Date Last Updated
        Customer Name The user can then drill down into the particular toll free number by clicking on that particular number to find more detailed information such as, Area of Service, Carrier(s), Call Routing, Reserve numbers, or other information associated with a toll-free number.

A user may also view the history of the number i.e. "the life of a toll-free number." By selecting a particular toll free number, the history of use of the toll free number may be readily viewable. Various charts, timelines, and usage data may be included therein. This functionality may allow a user to view and report on the status and activities of an entire RespOrg in real time, rather than parts of a RespOrg's activity and/or only at predefined time intervals (e.g., once per day).

In another disclosed non-limiting embodiment, the online customer dashboard is not a view only tool, but may provide additional or alternative features to be customized by the user. That is individual users may select their desired types of information available via their dashboard.

Such features may include, but are not limited to, the following:
  Customer information updates from the dashboard.
  System alerts pertaining to all users
  Historical customer usage information and populate information to the user such as suggestions of available numbers
  Alerts announcing the upcoming availability of numbers that the customer has previously searched for
  Billing alerts and notification of payments made Overall, the online customer dashboard may provide a single starting point for any user working with toll free numbers. Having a single location may allow a user of the system to use a single user interface (the dashboard) to view the entirety of activity that is associated with a plurality of toll-free numbers.

Figure 8:
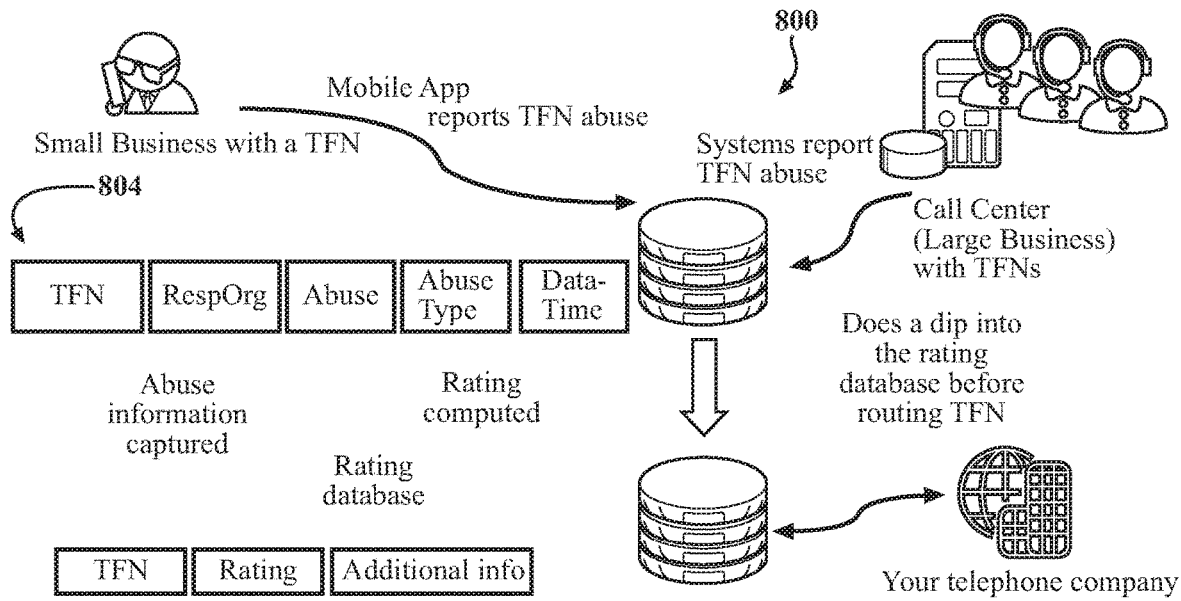
FIG. 8 depicts a schematic view of a whitelist management for toll-free spam control system.
Figure 9:
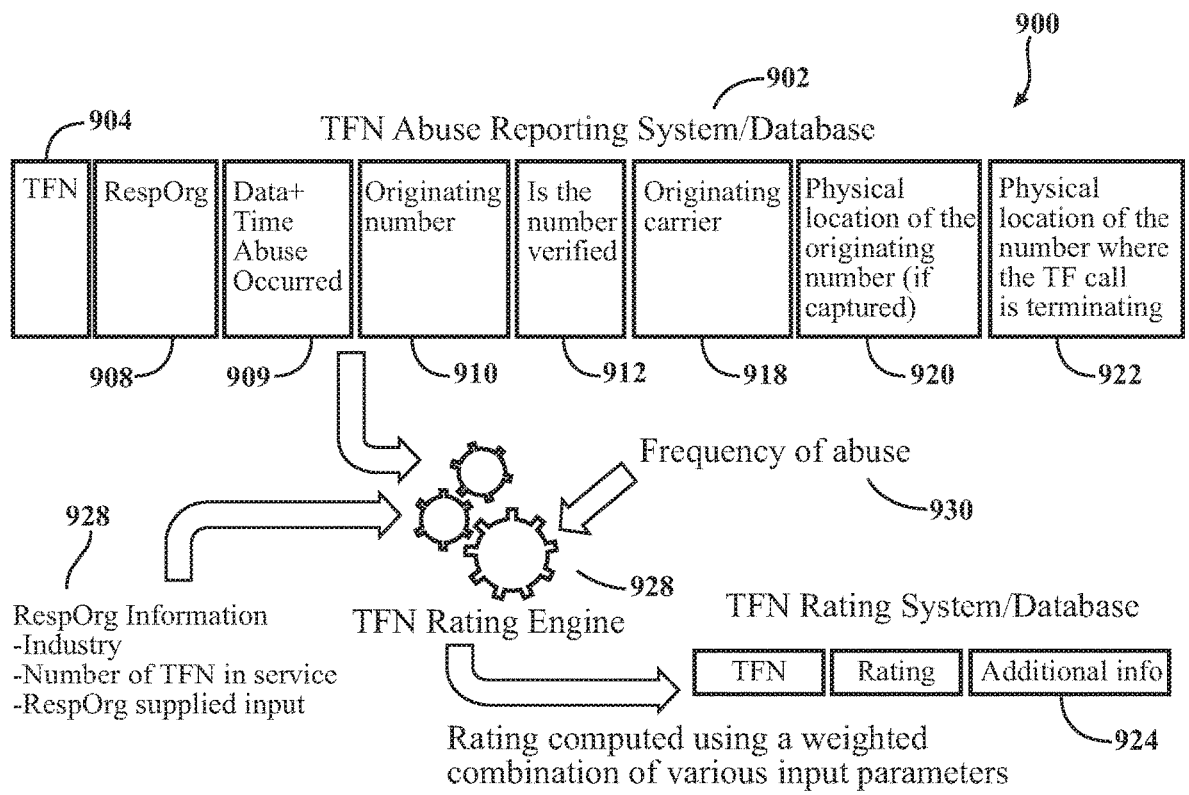
FIG. 9 depicts a schematic view of a Toll Free Number (TFN) abuse reporting database for whitelist management for toll-free spam control system.

With reference to FIGS. 8 and 9, the TFMP may include a toll-free number rating registry (TFRR) 802, that functions as a service to provide customers an indication of how often a toll-free number is abused, such as by fraudulent, frequent calling to increase billing costs. The rating may be calculated based on input from users, automated systems and/or proprietary algorithms that are collecting, storing and analyzing call data from throughout the toll-free system.

In embodiments, the system may collect toll-free number abuse information 804 from a plurality of sources including, but not limited to, a telephone service provider 808, toll-free number operators and Resp Orgs. The abuse information may be collected and processed in real-time to provide timely rating information for entities. In embodiments, the TFMP may publish standard interfaces that reporting parties can invoke to register abuse. Such interfaces may allow clients to connect synchronously and asynchronously. Interfaces may include, but are not limited to:
  A web page
  RestFul API
  Mobile application In embodiments, the abuse reporting interfaces that are associated with the TFMP may be invoked in a manual or automated manner. In the case of service providers, the reporting of abuse may occur during call setup. This may necessitate that the reporting is automated and introduces the least load on the device reporting the abuse. In an example, an asynchronous API may be made available to service providers for this purpose. In another example, for call centers where toll-free numbers terminate, such as a technical support department of a company, call-center processing software may be enhanced to include a module to detect and report abuse.

Additionally, the TFMP may also provide a mobile or other application that small business and single toll-free number users can use to report abuse. The TFMP may include a subsystem, referred to as a "node," that may be used to build a decision tree that is downloaded to the SCPs. The decision tree may be used in various manners to facilitate operation of the service as otherwise described to facilitate call efficiency. The service may alternatively or additionally be embodied in a distributed computing environment, such as a cloud based computing network. In another embodiment, such systems may be hybrid networks, including usage of a cellular telephone network (and associated mobile communication devices, such as smart phones), a distributed, cloud network and an enterprise network associated with a carrier or other business organization (and any combination or sub-combination of such networks).

In embodiments, to automate the processing of toll-free calls and reduce abuse, the TFMP system may be enhanced to allow customers to provision an abuse route. This route may be distributed to the SCPs along with current information being shared. When a service provider determines that a call being setup is an abuse call, they can use the abuse route specified by the customer.

With reference to FIG. 9, an example abuse reporting interface architecture 900 that is associated with the TFMP is provided. This abuse reporting interface may permit toll-free customers to report when a toll-free number abuse event occurs. The interface may allow for abuse to be reported manually and/or programmatically in an automated fashion. In embodiments, the abuse collection system described herein may collect information that includes, but is not limited to, the following:
  TFN 904
  Resp Org 908
  Date/time of abuse Date/time of report 909
  Originating number 910
  Has the originating number been verified as authentic (i.e., not spoofed) 912
  Geographic location of the originating number 920
  Geographic location of the terminating number 922

The abuse database 924 may also collect information about Resp Orgs and other industry details in an offline mode. The abuse information may be captured in the toll-free number abuse database 924. This information may then be processed using a rating engine 928 to compute the toll-free number rating. The rating engine 928 may take into account a plurality of factors including, but not limited to, input provided by Resp Orgs 928, TSPID's associated with service providers, frequency of abuse 930, identified source of abuse, and the like, to compute a rating for the toll-free number. In the absence of specific reports of abuse, predictive analytics methods of the TFMP, as described herein, may be used to infer abuse or unusual call activity, the results of which may be used in computing a rating. In an embodiment, the identification of abuse may be an inference of an abuse event produced by a predictive analytics engine that is associated with the TFMP based on at least a call history and metadata relating to calls placed over the toll-free telecommunications number. In an example, 100 calls may be placed over a toll-free number, each of which by itself does not appear to be abusive. For example the calls may be placed from locations that do not appear suspicious. However, an inference of abuse, based at least in part on the totality of calls placed over the toll-free number, may be used by the predictive analytics engine that is associated with the TFMP to infer that abuse is occurring or has occurred. For example, the totality of the calls may indicate a pattern indicative of abuse, or a call frequency that is indicative of abuse or some other criterion that may be used by the predicative analytics engine to infer that an abuse event, or plurality of abuse events is occurring or has occurred. In embodiments, a toll-free number rating may be a number between "0" and "100" that provides an indication of how often the number is abused and/or how severe the abuse is. A number with "0" rating may indicate a number that is never abused, and a number with a "100" rating may indicate a number for which the majority of activity is abusive in nature. The toll-free number rating may be made available to users of the TFMP, and may be used to make routing and other decisions about the toll-free number.

Based on the rating of a toll-free number, the service provider may take a specific action to ensure legitimacy of a toll-free call. In addition to the number rating, the rating engine may also generate routing rules to be shared with service providers. These rules may be imported by the service provider into their call routing engine to automatically route abusive calls in a manner that is consistent with the routing rules. These rules may also be used in combination with user profiles and security administration may grant permissions to different groups of users to access the toll-free number rating to create, view, update and activate certain functions. The system can implement a role-based access control mechanism. Predictive analytic services may be provided that allow a user, through the customizable user interface, or "dashboard," to access third party data services, sponsored data and information derived from toll-free telecommunications networks, including but not limited to telecommunications carriers, service control points, call centers, or other parties affiliated with a toll-free telecommunication network. Origination data may also be combined with social media and other public domain third party data, and near real-time, apply a valuation model to display a trend and prices on an interactive map via the TFMP.

The following are illustrative clauses demonstrating non-limiting embodiments of the disclosure described herein:

A method comprising:
  storing a taxonomy of abuse events that may occur regarding the usage of a toll-free number;
  storing a rule regarding an action to take upon receipt of a reported abuse event, wherein the rule specifies a routing rule defining how a call that is associated with the abuse event is to be routed over a toll-free telecommunications system;
  receiving a report of abuse of a toll-free number;
  identifying at least one abuse event within the stored taxonomy and routing rule that is related to content of the abuse report; and
  automatically routing a call that is the subject of the abuse report according to the routing rule.

A method comprising:
  receiving a report of abuse of a toll-free number;
  identifying an absence of an abuse event definition within a stored taxonomy that is related to the type of abuse reported;
  storing a new definition of the abuse event within the taxonomy; and
  creating a routing rule defining how a call that is associated with the abuse event is to be routed over a toll-free telecommunications system.

A method comprising:
  storing a taxonomy of abuse events that may occur regarding the usage of a toll-free number;
  associating the abuse events in the taxonomy with a toll-free number rating action;
  receiving a report of abuse of a toll-free number;
  identifying at least one abuse event within the stored taxonomy and rating action that is related to content of the abuse report;
  automatically computing a rating for the toll-free number based on the rating action; and
  reporting the rating to an entity.

The following are illustrative clauses demonstrating non-limiting embodiments of the disclosure described herein:

A user device for presenting data to a user in real time regarding changes in metadata associated with a toll-free number, the user device configured to:
  receive an indication of a change in status of a toll-free communications number, wherein the telecommunications number is associated with a responsible organization that processes toll-free telecommunications;
  update a metadatum associated with the toll-free communications number based at least in part on the change in status;
  store the metadatum;
  receive a status request from a user relating to the responsible organization;
  present the user with a graphic representation of the telecommunications number's status A method of toll-free telecommunications data visualization comprising:
  presenting a data visualization dashboard to a mobile application on a client device, wherein the presentation includes a selectable listing of toll-free telecommunications data parameters;
  receiving a selection from the client device of the toll-free telecommunications data parameters to analyze and at least one type of data analysis to perform;
  retrieving, in substantially real time, data relating to the selected toll-free telecommunications data parameters;
  analyzing the data according to the at least one type of data analysis; and
  presenting to the mobile application a summary of an analytic result.

In another disclosed non-limiting embodiment, the TFMP may provide a click-to-chat tool. The click-to-chat tool enables users to quickly contact a support representative through the user interface, dashboard, or other interface. The click-to-chat tool may integrate with existing web based access, provides an immediate channel to a support representative, and may facilitate support training.

In another disclosed non-limiting embodiment, the TFMP may provide a simplified two-factor authentication tool for maintaining identity and access security (e.g. dual factor authentication). This may eliminate the need to use hard tokens and improve VPN accessibility.

In another disclosed non-limiting embodiment, the TFMP may provide a password self-service tool that provides the ability for self-service passwords and unlock logon IDs. This may be automated via structured email processes.

In another disclosed non-limiting embodiment, the TFMP may provide a real-time status update tool that provides number counts and tasks within the application. This may facilitate a real-time view of number counts and status (i.e. reserved, assigned, etc.)

In another disclosed non-limiting embodiment, the TFMP may provide integrated data stores and a reporting tool that integrates data stores for consolidated reporting. This may facilitate the creation of a single operational data store to eliminate separate software as a service licenses and consolidated reporting for responsible organizations.

In another disclosed non-limiting embodiment, the TFMP may provide a single sign-on tool for Web Based Access (WBA), mechanized generic interface (API), Website/Billing, Web-based Reporting System (WRS), Virtual Private Networks (VPNs), IP Multimedia Subsystem (IMS), or some other network type.

In another disclosed non-limiting embodiment, the TFMP may provide an enhanced configurability tool that allows administrators to configure the limit of TFN that can be reserved in a single request, for example, more than 10. This may provide, for example, up to 5000 (would then do 500 batch calls).

The present disclosure includes a toll-free management platform (TFMP) for providing services to toll free subscribers and providers, enabling them to manage a plurality of toll-free numbers and tasks associated with such numbers. Functionalities of the TFMP include, but are not limited to, Number Administration (NA) and Customer Record (CR) administration.

The TFMP enables searching for any number, random number or to search for a plurality of numbers that are consecutive and/or include an indicated combination of digits. Since certain toll-free number codes (e.g. 800) and combinations of digits (e.g. repeating digits, digits whose corresponding telephone keypad letter values spell a word or phrase) may be considered most desirable, the NA function includes capabilities for searches and reservations to be handled so that a toll-free provider does not gain an advantage to reserve a given toll-free number. The TFMP also enables tracking the overall assignment of numbers for each toll-free provider in order to enforce regulations for toll-free number allocation specified by a tariff. NA may maintain a status for each number that reflects whether it has been reserved and whether a customer record has been created and sent to service control points (SCPs). It is possible to query the TFMP for status and reservation information associated with a number.

The TFMP enables customer record administration, allowing toll-free providers to create a customer record and to specify when the information should be sent to SCPs. A reserved toll-free number may become active when routing information for the number, specified in a customer record, is uploaded into SCPs. Customer records may be updated or deleted and the send time updated prior to sending. Once a customer record has been sent, a new record may be created to update or delete the routing specified by the previous record. The routing information specified in a customer record may include, but is not limited to:
  An Area of Service (AOS) that specifies from where the toll-free number can receive calls
  The carrier that will route calls to the toll-free number
  The terminating number that will receive calls to the toll-free number
  A set of rules that specifies different routing based on criteria like time of day and area from where the call originated Carriers who have arrangements to carry calls for a toll-free provider may wish to approve customer records when routing for a toll-free number has been assigned to the carrier. The customer record function may maintain a list of carriers and preferences for whether approval is required when a toll-free provider indicates the carrier in a customer record. A notification may be sent to a carrier when approval of a customer record is required. In embodiments, each customer record may have an associated status. Customer records may be queried to view the status and information contained in the record, based on the permissions of the user.

In another disclosed non-limiting embodiment, the TFMP may include a user interface functionality that allows manual access for human users and mechanized access for systems (such as an application programming interface) to make use of the NA and CR functions provided by the TFMP. Such systems may be embodied in a distributed computing environment, such as a cloud based computing network. In another embodiment, such systems may be hybrid networks, including usage of a cellular telephone network (and associated mobile communication devices, such as smart phones), a distributed, cloud network and an enterprise network associated with a carrier or other business organization (and any combination or sub-combination of such networks). The mechanized interface provided by the TFMP may allow external users to establish data dynamic connectivity with the platform and gain access to its available functions. The TFMP may maintain logins, passwords, encryption, authentication, and the like to provide security to limit system access to only authorized users. Permission levels that restrict access to TFMP's functions and to proprietary data may be assigned for each authorized user, and stored locally or remotely to an enterprise utilizing the TFMP, including within a computing storage facility that is remote to, but operatively coupled, with the TFMP. In embodiments, the user interface functionality may provide real time notifications and other information to external users using mechanisms such as email and File Transfer Protocol (FTP).

In another disclosed non-limiting embodiment, the TFMP may provide an interface to send routing information from CRs to SCPs. The SCP Management Function of the TFMP may enable management of interactions with SCPs, including maintaining data connectivity, sending CR information at the specified date and time, and monitoring responses in order to update customer record status.

In another disclosed non-limiting embodiment, the SCP administration functions of the TFMP may allow users to establish and modify SCP-related reference data in the system and send messages to the SCP node and the Call Management Services Data Base (CMSDB) within the SCP to manage data tables at the SCP. Network management functions for toll-free database services may involve the management of various automatic capabilities intended to monitor and control toll-free query traffic and calling volumes at the SCPs, Service Switching Points, terminating switches, terminating subscriber lines, and the like. When various call volume thresholds are exceeded, the SCPs may trigger Automatic Code Gapping (ACG) controls at the originating SSPs. The TFMP's management functions may allow network managers to configure and adjust relevant control parameters. Data collection at the SCPs may be requested through the TFMP to provide network managers with surveillance information that is useful to monitor traffic and analyze problems, such as the detection of SCP overloads and excessive calling or excessive ineffective attempts to dialed codes.

Figure 10:
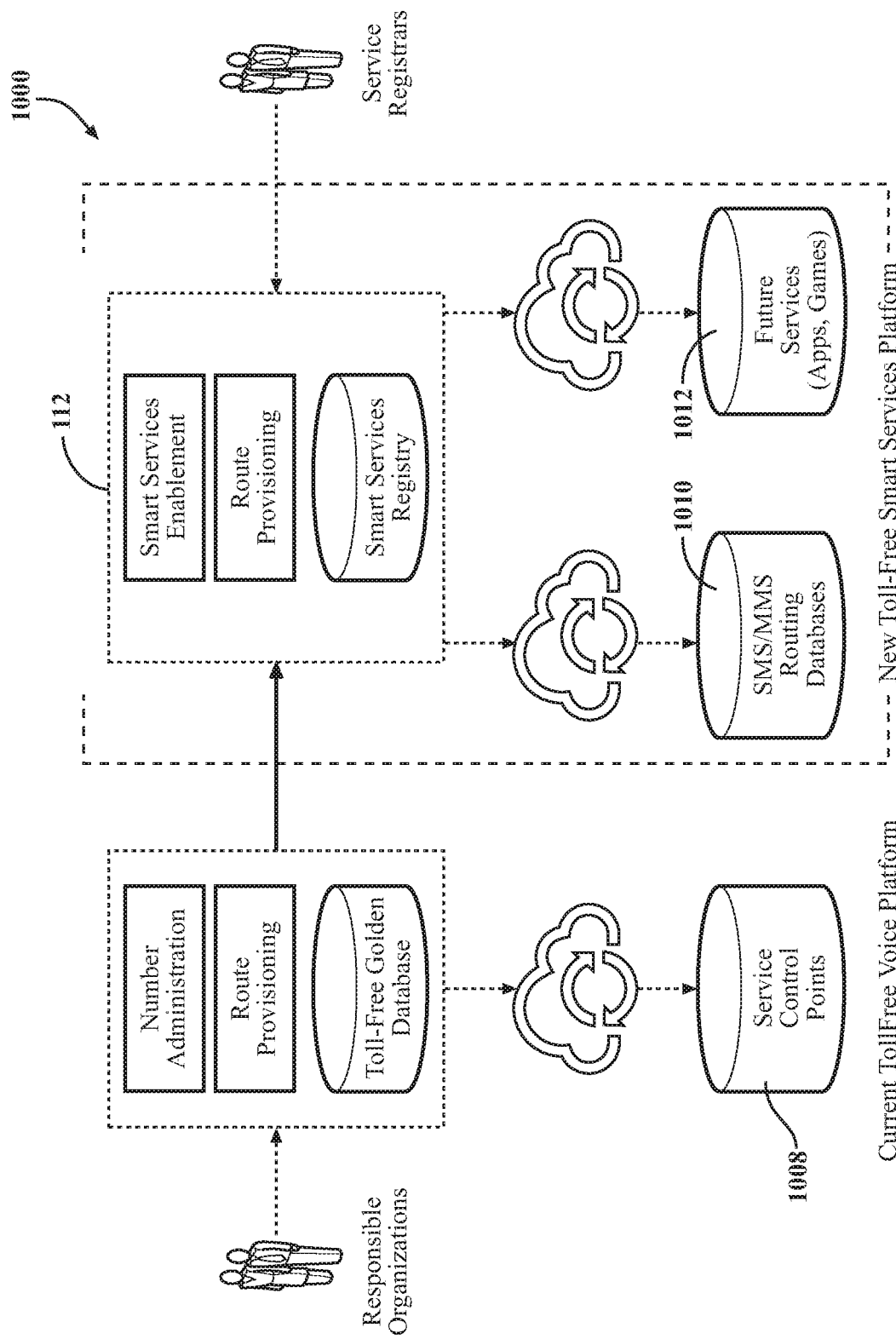
FIG. 10 depicts a toll-free smart services central registry deployed in conjunction with an existing toll-free voice registry.

With reference to FIG. 10, in embodiments, the TFMP may provide a Toll-Free Texting and Smart Services Registry (TSS) 1000 to support toll-free telephone numbers and related services, such as SMS, MIMS and streaming media. The TSS 1000 may include several components such as, but not limited to, number administration, call control and route provisioning, as well as number status assessment. The number administration function may provide number assignment for toll-free subscribers as well as provide services to manage the toll-free numbering plan. This component may provide for toll-free number portability as well as managing the mapping of toll-free numbers to geographic numbers. The number administration function may also open new number plan administration codes. The number administration function may forecast the exhaustion of codes and demand for codes for use by organizations such as the FCC.

The call control and routing function may be responsible for providing intelligent routing for calls made to toll-free numbers. Toll-free subscribers may have the ability to configure call routing to include multiple carriers, time of day rules, and rules based on the caller's proximity, among others. These rules may be downloaded to real-time network routing databases or Service Control Points (SCPs) 1008. The number status assessment function may determine the availability of certain numbers. Numbers may be reserved and assigned according to activation date and then are deployed. The number status function may assess whether numbers are spare, reserved, assigned, or currently deployed.

Providers of various smart services, such as voice, media, or texting services, may be able to access the TSS that can be text enabled from a list of reserved, assigned, and working numbers. After numbers are identified, an automated online letter of authorization/agency may be executed. The letter of authorization/agency may independently demonstrate authorization to a responsible organization that maintains the registration for individual toll-free numbers in a distributed database. The distributed database may be associated with a distributed computing network, as described herein. Upon execution of the letter of authorization/agency, the information may then be provisioned to industry routing databases for delivering various services, such as SMS (text) messaging, MMS messaging 1010, and content streaming, including but not limited to video content as well as future services 1012.

Letter of authorization/agency, as used herein, may include but is not limited to communication used by a toll-free end subscriber, such as during the provisioning phase of a toll-free number engagement, to enable that end subscriber to switch providers for a given telephone, messaging service, and the like. In an example, an end subscriber may wish to change its long distance provider so that a local company need not be used. The long distance provider to whom the end subscriber wishes to do business would typically walk the end subscriber through an authorization process to enable the end subscriber to switch long distance carriers from the local company to the new company. This authorization may manifest in the carrier's system as a letter of authorization/agency that documents the needed approvals from the end subscriber.

In an embodiment of the present disclosure, the TSS may enable a letter of authorization/agency process for a provider to authorizing texting and other services on a toll-free number or plurality of toll-free numbers that are used by an end subscriber. The letter of authorization/agency may be electronically stored and presented to the responsible organization or owner of record for a given number or service. The letter of authorization/agency may further define a time frame during which certain actions, such as the turning on of texting services for a toll-free number, are permitted. Such letters of authorization, as defined herein, may be further associated with stored profiles of an owner of record and/or end subscriber. A letter of authorization/agency may allow a toll-free number end-user, or toll-free number subscriber, to authorize service enablement for services not covered by their existing responsible organization. In this way, consumers can have multiple services enabled on a single telephone number, across multiple service providers. In an example, a letter of authorization/agency may authorize a responsible organization or other entity to take a plurality of actions so that additional communication with, for example, an end subscriber is unnecessary and actions may be taken more quickly and efficiently. This may enable service registrars, and others, to activate new services, such as toll-free texting services or bandwidth increases on a shorter timeline, which may have commercial benefits as speed activation of needed telecommunications services.

Figure 11:
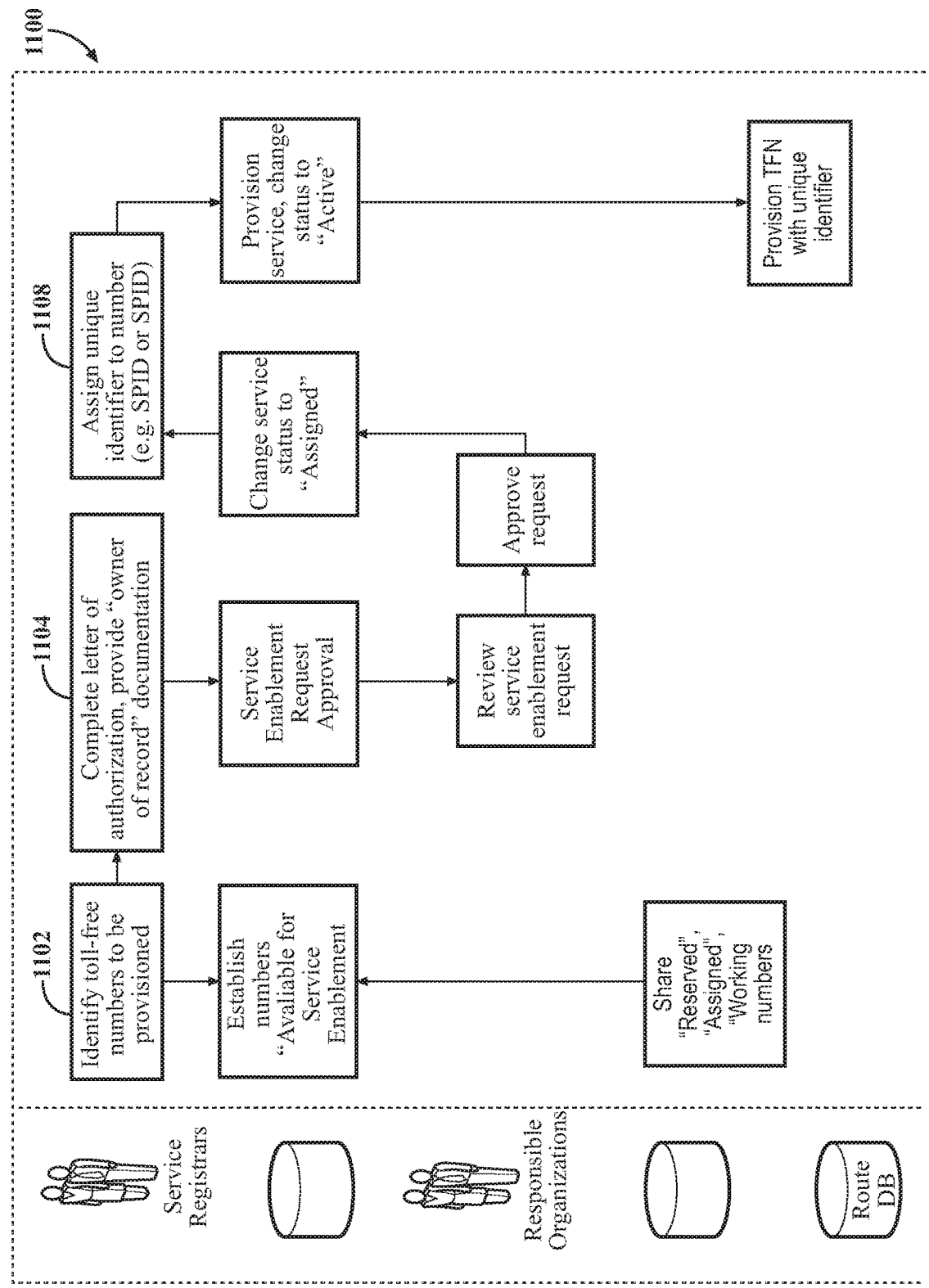
FIG. 11 depicts a candidate service enablement workflow deployed via a toll-free smart services central registry.

With reference to FIG. 11, in an embodiment of the present disclosure, the TSS may facilitate the enablement of a letter of authorization/agency process 1100 used to enable toll-free texting capability and capture basic data such as customer name, responsible organization, service registrar, toll free number, service enablement date, and letter of authorization/agency, status of services, or some other type of data associated with toll-free telephone numbers and services. The TSS may facilitate the letter of authorization/agency process by programmatically sending a notification to the responsible organization of record to memorialize the transaction. A timer may be set that will give the responsible organization a limited period of time to dispute the transaction. If no action is taken, the transaction may proceed and texting service enablement, or some other service type, may be fulfilled in the TSS Registry. Continuing the example, this letter of authorization/agency process may be provided for each toll-free number that is provisioned 1102 in the TSS registry, or only a subset of numbers depending on the wishes of the end users.

In order to streamline the letter of authorization/agency process, a "blanket" letter of authorization/agency may be used whereby the customer of record may authorize a specific service registrar to provision, update, and deactivate records in the TSS as needed 1104. In such cases, a notification may be sent to the responsible organization to memorialize each transaction. In order to further streamline the letter of authorization/agency process, responsible organization's may choose to put a "blanket" authorization on specific service registrar's which will allow the transaction to take place in real time 1108.

In embodiments, the TSS may allow electronic documentation to be stored and managed, providing a library of legal documentation that may be used by the system in real time to facilitate transactions more efficiently, and to provide more concrete evidence of formal authorization through a physical electronic document proving, for example, the end user's identity and validity.

In embodiments, the TSS may operate in conjunction with current toll-free services, including a toll-free voice registry. In order to establish unambiguous authority for the use of a toll-free number, a controlling organization for a toll-free number may be the responsible organization of record in the toll-free voice registry. Number administration may be the exclusive function residing only in the authoritative toll-free voice registry.

In embodiments, the TSS may be flexible and extensible to support a plurality of toll-free services such as SMS or MMS messaging services, and content provisioning. The TSS may additionally provide toll-free numbers for services such as videos, mobile device applications, games, or any other software, products or services that may be important to an organization to anchor their identity and brand. To support this environment, in embodiments, the TSS may reside on a stand-alone platform using hardware, software, and support systems independent of those used today in the toll-free voice registry. The TSS may be able to connect to a toll-free voice registry to obtain number information, such as availability and reservation status, as well as control responsible organization information, such as the responsible organization contact information, but may remain otherwise separate in its operation.

A responsible organization may maintain a toll-free voice registry that provides number administration, route provisioning, toll-free database services to various service control points, or some other type of toll-free service. The TSS, as described herein, may incorporate the services from a toll-free voice registry to provide smart services enablement, route provisioning, and smart services registry to existing SMS/MMS routing databases as well as other smart services requiring toll-free numbers, such as mobile device applications or games.

Figure 12:
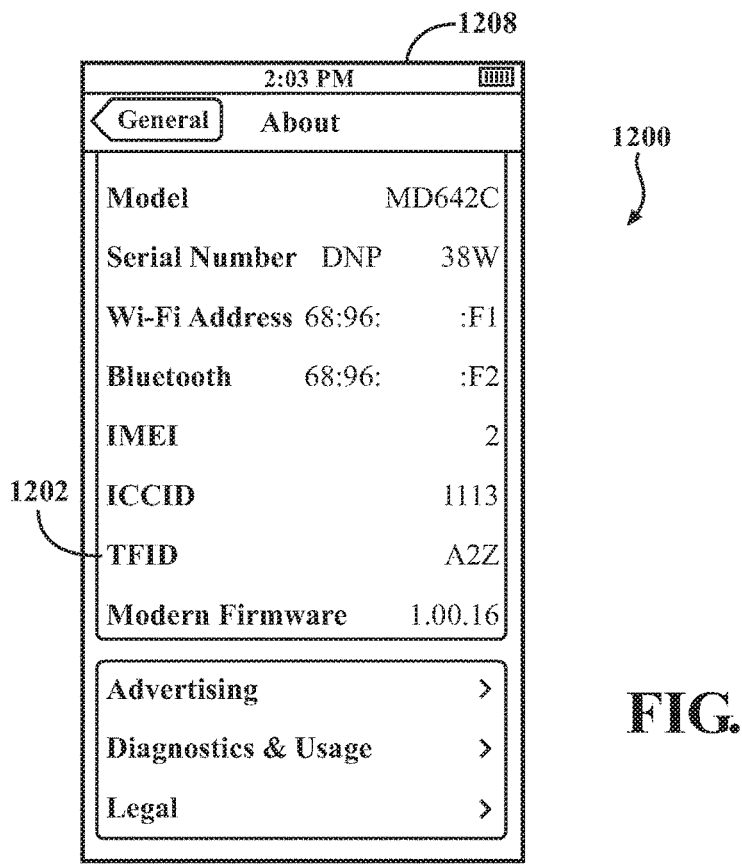
FIG. 12 depicts a schematic view of a systems page on a hard-flashed phone with a toll-free number.

With reference to FIG. 12, in another embodiment, a mobile device 1200 may utilize an unambiguous support identifier along with a toll-free data, message, and voice service. In this embodiment, the mobile device may be assigned a unique Toll-Free ID (TFID) 1202 at the time of manufacturing. That is, the TFID may be agnostic of type of device and may be hard flashed into the mobile device to identify a customer with a toll free provider that is providing the toll free communication. The TFID may be associated with the carrier identifier such as IMEI, MEID if GSM phone, CDMA, a service provider identifier such as a TSPID, as described herein, or to another identifier associated with a mobile device. In another embodiment, the TFID may be associated with other systems, including usage of a cellular telephone network (and associated mobile communication devices, such as smart phones), a distributed, cloud network and an enterprise network associated with a carrier or other business organization (and any combination or sub-combination of such networks).

A standard support app that is natively installed, such as a "setting" 1208 app distributed as part of the device, or separately though an app store, facilitates a consumer's ability to talk, message, view, browse support related features of merchandise, devices or other issues that the consumer may have. The standard support app may further interact with a user profile and security administration that grants permissions to different groups of users to access embodiments of the system to create, view, update and activate certain functions. The system can implement a role-based access control mechanism.

When consumers buy a device, the device manufacturers and retailers may "auto register" the device to the support application at the Point of Sale (POS). The TFID may be embedded in the hardware of the device and cannot be changed to provide a definitive way to identify a device when using toll-free services.

Figure 13:
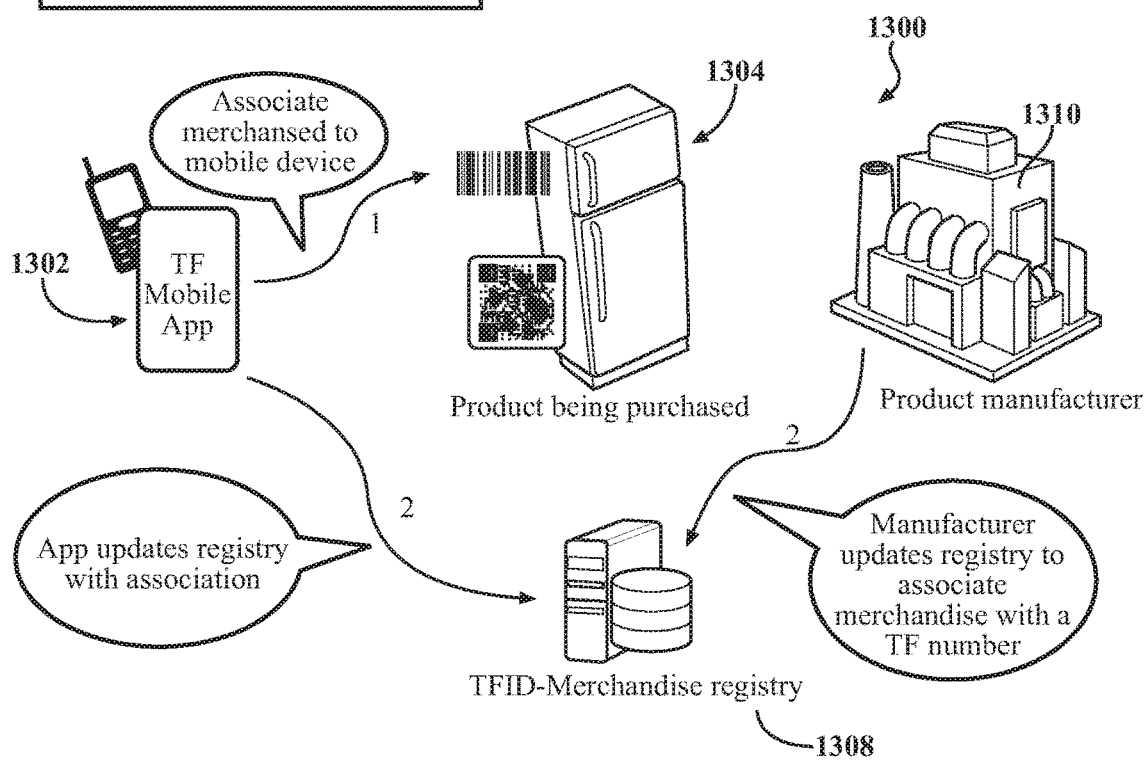
FIG. 13 depicts a schematic view of a hard-flashed phone to a toll-free number that may be used for a customer or tech support call related to the phone.

With reference to FIG. 13, in another embodiment, the TFID may permit a customer who is purchasing an appliance, a device, or other merchandise to be presented with an opportunity to associate one or more mobile devices to the merchandise purchased 1300. For example, this can be performed at the POS or after the sale as a registration and/or warranty process 1302. The process of registration is thereby automated to simplify these somewhat otherwise bothersome processes for the customer.

In one example, a TFID Mobile App is operable to permit the mobile device to read QR codes, Barcodes, RFIDs, serial numbers, or other merchandise identifiers and then communicate with the manufacturer via toll free service provided by the manufacturer 1304. For example, a user may need only point a camera of the mobile device toward the merchandise to capture the merchandise identify and thereby complete a registration, warranty, support or other process.

On the backend, a TFID Mobile App registry 1308 may be updated with the added mobile device TFID to merchandise association. Via a separate mechanism, merchandise manufactures 1310 can then update the registry with the contact information associated with the TFID for registration and user association. The TFID Mobile App registry may alternatively or additionally be embodied in a distributed computing environment, such as a cloud based computing network. In another embodiment, such systems may be hybrid networks, including usage of a cellular telephone network (and associated mobile communication devices, such as smart phones), a distributed, cloud network and an enterprise network associated with a carrier or other business organization (and any combination or sub-combination of such networks).

Once the merchandise is associated with the particular mobile device—the TFID Mobile App may present or otherwise store the various information about the merchandise, e.g., product documentation, upgrades, manufacture contact information, etc. This permits the user to readily communicate with the manufacturer via the toll free service provided by the manufacturer and accessed via the TFID. For example, once the merchandise is associated with the mobile device, a support call registry may be made readily available from the manufacturer via a toll free service. Support such as repair and troubleshooting for the merchandise may then be more readily provided as the initial validation of the merchandise to the particular user, e.g., warranty registration and confirmation has already been automatically provided by the registry. That is, the registry facilitates more direct access to support from the manufacturer via a toll free communication provided by the manufacturer as supported by the support application on the device.

The following are illustrative clauses demonstrating non-limiting embodiments of the disclosure described herein:

A mobile device, comprising:
  a unique toll-free ID (TFID) present in the mobile device, the TFID operable to facilitate toll-free communication between the mobile device and a manufacturer.

A method of communication via a toll-free service, comprising:
  associating at least one mobile device to merchandise purchased from a manufacturer via a unique toll-free ID (TFID) present in the mobile device, the TFID operable to facilitate toll-free communication between the mobile device and the manufacturer.

A toll-free voice registry may share reserved, assigned, and working numbers with the TSS. The TSS may then establish available numbers for service enablement. As described herein, a service registrar may identify toll-free numbers to be provisioned to an organization and may complete a letter of authorization/agency and provide "owner of record" documentation. The TSS may then request approval for service enablement from a responsible organization. The responsible organization may review the service enablement request. If approved, the TSS may change the service status of the toll-free number from "available" to "assigned." The service registrar may then assign a unique identifier to number such as a Service Provider Identifier (SPID) or eSPID. The TSS may then provision the service and change the number status from "assigned" to "active." The routing database associated with the TFMP may then provision the toll-free number with the unique identifier.

Figure 14:
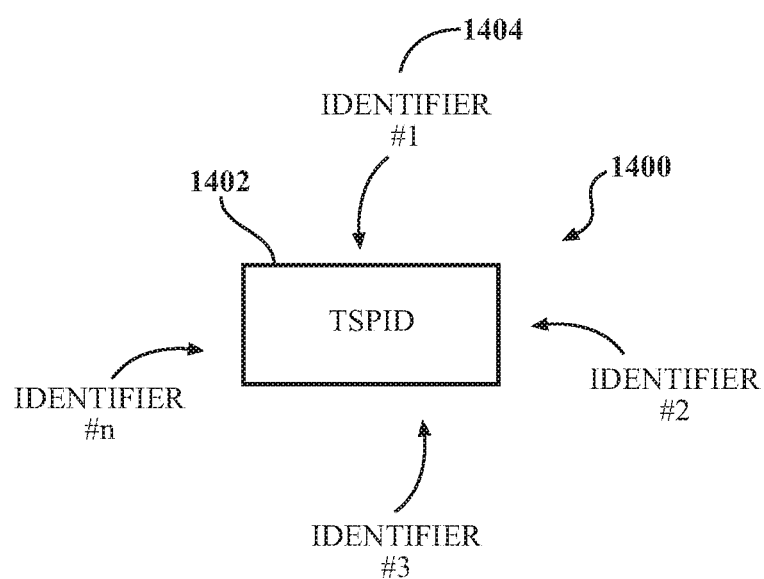
FIG. 14 depicts a schematic view of a Toll-Free Service Provider ID (TSPID).

With reference to FIG. 14, a toll-free voice registry may share reserved, assigned, and working numbers with the Toll-Free Texting and Smart Services Registry (TSS). The TSS may then establish available numbers for service enablement. As described herein, a service registrar may identify toll-free numbers to be provisioned to an organization and may complete a letter of authorization/agency and provide "owner of record" documentation. The TSS may then request approval for service enablement from a responsible organization. The responsible organization may review the service enablement request. If approved, the TSS may change the service status of the toll-free number from "available" to "assigned." The service registrar may then assign a unique identifier to number such as a Service Provider Identifier (SPID) or eSPID. The TSS may then provision the service and change the number status from "assigned" to "active." The routing database associated with the TFMP may then provision the toll-free number with the unique identifier.

Additionally, the TFMP may also provide a mobile or other application that small business and single toll-free number users can use to report abuse in combination with the TSS. The TFMP may include a subsystem, referred to as a "node," that may be used to build a decision tree that is downloaded to the SCPs. The decision tree may be used in various manners to facilitate operation of the service as otherwise described to facilitate call efficiency. The TFMP may alternatively or additionally be embodied in a distributed computing environment, such as a cloud based computing network. In another embodiment, the TFMP may include hybrid networks, including usage of a cellular telephone network (and associated mobile communication devices, such as smart phones), a distributed, cloud network and an enterprise network associated with a carrier or other business organization (and any combination or sub-combination of such networks).

Telecommunication service providers are required by industry guidelines to have a unique company code assigned to them. This unique company code identifies carriers as they interconnect with each other and allows for rating, guiding, billing and routing functionality. Historically, when service providers provided voice only services, each service provider was identified by a company code termed an Operating Company Number (OCN). With the evolution of the communications industry, service providers started introducing additional voice services, for example number portability. As these services were introduced, the need for uniquely identifying the carriers became of paramount importance. Registries and organizations were set up to facilitate the integration and interactions required to fulfill these services. Such developments prompted service organizations' need for additional context-based metadata to support these interactions (for example number portability). One result was the adding of additional identifiers to each service provider that required integration. These are sometimes referred to as the SPID or Alternate Service Provider Identifier (Alt-SPID).

With the introduction of over-the-top (OTT) providers, for example Skype, and Internet Protocol-based vendors (IP Vendors) selling traditional communication services over a full Internet Protocol (IP) network, the activities between software and the traditional telecommunications industry become more interactive. IP allowed for a new breed of vendors to integrate with traditional communication service provider networks for delivery and exchange of consumer data. This created a new set of challenges for the unique identification of service providers since the IP Vendors were not traditional carriers and did not meet industry guidelines for OCNs. Additional, sometimes proprietary metadata were created to support these new service providers, for example an eSPID, as described herein. The preponderance of different identifiers from eclectic industry organizations lead to lack of a consistent, unique way to identify and interact with service providers, with no centralized industry provider, organization or registry having a complete view of service provider community.

In an example embodiment of a service provider routing text messages though the network, as the text messages are processed the TSS may obtain metadata associated with the messages that includes coding data. By reading these codes, the TSS may confirm that a given message is derived from a service provider such as Skype for delivery to an AT&T subscriber. Such metadata may be obtained, for example, in a header file. Fields in the header file may be associated with a SPID. This may allow the TSS to determine that the text message is coming from Skype en route to ATT. If it were the case that many texts were originating from Skype at a particular time or day, the TSS may utilize this data to assist third parties in providing targeted advertising content. The TSS may also utilize this data to identify the unnecessary usage of intermediaries in processing communications such as text messages and assist users in avoiding the excess charges for intermediaries by routing messages without using intermediaries. The TSS may utilize a context-based unique identifier to distinguish specific services associated with the TSS Registry. The TSPID 1402 may be enabled in TSS and applies to such multimedia services such as but not limited to SMS, MMS, video conferencing, and streaming data. Resp Org IDs may also be associated with any toll free number enabled in TSS. The TSPID may further facilitate the value chain of a multimedia service for toll-free numbers in order for that service to be delivered.

The Toll-Free Service Provider ID "TSPID," provides an aggregate identifier for Service Registrars, who provide services such as, but not limited to, SMS, MMS, video conferencing, and streaming content that may be registered and distributed by the TSS Registry. That is, the TSPID provides a single unified identifier that may include other identifiers 1404 over a broad distribution of data, to include, but not be limited to, traditional voice services. The TSPID may also be utilized as an authoritative identifier of the service provider of record for toll-free numbers, and/or ultimately local 10 digit numbers. The TSPID may be enabled by a user profile and security administration that grants permissions to different groups of users to access embodiments of the system to create, view, update and activate certain functions. The system can implement a role-based access control mechanism.

Telecommunication service providers are required by industry guidelines to have a unique company code assigned to them. This unique company code identifies carriers as they interconnect with each other and allows for rating, guiding, billing and routing functionality. Historically, when service providers provided voice only services, each service provider was identified by a company code called as Operating Company Number or (OCN). With the evolution of the communications industry, service providers started introducing additional voice services, for example number portability. As these services were introduced, the need for uniquely identifying the carriers became of paramount importance. Registries and organizations were set up to facilitate the integration and interactions required to fulfill these services. Such developments prompted service organizations' need for additional context-based metadata to support these interactions (for example number portability). One result was the adding of additional identifiers to each service provider that required integration. These are sometimes referred to as the SPID or Alternate Service Provider Identifier (Alt-SPID).

The SPID is the authoritative identifier for telephone number ownership in the Number Portability Administration Center, which includes "ported" numbers associated with Local Number Portability as well as "pooled" numbers, which are associated with assigned pool blocks as administered by the Pooling Administration. Over time, many companies may map various identifiers such as the SPIDs to a broader table for use with the TSPID to still further aggregate such data. Further, traditional voice services may be mapped as well.

With the introduction of value added mobile services (for example SMS), exchanges and hubs set up by Inter Carrier Vendors (ICV) provide communication between multiple mobile network operators. Route tables are stored in industry proprietary databases that provided a call path service to determine, in real time, the destination service provider for an incoming mobile service. These ICVs further add additional metadata to identify carriers and facilitate integration. This process may have added complexity insofar as countries have their own local and regional authorities and naming conventions.

With the introduction of over-the-top (OTT) providers, for example Skype, and Internet Protocol-based vendors (IP Vendors) selling traditional communication services over a full Internet Protocol (IP) network, the activities between software and the traditional telecommunications industry become more interactive. IP allowed for a new breed of vendors to integrate with traditional communication service provider networks for delivery and exchange of consumer data. This created a new set of challenges for the unique identification of service providers since the IP Vendors were not traditional carriers and did not meet industry guidelines for OCNs. ICVs created additional, sometimes proprietary metadata to support these new service providers, for example an eSPID, as described herein. The preponderance of different identifiers from eclectic industry organizations lead to lack of a consistent, unique way to identify and interact with service providers, with no centralized industry provider, organization or registry having a complete view of service provider community.

In embodiments of the present disclosure, the TSS may provide an inclusive view of industry identifiers, enabling a single system of record for identifying service providers, whether traditional telecommunications provider, OTT provider, or some other type of service provider. During the on-boarding process (e.g., toll-free number reservation and provisioning), service registrars may be required to provide their unique identifiers (UIds) with the various organizations they interact.

In embodiments, the TSS may establish a baseline of UIds by public domain information gathering. Data gathered through the public domain may be further validated through crowd sourcing, where a global, potentially mechanical human process can be used to identify, validate and confirm UIds to create a baseline for the registry. In another embodiment, latent sematic indexing may be used to associate data and metadata associated with communications to the actual owner, provider, or responsible party that is associated with a communication, such as a text message. This crowd-sourced translation table associated with the TSS may enable mapping of service providers to unique identifiers. Such a mapping would enable the a registry that may be used by third parties to locate the plurality of identifiers that may be associated with a service provider or plurality of service providers.

In order to facilitate proper content delivery, service providers may be required by the TSS to periodically update their UIds. A validation, verification and certification process may be used to ensure integrity and validity of data entering the TSS. This may provide the industry with a single resource that may be used to identify and validate the identity of service providers. In an example usage scenario, a communications company that intends to optimize its network and manage traffic, may wish to identify where its end traffic (original source) is located by looking at packet headers and identifying service providers. In another example, a consumer reports-based rating service may use the TSS to provide consumers with message or delivery metrics. Bulk-advertising (pam) management companies may use the TSS look at detailed metadata and associate a name to a code. ICVs may use the TSS to streamline establishment and setup of their recipients without requiring expensive and costly set up. Ad agencies may use data derived from the TSS to customize ads to end users by understanding the source and destination (as opposed to area codes), and personalize content based on the service provider(s), for example if the content originated on an IP network.

In an example embodiment of a service provider routing text messages though the network, as the text messages are processed the TSS may obtain metadata associated with the messages that includes coding data. By reading these codes, the TSS may confirm that a given message is derived from a service provider such as Skype for delivery to an AT&T subscriber. Such metadata may be obtained, for example, in a header file. Fields in the header file may be associated with a SPID. This may allow the TSS to determine that the text message is coming from Skype en route to AT&T. If it were the case that many texts were originating from Skype at a particular time or day, the TSS may utilize this data to assist third parties in providing targeted advertising content. The TSS may also utilize this data to identify the unnecessary usage of intermediaries in processing communications such as text messages and assist users in avoiding the excess charges for intermediaries by routing messages without using intermediaries.

Figure 15:
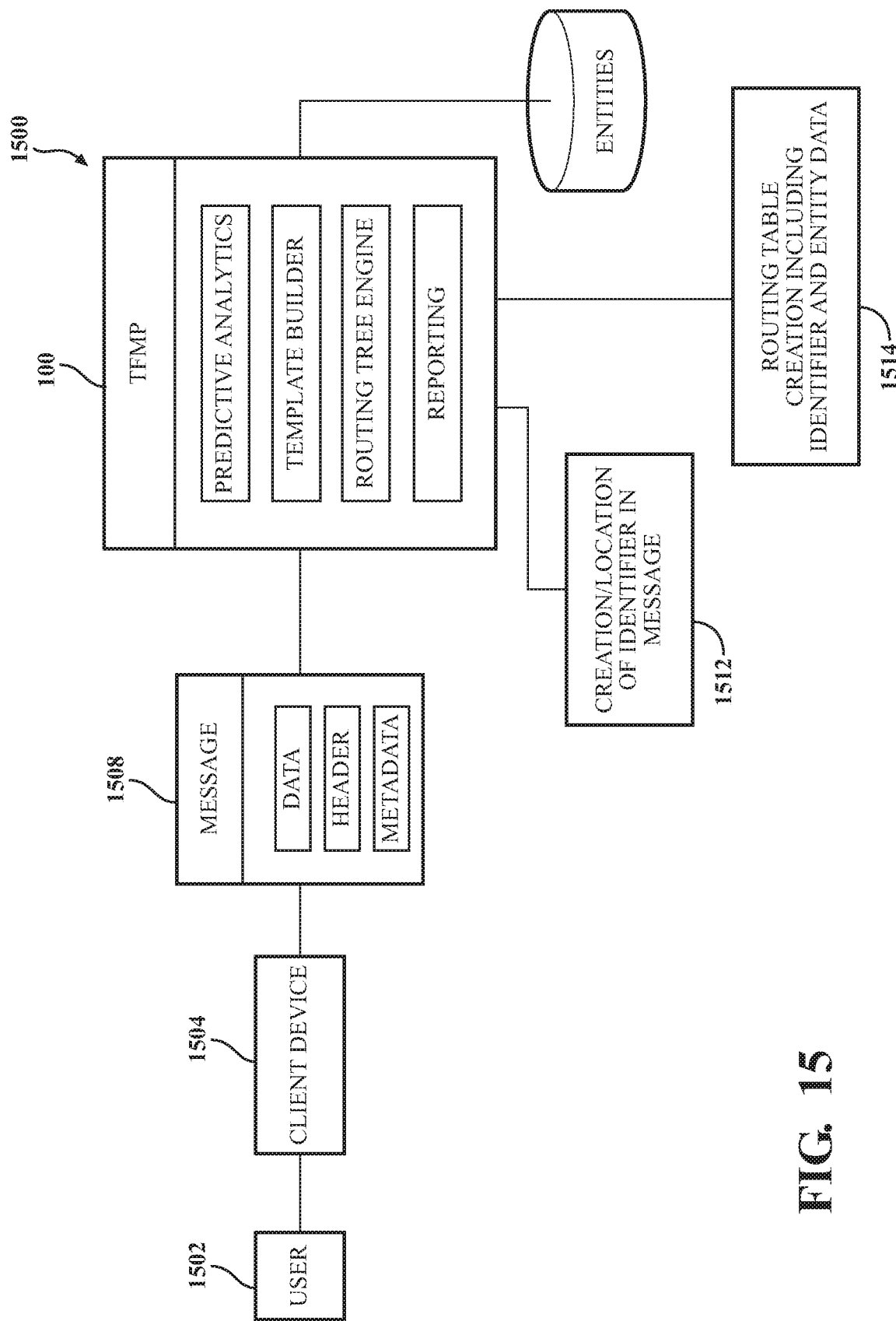
FIG. 15 depicts a schematic view of real time machine based routing tree enhancements.

With reference to FIG. 15, in embodiments, the TSS (Texting and Smart Services) Registry 1500 may establish a baseline of UIds by public domain information gathering for messages 1508 sent from a client device 1504. Data gathered through the public domain may be validated through crowd sourcing, where a global, potentially mechanical human process can be used to identify, validate and confirm UIds to create a baseline for the registry. Every Service Provider has a set of unique UIds by which its customers are reached by various methods such as, but not limited to, voice, short messaging service (SMS), multimedia messaging service (MMS), video conferencing, and streaming content. When any of these Service Providers signs up to be a TSS user 1502, it has a unique UId, called a TSPID, which is assigned. This TSPID provides the baseline for which many other UIds can be mapped. Many Data Providers, Messaging Hubs, Aggregators, and others who are in the business of routing and providing services such as voice, SMS, MMS, video conferencing, streaming content, and other multimedia services, to sign on to consume TSS Data. Each of these entities that consume data will have a unique identifier to which the TSPID will be mapped. Data Providers that consume TSS data will be required to provide to TSS a new toll-free specific UId for each established TSPID. The end result is a mapping that extends to any data provider that is consuming TSS data. As distribution widens, a fairly comprehensive routing table 1514 for each Service Provider is created.

Furthermore, each TFN that is enabled in the TSS Registry, has the Resp Org ID and Resp Org Entity associated with it, and thus is also mapped to the TSPID. The result is the most comprehensive routing table specific to toll-free numbers that will map toll-free numbers to their voice provider, messaging provider, as well as the routing information across a plurality of data providers. Once this comprehensive Toll-Free routing table 1514 is established, it can be further extended to layer in other identifiers, such as, but not limited to local ten digit numbers (also known as "long codes"), SPID, LRN, OCN, and LATA.

In another embodiment, latent semantic indexing may be used to associate data and metadata associated with communications to the actual owner, provider, or responsible party that is associated with a communication, such as a text message. This crowd-sourced translation table associated with the TSS may enable mapping of service providers to unique identifiers. Such a mapping would enable a registry that may be used by third parties to locate the plurality of identifiers that may be associated with a service provider or plurality of service providers. In embodiments, toll-free number abuse information, as described herein, from a plurality of sources including, but not limited to, a telephone service provider, toll-free number operators and Resp Orgs may also be used for the purposes of creating translation tables, including but not limited to crowd-sourced translation tables. The TSS routing table, once sufficiently established, may be used for services such as value added predictive analytics, as described herein, that service providers can use to gain valuable insights about their customers. Service Providers and other consumers of the data in the routing table would access the information using either an application programming interface (API) for automated integration into their own analytics engines, or a web-based GUI for simpler one-time lookups. Below are some examples of probable use-cases for the routing table.

In order to facilitate proper content delivery, service providers may be required by the TSS to periodically update their UIds. A validation, verification and certification process may be used to ensure integrity and validity of data entering the TSS. This may provide the industry with a single resource that may be used to identify and validate the identity of service providers. In an example usage scenario, a communications company that intends to optimize its network and manage traffic, may wish to identify where its end traffic (original source) is located by looking at packet headers and identifying service providers.

In another embodiment, a consumer reports-based rating service may use the TSS to provide consumers with message or delivery metrics. Bulk-advertising (spam) management companies may use the TSS to look at detailed metadata and associate a name to a code to streamline establishment and setup of their recipients without requiring expensive and costly set up. Ad agencies may use data derived from the TSS to customize ads to end users by understanding the source and destination (as opposed to area codes), and personalize content based on the service provider(s), for example if the content originated on an IP network.

In another embodiment of a service provider routing text messages though the network, as the text messages 1508 are processed, the TSS may obtain metadata associated with the messages that includes coding data. By reading these codes, the TSS may confirm that a given message is derived from a service provider such as Skype for delivery to an AT&T subscriber. Such metadata may be obtained, for example, in a header file. Fields in the header file may be associated with a SPID. This may allow the TSS to determine that the text message is coming from Skype en route to AT&T. If it were the case that many texts were originating from Skype at a particular time or day, the TSS may utilize this data to assist third parties in providing targeted advertising content. The TSS may also utilize this data to identify the unnecessary usage of intermediaries in processing communications such as text messages and assist users in avoiding the excess charges for intermediaries by routing messages without using intermediaries.

In embodiments, the TFMP may provide a Toll-Free Texting and Smart Services Registry (TSS) to support toll-free telephone numbers and related services, such as SMS, MMS and streaming media. The TSS may comprise several components such as, but not limited to, number administration, call control and routing, as well as number status assessment. The number administration function may provide number assignment for toll-free subscribers as well as provide services to manage the toll-free numbering plan. This component may provide for toll-free number portability as well as managing the mapping of toll-free numbers to geographic numbers. The number administration function may also open new number plan administration codes. The number administration function may forecast the exhaustion of codes and demand for codes for use by organizations such as the FCC. The call control and routing function may be responsible for providing intelligent routing for calls made to toll-free numbers.

Toll-free subscribers may have the ability to configure call routing to include multiple carriers, time of day rules, and rules based on the caller's proximity, among others. These rules may be downloaded to real-time network routing databases or Service Control Points (SCPs). The number status assessment function may determine the availability of certain numbers. Numbers may be reserved and assigned according to activation date and then are deployed. The number status function may assess whether numbers are spare, reserved, assigned, or currently deployed. Providers of various smart services, such as voice, media, or texting services, may be able to access the TSS that can be text enabled from a list of reserved, assigned, and working numbers. After numbers are identified, an automated online letter of agency may be executed. The letter of agency may independently demonstrate authorization to a responsible organization that maintains the registration for individual toll-free numbers in a distributed database. The distributed database may be associated with a distributed computing network, as described herein. Upon execution of the letter of agency, the information may then be provisioned to industry routing databases for delivering various services, such as SMS (text) messaging, MMS messaging, and content streaming, including but not limited to video content.

Letter of agency, as used herein, may include but is not limited to communication used by a toll-free end subscriber, such as during the provisioning phase of a toll-free number engagement, to enable that end subscriber to switch providers for a given telephone, messaging service, and the like. In an example, an end subscriber may wish to change its long distance provider so that a local company need not be used. The long distance provider to whom the end subscriber wishes to do business would typically walk the end subscriber through an authorization process to enable the end subscriber to switch long distance carriers from the local company to the new company. This authorization may manifest in the carrier's system as a letter of agency that documents the needed approvals from the end subscriber. In an embodiment, the TSS may enable a letter of agency process for a provider to authorize texting and other services on a toll-free number or plurality of toll-free numbers that are used by an end subscriber. The letter of agency may be electronically stored and presented to the responsible organization or owner of record for a given number or service.

The letter of agency may further define a time frame during which certain actions, such as the turning on of texting services for a toll-free number, are permitted. Such letters of agency, as defined herein, may be further associated with stored profiles of an owner of record and/or end subscriber. A letter of agency may allow a toll-free number end-user, or toll-free number subscriber, to authorize service enablement for services not covered by their existing responsible organization. In this way, consumers can have multiple services enabled on a single telephone number, across multiple service providers. In an example, a letter of agency may authorize a responsible organization or other entity to take a plurality of actions so that additional communication with, for example, an end subscriber is unnecessary and actions may be taken more quickly and efficiently. This may enable service registrars, and others, to activate new services, such as toll-free texting services or bandwidth increases on a shorter timeline, which may have commercial benefits as speed activation of needed telecommunications services.

In an embodiment, the TSS may facilitate the enablement of a letter of agency process used to enable toll-free texting capability and capture basic data such as customer name, responsible organization, service registrar, toll free number, service enablement date, and letter of authorization/agency, status of services, or some other type of data associated with toll-free telephone numbers and services. The TSS may facilitate the letter of agency process by programmatically sending a notification to the responsible organization of record to memorialize the transaction. A timer may be set that will give the responsible organization a limited period of time to dispute the transaction. If no action is taken, the transaction may proceed and texting service enablement, or some other service type, may be fulfilled in the TSS Registry. Continuing the example, this letter of agency process may be provided for each toll-free number that is provisioned in the TSS Registry, or only a subset of numbers depending on the wishes of the end users. In order to streamline the letter of agency process, a "blanket" letter of agency may be used whereby the customer of record may authorize a specific service registrar to provision, update, and deactivate records in the TSS as needed. In such cases, a notification may be sent to the responsible organization to memorialize each transaction. In order to further streamline the letter of agency process, responsible organization's may choose to put a "blanket" authorization on specific service registrar's which will allow the transaction to take place in real time.

In embodiments, the TSS Registry, as described herein may be an authoritative database of all, or some subset of, text-enabled toll-free numbers in North America. It may also contain the top-level routing information, in the form of a toll-free service provider identifier (TSPID), used by the texting ecosystem to send messages to the proper toll-free subscriber. Since a letter of agency is required for each toll-free number that is enabled in the TSS, the TSPID may become a centralized and authoritative source identifier and may be used in the provisioning of additional services associated with toll-free numbers such as, but not limited to MMS, video conferencing, and streaming data. Furthermore, since part of the enablement process includes Responsible Organization authorization and/or notification, coupled with the direct connection to a voice telecommunications platform associated with the TFMP, the TSPID may also serve to validate the authority of a call routing table.

The following are illustrative clauses demonstrating non-limiting embodiments of the disclosure described herein:

A method of identifying and storing an identifier associated with a toll-free-communication entity, comprising:
locating an identifier within the header portion of an SMS text message routed over a toll-free telecommunications line, the identifier located based at least in part through latent semantic indexing;
comparing the located identifier with metadata stored on a server, the metadata associated with a plurality of entities;
selecting an entity from among the plurality of entities based at least in part on the comparison; and
storing a code associated with the entity within a translation table associated with a toll-free telecommunications management platform.

A method of creating and storing an identifier associated with a toll-free-communication entity, comprising:
locating data within the header portion of an SMS text message routed over a toll-free telecommunications line, the data located based at least in part through latent semantic indexing;
creating an entity identifier based at least on the data;
storing a code associated with the entity identifier and an entity within a translation table associated with a toll-free telecommunications management platform; and
associating the entity and entity identifier with a call routing table.

A method of identifying and storing an identifier associated with a toll-free-communication entity, comprising:
identifying a toll-free call route trend among a plurality of toll-free calls taking place within a toll-free telecommunications network; wherein the call route trend is identified at least in part by call routings among toll-free numbers sharing an attribute;
creating a call route template based at least in part on the trend;
identifying an entity using at least one toll-free number with the shared attribute;
prepopulating a call route tree for the entity based on the call route template.

With reference to FIGS. 16-20, a system according to various embodiments, and which may be referred to in some instances herein as an intelligent platform, platform, or an architecture, is operable to support the ever evolving toll-free industry through the use of modern technologies which may include enhanced functionality and deliver improved cost efficiencies and quality of service.

The architecture depicted in FIGS. 16-20 may include aspects such as:
Number searches return suggestions
Scheduled number search
One-click number search to activate
Number search based on history
Smart number search
Bulk search
Spare number availability notification
Enhanced number configurability
Enhanced route management
Self-service administration
Additional user roles
Customer record builder
Customer record template transfer
Dashboard
Customer access
Open API
Bulk Processing
Improved Search
Workflow
Customer records/Template
System Performance
Reporting and Analytics The architecture depicted in FIGS. 16-20 may include the components in the following table:

| Component | Decision | Rationale |
| --- | --- | --- |
| Application Platform | Apply Service-oriented (SOA) and event-driven (EDA) design throughout the application. The core system should be considered a platform for existing application services as well as future products and services, some of which may be provided by the TFMP while others would be provided by either third parties or affiliated entities, interfacing with the system via public APIs. | SOA and EDA create loose coupling and high cohesion, which enable flexibility and extensibility to business change in alignment with the solution principles. |
| Application Platform | Follow web scale IT design to enable cloud-based scale and high availability using stateless models, open source tools, Agile/DevOps approaches, and Web Oriented Architecture (Web APIs) concepts. | Web-Scale design concepts consider global-class compute capacity given the massive expansion of web- and cloud-enabled capabilities. Web-Scale is the modern equivalent to high quality of service architectures on low cost/commodity infrastructure. |
| Application Platform | Utilize web API architecture to simplify traditional N-Tier models by connecting any device/channel/interface via a single API that encapsulates a back-end data/process service. | Traditional N-Tier architectures require significant "platform plumbing," and may be quickly being replaced by simpler, more modern Web API architectures that use generic interfaces to back-end data/processing services. This simpler architecture aligns well with the solution principles. |
| Application Platform | Distributed queue with guaranteed (storage-based) messaging to ensure FIFO request management. Develop a proof of concept for in-memory queue if requirements necessitate faster performance. | Traditional, storage-based queues should be sufficient to handle transaction volumes. If the queue becomes a bottleneck and the database architecture cannot maintain integrity, an in-memory queue may be necessary. |
| Application Platform | Prefer Java as the programming platform/language of choice for core application components. Leverage alternative languages opportunistically to accelerate development for lightweight Web components, native sockets, or analytics, among others. | Over the last few years, Java has consistently been ranked as one of the most popular programming languages with an installed base that rivals any other programming language. A wide availability of resources and products exist to complement the language. A minimal risk exists with Java based on the fact that it is controlled by Oracle and does not share the same degree of openness as many other languages. Nonetheless, Java is a generic rather than a purpose-specific language, so the architecture should expect a plurality of alternatives to solve discrete technical or business problems. |
| User Interface | Design for web-based, thin client user interface with HTML5, JavaScript and CSS. | Responsive/cross-channel web design and cross-platform/device compatibility requires modern user interface technologies to deliver consistency across a variety of browsers, screen-sizes and platforms. JavaScript libraries (formerly referred to as AJAX/RIA) have significantly matured, when combined with HTML5 and CSS, can now deliver rich, dynamic and usable experiences that integrate easily with web APIs. These tools do, however, require significant hand-coding. |

-continued

| Component | Decision | Rationale |
| --- | --- | --- |
| Business Process and Rules | Implement a business rule engine (BRE), but not a BPMS, to simplify call-tree routing for customer records and enable configuration of valid values and ranges throughout the application. | Current business processes may not require use of a business process management suite (BPMS) because 1) processes may be deterministic with defined beginnings and ends, 2) processes do not change frequently, and 3) processes do not require business user change. Basic workflow/orchestration logic and rule evaluation tools meet minimum solution requirements. These basic capabilities may be packaged in many leading products including service buses and open source tools. |
| Integration | Use a lightweight service bus to intermediate Web APIs between channels/devices/interfaces. The service bus can be one of two patterns/usages:<br>1. Open Source Enterprise Service Bus (ESB) that provides advanced service mediation, intelligent routing, BPEL/orchestration, rule evaluation, security and robust message transformation<br>2. API Management Appliances that provide basic service mediation, routing, orchestration and transformation plus hardware acceleration for security/SSL and message processing | An integration layer centralizes and simplifies Web API mediation and security, as well as decouples the architecture to increase flexibility and extensibility. ESBs may be traditional integration mainstays that provide a suite of integration functionality. Popular open source tools include Talend, Mulesoft, Red Hat Fuse, and WSO2. Lighter-weight API Management Appliances (formerly referred to as SOA Governance tools) may be increasingly popular for simplified and accelerated service mediation. Popular appliances may be CA/Layer 7, DataPower, and Intel SOA Express. |
| Integration | Both SOAP and REST, and others can be used. SOAP WS-I is preferred for higher quality of service requirements such as security and reliable messaging. REST is preferred for ubiquity and interoperability. | Both REST and SOAP WS-I may be mainstream Web Service integration technologies. These technologies provide for relatively easy and efficient integration following industry-accepted standards. |
| Integration | Use data integration to ensure consistency across data stores and synchronization for replication. Data integration tools may deliver two patterns/usages:<br>1. Change data capture (CDC) for moving data from transaction processing systems (OLTP) into the operational data store (ODS) in near/real-time<br>2. Extract, transform, load (ETL) for moving data from ODS to other data stores for replication and analysis in batch/scheduled mode | CDC and ETL may be both mainstream options for moving data. CDC should be used for near real-time data integration whereas ETL should be used to move bulk changes on a periodic basis. Numerous open source data integration tools may be available, including those packaged with the chosen database. |
| Business Intelligence | Expand use of the SAP BusinessObjects suite investment to address the three business intelligence use cases: Dashboards, Reporting, and Analytics. This includes using BusinessObjects as a replacement for Concurrent Technologies Knosys, which is currently used for management reporting. Evaluate use of BusinessObjects On-Demand/SaaS to reduce the infrastructure footprint. | There is an existing investment, comfort, and experience with BusinesObjects for end-user reporting. BusinessObjects is a leading product and suite for dashboards, reporting and analytics. The Knosys platform is expensive, adds complexity to the environment, and requires data to be sent off-site without clear repossession rights. |
| Business Intelligence | Analytics and Reporting can run against the operational data store (ODS) for both management and end-user reports (dashboards, | A separate reporting database is essential to remove those workloads from the transaction processing database (when not |

| Component | Decision | Rationale |
| --- | --- | --- |
| | canned reports, parameterized reports, ad hoc reports). The ODS can provide insight into "what happened?" and "what is happening?" | using an in-memory database, which is the current direction). The ODS can maintain an integrated, near real-time set of all operational data including number, customer, and billing information. |
| Business Intelligence | Analytics and Reporting can run against a data warehouse or "big data" data store. The analytics data store can be created for industry intelligence workloads, which may include mining, forecasting, and trending to provide insight into "why is this happening?" and "what is likely to happen next?" | A separate analytics database is essential to remove those workloads from the ODS. This analytics data store may also include a different schema, different data types, and different semantics. ETL, and others can be used to move data from the ODS to the analytics data store unless near/real-time information is necessary for industry analytics. |
| Data Management | There is no need for master or metadata management, search engines or Web/content/document management. | There may be current or future requirements that necessitate active data quality management, metadata management, or unstructured content search. Web and content management may be out of scope. |
| Data Management | The database architecture can enable partitioning in a shared nothing model. This can ensure that data access and indexing can be scaled in a widely accepted, fault-tolerant manner. | Traditional, shared-everything, monolithic database architectures may be being replaced by modern, shared-nothing, highly scalable architectures. These concepts align with Web-Scale deployments and disclosed embodiments solution principles. |
| Data Management | Data integrity and availability may be characterized by two data model patterns/usage: ACID and BASE. Preference is for ACID, but others may be prototyped such as BASE using strict success criteria (monitoring, management, consistency, responsiveness) to determine if additional benefits exceed the risks of complexity, difficulty, and ability to maintain user expectations.<br>1. ACID: Traditional session-based database locking strategies to guarantee transaction integrity (e.g., Oracle, DB2, SQL Server, mySQL)<br>2. BASE: Trending stateless database models that favor data availability and eventual consistency over data integrity (e.g., mySQL Cluster, Cassandra, MongoDB) | ACID is the traditional, high integrity database model that provides ample scale and capacity. This is a low risk solution for well-known number and customer administration functionalities. BASE offers nearly infinite performance and scale benefits, but requires a significant shift in developer and user experience that introduces risk into the deployment. This degree of change and risk currently outweigh the benefits of scale and capacity. Further investigation is needed to understand the true benefits/tradeoffs, and implications to other architectural decisions. |
| Data Management | If the performance requirements necessitate additional scale, the BASE pattern design should be favored over data sharding. | Data sharding is an advanced alternative technique that not only partitions data but also moves those partitions into separate databases. This requires intelligence in the application to know in which database certain sets of data reside. For disclosed embodiments, the benefit of sharding scale and performance do not justify the costs of additional application complexity. |
| Monitoring | Monitoring may cover three levels: 1) application performance monitoring (end-user experience, application runtime, transaction profiling, component deep-dives), 2) server monitoring and 3) network | Application monitoring is a critical piece of application management and is essential to reduce maintenance costs. Consistent application instrumentation implementation |

| Component | Decision | Rationale |
|---|---|---|
| | monitoring. Unified monitoring tools may be utilized to simplify the landscape and provide a single console for application and infrastructure health. | practices are followed to ensure accurate end-to-end user and transaction level monitoring. |
| Security | Multiple products may be used to secure the runtime environment. Web Application Firewalls provide real-time event monitoring and protect against known SQL injection and phishing vulnerabilities. Dynamic security testing tools may continually verify protection against known signatures and patterns. Data masking tools should be used to obfuscate production data for test/development purposes. | Application security is a fundamental concern for all application development, and should be ingrained into every aspect of the application code. Web Application Firewalls may be simple hardware appliances that can also accelerate and load balance requests. Many other security tools may be open source or easily acquired. |
| Security | Identity and Web access management can be provided via on-premises Web Access Management tools. These tools provide integrated identity management, self-service password management, authentication management and authorization integration. Disclosed embodiments may still require two-factor authentication. A password is likely to be the first factor. A token (soft or certificate-based) or a one-time password (OTP) may be likely to be the second factor. A VPN should be used to create a secure tunnel and mitigate Man-In-The-Middle attacks. | Security cannot be compromised, but there may be more usable solutions available that can sustain and even enhance system security posture. |

Figure 21:
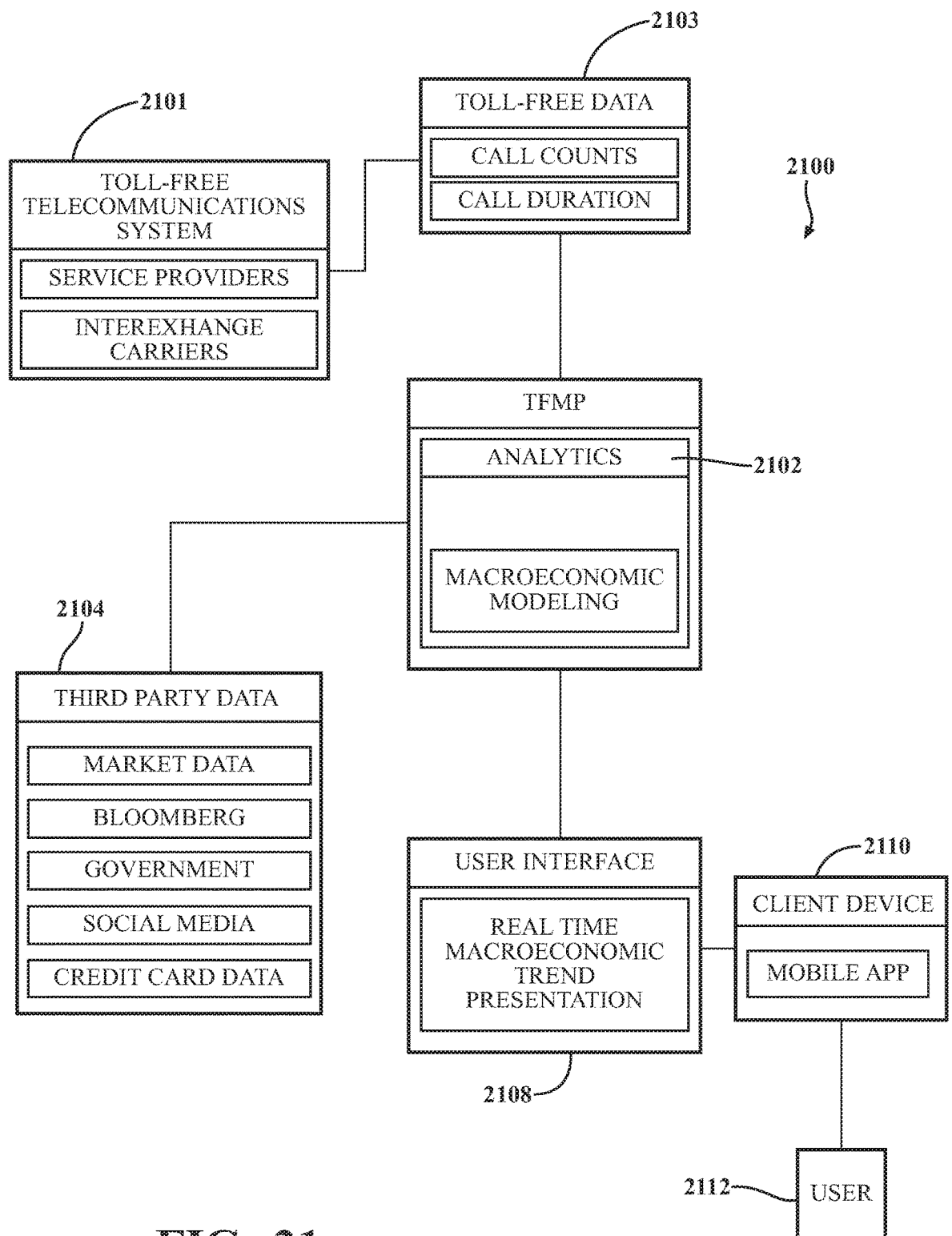
FIG. 21 depicts a schematic view of a system for predictive analytics based on toll-free number utilization.

With reference to FIG. 21, in embodiments, the TFMP may include a subsystem that enables distributed call collectors to collect data from various sources including service control points (SCPs), toll-free service providers, interexchange carriers, and others. Data may be real-time grouped, aggregated and reduced based on toll-free numbers and relevant parameters, including but not limited to origination location, originating area of service, originating NPA, ANI, or some other criterion. Call counts may be calculated for high priority numbers. Data may be enriched with call duration information when it is available. This process may assist in reducing the overall data set size and speeding processing. A local NoSQL data store may be used to aggregate local trends and pre-process raw data.

In embodiments, once pre-processing completes, data may be shared in real time, or near real time, to a centralized analytics data store 2102 that is associated with the TFMP for more real time mapping and reduction. The analytics NoSQL datamart may combine data feeds from various service providers from the network and further reduce information to call counts, call completion rates and call duration for high priority numbers. This subsystem of the TFMP may gather historical macroeconomic data from market sources 2104 like Bloomberg™ and Reuters™ and create a reference data store that groups and summarizes economic trends month over month. This subsystem may serve as a reference data source for the analysis, inference and indexing system.

In embodiments, this subsystem may collect historical call completion and call count data from high priority numbers and apply mapping and data reduction techniques to create historical baselines for calls. Calls may be sourced from market data sources, data purchases, data bartering from call sources, or through some other type of data source. Call sampling and aggregation may be iteratively performed until a statistically significant dataset is created (e.g., over a tuning period). Multi-factor models may be created for correlating toll-free call activity with selected macroeconomic trends, backed by high priority numbers tied to businesses. For example, calls to toll-free numbers for employment commissions in the 50 states may be tied to a forward-looking indicator for unemployment and consumer sentiment.

In another example, historical changes in macroeconomic data may be plotted with changes in call metrics like call volume, call duration, or some other data related to toll-free data. This may provide a correlation between telemetry and economic indicators. Financial modeling techniques may be applied, and additional factors may be analyzed, including but not limited to consumer sentiment, including sentiment that is sourced by social media comments and online behaviors related to relevant topics (e.g., questions regarding unemployment benefits or questions regarding food stamps). Interrelationships between indicators may also be analyzed. Credit card spending data may be an additional factor analyzed. These underlying factors may drive stochastic probabilities to determine a prediction model that may be utilized by the TFMP. The TFMP system may include a subsystem, referred to as a "node," that may be used to build a decision tree that is downloaded to the SCPs to facilitate the stochastic probabilities to determine a prediction model. The decision tree may be used in various manners as otherwise described to facilitate call efficiency. The output of the model may be a prediction trend 2108 that can forecast the probability of a relative positivity or negativity of the upcoming indicator. Data from the analytics data store and the historical trends data store may be analyzed through a multi-factor model for deriving a macro economic trend indicator and a relative level of confidence with the trend.

In embodiments, a client device 2110 such as an online and/or a mobile application may allow users to filter, search and sort trend data, increase or reduce granularity, include or exclude factors and zone in or drill down based on dimensions. For example, a user may choose to include or exclude a state from the model to derive a trend prediction and a prediction confidence indicator. Alternatively or in addition, a customizable user interface, or "dashboard," may be utilized to provide access for third party data services, sponsored data and information derived from toll-free telecommunications networks, including but not limited to telecommunications carriers, service control points, call centers, or other parties affiliated with a toll-free telecommunication network. As elsewhere described, origination data may be combined with social media and other public domain third party data, and near real-time, apply a valuation model to display a trends and prices on an interactive map via the TFMP. Further, the user profile and security administration grants permissions to different groups of users to access embodiments of the system to create, view, update and activate certain functions. The system can implement a role-based access control mechanism.

In embodiments, this analytic subsystem of the TFMP may provide a flexible mapping interface for a user 2112 to enter their own data as part of an analysis. Once configured, additional data sources may be added in real time, or near real time, through an API or a web interface to further refine the model based on customer specific data sets to make intelligent business decisions. The system may alternatively or additionally be embodied in a distributed computing environment, such as a cloud based computing network. In another embodiment, such systems may be hybrid networks, including usage of a cellular telephone network (and associated mobile communication devices, such as smart phones), a distributed, cloud network and an enterprise network associated with a carrier or other business organization (and any combination or sub-combination of such networks).

The system may also provide a marketplace for data trading where subscribers can choose and buy data sources that are of interest to them to include in their analysis to further refine their predictive model. The system may facilitate the sale of data sources and assist in ensuring that the data uploaded and made available on the data market is scrubbed of personally identifiable or other sensitive data. For facilitating the data sale, the system may charge a percentage of the sale proceeds in addition to an annual or monthly subscription fees. For consumers interested in a monthly subscription, overall sentiment data may be made available through a number trend report. Alerts may be presented to users, such as to a client device. The user may also access the reporting capabilities of the TFMP through a client device, such as a personal computer, mobile phone, tablet computer, or some other computing facility, and receive data, including multimedia to the user's client device. Functionalities of the TFMP include, but are not limited to, Number Administration (NA) and Customer Record (CR) administration.

In embodiments, the TFMP may provide macroeconomic data trend over a network to a remote client device, by providing a user interface dashboard to a user for installation on the remote client device; receiving third party social media data; modeling at least one of call duration or call count data with the third party social media data to derive a macroeconomic trend; receiving a request from the remote client device to present the macroeconomic data trend; generating an alert from the macroeconomic data trend that contains a stock name, stock price and a universal resource locator (URL), which specifies the location of the data source; and transmitting the alert over a communication channel to the remote client device associated with the user based upon a destination address and transmission schedule that is associated with the remote client device, wherein the alert activates the user interface dashboard to cause the alert to display on the remote client device and to enable connection with the user interface dashboard when the remote client device is activated.

The following are illustrative clauses demonstrating non-limiting embodiments of the disclosure described herein:

A method comprising:
receiving data relating to toll-free number call activity from a toll-free telecommunications system, wherein the data includes at least one of call duration or call count data;
receiving third party data relating to macroeconomic activity;
modeling at least one of call duration or call count data with the third party data to derive a macroeconomic trend;
receiving a request from a client device to present the macroeconomic trend; and
presenting a representation of the macroeconomic trend to a user interface on the client device.

A method comprising:
receiving data relating to toll-free number call activity from a toll-free telecommunications system, wherein the data includes at least one of call duration or call count data;
receiving metadata about the toll-free numbers that are the subject of the call activity, wherein the metadata includes data pertaining to at least one of business type or location;
modeling at least one of call duration or call count data with the metadata to derive a macroeconomic trend;
receiving a request from a client device to present the macroeconomic trend; and
presenting a representation of the macroeconomic trend to a user interface on the client device.

A method of distributing a macroeconomic data trend over a network to a remote client device, the method comprising:
providing a user interface dashboard to a user for installation on the remote client device;
receiving third party social media data;
modeling at least one of call duration or call count data with the third party social media data to derive a macroeconomic trend;
receiving a request from the remote client device to present the macroeconomic data trend;
generating an alert from the macroeconomic data trend that contains a stock name, stock price and a universal resource locator (URL), which specifies the location of the data source; and
transmitting the alert over a communication channel to the remote client device associated with the user based upon a destination address and transmission schedule that is associated with the remote client device, wherein the alert activates the user interface dashboard to cause the alert to display on the remote client device and to enable connection with the user interface dashboard when the remote client device is activated.

With reference to FIG. 22, in another embodiment, a toll-free management platform (TFMP) may refine a recommendation for a toll-free number search via a recommendation engine that utilizes a searcher's profile to improve the search. The toll-free management platform (TFMP) may utilize other assets of a toll-free system generally, such as carrier data, location information regarding call origination, payment data and so forth. The TFMP system may include a subsystem, referred to as a "node," that may be used to build a decision tree that is downloaded to the SCPs. The decision tree may be used in various manners as otherwise described to facilitate call efficiency. In one example, the toll-free number search may be based upon a customer's historical data such as prior search criteria and existing toll-free numbers, and thereby provide the customer suggestions or notification of toll-free numbers that are available for use. This toll-free number search may be based upon previous searches by either that customer and alternatively or in addition, upon other customer searches.

The toll-free number predictive search is operable to utilize multiple sources of data to extrapolate possible toll-free numbers and those included in a Resp Org and/or user's search history to include, but not be limited to, a current Resp Org inventory, an overall search history, lists of upcoming available numbers, or some other type of data. Predictive analytics is an area of data mining that deals with extracting information from data and using it to predict trends and behavior patterns. The toll-free number predictive search is operable for the user profile and security administration grants permissions to different groups of users to access embodiments of the system to create, view, update and activate certain functions. The system can implement a role-based access control mechanism.

Predictive analytics utilized for the predictive search may encompass a variety of statistical techniques from predictive modeling, machine learning, and data mining that analyze current and historical facts to make predictions about future, or otherwise unknown, events. Predictive analytics can be applied to any type of unknown whether it be in the past, present or future. Predictive analytic services may also be provided that allow a user, through the customizable user interface, or dashboard, to access third party data services, sponsored data and information derived from toll-free telecommunications networks, including but not limited to telecommunications carriers, service control points, call centers, or other parties affiliated with a toll-free telecommunication network. As elsewhere described, origination data may be combined with social media and other public domain third party data, and near real-time, apply a valuation model to display a trends and prices on an interactive map via the TFMP.

The toll-free number predictive search may check on the availability of a suggested toll-free number before making a particular suggestion and may otherwise automatically reserve that toll-free number, based upon the customer selecting an "automatically reserve" option. That is, the toll-free number may be automatically reserved if it meets particular search criteria to essentially automate the reservation thereof. Further, the automatic reservation may be a fee-based function in which particular bidders are able to prioritize the choice of toll free numbers via particular fee based arrangements.

In embodiments, initially, a user may be provided the option to opt in to the toll-free number predictive search feature as well as the option to automatically reserve toll-free numbers determined to be available based upon the predictive search. That is, rather than wait for a request, a customer-desired number is predicted, offered, and potentially reserved. The user may also access the reporting capabilities of the TFMP through a client device, such as a personal computer, mobile phone, tablet computer, or some other computing facility, and receive data, including multimedia to the user's client device. Functionalities of the TFMP include, but are not limited to, Number Administration (NA) and Customer Record (CR) administration. It should be appreciated that other options may be alternatively or additionally provided.

In one disclosed non-limiting embodiment of a method 2200 for operation of a toll-free number predictive search is initiated via accessing a Resp Org's search history (step 2202; FIGS. 23, 24, 25, and 26). Numerous criteria may be used when searching for toll-free numbers including the use of wildcards, words translated to numbers, and the like. The search may be performed at both a Resp Org level and broken down by a user as well. This history may be one of the factors used in providing suggestions. Typically, an inventory of toll-free numbers associated with a particular Resp Org as well as an inventory of available toll-free numbers is accessible. Next, the toll-free number predictive search feature may utilize an algorithm that would, for example using the data noted above, produce a list of customer desired toll-free numbers for the customer (step 2204). For example, the algorithm may use any and/or all of the following information to make a search recommendation:

Previous search number history (what numbers has a user/Resp Org searched for recently and how many times has the search been performed).

Current inventory of toll-free numbers managed by this particular Resp Org. For example, if 888-234-CARS is managed perhaps 800-234-CARS may be predicted as being desired.

Numbers that are to be spared (made available). Examine numbers that are going to become available and determine if they meet any patterns in which a user has expressed interest.

Search histories from this or other Resp Orgs as it relates to a number this Resp Org has searched for.

The predictive search results may facilitate a standing willingness for a customer to pay for a particular toll-free number and thus automatically reserve the predicted toll-free number (step 2206). For example, once a toll-free number is identified, various offers may be made available via an auction, payment to be first in line, subscription offerings, and others. Finally, a plurality of options may be provided when the customer receives the predictive search results (step 2208), such as, but not limited to:

At every logon;

Emailed at a specific time of the day. In one example, coordinated around the TFN Spare activity.

The following are illustrative clauses demonstrating non-limiting embodiments of the disclosure described herein:

A method of searching for a toll-free number, comprising:
identifying a previous search number history for a user; and
offering a toll free number associated with the previous search number history to the user.

A method of searching for a toll-free number, comprising:
predicting a customer-desired toll free number for a user;
reserving a toll free number in response to the predicting; and
offering the reserved toll free number to the user.

A method of searching for a toll-free number, comprising:
identifying a previous search number history for a user;
predicting a customer-desired toll free number for a user from the previous search number history; and
offering the predicted toll free number to the user.

One disclosed embodiment of the system can support future and the ever-evolving toll-free industry through the use of modern technologies, enhanced functionality, and improved cost efficiencies and quality of service. The system can provide additional and enhanced system capabilities that meet or exceed the performance of the existing legacy system on all parameters such as response time, capacity, scalability and cost. The system can improve core services, lower operational expenses, and enable innovations for customers.

More specifically, embodiments of the system can facilitate:

Modernization of core technologies
Relevance with transition to IP.
Use cloud, mobile, and leading-edge technologies to enable new business opportunities and facilitate customer innovation.
Meet/Exceed current service levels.
Optimize processes and data.
Make it easier for customers to do business thereby building stronger relationships.
Increase customer satisfaction and perceived value
Enable business process automation to optimize cycle time
Make data more valuable and accessible for both internal and external use.
Optimize functionality and system access methods to the minimum required. Increase ability to change.
Be more flexible to quickly add/enhance products and services.
More easily adapt to and support business/industry change over time.
Simplify in everything to optimize and reduce costs.
Broaden pool of available talent by leveraging current technologies and leading concepts.

Embodiments of the disclosed system may include the integration of one or more of the following capabilities:

Number searches return suggestions.
Scheduled number search.
One-click number search to activation.
Number search based on history.
Smart number search.
Bulk search.
Spare number availability notification.
Enhanced number configurability.
Enhanced route management.
Self-service administration.
Additional user roles.
Customer record builder.
Customer record template transfer.
Dashboard.
Customer access.

Additionally, the capabilities listed herein may include the following features in its integration such as Minimal Feature Sets ("MFS"), New Feature Sets ("NFS") and Non-Functional Requirements. Additionally, the capabilities listed in the MFS, NFS, and Non-Functional Requirements may include the following:

Ease of Use.
Open API.
Bulk Processing.
Improved Search.
Workflow.
Customer records/Template.
System Performance.
Reporting and Analytics.

Figures 26, 27:
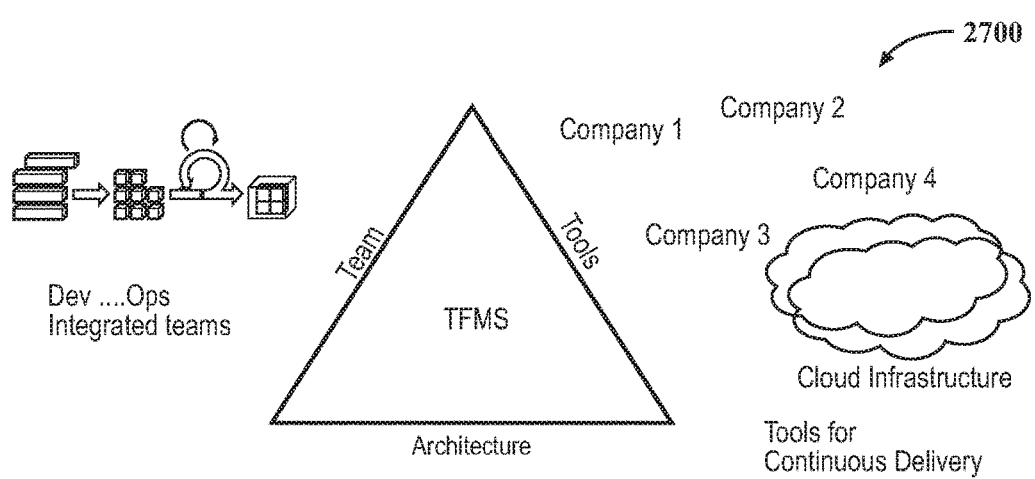

With reference to FIG. 27, a high performance Agile and DevOps application delivery organization 2700 permits each vendor to examine the organization and sample toolset to see if it fits within their idea of a delivery organization. The system can be built on a Web-Scale infrastructure capable of delivering continuous availability and continuous delivery. The Web-Scale infrastructure can enable developers and administrators to easily provision and deploy environments on-demand. The infrastructure and application services can scale up and down based on external factors (i.e., current load, performance requirements). Integrated teams, process and tools that provide increased agility, transparency and ease of governance, and effective allocation of resources A subscriber to basic telephone service is assigned a telephone number that identifies the service and is billed for calls originated from the telephone line associated with the service. In contrast, with toll-free service the subscriber is assigned a toll-free telephone number and is billed for all calls terminated to that number. There is no charge to the originator of the toll-free call.

Toll-free number portability made it possible for any company to provide service for any available toll-free number. FCC Tariff No. 1 x, 800 Service Management system functions specified the functionality of a Service Management system that would be operated by the Bell Operating Companies (BOCs). One embodiment of a tariff is Tariff F.C.C. No. 1 x, 800 Service Management System Functions, Issued Jan. 31, 2013, Effective Feb. 15, 2013. A disclosed embodiment, originally developed and maintained by Bellcore, facilitates a company that wishes to provide toll-free service (referred to as a Responsible organization/Resp Org/toll-free service provider) to obtain control of toll-free numbers and provision of the information in the network needed to route calls to a designated terminating number. (This information is sometimes referred to as a Customer Record.) This tariff outlines the requirements for becoming a toll-free service provider, the capabilities required of the disclosed embodiment to allow toll-free service providers to search for and reserve toll-free numbers and provision Customer Record information, and how toll-free service providers may be to be billed for use of the disclosed embodiment and control of toll-free numbers.

With geographic portability made possible through the use of centralized routing databases, it became possible for the same toll-free number to be dialed from anywhere in the country and for the toll-free call to be delivered to different destinations based on routing criteria specified in the Customer Record. Toll-free service quickly grew in popularity, and the supply of available 800 numbers neared exhaustion. The toll-free code 888 was opened in 1996, followed by 877 in 1998, 866 in 2000, and 855 in 2010. Plans may be underway for opening of the 844 code in the near future and the FCC tariff has designated the future use of the 833 and 822 codes. As the value of toll-free service and the advantages to having a meaningful combination of digits in a toll-free number (referred to as a vanity number) became increasingly apparent, numerous companies became toll-free service providers and established businesses selling toll-free service. Today, there may be more than 450 toll-free service providers, including telecommunications network providers, resellers, and independent organizations.

To understand routing of toll-free calls, it may be useful to understand how routing is performed for standard (i.e., not toll-free) calls.

Figure 28:
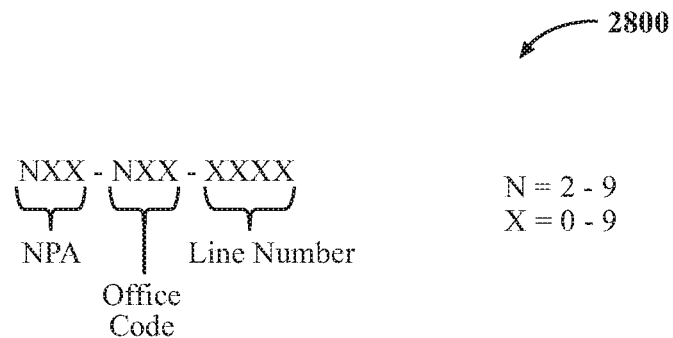
FIG. 28 depicts a North American Numbering Plan Administration (NANPA) format.

With reference to FIG. 28, the North American Numbering Plan (NANP) 2800, introduced in the 1940s, established the 10-digit telephone number format used in the United States, Canada, and neighboring countries in the Caribbean. The format, shown in FIG. 28 consists of a three-digit Numbering Plan Area (NPA) code, and a seven-digit telephone number that includes three digits that identify an office code or local exchange and four digits that identify the individual number within the office code. The NPA, or area code, uniquely identifies a geographic area, the office code uniquely identifies a central office switching system (historically referred to as an exchange) within an NPA, and the line number points to the service components and dedicated resources in the switching system that provide the service instance identified by the line number.

When toll-free service was introduced in 1967, telephone calls were routed using information provisioned in each Public Switched Telephone Network (PSTN) local switching system. A routing table specified how the switch should process an originating call based on the digits dialed by the calling party and the arrangement of facilities that connected the switch to other switches. A switch has direct connections to other switches in the same area and connections to intermediate switches called tandems that provide the next hop toward other switches operated by the same company. Additional connections to specialized tandems provide access to long distance networks to transport calls to switches outside the local area. The local area where a company provides services is known as a Local Access and Transport Area (LATA).

The NPA or NPA-NXX of the dialed called party number identifies an entry in the routing table that points to the route needed to transport the call toward the terminating switch that serves the dialed line number. Initially, calls within a local area only required 7-digit dialing (just the NXX and the final 4 digits), but as the demand for telephone numbers grew, additional area codes were opened within a local area, and it became necessary to dial 10 digits for both local and long distance calls. If the digits dialed may be for an NPA-NXX served by the same switch, the routing table can indicate that a call should be offered to the subscriber identified by the telephone number. If the digits dialed indicate a NPA-NXX not served by the switch, the routing table can point to a route to a neighboring local switch, a local tandem, or a long-distance tandem.

Unlike a typical NPA, the 800 code introduced to identify toll-free numbers does not identify a unique area to which a call can be routed. To support toll-free service, additional entries had to be made in each local switch routing table to indicate the route for an 800-NXX code. Calling a particular 800 number was limited to the local switches that had been provisioned with routing information for that number. Additionally, further routing information was required at a terminating switch to map the 800 number to the terminating line.

In the early 1980s, AT&T introduced centralized call routing databases to handle routing of 800 calls. With a centralized database, it was not necessary to provision routing information for toll-free numbers in every local switch. Instead, switches were configured to query the database for routing information when it was recognized that an 800 number had been dialed. The database can be provisioned with routing information to direct a call to a route based on many factors, providing flexibility and removing the association of an 800 number to a specific local switch. This made it possible for a company to own a national 800 number and for calls to that number to be routed to a different local switch depending on where the call originated or the time of day. The flexibility provided by centralized call routing databases also enabled any carrier to provide service for any 800 number. Both geographic and carrier portability for toll-free service had become possible.

Today, in addition to toll-free calling, services like local number portability, operator services, and Advanced Intelligent Network (AIN) features, make use of advanced routing capabilities enabled by signaling system 7 (SS7).

Figure 29:
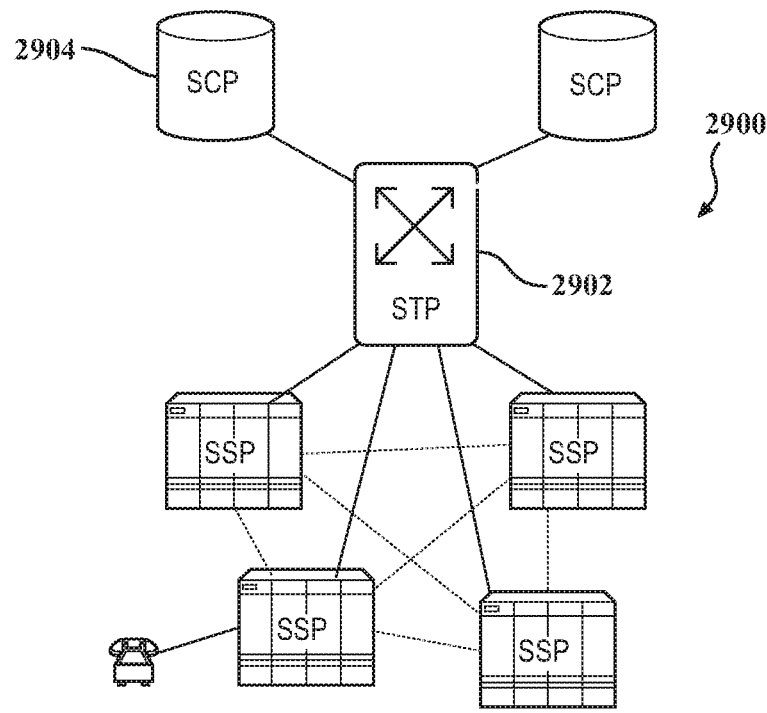
FIG. 29 depicts a schematic of an SS7 architecture.

With reference to FIG. 29, in the SS7 network 2900, the local switch is known as a Service Switching Point (SSP). A Signal Transfer Point (STP) 2902 provides routing of SS7 messages, and databases with call routing and feature information may be known as Service Control Points (SCP) 2904. To enable advanced routing via a centralized database, local switch routing tables may be configured to trigger a query to a database for additional call processing instructions based on various criteria.

In the case of a toll-free call origination, the switch can recognize the 8XX code in the dialed digits and launch a query to an SCP for routing information using the SS7 Signaling Connection Control Part (SCCP) protocol to transport a Transaction Capabilities Application Part (TCAP) query.

Figure 30:
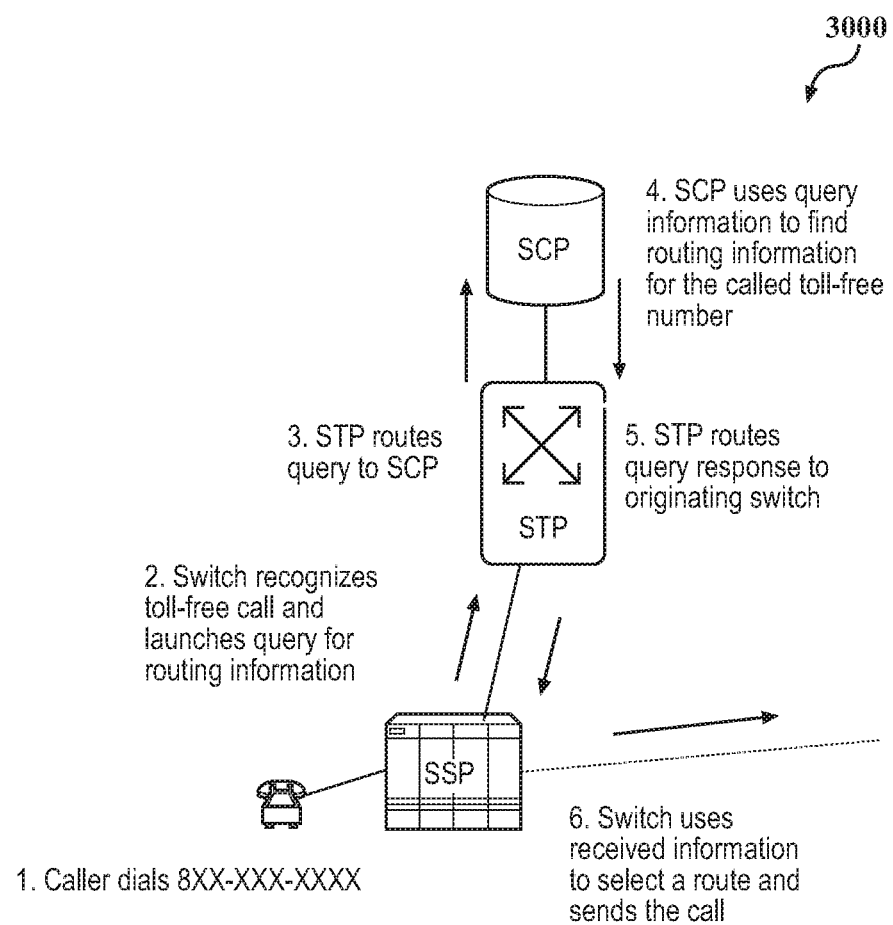
FIG. 30 depicts a schematic of toll-free call processing.

As shown in FIG. 30, the query may be routed by an STP to an SCP that has been provisioned with the information that describes how to route the toll-free call. In some cases the initial SCP that is queried by the local switch can return information that can cause the call to be routed to a switch operated by another carrier where a subsequent query to a different SCP can be performed to obtain the routing information needed to direct the call to the destination.

The routing information, consisting of a carrier code and terminating number, is returned in a TCAP response to the originating switch. The switch uses the information to select a route from its routing database and continues processing 3000 of the toll-free call.

Toll-free number administration includes management of number assignment and provisioning of customer records. This section describes the toll-free business, the key stakeholders, roles and responsibilities, and disclosed embodiment capabilities.

Key aspects of the toll-free number business may be described by the FCC tariff. This tariff, describing "regulations, rates and charges applying to the provisioning of functions and support services" was first released in 1993. Updates have occurred since, with the latest released January, 2013, becoming effective in February, 2013. This tariff describes the undertakings of the company responsible for the disclosed embodiment and the capabilities required of embodiments of the system itself. It defines key terminology and specifies the responsibilities of toll-free service providers, who may be the primary users of the disclosed embodiment. It also provides a schedule of rates and charges with regulations for billing toll-free service providers for disclosed embodiment access and usage. System requirements defined by this, or any other, tariff may be provided in "Business Rules" Section.

Figure 31:
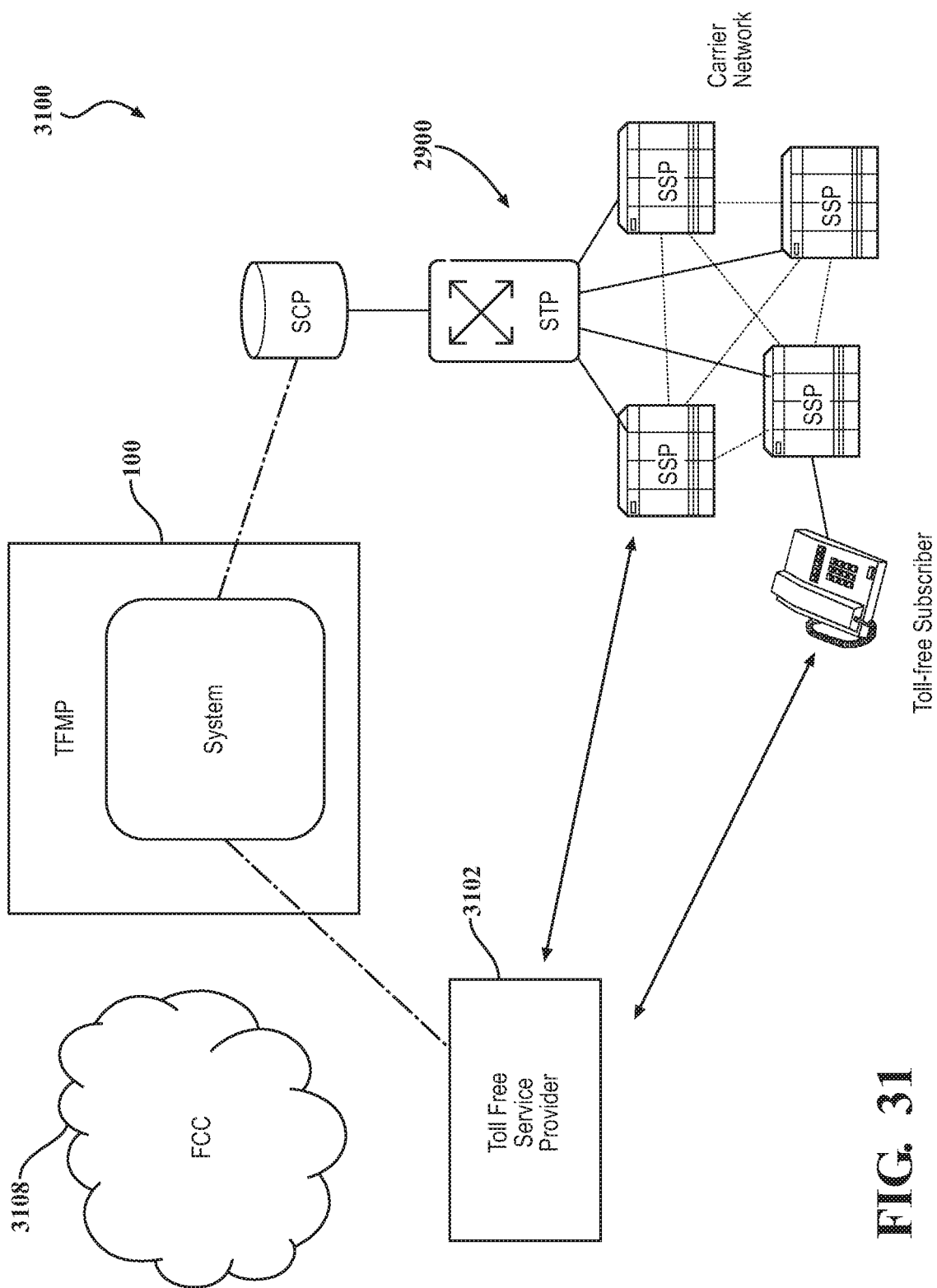
FIG. 31 depicts a schematic of toll-free business interactions.

Some key participants in the toll-free business 3100 and the interactions between them may be illustrated in FIG. 31. Note that a primary geographic area for the toll-free business is the United States, Canada, and other areas where the NANP is used.

A toll-free subscriber contacts a toll-free service provider to order toll-free service. The toll-free service provider may be a carrier who operates a network or may have a relationship with a network provider in order to enable service. The toll-free service provider has an interface to the disclosed embodiment to search the pool of unassigned toll-free numbers and reserve one or more for use by the toll-free subscriber. Working with the toll-free subscriber, the Resp. Org determines how calls to the toll-free number should be routed.

On behalf of the toll-free subscriber, the toll-free service provider enters a Customer Record in the disclosed embodiment that specifies routing and carrier information for the toll-free number. The disclosed embodiment sends this information to the SCPs that control real-time routing of calls in the network. When the SCPs have received the routing information in the customer record, toll-free service is enabled for the toll-free number.

The toll-free subscriber has a business relationship with the toll-free service provider 3102 to pay for toll-free service. The toll-free service provider has a relationship with the TFMP to pay for access to the disclosed embodiment and use of the toll-free number assigned to the toll-free subscriber.

There may be a number of stakeholders that play key roles in the toll-free business, which may include those that follow:

FCC 3108—The FCC is the federal agency that has responsibility for the FCC tariff that specifies the need for a toll-free number Service Management system and defines the regulations, rates, and charges applicable for the use of system functions and support services. The FCC may approve changes to rates or other aspects of the FCC tariff.

The TFMP 100—The TFMP is responsible for the administration and operations of the disclosed embodiment and enforcement of the regulations outlined by a tariff. The TFMP may retain a number of contractors to assist with the activities required to manage the disclosed embodiment and related functions, including maintaining the disclosed embodiment software, running the data centers that house the disclosed embodiment, performing routine and corrective maintenance activities on the disclosed embodiment hardware, handling billing for access and use of the disclosed embodiment, and running the help desk to handle questions and requests from disclosed embodiment users.

Administrators and the TFMP Help Desk personnel can access the disclosed embodiment. Administrators can enter and maintain configuration and reference information needed for operation of the disclosed embodiment. Help Desk personnel can assist with troubleshooting access and Customer Record issues, complete TFMP Requests, and submit trouble reports.

Toll-Free Subscribers—Toll-free subscribers may be the end users of toll-free service. Toll-free service includes a toll-free telephone number and the network capabilities that enable calls to a toll-free number to be delivered to a designated terminating number according to conditions specified by the toll-free subscriber. Toll-free service is obtained from a toll-free service provider.

Toll-free service providers (aka Resp Orgs)—Toll-free service providers may be responsible for the overall coordination required to provision, maintain, and test toll-free service. A toll-free service provider may be a carrier that operates a network or instead could be an independent company or organization that interfaces with a carrier to arrange toll-free service. Toll-free service providers may be the primary users of disclosed embodiment. In embodiments, the system may be used to search for and reserve toll-free numbers for subscribers and provision Customer Records that provide the network with the information needed to route toll-free calls. Toll-free service providers may be billed for access and use of the disclosed embodiment and control of toll-free numbers on a monthly basis as described by a tariff.

Toll-free service providers often maintain sub-organizations based on geography or other organization classifications. The toll-free service provider entity is the top-level organization against which reservation limits may be imposed (represented by the first 2 digits of toll-free service provider ID in the current system). The sub-organization within a toll-free service provider entity (represented by the full 5 digit toll-free service provider ID in the current system) is referred to as a toll-free service provider unit. The toll-free service provider users who access the disclosed embodiment can be associated with a toll-free service provider unit and the corresponding toll-free service provider entity. A toll-free service provider entity may manage many toll-free service provider units, each having a unique toll-free service provider ID.

SCP Owners/Operators (SCP O/O)—SCPs may be the databases in the SS7 network that contain the information used to route toll-free calls. SCP Owners/Operators contract with the TFMP to receive updates from the disclosed embodiment. An interface is established between the disclosed embodiment and the SCPs so Customer Record information can be provisioned to SCPs to enable the real-time routing of toll-free calls. SCP O/Os may be billed for this service.

At SCP O/O companies, the SCP administrator is responsible for establishing reference data about the SCPs and their corresponding SS7 networks. The administrator also manages tables at the SCP node and the Call Management Services Database (CMSDB) within the SCP to set controls and limits for SCP operations. They may be permitted to access and change data only for the O/O's SCPs in the SS7 network.

A network manager is a member of Network Management Center (NMC) or Network Operations Center (NOC) at the SCP O/O company staff responsible for managing mass calling surveillance and control capabilities in its managed SS7 networks.

SCP O/O SCP administrators and SCO O/O Network managers may be users of the disclosed embodiment.

Billing Administrator—This function coordinates the Billing of all customers, using information provided in the disclosed embodiment.

Industry and Regulatory Liaison—This function uses information in the disclosed embodiment to respond to inquiries or to make inquiries to the regulatory bodies.

Carriers—Actual telephone entity that carries the toll-free call. Carriers operate networks that process telephone calls. Local-Exchange Carriers (LECs) operate end office switches that provide access service to subscribers and carry calls within a local area, known as a LATA. Interexchange carriers (IC) carry calls between local areas. A subscriber receives service from a local-exchange carrier and designates the default IC to carry calls between LATAs. Historically, local carriers and ICs were distinct, but today a carrier can be both a LEC and an IC. A carrier may also be an SCP O/O, or a carrier may obtain SS7 signaling and database services from a separate SCP O/O.

Figure 32:
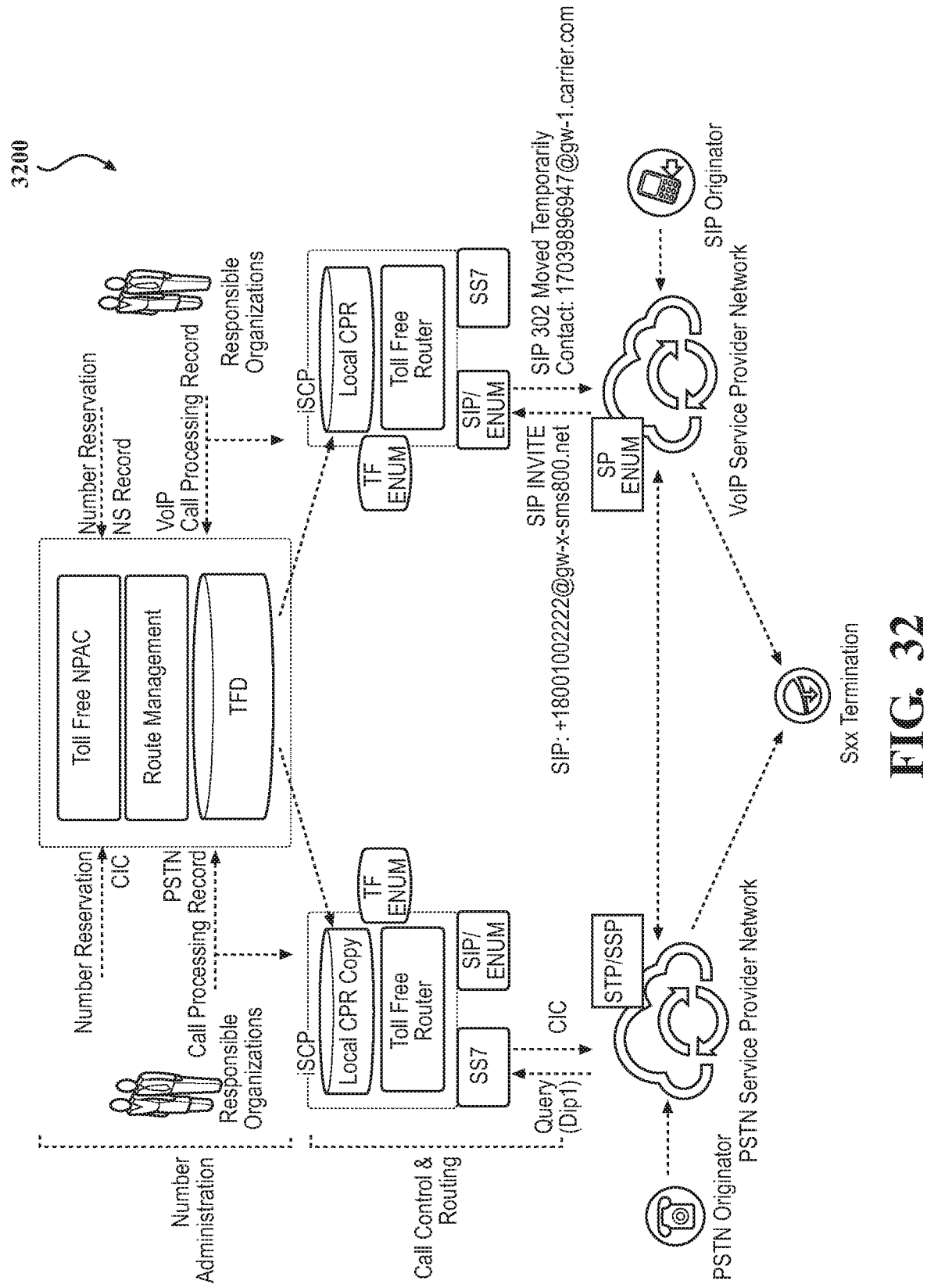
FIG. 32 depicts a schematic of a toll-free IP Future State.

With reference to FIG. 32, in one disclosed embodiment, the architecture 3200 for a solution for toll-free with key enhancements to support the unique requirements for toll-free number administration and call routing is illustrated.

Figure 33:
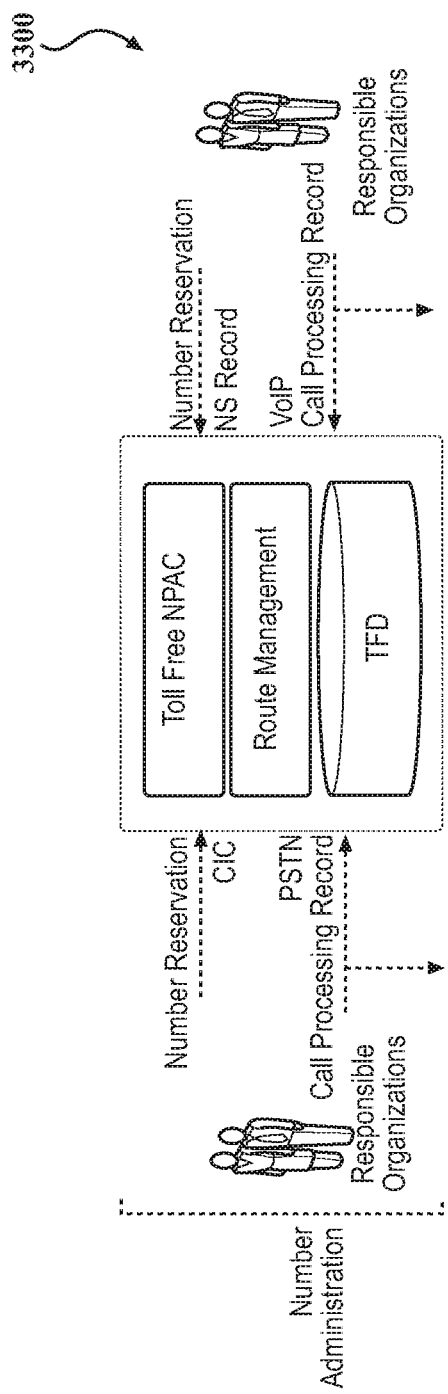
FIG. 33 depicts a schematic of a Number Administration future state.

With reference to FIG. 33, in one disclosed embodiment, the architecture 3300 provides number administration capabilities for toll-free numbers facilitating integration between PSTN and an IP network. This unified platform can serve both PSTN and IP enabled numbers.

Toll-free subscribers work with Resp Orgs to search and reserve toll-free numbers. Responsible organizations continue to populate the disclosed architecture with CICs for PSTN numbers and an NS Records for IP-enabled numbers.

The disclosed embodiments of the architecture can store additional metadata (for example: toll-free CNAM, industry code, description, license status, trade group affiliations, BBB ratings and such) for the toll-free organization As the transition completes, toll-free calls would provide consumer assurance through a validated neutral third party trust chain to significantly improve consumer confidence and prevent identity fraud.

In addition to the NS Record for the iSCP, Resp Orgs can choose to configure aspects of the routing logic with the disclosed architecture (second dip). They can map a SIP URI to a toll-free record. In this example scenario, a Resp Org would copy over that information with the iSCPs. In addition to the enhanced aspects of the iSCP, the iSCP may also facilitate direct IP interconnects between RespOrgs and their service providers, if desired, through sharing additional metadata about a route.

Figure 34:
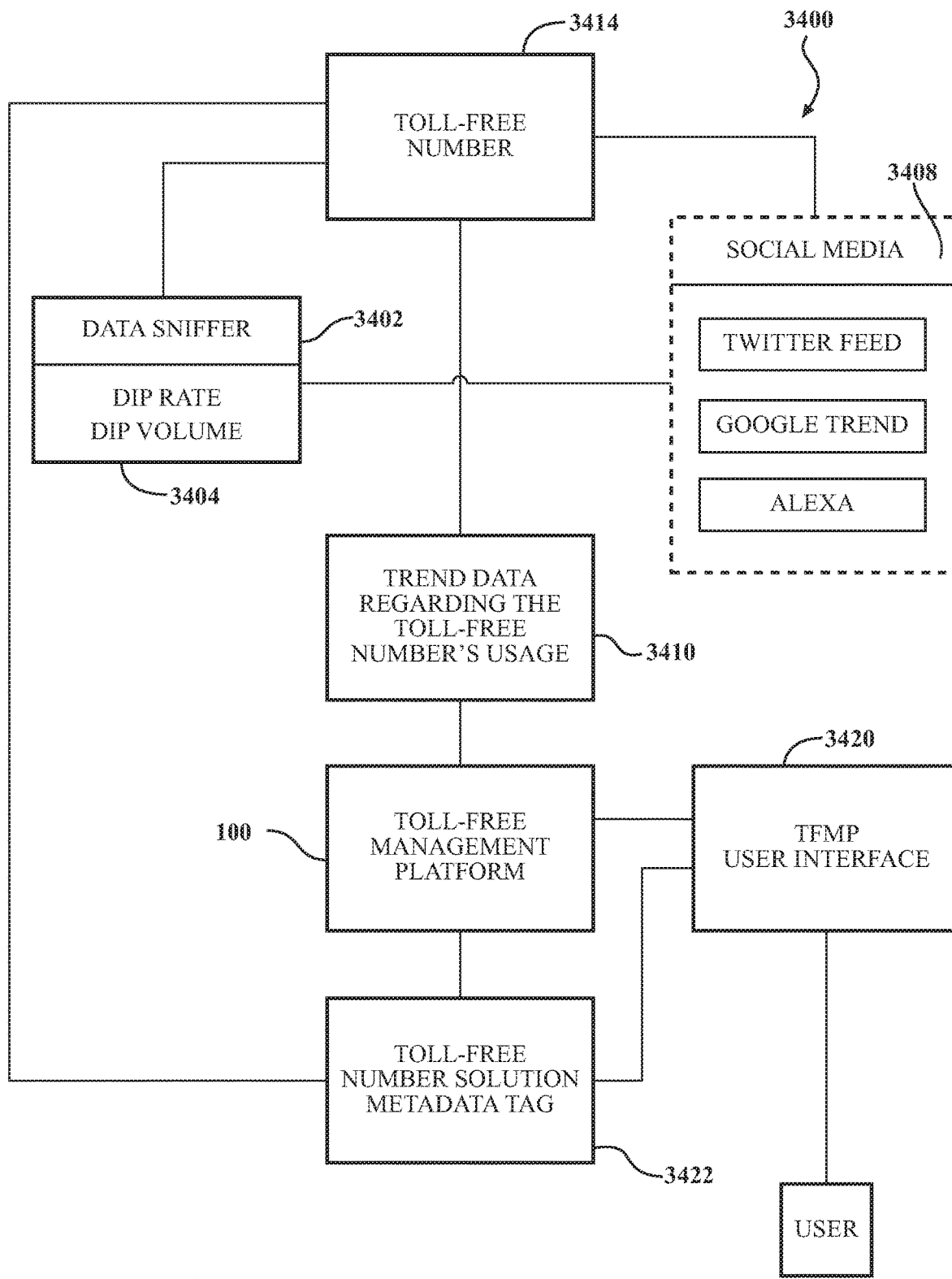
FIG. 34 depicts a schematic view of a system for tagging toll-free numbers.

With reference to FIG. 34, Toll-free numbers 3414 (unlike mobile and landline numbers) have evolved to be a branding and identity vehicle. Companies are increasingly using their toll-free numbers along with their online assets to provide an integrated customer experience. With this growth, availability of vanity numbers has become sparse and demand is increasing. In embodiments, a toll-free tagging service may be provided that includes a subscription-based service that is made available to Responsible Organizations (Resp Orgs), consumers and businesses. The toll-free tagging service may provide the ability to tag a toll-free number (or group of numbers), and once a number is tagged, to track updates to that number (e.g., a change in ownership, change in availability, increase in search statistics) that may then be distributed ("pushed") to customers through emails/text messages or other means. Subscribers of the toll-free tagging service may also have the ability to create, view, update and delete tags through a web application, mobile application, or some other user interface.

The toll-free tagging service may alternatively or additionally be embodied in a distributed computing environment, such as a cloud based computing network. In another embodiment, the toll-free tagging service may be utilized via hybrid networks, including usage of a cellular telephone network (and associated mobile communication devices, such as smart phones), a distributed, cloud network and an enterprise network associated with a carrier or other business organization (and any combination or sub-combination of such networks). The toll-free tagging service may permit the user to access the reporting capabilities of the TFMP through a client device, such as a personal computer, mobile phone, tablet computer, or some other computing facility, and receive data, including multimedia to the user's client device. Functionalities of the TFMP include, but are not limited to, Number Administration (NA) and Customer Record (CR) administration.

In embodiments, subscribers may be provided options to create custom toll-free number tags based on keywords, using a website. Subscribers may have the option to choose, for example:
Keywords that spell a number (for example 800-Success)
Category based tagging (for example "Laundry")
Location based tagging (for example "California Numbers")
Popularity (suggestions based on search engine metrics)
Social Media mentions (Facebook and twitter feeds)
Suggestive Tags (based on peer user behavior)

In embodiments, the system may ingest data from a plurality of sources, including but not limited to the following:
Number popularity sourced from number searches from the toll-free management platform (TFMP) 3402
Number dips sourced from SCPs and network elements 3404
Facebook, Linkedin and twitter mentions of key words based on categories 3408
Location information from fuzzy location parameters (including network location elements like NPA-NXX, ANI, JIP) and such
Tag trend report based on tags that are most frequently indexed 3410
News and Current event tags
User contact sourcing (tag generation from subscribers address book)
User social feed sourcing (tag generation based on users social media feeds)
Seasonal tag sourcing (for example, Thanksgiving ads)

In embodiments, the TFMP 100 may allow for differentiated services based on subscriptions through a user interface 3420. For example, service offerings may be tiered:
Regular Tier: May allow for tag alerting based on acceptable latency. Alerts maybe available through a non-guaranteed delivery mechanism like email, and allows for basic subscription services with a cap on subscribers.
Plus Tier: May allow for low latency alerting based on multiple mechanisms. Premium customer support and access to artificial intelligence based indexing may be provided to see popular tags. This may allow for extended customer bases.
Premium Tier: May allow for premium access to see search patterns from others, unlimited tags, high speed and high frequency alerting, and the like. May also allow for an "auto reserve" function.

In embodiments, the tagging service of the TFMP may provide an unbiased valuation for a number or group of numbers based on several factors including, but not limited to:
Tag popularity
Industry financial metrics
Call completion, dip status
Average call duration
Vanity-ness In embodiments, the tagging service of the TFMP may source data from distributed data sniffers that reside in networks to see dip rate and dip volume for popular numbers. This data may be compiled with other data sources including, for example, Google™ and Alexa™ trends (or other web traffic data and analytics) for tags and provide a heat map that shows "hot spots" for where the numbers are in demand and who is calling these numbers, nationally and internationally. In another example, a view may be provided that is a near real time valuation trend (e.g., analogous to a stock ticker) for, say, the top 10 tags/numbers by state/city. Current methods are limited in that they cannot combine call origination data, with social media and other public domain data, and near real-time, apply a valuation model to display a trends and prices on an interactive map, however the methods and systems of the TFMP enable such functionality.

The toll-free tagging service may alternatively or additionally utilize the TFMP system and may include a subsystem, referred to as a "node," that may be used to build a decision tree that is downloaded to the SCPs. The decision tree may be used in various manners as otherwise described to facilitate call efficiency. Tagging data associated with toll-free numbers may be used, including with real-time network information and static call routing information, to create a real-time call path score. In an example, a toll-free number that is associated with spoofing or other fraudulent call activity may be tagged as a problematic number and a call route assigned to it to minimize the financial impact of receiving a high volume of fraudulent calls to the toll-free number. SCPs may also be a source of real-time call routing data and data used for tagging purposes. Using this information facilitates extrapolation and determination of uptime, downtime, congestion, geographical movement and economic movement of people communicating via calls. Based on real-time data that can be obtained from the SCPs and from the network, the TFMP may create a score that can be assigned to each call decision node. Such a score may also be used for the purposes of tagging. Similar to a mapping algorithm that uses distance and speed limit, given a starting point and a destination, the quickest or shortest map may be mapped. Changes in the call routing tree may be dependent upon an update to the routing tree that is then validated by the TFMP and then downloaded to the SCPs. With the use of real-time data, and more network decisions nodes added to a call routing tree based on the needs of the end subscriber, the TFMP may provide the ability to allow an end subscriber to have real-time business continuity for their toll-free number instead of having to contact their service provider, or getting a ticket opened to update their routing tree, and then having it download to all the SCPs for the new routing to take place. In embodiments, a call path score and real-time routing may be based on the best possible availability score. This may also be modified by the TFMP to allow for lowest cost score, based on the per-call and per-minute cost for particular carrier. The call score may be updated during low activity periods with a date/time stamp associated with it. This may allow real-time, or near real time, detection of a path's status. Upon completion of a call down a particular path, the TFMP may also update the call path score and the data used for the purposes of tagging. Further, real time status changes in a telecommunications network, the performance of a given call route, or some other status change, may be used as additional tagging data. In an example, a toll-free number that may experience a season high-demand may begin to operate less efficiently, this metadata 3412 may be tagged to the toll-free number for use in, for example, predictive analytics provided by the TFMP regarding temporal changes in call activities and the optimization of certain call routes. Toll-free numbers tagged as having significant seasonal variation in call volume, or some other criterion, may have additional enhanced routing trees created for the purpose of handling peak seasonal call demands. A plurality of tagged numbers may be further associated with a TSPID so that a common entity associated with the toll-free numbers may be identified.

In embodiments, number trend optimization 3410 may be provided by the TFMP in order to provide recommendations to target the right audience for a number. Recommendations may include marketing a number on a certain media within a certain geography to promote calls to the right customer. Call origination data (in partnership with the call originators and service control points (SCPs)) will be sources to provide effectiveness metrics to users based on, for example, originating numbers and derived call success rates (based on average call duration) and call completion. The toll-free tagging service may alternatively or additionally be utilized with predictive analytic services that allow a user, through the customizable user interface, or "dashboard," to access third party data services, sponsored data and information derived from toll-free telecommunications networks, including but not limited to telecommunications carriers, service control points, call centers, or other parties affiliated with a toll-free telecommunication network. As elsewhere described, origination data may be combined with social media and other public domain third party data, and near real-time, apply a valuation model to display a trend and prices on an interactive map via the TFMP.

The following are illustrative clauses demonstrating non-limiting embodiments of the disclosure described herein:

A method comprising:
receiving data relating to at least one of a dip rate or dip volume that is associated with a toll-free number;
receiving social media data relating to usage of the toll-free number;
analyzing the combined data and social media data to create a valuation metadata tag that is associated with the toll-free number, wherein the valuation metadata is a quantitative summary of the demand associated with the toll-free number; and
distributing a communication to an entity regarding the current valuation of the toll-free number.

A method comprising:
analyzing data relating to a toll-free number and social media data to create a valuation metadata tag that is associated with the toll-free number, wherein the valuation metadata is a quantitative summary of the inferred economic activity associated with the toll-free number;
inferring a rating of a second toll-free number based at least in part on the valuation metadata, wherein the toll-free number and the second toll-free number share an attribute; and storing the inferred rating of the second toll-free number.

A method comprising:
receiving data relating to at least one of a dip rate or dip volume that is associated with a toll-free number;
receiving social media data relating to usage of the toll-free number;
analyzing the combined data and social media data to create a valuation metadata tag that is associated with the toll-free number, wherein the valuation metadata is a quantitative summary of the demand associated with the toll-free number; and
initiating a toll-free number reservation based on the current valuation of the toll-free number.

Figure 35:
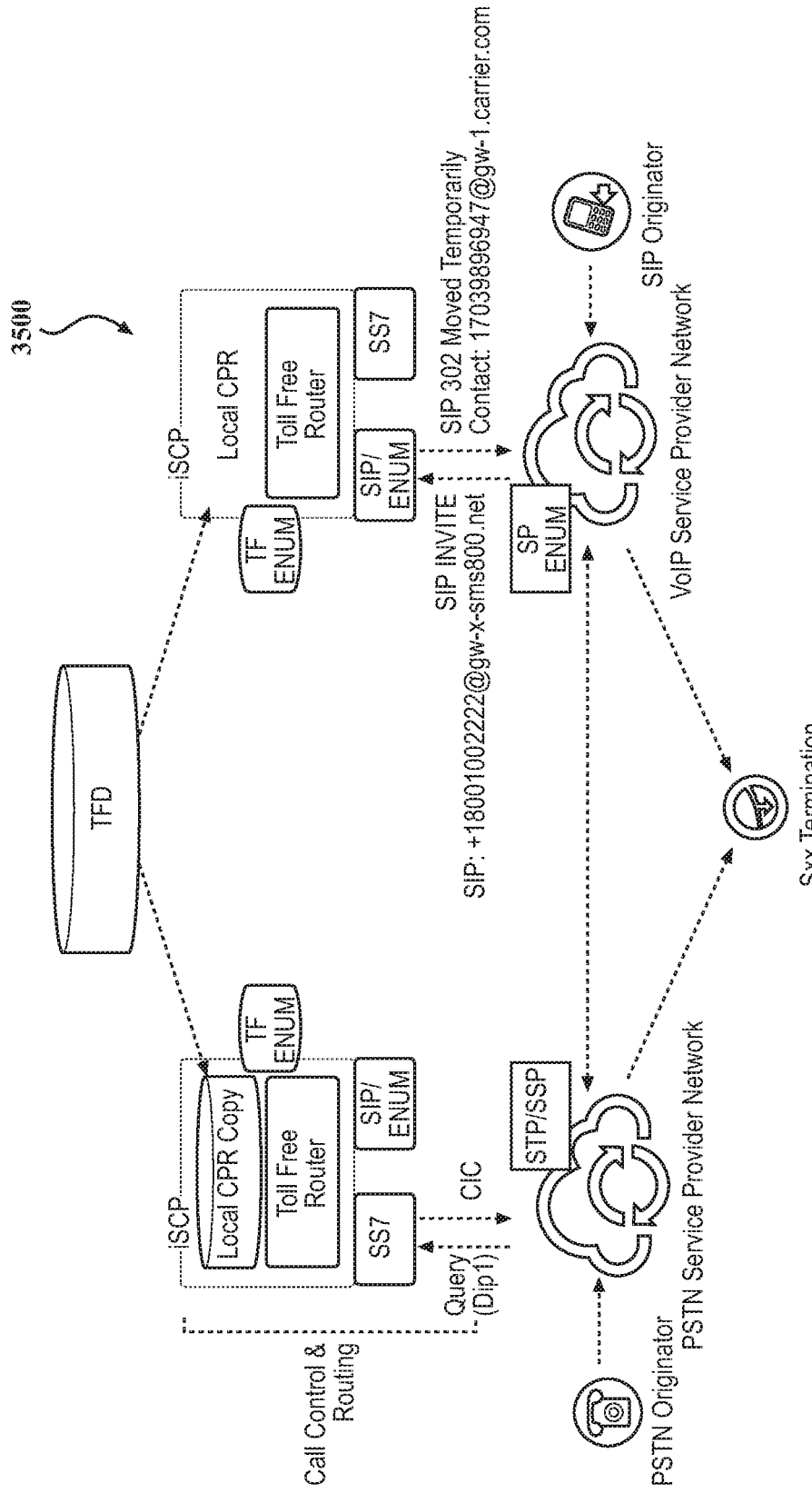
FIG. 35 depicts a schematic of a call routing future state.

With reference to FIG. 35, routing information in NS records 3500 may be downloaded to originating service provider (SP) ENUM or similar directory for call control. PSTN Call originations can continue existing PSTN 8xx call flow.

IP call originations can use an intelligent ENUM-like and SIP enabled intelligent Service Control Point (iSCP). In embodiments, many geographically redundant, highly available iSCP servers can reside in the originating service providers or provided by independent third parties. iSCPs can operate in mixed mode (SIP and PSTN) or be exclusively SIP. iSCPs provide ENUM like functionality enhanced with intelligent routing capabilities required for toll-free routing.

For IP call originations, the originating service provider queries its local naming (ENUM-like capability) server for call routing. The SP ENUM or similar service delegates the 8xx number queries to the iSCPs (similar to level 2 DNS). iSCPs execute intelligent call routing logic, and return a SIP Redirect with a URI for the SIP gateway of the toll-free service provider. The originating service provider can then route the SIP INVITE to the terminating toll-free subscriber's service provider.

For IP calls terminating to the PSTN network, the originating service provider queries its ENUM server similar to IP termination as described above, with the iSCP returning the URI for a PSTN gateway.

Toll-free numbers follow the NANP 10-digit format (NPA-NXX-XXXX) used for all telephone numbers in North America. A toll-free NPA designated by the FCC, such as 800 or 888, identifies a number as a toll-free number. Toll-free numbering may follow the E.164 format for identifying telephone numbers. The disclosed embodiment maintains status and associated information for the complete pool of toll-free numbers.

The Number Administration function provides the ability for a user to perform any of the following capabilities:

Number Query: the ability to find out information such as availability, toll-free provider ownership, and status about a specific toll-free number.

Number Search: the ability to look for one or many toll-free numbers.

Number Reserve: the ability to reserve one or many toll-free numbers for his/her toll-free provider based upon the results of a search.

Number Search & Reserve: the ability to search for one or many toll-free numbers and reserve them in the same single user action.

Except when noted otherwise, all number reservations may be taken and processed on a first come/first served basis. In embodiments, this may be due to a tariff requirement and true regardless of the source of the request.

A status is associated with each toll-free number that changes based on user actions to search for and reserve numbers and to provision and delete Customer Records for a number. Other status changes may be made automatically by embodiments of the system based on rules specified by a tariff.

The business rules around status change in the may include:

Spare—Number is available to be reserved. No toll-free service provider entity has control of the number.

Reserved—Toll-free service provider entity has taken control of the number, but a Customer Record has not yet been provisioned.

Assigned—Customer Record has been provisioned in the disclosed embodiment, but has not been sent to SCPs.

Working—Customer Record has been sent to SCPs and accepted by at least one SCP.

Disconnect—Toll-free service has ended and intercept treatment, such as an announcement, is provided; a Customer Record may be needed to specify routing for intercept treatment.

Transitional—Toll-free service and intercept service, if provided, have ended; there is no longer routing information in SCPs for the number and therefore no active Customer Record reflecting current information in an SCP associated with the number.

Unavailable—Number cannot be reserved by a toll-free service provider.

Suspend—Number has been disconnected but has a Customer Record to restore service, or number is the subject of a billing dispute.

For all statuses except usually SPARE and UNAVAILABLE, a toll-free service provider entity may be associated with the number. This association begins when the toll-free service provider entity takes control of the number by completing a reservation. Except when noted otherwise, all number reservations may be taken on a first come/first served basis.

Figure 36:
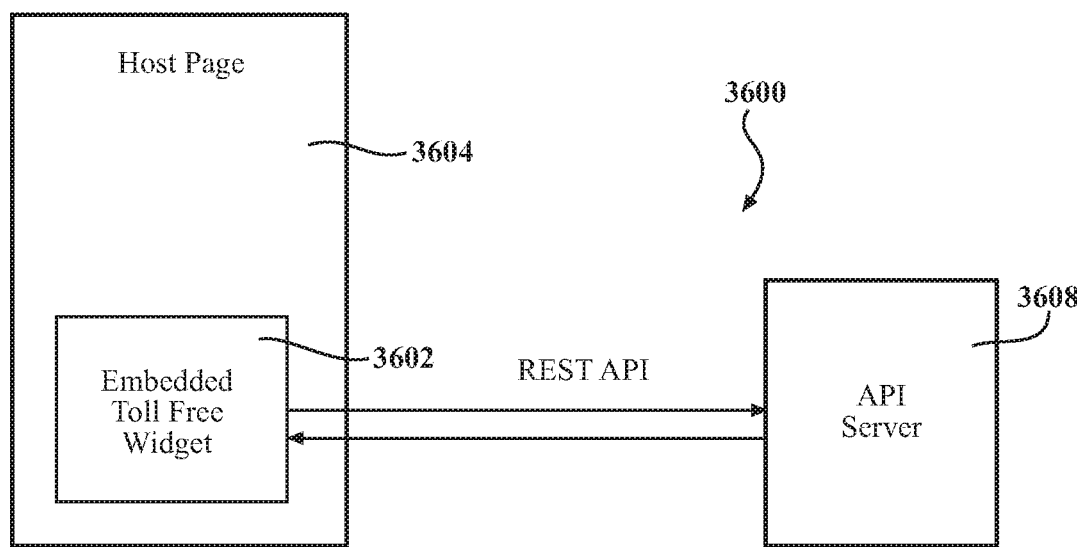

With reference to FIG. 36, in another embodiment for one click activation 118, a widget 3602 may be embedded within a webpage 3604 to facilitate reservation of a toll-free number via a user interface 1806. The term widget as used herein may refer to a client side, browser based application which displays data coming from different sources. In an embodiment, the widget 3602 may also be used on a mobile device as a mobile app. The embedded widget 3602 may communicate with a server 3608 using an API 3608 such as secure Restful API.

The widget 3602 may be embedded within a webpage 3604 with HTML tags. The complexity and logic may thus be hidden in the Javascript that resides on the server 3608. Loading the widget 3602 on to the hosting webpage 3604 may be performed through a bootstrap script that, for example, may be written as a Javascript file, or in some other language, that resides in the server 3608. A script tag can then be used to invoke loading this, thereby loading the bootstrap.

Generally, there are two ways to embed the content on the hosting webpage 3604, using IFrame, or using DOM in Javascript, and placing it within the host site or a combination thereof. The host page may be a client website within which the widget 3602 is embedded.

Communication technology may include HTML5, JavaScript, CSS, JSON and Restful API and services. The client may utilize HTML5, Javascript, or CSS whereas the server may provide the Restful API and services. In order for the widget to communicate with the host page or if the widget needs to send data to the server, based on what is being used, it can be performed using Normal Post, AJAX (asynchronously), or some other process. In order for cross domain communication between the host page, embedded code or IFrame, HTML 5's API called postMessage may be used. JSON is a file format that is understood by both client and server and hence may be also be readily used for data representation and transfer.

Figure 37:
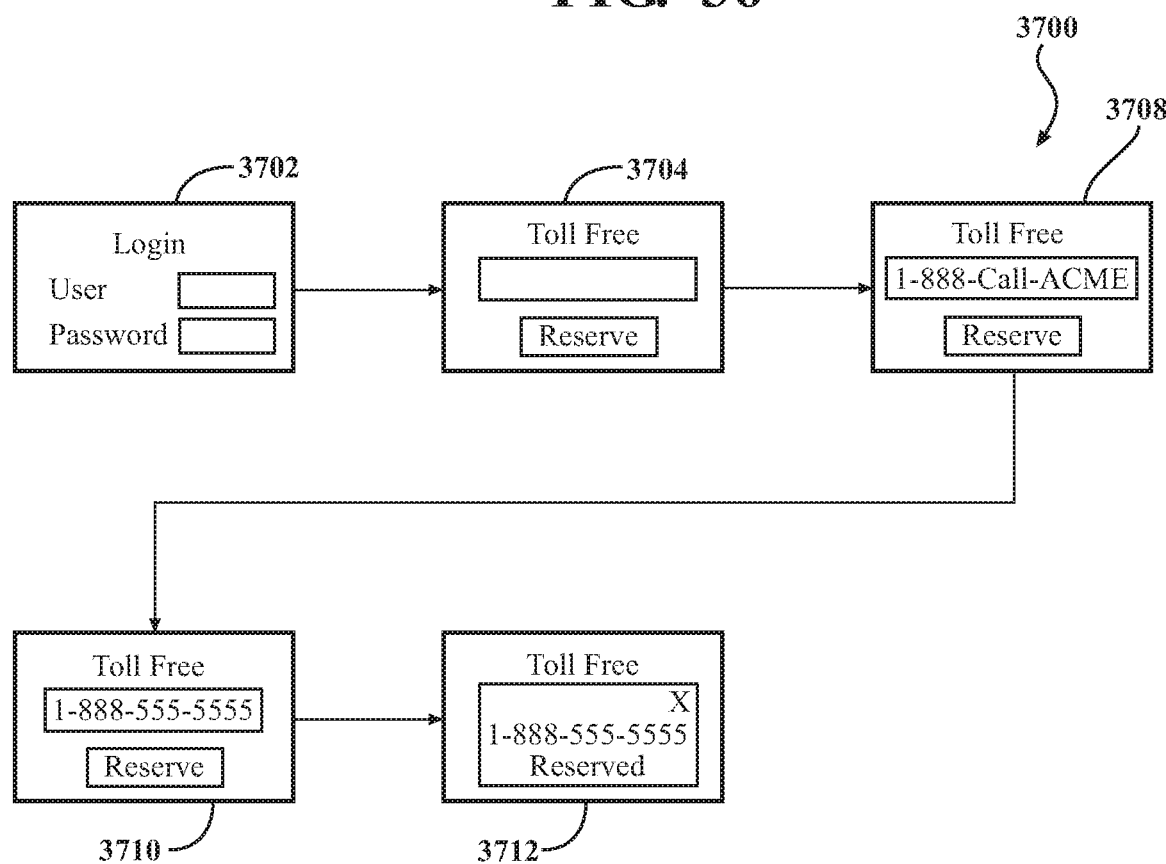

With reference to FIG. 37, various methods may be utilized to secure this communication. The widget 3602 may include a login feature 3902 in order to use the services. After initial credential validation with username and password, tokens may be provided to users. This may be used in the subsequent communication back to the server. In the alternative, API keys may be used. On authentication and authorization, various search 3904, reserve 3906, activation 3910, and confirmation 3912 elements may be provided.

Figure 38:
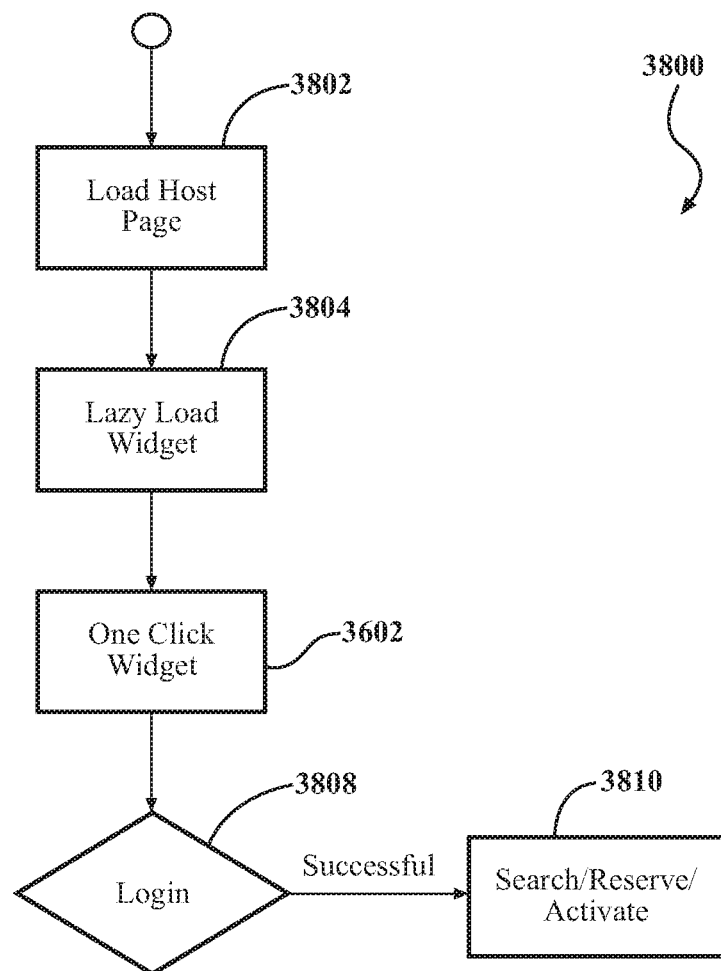

With reference to FIG. 38, one disclosed non-limiting embodiment of a method 3800 may be initiated by loading the webpage 3604 (step 3802) then lazy loading the widget 3608 (step 3804). That is, the lazy loading may be utilized to minimize any effect upon the loading speed of the webpage 3604. Once the widget 3608 is loaded (step 3804)

the login and search features (step 3808) are provided such that reservation/activation may be initiated.

The widget 3602 may be particularly beneficial to a business owner and/or Resp Org/Toll Free Service Provider. The business owner who visits a web page may view the widget 3602 that includes a statement such as, for example, "Reserve your Toll Free Number or "Do you have your Toll Free Number?" with a ready presented text field to search for a desired Toll Free Number or to enter their business name. A list of appropriate or related toll free numbers and an option to reserve and activate is thereby provided in a one-click or relatively one-click manner.

For a Resp Org/Toll Free Service Provider, the widget 3602 can be embedded in their portal. The widget 3602 provides a login page such that the widget 3602 provides a text field to reserve toll-free numbers along with a drop down list of numbers that expire in the next month and a popup link to extend. A popup link may also provide historical information such as their last 10 actions. The widget 3602 may also display a popup link to display status of the toll-free numbers in which a user previously indicated interest.

In the toll-free industry, it currently is a multi-step process to obtain a toll-free number and submit a request to active that number. It requires the user to first search and reserve a number and then in a separate transaction, often on a separate user screen, input the information to create a toll-free number routing record that is sent to the service control points (SCPs), thus activating the number for use. According to embodiments of the present disclosure, users may complete such a request related to activation of a toll-free number in a single user interaction with the system, providing minimal information. This process may provide a one-click-type functionality, hereinafter referred to as one-click activate, to activate the number, and will, in the same single-step user activation search for the toll-free number based upon user criteria. Initiation of the one-click activation may be facilitated by the use of a widget, as described herein, such as a widget operating on a client device. In embodiments, a one-click activate request may be a request from a user to 1) search for a number, or multiple numbers, that fit a provided search criteria, 2) reserve the number(s) matching the criteria, and 3) activate the number(s) using a selected customer record template, as described herein, and producing a pointer record. The final result of this request will be a toll-free number assigned to the user's Resp Org that has a customer pointer record assigned to it.

In embodiments, a user may utilize a new user interface screen, including but not limited to a customizable dashboard, as described herein, that may be accessed from a landing page of the user interface that is associated with the TFMP. The new screen may be referred to as the "Search-Reserve-Active," also referred to herein as the S-R-A, from the landing page. A user may be required to have the correct permissions to be able to perform these actions, such as:

The user must have Update in NUS_PERMISSIONS
The user must have Update in PAD_PERMISSIONS The S-R-A may also provide for predictive analytic services that may be provided to a user, through the customizable user interface, or dashboard, to access third party data services, sponsored data and information derived from toll-free telecommunications networks, including but not limited to telecommunications carriers, service control points, call centers, or other parties affiliated with a toll-free telecommunication network. As elsewhere described, origination data may be combined with social media and other public domain third party data, and near real-time, apply a valuation model to display a trends and prices on an interactive map via the TFMP.

In embodiments, the S-R-A screen may be a clone of a number search screen that is associated with the TFMP, and have, but not be limited to, the following screen design elements:

Present an action button called "Activate New Number"
Provide an action for the user to select a template record to be used for activation from a drop down list of template records
Provide an action for the user to specify information necessary to be supplied in order to active a number, including but not limited to the following:
Effective date & time—A future date and time or "now." Now may indicate that the record should go directly to an activated state.
Service order number
Number of lines to validate With reference to FIG. 39, a sample UI design 3900 is provided. The UI may alternatively or additionally be embodied in a distributed computing environment, such as a cloud based computing network. In another embodiment, the UI may be hybrid networks, including usage of a cellular telephone network (and associated mobile communication devices, such as smart phones), a distributed, cloud network and an enterprise network associated with a carrier or other business organization (and any combination or sub-combination of such networks).

In embodiments, when a user selects the S-R-A function of the landing page, the system may retrieve a list of customer template records that have been defined for a Resp Org. If this Resp Org does not have any customer template records defined, the user may receive a message notifying the user of a lack of required definition, such as "E205: Search, Reserve, & Activate functionality requires the users Resp Org to have at least one customer template record defined. Your Resp Org does not." The user may then be returned to the Landing page. If the Resp Org does have customer template records defined, the customer template record names may be displayed in a scrolling list on the screen. The user may then select one of the customer template records for use in the request.

In embodiments, a user may select a number search criterion that provides the ability to specify a specific number, a number with wildcard selection, or the NPA, NXX, and line number selections. The user may elect to have a set of default information (template, effective date, and service order number and so forth) associated with their Resp Org and/or user ID. Rather than select these items, the user may elect to use default values that are provided, thus expediting the process even further. The user may also elect not to use the default values, and may then supply the values. The search process may also include utilizing predictive analytics of the TFMP, as described herein, in order to learn more about the history and metadata that is associated with a number. Toll-free numbers, including those that are reserved and/or activated using the one-click activation may be tagged, using the methods and systems described herein, according to criteria of interest to a user. In an example, a user may search for toll-free numbers based on a predictive analytic result of toll-free numbers the TFMP has determined are active in the New England area. Predictive analytic results may also relate to specific populations of interest to a user (e.g., New York residents), behavioral data, or some other data parameter.

In embodiments, a number may then be reserved and/or activated and tagged by the user as a number that is relevant to the New England marketplace. Prior to reserving or activating a number, a user may also check a TFMP registry to determine if there is a history of reports of abuse associated with the number, for example frequent fraudulent calls (i.e., "spoofing"). The user may tag toll-free numbers in order to note this history of abuse, or other factor of interest, for future searches, and reserved or activated numbers may be associated with a toll-free service provider identifier (TSPID). The TSPID may be an existing TSPID that the user has, or as part of the one-click to activate method and system, a new TSPID may be created for the user. The user may select a customer template record from a list to be used when creating a pointer record used to active toll free number(s). The user may select only one customer template record to be used and that template record may be used with every number requested in this particular request. The user may select an effective date and time for the request. The user may further specify a future date and time or select "now" for immediate processing. Formatting and validation criteria may also be provided. The user may complete additional fields as necessary for a pointer record to be created:

Service Order number
Number of Lines

In embodiments, once all the required fields are populated, the user may select the "Activate New Number" button to start the process. The process may include the search of, and reservation for, the toll-free number(s), and the submission of a request to create a pointer record for the number(s). Errors encountered along the way may result in an error being reported back to the user for that number. In an example, requests of more than ten numbers may be processed in the background, from the perspective of the user. The user's request may be validated and the user provided a request ID. Control of the one-click activate function may be given back to the user with a notice that they will be informed when the request completes. In another example, requests for ten or fewer numbers may be processed in real time and the results are returned to the user when the request completes.

In embodiments, the one-click activate function may perform a search and reserve function for all the requested numbers in blocks of up to ten numbers, depending upon how many numbers are requested. The activation function of the process may require a separate system request for each number being activated. The one-click activate function may control the processing of the individual requests so that, from a user standpoint, it appears as a single user interaction with the system, and a response does not go back to the user until the process has been completed. Once the request has completed processing, the one-click activate function may display back to the user in the search results area of the screen (e.g., ten or fewer numbers) the list of numbers and information about them similar to how it is done with the search and reserve functionality, as described herein. For more than, for example, ten numbers, the results may be made available in the communication area off the landing page.

In embodiments, a parking lot functionality may allow a user to go through a similar one-click activate process, but instead of establishing specific routing for a number via a customer record template, the user may define the routing for this number as "parked." Parked in this context means that the number may have a default routing to a pre-defined customer announcement so the number can be activated without a final determination of the routing and when called, the user may be presented with this announcement stating the service this number provides is not currently available.

The following are illustrative clauses demonstrating non-limiting embodiments of the disclosure described herein:

A method comprising:
  receiving a one-click activate request from a user, wherein the request includes at least a customer record template reference and an indication of when to active a toll-free number associated with the request;
  searching a responsible organization record to determine the presence of a defined customer template record relating to the user request, wherein the responsible organization is associated with toll-free telecommunications;
  retrieving at least one customer template record, wherein the customer template record is a defined customer template record for the responsible organization; and
  activating the user request, wherein the activation includes at least one of activating or reserving the toll-free number.

A user interface, comprising:
  a webpage; and
  a widget operable to reserve a toll free number embedded within the webpage.

A method to secure user interface, comprising:
  lazy loading a widget operable to reserve a toll free number embedded within a webpage.

Figure 40:
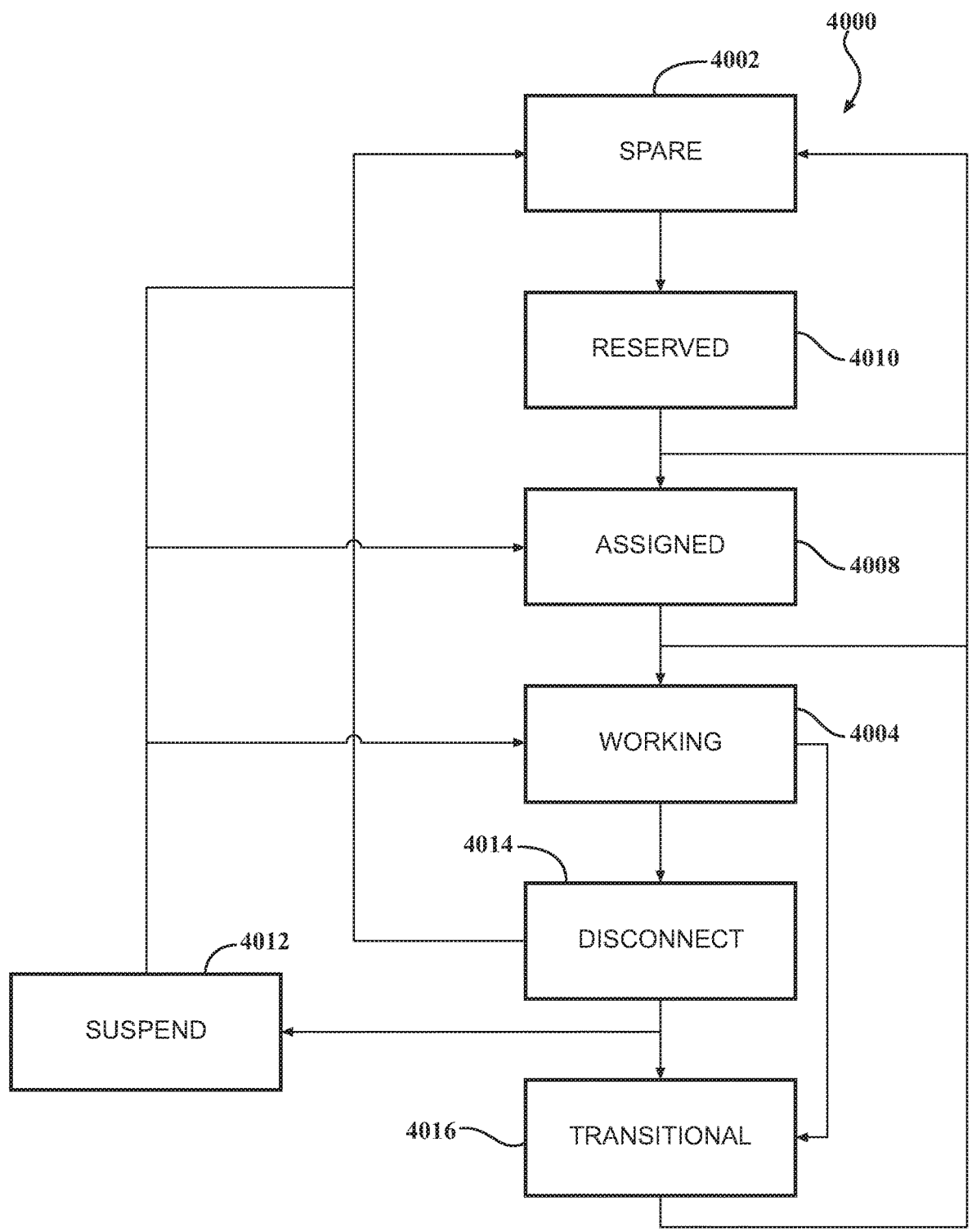
FIG. 40 is a schematic of a current system flow.

A representative flow operation showing the current system common number status transitions for activation of a toll-free service, starting with a number in SPARE status 4002, is shown in FIG. 40. Transitions that may not be part of the typical flow may not be illustrated in FIG. 40, including transition from WORKING 4004 to ASSIGNED 4008 and ASSIGNED 4008 to RESERVED 4010, as well as transitions to and from UNAVAILABLE status. SUSPEND 4012, DISCONNECT 4014 and TRANSITIONAL 4016 features may be provided. This flow is shown to facilitate understanding of system status transitions as may be understood by the customers.

A description of possible number status transitions is provided in the below table. This flow is shown to facilitate understanding of system status transitions as is understood by the customers and is not a dictate of limitations thereto.

| Transition From | Transition To | Trigger |
| --- | --- | --- |
| Initial Creation | Spare | System administrator opens a toll-free NPA-NXX. |
| Spare | Reserved | Successful reservation by toll-free service provider entity user or system administrator user. |
| Spare | Unavailable | System administrator user action. |
| Reserved | Assigned | CR provisioned against the number. |
| Reserved | Spare | Time since transition from SPARE to RESERVED has reached specified limit (Reserved Duration Limit, currently specified by FCC as 45 days) or user action. |

| Transition From | Transition To | Trigger |
| --- | --- | --- |
| Reserved | Unavailable | System administrator user action. |
| Assigned | Working | CR has been sent to SCPs and accepted by at least one. |
| Assigned | Reserved | CR provisioned against the number, but deleted by toll-free service provider entity user, and Reserved Duration Limit timer has not been reached. |
| Assigned | Spare | CR provisioned against the number, but deleted by the toll-free service provider entity user, and Reserved Duration Limit timer has expired. Or Assigned Duration Limit, currently specified by the FCC as 6 months, expires. |
| Working | Disconnect | CR disconnect has been accepted by all SCPs and intercept routing is being provided. |
| Working | Transitional | CR has been deleted from all SCPs (no intercept routing provisioned). |
| Disconnect | Transitional | End Intercept date has been reached and SCPs have deleted CR. |
| Disconnect | Spare | Time since transition from WORKING has reached specified limit (currently specified by FCC as 4 calendar months) or toll-free service provider entity user or system administrator user action. |
| Transitional | Spare | Time since transition from WORKING has reached specified limit (currently specified by FCC as 4 calendar months) or toll-free service provider entity user or system administrator user action. |
| Transitional | Reserved | System administrator user action. |
| Transitional | Unavailable | System administrator user action. |
| Disconnect | Suspend | "New Connect" CR entered while number is in DISCONNECT status. |
| Suspend | Working | CR to restore service has been sent to SCPs and accepted by at least one. |
| Suspend | Assigned | Intercept period ends and "New Connect" CR is pending. |
| Suspend | Spare | Time since transition into SUSPEND has reached specified limit (currently specified as 8 calendar months) with no connect CR or CR deleted by the toll-free service provider entity user or system administrator user. |
| Unavailable | Spare | System administrator action. |

| Requirements- Minimal Feature Set | | | |
| --- | --- | --- | --- |
| MFS # | Current state or New | Function | Description |
| MFS 1 | Current state | Search Available Numbers | Find available numbers. Control search by configurable parameters. |
| MFS 1a | New | Locking numbers after search | Do not lock numbers during a straight search. Numbers may be only locked on a reserve. |
| MFS 2 | Current state | Reserve Avail Numbers | ROs reserve available numbers. Reservation limits apply by resp. org & overall number administrator rationing and FIFO. |
| MFS 3 | Current state | Search & Reserve Available Numbers | Combination of MFS 1 & 2 in one user action. |
| MFS 4 | Current state | Query a Number | Return relevant attributes regarding a number. |
| MFS 4a | Current state | Number Reservation Limits | In embodiments, the system may maintain limits for the quantity of numbers an individual toll-free service provider entity is allowed to have in RESERVED status. The current limit specified by the FCC tariff is the greater of 7.5% of the toll-free service provider's working numbers or 2000 numbers, not to exceed 3% of the total quantity of SPARE numbers. A system administrator may specify different limits. Defining a limit should be configurable. |
| MFS 4b | Current state | Number Allocation Limits | In embodiments, the system may impose weekly limits for how many numbers a toll-free service provider entity can reserve. The available pool of numbers in SPARE status is divided into a portion that is allocated to each toll-free service provider entity based on market share and a portion that is allocated equally among all toll-free service provider Entities. This function should be configurable. |

| Function | Function Criteria | Response Criteria |
| --- | --- | --- |
| Query a Number | Query for a specific number | Return information about the number including status of the |

-continued

| Function | Function Criteria | Response Criteria |
|---|---|---|
| | | number, Date/time of transition to current status, toll-free service provider, Reserved Until Date, Disconnect Until Date, Last Active Date depending upon permissions. |
| Search for a Number | Search for completely random number(s) | Return a number or list of numbers meeting the search criteria (1 - configurable max number) with status. The number is not locked until a reserve is executed. |
| | Search for multiple consecutive numbers with any criteria as specified herein | |
| | Search for numbers in a specific NPA (i.e., 800, 888, 877, etc.) | |
| | Search using wildcards to represent any number (i.e., 800-***-CARS) | |
| | Search for numbers with duplicated numbers in them (i.e., 855-345-&&&& where & means a duplicate numbers like 2222 or 5555) | |
| | Search for numbers containing a specific string of numbers at any point in the number (i.e.***-777-0000) | |
| | Search for numbers starting with a specific string (i.e., 855-234-****) | |
| | Search for numbers ending with a specific string (i.e., 855-***-5555 | |
| | Search for numbers using alpha characters as well as numbers (i.e., 888-234-CARS) | |
| Reserve a Number | Reserve a single number selected from a search result | Return updated number status of Reserved and updated toll-free service provider assigned if number still available; else return notification of number no longer available. |
| | Reserve multiple numbers selected from a search result (1 - configurable max number) | Return updated number status of Reserved and updated toll-free service provider assigned for all numbers that may be still available; else return notification of number no longer available for those that may be not available. |
| Search & Reserve a Number | Search & Reserve completely random number(s) | Return a number or list of numbers meeting the search criteria with updated number status of Reserved and updated toll-free service provider assigned. |
| | Search for numbers in a specific NPA (i.e., 800, 888, 877, etc.) | |
| | Search using wildcards to represent any number (i.e., 800-***-CARS) | |
| | Search & Reserve numbers with duplicated numbers in them (i.e., 855-345-&&&& where & means a duplicate numbers like 2222 or 5555) | |
| | Search & Reserve numbers containing a specific string of numbers at any point in the number (i.e.***-777-0000) | |
| | Search & Reserve numbers starting with a specific string (i.e., 855-234-****) | |
| | Search & Reserve numbers ending with a specific string (i.e., 855-***-5555 | |

| Function | Function Criteria | Response Criteria |
|---|---|---|
| | Search & Reserve numbers using alpha characters as well as numbers (i.e., 888-234-CARS) | |

The below delineated example use cases may be generic in showing the flow for multiple specific cases as defined in the particular example use case.

| | | |
|---|---|---|
| Use Case ID | NA-UC-1 | |
| Use Case Name | Search for a number | |
| Use Case Description | Search for a toll-free number or multiple numbers with status of SPARE | |
| MFS Reference | MFS 1; MFS 1A; | |
| Actor(s) | User (toll-free service provider or disclosed embodiment administrator) System (disclosed embodiment) | |
| Functional Category | NA—Number Administration | |
| Pre-Conditions | The user has logged into the system In embodiments, the system has verified identity and permissions of the specific user and of the toll-free service provider as a whole | |
| Post-Conditions | User has found Spare numbers meeting criteria No change for the searched number status | |
| Assumptions | None identified | |
| Interface Considerations | None identified | |
| Primary Flow | Step 1 | The user initiates a Search. The user may specify none, one, or more of the following Search criteria: One or more than one number returned Specific starting NPA Various combinations of alpha & numbers included in the number Specify numbers using wildcards and duplicate value indicators Request consecutive numbers |
| | Step 2 | In embodiments, the system returns a number or list of numbers with SPARE status |
| Alternate Flows | E1: At Step 2, if no values with SPARE status may be found, embodiments of the system indicates this to the user E2: At Step 2, if multiple numbers may be requested and there may be not enough SPARE numbers to match the quantity requested by the user, embodiments of the system returns the quantity that is available E3: At Step 2, if the maximum allowed quantity of RESERVED numbers for the toll-free service provider entity has been exceeded, embodiments of the system indicates this to the user when the SPARE number is returned | |

| | |
|---|---|
| Use Case ID | NA-UC-2 |
| Use Case Name | Reserve a number with spare status |
| Use Case Description | Reserve a number or multiple numbers with spare status based upon the results of a previously executed Search |
| MFS Reference | MFS 2 |
| Actor(s) | User (toll-free service provider or disclosed embodiment administrator) System (disclosed embodiment) |
| Functional Category | NA—Number Administration |
| Pre-Conditions | The user has logged into the system. In embodiments, the system has verified identity and permissions of the specific user and of the toll-free service provider as a whole The user has executed a Search that has returned a toll-free number or list of toll-free numbers in Spare status |
| Post-Conditions | Numbers in RESERVED status. |
| Assumptions | None identified |
| Interface Considerations | None identified |

| | | |
|---|---|---|
| Primary Flow | Step 1 | The user requests Reservation of one or more of the numbers returned by the system. |
| | Step 2 | For each number requested to be reserved, system verifies that the number is still available (in Spare status) for reservation. |
| | Step 3 | For each number requested to be reserved, system verifies that the toll-free service provider entity has not reached the maximum allowed number of RESERVED numbers. |
| | Step 4 | For each number for which is still available and the maximum allowed quantity of RESERVED numbers has not been reached, embodiments of the system places the requested numbers in RESERVED status, and updates the count of RESERVED numbers for the toll-free service provider entity. |
| | Step 5 | In embodiments, the system indicates the numbers that have been reserved for the user. |
| Alternate Flows | | E1: At Step 2, If a number requested to be reserved is no longer available, embodiments of the system can return to the user a notification that this number is no longer available and continue with the list of numbers to be reserved. |
| | | E2: At Step 3 and 4, if the toll-free service provider entity has reached the maximum allowed number of RESERVED numbers, the Reservation attempt fails for that number: an indication of this error is provided to the user. This applies for each number for which reservation was requested. At Step 7, embodiments of the system indicate the numbers that may be reserved and that the maximum allowed quantity of RESERVED numbers has been reached. |

| | | |
|---|---|---|
| Use Case ID | NA-UC-3 | |
| Use Case Name | Search And Reserve a number or multiple numbers | |
| Use Case Description | Search for a number or multiple random in SPARE status using any of the available search criteria and reserve the numbers in one operation | |
| MFS Reference | MFS 3 | |
| Actor(s) | User (toll-free service provider or disclosed embodiment administrator) System (disclosed embodiment) | |
| Functional Category | NA—Number Administration | |
| Pre-Conditions | The user has logged into the system In embodiments, the system has verified identity and permissions of the specific user and of the toll-free service provider as a whole | |
| Post-Conditions | Numbers may be in RESERVED status | |
| Assumptions | None identified | |
| Interface Considerations | None identified | |
| Primary Flow | Step 1 | The user initiates a Search. The user may specify none, one, or more of the following Search criteria: One or more than one numbers returned Specific starting NPA Various combinations of alpha & numbers included in the number Specify numbers using wildcards and duplicate value indicators Request consecutive numbers |
| | Step 2 | In embodiments, the system verifies the quantity requested, the current count of numbers reserved for the toll-free service provider entity, and the maximum allowed quantity of RESERVED numbers. |
| | Step 3 | In embodiments, the system places a quantity of numbers in RESERVED status, up to the limit allowed for the toll-free service provider entity, and updates the count of RESERVED numbers for the toll-free service provider entity. |
| | Step 4 | In embodiments, the system indicates the numbers that have been reserved for the user. |
| Alternate Flows | | E1: At Step 2, if no SPARE values may be found, embodiments of the system may indicate this to the user and no further action is taken. |
| | | E2: At Step 2, if the maximum allowed quantity of RESERVED numbers has been exceeded before reserving any numbers, embodiments of the system indicates this to the user and no further action is taken. |

E3: At Step 4, if the quantity of numbers reserved in Step 3 is less than the quantity requested (because the maximum allowed quantity of RESERVED numbers is reached), embodiments of the system indicates the numbers that may be reserved and that the maximum allowed quantity of RESERVED numbers has been reached.

| | |
|---|---|
| Use Case ID | NA-UC-4 |
| Use Case Name | Query for Information about a number |
| Use Case Description | The user queries embodiments of the system for information related to a specific number |
| MFS Reference | MFS 4 |
| Actor(s) | User (toll-free service provider or disclosed embodiment administrator) |
| | System (disclosed embodiment) |
| Functional Category | NA—Number Administration |
| Pre-Conditions | The user has logged into the system |
| | In embodiments, the system has verified identity and permissions of the specific user and of the toll-free service provider as a whole |
| Post-Conditions | No change for the queried numbers |
| Assumptions | None identified |
| Interface Considerations | None identified |
| Primary Flow | Step 1  The user requests information about a number. |
| | Step 2  In embodiments, the system returns status and other information about the number. Information returned depends on the permissions of the user and the toll-free service provider entity controlling the number. |
| Alternate Flows | E1: At Step 2, embodiments of the system provide an indication to the user information cannot be returned for the number. |

Examples: Number Search Using Starting Point

| Starting Point | Example Starting Point | Possible Search Result |
|---|---|---|
| NXX | NXX = 321 | NPA-321-XXXX to NPA-999-XXXX, where NPA is any valid toll-free NPA and XXXX is 0000-9999 |
| XXXX | XXXX = 1234 | NPA-NXX-1234 to NPA-NXX-9999, where NPA is any valid toll-free NPA and NXX is any valid NXX in the NPA |
| NXX and XXXX | NXX = 321 and XXXX = 1234 | NPA-321-1234 to NPA-999-9999, excluding XXXX = 0000-1233, where NPA is any valid toll-free NPA. Note: NPA-322-0000 is not a valid response for this search |
| NXX-XXXX | NXX-XXXX = 321-1234 | NPA-321-1234 to NPA-999-9999, where NPA is any valid toll-free NPA. Note: NPA-322-0000 is a valid response for this search |

| Example Masks and Search Results for a Consecutive-Number SearchMask | Valid Quantity of Consecutive Numbers | Quantity of Numbers Requested | Example Valid Search Results | Example Invalid Search Results |
|---|---|---|---|---|
| 888-234-567* | 2-9 | 4 | 888-234-5673 | 888-234-5678 |
| | | | 888-234-5674 | 888-234-5679 |
| | | | 888-234-5675 | 888-234-5680 |
| | | | 888-234-5676 | 888-234-5681 |
| 888-234-56** | 2-99 | 4 | 888-234-5678 | 888-234-5698 |
| | | | 888-234-5679 | 888-234-5699 |
| | | | 888-234-5680 | 888-234-5700 |
| | | | 888-234-5681 | 888-234-5701 |
| 888-234-5&&* | 2-9 | 4 | 888-234-5111 | 888-234-5888 |
| | | | 888-234-5112 | 888-234-5889 |

| Example Masks and Search Results for a Consecutive-Number SearchMask | Valid Quantity of Consecutive Numbers | Quantity of Numbers Requested | Example Valid Search Results | Example Invalid Search Results |
|---|---|---|---|---|
| | | | 888-234-5113 888-234-5114 Or 888-234-5885 888-234-5886 888-234-5887 888-234-5888 | 888-234-5890 888-234-5891 |

Example Number Search with Mask Characters

| Mask Character | Usage | Example Mask | Possible Search Results |
|---|---|---|---|
| Wildcard- * | Number returned in search results can include any digit in the indicated position | 888-456-78** | 888-456-7800 to 888-456-7899 |
| Repeat Wildcard- & | Number returned in search results includes the same digit in each of the positions indicated | 800-456-&23& | 800-456-0230 800-456-1231 800-456-2232 800-456-3233 |
| | | | 800-456-4234 800-456-5235 800-456-6236 800-456-7237 800-456-8238 800-456-9239 |
| Number - 0-9 | Number returned in search results includes the specified digit in the position(s) indicated | ***-87*-**** | NPA-870-0000 to NPA-879-9999 Where NPA is a valid toll-free NPA |
| Alpha - A-Z | Number returned in search results includes a digit that maps to the letter specified in the position(s) indicated, based on the mapping provided by a standard telephone keypad | 866-***-TEAM | 866-NXX-8326 where NXX is a valid NXX |

In addition to the existing number search and reserve functionality noted above, embodiments of the disclosed architecture may support search and reserve features. Description of at least some of these is provided at a relatively high level describing the business functionality required as follows:

| Search & Reserve Requirements- New Feature Set | | |
|---|---|---|
| NFS # | Function | Description |
| NFS 1 | Suggested Number Response | When a toll-free provider searches for a specific number and that number is not available, the system should provide the ability to return suggested alternative numbers to the user. The alternative numbers would be determined via an algorithm based upon the number requested. This same functionality should be able to be expanded to return suggested alternative when a partial number search is performed, but there are no numbers matching the mask entered by the user. The user should have the ability to turn off this feature if they do not want suggestions. Example: The user searches for 888-222-1234 and it is not available, but 888-777-1234 is, the system can return this as an alternative. |
| NFS 2 | Predictive Number Search & Reserve | By performing an analysis of the toll-free providers current number allocation, provide a list of available numbers that that similar characteristics to the current allocation. The user should then have one click reservation ability for this number Example: The toll-free provider has allocated the numbers 877-234-3000 thru 877-234-3015 and the number 877-234-3016 is available, provide this as an informatory suggestion when going to the Search function. |
| NFS 3 | User Saved Searches with one click initiation | Allow the toll-free provider to create searches and save them for future use. These saved searches could then be executed with a single click or could also be setup to be run every time the user logs into the system. |
| NFS 4 | Bulk Load Numbers for Search | Bulk import/export TFN (toll-free numbers) for search and reservation requests performed online or thru an API. This would allow a user to maintain list of TFNs they wish to search on a regular basis. |
| NFS 4A | Bulk Number Search & Reserve | The user will be able to search & reserve more than 10 numbers in one request (10 numbers is the current system limit). The new limit should be configurable. Depending upon the size of the request and time it takes to process, the control of |

| Search & Reserve Requirements- New Feature Set | | |
|---|---|---|
| NFS # | Function | Description |
| NFS 5 | Scheduled Searches | the system can be returned to the user and a notification of the completion of the request will be sent to the user upon request completion. Allow toll-free providers to schedule a specific search to be performed on a regular basis at a date/time desired by the user without the user being logged in. Allow the user to either be notified via email or text if a number becomes available or alternatively to set a reserve option on the search and reserve the number automatically. |
| NFS 5A | One Click Activate | Allow a toll-free provider to search for a number, reserve that number and activate that number by assigning it a default customer record with a single user transaction. |

| Number Administration: Additional User Functions Requirements- Minimal Feature Set | | |
|---|---|---|
| MFS # | Function | Description |
| MFS 5 | Update user information | Update contact information for end user of number or comments. |
| MFS 5a | Update number information | Update any of the information associated with the number that is reserved. |
| MFS 5b | Find toll-free service provider numbers & status information | Have their ability for a toll-free service provider to determine their numbers and status information utilizing a "toll-free Service provider dashboard of numbers" |
| MFS 6 | Toll-free service provider release numbers | Toll-free service provider releases numbers, return to spare. |
| MFS 7 | Toll-free service provider number transfer | Transferring a number or multiple numbers from one toll-free service provider to another. |

| Functional Descriptions | | |
|---|---|---|
| Function | Function Criteria | Response Criteria |
| Update Numbers MFS 5 & 5a | Update Information such as dates, contact info, etc. for number(s) associated with a toll-free service provider. | Acknowledge changes were made and display updated information. |
| Toll-free service provider release numbers MFS 6 | Toll-free service provider releases numbers, returning them to spare status | Acknowledge changes were made and display updated information. |
| Toll-free service provider number transfer MFS 7 | Transferring a number or multiple numbers from one toll-free service provider to another. | Acknowledge changes were made and display updated information. |
| Find toll-free service provider numbers & status information MFS 5b | Have their ability for a toll-free service provider to display their numbers and status information utilizing a "toll-free service provider dashboard of numbers" | Provide a toll-free service provider a method of displaying current up to date information about the numbers they control. The information should be current with minimal latency. |

As an example use case, to update Information such as dates, contact info, etc. for number(s) associated with a toll-free service provider may be provided as follows:

| | |
|---|---|
| Use Case ID | NA-UC-4 |
| Use Case Name | Change Reserve-Until Date/Disconnect Until Date for a Number |
| Use Case Description | User requests that embodiments of the system change the date associated with an expected change of status of a number. |
| MFS Reference | MFS 5a |
| Actor(s) | User (toll-free service provider or disclosed embodiment administrator) System (disclosed embodiment) |
| Functional Category | NA—Number Administration |
| Pre-Conditions | The user has logged into the system In embodiments, the system has verified identity and permissions of the specific user and of the toll-free service provider as a whole |
| Post-Conditions | The specified date is changed |
| Assumptions | None identified |
| Interface Considerations | None identified |
| Primary Flow | Step 1    The user requests one of the following date changes: 1. Reserve-Until Date (for a RESERVED number) 2. Disconnect Until Date (for a Disconnected number) Step 2    In embodiments, the system verifies the identity and permissions of the user and that the specified number has the expected status. |

-continued

| | | |
|---|---|---|
| | Step 3 | In embodiments, the system verifies that the specified date is earlier than the existing date. |
| | Step 4 | In embodiments, the system changes the date when the number can change to its next status (in the absence of other user activity). |
| Alternate Flows | | E1: At Step 2, embodiments of the system notify the user if the user does not have permission for the change or if the number is not in the expected status. |
| | | E2: At Step 3, if the specified date is beyond the current value, an indication is provided to the user. |

| | |
|---|---|
| Use Case ID | NA-UC-6 |
| Use Case Name | Change the Status of One or More Numbers |
| Use Case Description | The user requests that embodiments of the system change the status of one or more numbers to another allowed status |
| MFS Reference | MFS 5a; MFS 6 |
| Actor(s) | User (toll-free service provider or disclosed embodiment administrator) |
| | System (disclosed embodiment) |
| Functional Category | NA—Number Administration |
| Pre-Conditions | The user has logged into the system |
| | In embodiments, the system has verified identity and permissions of the specific user and of the toll-free service provider as a whole |
| Post-Conditions | The specified numbers may be SPARE and may be reserved by any toll-free service provider. |
| Assumptions | None identified |
| Interface Considerations | None identified |
| Primary Flow | Step 1  The user requests that the status of one or more numbers currently at one status be changed to another allowed status. |
| | Step 2  In embodiments, the system verifies the identity and permissions of the user |
| | Step 3  In embodiments, the system changes the status of the numbers to the status. |
| Alternate Flows | E1: At Step 2, embodiments of the system notify the user if any of the specified numbers cannot change from the current status to a status. |

Change the Toll-Free Service Provider Information for One or More Numbers

| | |
|---|---|
| Use Case ID | NA-UC-7 |
| Use Case Name | Change the toll-free service provider information for one or more numbers |
| Use Case Description | User requests that embodiments of the system change the toll-free service provider Unit associated with a number or numbers in RESERVED, WORKING, DISCONNECTED, or TRANSITIONAL status |
| MFS Reference | MFS 7 |
| Actor(s) | User (toll-free service provider or disclosed embodiment administrator) |
| | System (disclosed embodiment) |
| Functional Category | NA—Number Administration |
| Pre-Conditions | The user has logged into the system |
| | In embodiments, the system has verified identity and permissions of the specific user and of the toll-free service provider as a whole |
| Post-Conditions | The specified toll-free service provider unit is changed for all information associated with the number(s). |
| Assumptions | None identified |
| Interface Considerations | None identified |
| Primary Flow | Step 1  The user requests that the toll-free service provider Unit associated with a number or list of numbers that is currently controlled by a particular toll-free service provider Unit be changed to a value. |

| | | |
|---|---|---|
| | Step 2 | In embodiments, the system verifies the identity and permissions of the user. |
| | Step 3 | In embodiments, the system changes the toll-free service provider Unit associated with the number(s). |
| Alternate Flows | | E1: At Step 2, embodiments of the system notifies the user if any specified numbers may be not associated with the specified toll-free service provider unit. |
| | | E2: At Step 2, embodiments of the system notifies the user if the specified toll-free service provider unit is not valid. |
| | | E3: At Step 2, embodiments of the system notifies the user if not permitted to request this change. |

Number Administration: Additional User New Features

Additional features in the embodiments of the disclosed architecture may be supported such as:

Additional User New Features Requirements - New Feature Set

| NFS # | Function | Description |
|---|---|---|
| NFS 6 | Spare Number Availability Notification | This feature would allow for a toll-free Provider to submit requests to be notified if a specific toll-free number became available to be reserved. The notification could be via an email notification, pop-up when they log in, or text notification. This could be a value added service with an additional charge, which would have tariff implications or just a service provided to all users. |

There may be a number of tasks where a system administrator enters values for configuration parameters that control an aspect of system functionality. A pre-condition is that the user is a system administrator with permissions to perform the specific administrative task.

For each administrative use case, the following sequence of steps applies:
 Step 1: The user enters values
 Step 2: In embodiments, the system verifies the user input
 Step 3: In embodiments, the system accepts the parameter values and notifies the user of success If the user input is not valid or some other condition prevents successful completion of the use case, embodiments of the system can inform the user of an error.

Requirements - Minimal Feature Set

| MFS # | Current state or New | Function | Description |
|---|---|---|---|
| MFS 9 | Current state | NPA & NPANXX Mgmt. | Open & Close NPA's and NPANXXs (SMS Admin only). The pool of toll-free numbers is controlled by opening and closing toll-free NPAs and NPA-NXXs as directed by the FCC. An NPA becomes Open when the numbers in the first NXX within the NPA become available. An NPA becomes Closed when all the NXXs within the NPA may be Closed. |
| MFS 10 | Current State | Reservation and Allocation limits | Set mandated Reservation and Allocation limits. In embodiments, the system can impose weekly limits for how many numbers a toll-free service provider entity can reserve. The available pool of numbers in SPARE status is divided into a portion that is allocated to each toll-free service provider entity based on market share and a portion that is allocated equally among all toll-free service provider entities. (SMS Admin may be only allowed to set limits) |

Functional Descriptions

| Function | Function Criteria | Response Criteria |
|---|---|---|
| NPA/NNX Management MFS9 | Open & Close NPA's and NPANXXs | Return information about the number including status of the number, date/time of transition to current status, toll-free service provider, Reserved Until Date, Disconnect Until Date, Last Active Date depending upon permissions. |
| Reservation and Allocation limits MFS 10 | Set Tariff mandated Reservation and Allocation limits | Return a number or list of numbers meeting the search criteria (1 - configurable max number) with status. |

An example use case to open a Toll-Free NPA and NXXs is as follows:

| | |
|---|---|
| Use Case ID | NA-UC-8 |
| Use Case Name | Open a Toll-Free NPA and NXXs |
| Use Case Description | Administrator opens a toll-free NPA and schedules opening of one or more of the included NXXs. |
| MFS Reference | MFS 9 |
| Actor(s) | User (disclosed embodiment administrator) System (disclosed embodiment) |
| Functional Category | NA—Number Administration |
| Pre-Conditions | The user has logged into the system In embodiments, the system has verified identity and permissions of the specific user |
| Post-Conditions | A toll-free NPA is added to the system. Numbers within the NXXs may be added with an initial status of SPARE. |
| Assumptions | None identified |
| Interface Considerations | None identified |
| Primary Flow | Step 1 The user enters the three digit toll-free NPA to be opened. |
| | Step 2 In embodiments, the system verifies that the NPA is a valid format and is not currently open. |

-continued

|   |   |
|---|---|
|   | Step 3 In embodiments, the system facilitates the user to enter a date and time to schedule availability for each of the NXXs within the NPA that may be to be available for Search/Reserve. (Allocation controls can be specified for an NPA). |
|   | Step 4 At the indicated date and time, embodiments of the system add the numbers in the NXXs within the NPA with an initial status of SPARE and, for the first NXX that is made available in the NPA, marks the NPA as Open. |
| Alternate Flows | E1: At Step 2, embodiments of the system notify the user if the operation cannot complete due to system conditions or invalid inputs. |
|   | E2: At Step 2, embodiments of the system notify the user if the user does not have permission to execute the operation. |
|   | E3: At Step 3, prior to reaching the specified date and time for opening of an NPA-NXX, the user can revise the date and time. |

An example use case to Specify Number Reservation Limits is as follows:

| | |
|---|---|
| Use Case ID | NA-UC-9 |
| Use Case Name | Specify Number Reservation Limits |
| Use Case Description | In embodiments, the system administrator enters values to specify limits for percent of numbers in working percent of quantity of status, count of numbers in RESERVED status, and SPARE numbers that a toll-free service provider entity is allowed to have in RESERVED status. |
| MFS Reference | MFS 10 |
| Actor(s) | User (disclosed embodiment administrator) System (disclosed embodiment) |
| Functional Category | NA—Number Administration |
| Pre-Conditions | The user has logged into the system In embodiments, the system has verified identity and permissions of the specific user |
| Post-Conditions | The limits for percent of working numbers, count of working numbers, and percent of quantity of SPARE numbers that a toll-free service provider entity is allowed to have in RESERVED status may be set. |
| Assumptions | None identified |
| Interface Considerations | None identified |
| Primary Flow | Step 1    In embodiments, the system administrator enters values for the limits for percent of working numbers, count of reserved numbers, and percent of quantity of SPARE numbers that a toll-free service provider is allowed to have in RESERVED status. |
|   | Step 2    In embodiments, the system verifies that the user input and sets reservation limits. |
|   | Step 3    In embodiments, the system notifies the user that the operation has completed. |
| Alternate Flows | E1: At Step 2, embodiments of the system notify the user if the operation cannot complete due to system conditions or invalid inputs. |

There may be additional features the embodiments of the disclosed architecture may include those that follow:

| Additional User New Features Requirements - New Feature Set | | |
|---|---|---|
| NFS # | Function | Description |
| NFS 7 | Enhanced Number Administration Configurability | Allow administrators to configure most of the settings within the system without development changes. For example, the system may have a limit of 10 TFNs returned from a search, which can be raised, but be configurable. |

The Customer Record Administration (CRA) functions may be those concerned with the input, validation, processing, and management of the toll-free Customer Records (CRs). These may also include the processes by which embodiments of the system can upload relevant customer record data to the SCP toll-free databases in the public network, to enable their processing of SS7 toll-free database queries. Multi-number and mass change capabilities impacting CRs may also be included in CRA functionality.

The system's CRA functions support interactions with external users or systems at the toll-free service provider to create and update the customer records. Additional interactions may be supported with telecommunications carriers, to approve and/or be notified of CR updates that impact toll-free calling traffic in their respective networks, i.e., Carrier Notification and Approval (CNA) functions. Further interactions may be supported with respect to the Local-Exchange Carriers (LECs), including Incumbent Local-Exchange Carriers (ILECs), Competing Local-Exchange Carriers (CLECs), other IntraLATA carriers, and CCS network operators whose networks may be involved in terminating the toll-free calls to the toll-free subscriber lines, and whose reference data, and others can be used to validate certain call routing instructions in the CRs. These latter capabilities may be referred to as IntraLATA Carrier Management (ICM) functions.

After a toll-free number (TFN) is reserved by a toll-free service provider's toll-free service provider, it should be assigned to a customer, and Customer Records (CRs) for that TFN may be created in the disclosed embodiment, ultimately resulting in their downloading to Service Control Points (SCPs) and the activation of service for the toll-free subscriber (the customer) in the public network.

A CR contains both customer administrative data and call routing information for a customer's toll-free service. In particular, it defines important aspects of the service, including the originating Area of Service (AOS)—the geographic area from which calls to the toll-free number can be allowed, and the rules for translation of the toll-free number to call routing instructions. The call routing instructions may include Destination Telephone Number(s) to which the toll-free calls may be routed, the Carrier Identification Code (CICs) of telecommunications carriers whose networks may be used for IntraLATA and InterLATA calls, and call announcement treatment instructions for those cases in which the toll-free calls should not be routed further.

Each TFN may have several CRs associated with it, each containing the toll-free service information to take effect at a given date and time (i.e., the Effective Date and Time of the CR). Once established, service for a customer may be modified or disconnected via subsequent future-dated CRs. Future pending CRs then replace the active CR when their effective dates and times may be reached.

At the effective date and time, a subset of the active CR's data applicable to toll-free database query processing is then downloaded to the applicable SCPs in the public network, replacing (overwriting) any previous SCP customer record in effect for that TFN. Only one CR may be the active CR in embodiments of the system reflecting the current toll-free service for a given TFN.

Customer Records can be considered either one of two types:
  Regular Customer Records: Define the call routing for a toll-free number and define the final toll-free-to-TN destination number translations and what carrier can carry the call. These may be simple or complex.
  Turnaround Records: The originating toll-free calls may be routed only via the TFNs and CICs. The routing is deferred to the interexchange carrier networks, which may be responsible for the final toll-free-to-TN destination number translations. The term "turnaround routing" refers to the CR's instruction to the SCP to "turn around" the TFN received in the SS7 query message as the routing number (Destination Telephone Number) in the SCP response, and the call is then routed onward to a carrier network based on the TFN and obtained CIC. It is then the responsibility of the carrier network to provide the final translation to the POTS Destination Telephone Number for final call routing. A TR can therefore contain only the TFN as a DTN or intercept treatment in its call routing instructions, and always without final routing to POTS destination numbers.

The disclosed embodiment administers 3 types of CRs:
Customer Records: each pertaining to a single TFN and containing all of its service parameters;
Pointer Records: each pertaining to a single TFN but pointing to a "reusable" "template record," for much of its more complex service data, which it may share with other TFNs, and
Template records: a record with service information that can be referenced (shared) by multiple Customer Records and referenced via Pointer Records (TFNs). Template records are valuable as a single complex record can be created and then referenced by multiple Pointer records. This saves space in the SCPs Each type of CR may have a required common administrative data portion, and more complex, optionally populated Call Processing Record (CPR) data portions for more complex routing scenarios. The CPR portion facilitates a tree structure for the specification of variable (branching) call routing logic based on various decision criteria (decision nodes) and the resulting translations to destination numbers and carriers or announcement treatments (action nodes). CPRs may be used within Regular CRs and Template Records.

Creation/Updating of Customer Records to Reflect Call Routing

| Requirements - Minimal Feature Set | | | |
|---|---|---|---|
| MFS # | Current state or New | Function | Description |
| MFS 11 | Current state | Customer Record - Routing options | There may be a number of Call Routing options in the current system. These can be needed and possibly options moving forward. |
| MFS 12 | Current state | CRUD (Create Read Update Delete) Records | Includes user input, modification, query, view, disconnect, copy, transfer, Customer list, and status retrieval, includes scheduling in future. |

-continued

| Requirements - Minimal Feature Set | | | |
|---|---|---|---|
| MFS # | Current state or New | Function | Description |
| MFS 13 | Current state | Validate CRs | Validate Customer Records against reference data, syntax, and routing correctness |
| MFS 14 | Current state | CR Templates | CRUD (Create Read Update Delete). |
| MFS 15 | Current state | Customer Record View | View all associated CRs with a TFN. Drill down into details for CRs |
| MFS 16 | Current state | Pointer Records | CRUD (Create Read Update Delete). Pointer Records may be tied to TFNs. |
| MFS 17 | New | Copy CR/Template (clone & modify) | Create an easy way for toll-free service providers to create records based on existing records |

In embodiments, the platform may include a customer record template builder. The process and tools currently available for building a complex customer record may be single threaded and cumbersome. In addition, a tool may be required that works intelligently with the user to interpret natural language input to produce a complex customer record while using existing user records and usage data to prepopulate information for the user. This tool may be intuitive such that a first time user could build a complex record without hours of training.

The Customer Record Template Builder (CRTB) can allow toll-free providers to easily build a complex customer record template using a simple UI that can then let that record be designated at the default customer record. A toll-free provider can build multiple complex customer record templates for their use and to define a record as the default customer record, allowing the user to select the default with a single click, thus significantly reducing their work effort.

The CRTB can lead the user thru both the initial customer data population (known as the CAD portion) but also the call routing logic (known as the CPR portion) utilizing a simple UI using a decision tree logic structure with defined data nodes. Based upon the decisions at those nodes the UI can drive down a branch to a new decision node ultimately driving the customer record decision logic to the lowest level.

A decision tree can represent a series of decision points. Each decision point is called a node and off each node is one or more branches. The point at which there may be no more decisions to be made is called a leaf and is used as 'the "end point" of a branching structure. See FIG. 3 for a generic visualization of this structure.

The CAD portion of the CRTB can logically lead the user to populate the example following pieces of information:
  Administrative data about the toll-free customer
  Toll-free number
  Effective date and time
  Control toll-free provider identifier
  End customer name
  End customer address
  Area Of Service (AOS),
  List of destination telephone number(s)
  Carrier Identification Codes (CICs) for IntraLATA and InterLATA Traffic The complex customer record (CPR) decision nodes supported by the may be as follows:
  Originating State
  Originating NPA
  Originating LATA
  Originating POTS NXX
  Originating POTS NPANXX
  Originating POTS number
  Specific date
  Day(s) of the week
  Time-of-day range
  Percent load share, which may be used to automatically direct different percentages of processed queries (calls) to different branches below the node.

The "leaves" supported by the data model at the ends of a given branch may include:
  Destination Telephone Number;
  Carrier; and
  Announcement Treatment.

A simple example of Customer Record routing would be as in FIG. 4.

In this relatively simple example, starting from the leftmost branched path, the 3 decision paths corresponding to the decision trees branched paths can be represented as:
  Area Code=732, NXX={699,494}, Carrier=ATX-0288, Tel #=800-234-5678
  Area Code=732, NXX=Other, Carrier=MCI-0222, Tel #=800-234-5678
  Area Code=Other, NXX=<null>, Carrier=MCI-0222, Tel #=800-234-5678.

The CRTB toll can be built in such a manner to allow a customer works his/her way down the decision tree and anticipate/pre-populate information based upon the information already provided in this build or also information provided in previous customer record entries. Once a default customer record template is built, the system can build the capability to invoke this template when creating a customer record for a new number, thus reducing the time and effort for a customer record to be built.

The CPR portion of the CR may provide a mechanism for users to specify branching call routing and call treatment logic involving multiple destination numbers and multiple carriers based on one or more decision criteria. The decision criteria include aspects of the toll-free call, such as its originating geographic area (the originating state, CCS network, NPA, LATA, NPANXX etc.) to be mapped by the SCP, based on the calling party number and other attributes of the query), and the date, time-of-day and day-of week of the query, among other variables.

The CPR is linked to the CAD portion of a regular customer record by the referenced TFN and the Effective Date and Time. The CPR portion is also used in Template Records. When used in a Template record, the CPR portion is linked to the Template Record by the referenced Template Name and Effective Date and Time in the equivalent TAD portion of the Template Record.

The logical branch points of the CPR decision tree may be specified within one or more "decision nodes" along each traversable branched path. The resulting call processing actions, including the translation of the toll-free number to specific destination numbers, call routing via specific carriers, or the announcement treatment for non-routed calls may be specified in "action nodes" at the ends of each path. Each path logically begins at the dialed toll-free number being translated, progresses through one or more decision nodes that define the call criteria, and ends at one or more action nodes. Each possible path through the decision tree from root to the end of each branched path may be conceived of as a "row" in a logical data table or matrix. Each row may contain numerous decision nodes defining the set of criteria to be matched by the call attributes for a call routing case (path) and may end with one or two action nodes.

The CPR decision nodes supported by the data model according to one embodiment can include one or more of the following:
  Originating State (STATE)
  Originating NPA (AREA CODE)
  Originating LATA (LATA)
  Originating POTS NXX (NXX)
  Originating POTS NPANXX (6-DIGIT #)
  Originating POTS number (10-DIGIT #)
  Specific date (DATE)
  Day(s) of the week (DAY)
  Time-of-day range (TIMES)
  Binary Switch (SWITCH)—an on-or-off binary switch, which may be used to manually redirect call processing onto an alternate branched path.
  Percent load share (PERCENT), which may be used to automatically direct different percentages of processed queries (calls) to different branches of the node.

The action nodes supported by the data model according to one embodiment at the ends of a given branch can include:
  Destination Telephone Number (TEL #)
  Carrier (CARRIER)
  Announcement Treatment (ANNOUNCE)
  Go-To (GOTO) a pointer to another decision tree (CPR subsection) within the CPR, which defines further (refining) decision criteria.

Logically, decision nodes can have more than one argument for their included decision criteria (e.g., a list of more than one originating NPA, or more than 1 day of the week), and there may be multiple decision nodes used in combination to define each branched path (row). Each action node may have, at most, one outcome in the call routing logic. Null (empty) values for a decision node within a row convey its decision criteria is not to be part of the matched criteria defining the decision case for that row (i.e., that any value for that call parameter can suffice). A conceptual view of a CPR routing tree example is illustrated in FIG. 3.

Sample of Main Flow Customer Record Use Cases

This section has a sample of some of the many use cases that may be covered in this functionality. It does not represent every possible use case and should be a base for determining CRA functionality.

An example use case for Create a New CR for a Reserved toll-free number (New Service Connect) is as follows:

| | |
|---|---|
| Use Case ID | CR-UC-1 |
| Use Case Name | Create a New CR for a Reserved toll-free number (New Service Connect) |
| Use Case Description | The user creates a regular or pointer customer record in embodiments of the system to activate service for a given RESERVED toll-free number, either immediately, or at a future effective date and time. The user may create a regular customer record or a pointer record referencing an existing template record. |
| MFS Reference | MFS 11; MFS 12 |
| Actor(s) | User (toll-free service provider or administrator) System (disclosed embodiment) |
| Functional Category | CR—Customer Record Administration |

| | |
|---|---|
| Assumptions and Pre-Conditions | In embodiments, the system has verified the identity and permissions of the User or has established the necessary API interface connectivity.<br>The toll-free number is in the RESERVED state and is reserved by the requesting toll-free service provider unit.<br>No CRs for the TFN yet exist.<br>If a pointer record is being defined, it may point to an existing active template record. |
| Post-Conditions | A CR for the toll-free number with a future or current effective date and time is created and stored in embodiments of the system with PENDING status for future or immediate activation in the network. (Its subsequent state in embodiments of the system can depend upon whether its final validation and carrier approval processing has completed successfully.) The number status is changed to "ASSIGNED" when the first valid CR for the TFN is successfully created. |
| Interface Considerations | Human User Interface<br>API interface (REQ/RSP-CRA or REQ/RSP-CRC) |
| Primary Flow | 1. The user enters the toll-free number, a requested future effective date and time (or NOW for an immediate activation), all mandatory parameters, and any optional parameters for the CR's CAD portion (Regular CR) or PAD portion (Pointer Record).<br>2. For regular CRs, the user may also populate a LAD portion of the CR specifying TFN-specific labels for use in CPR decision and action nodes.<br>3. For regular CRs, the user optionally populates a CPR portion to specify any complex call routing logic, including any LAD labels defined in the LAD portion for decision and action nodes.<br>4. The user submits the completed CR, including all of its applicable component data portions to embodiments of the system for validation and processing.<br>5. In embodiments, the system validates the CR is correct and complete, per CR data requirements and per CR validations, and posts the validated CR to the TFMP database with an initial status of PENDING. |
| Alternate Flows | E1: In Step 1, the TFN was not valid or reserved by the user's toll-free service provider, creation of the CR is not allowed, and an error indication is returned to the user.<br>E2: In Step 1, a CR with the TFN and same effective date and time already exists, so creation of a CR with the same key data is not allowed, and an error indication is returned to the user.<br>E3: In Step 4, the CR data in the CAD (or PAD), LAD, or CPR portions may be invalid, missing, inconsistent, or incomplete, embodiments of the system rejects the CR as invalid. The CR enters the INVALID state and is stored in the database. It may be corrected (modified) and resubmitted in a separate update request.<br>In all cases, further processing is stopped. |

An example use case for Query/Retrieve/View an Existing CR is as follows:

| | |
|---|---|
| Use Case ID | CR-UC-2 |
| Use Case Name | Query/Retrieve/View an Existing CR |
| Use Case Description | The user retrieves an existing CR (regular CR or pointer record) for a given TFN and Effective Date and Time for the purpose of viewing/reading its content. |
| MFS Reference | MFS 15 |
| Actor(s) | User (toll-free service provider, Customer, Agent, Carrier, or administrator)<br>System (disclosed embodiment) |
| Functional Category | CR—Customer Record Administration |
| Assumptions and Pre-Conditions | In embodiments, the system has verified the identity and permissions of the user or has established the necessary API interface connectivity.<br>The CR may exist in the database.<br>The user may be from the CR's Control toll-free service provider entity, TFMP administration, or an involved routing carrier on the CR, or the CR's customer (or their agent) with online access. |
| Post-Conditions | The retrieved CR is unchanged. Its contents may be displayed or returned to the user or external user system, subject to CR access restrictions, with only the authorized information provided or displayed. |
| Interface Considerations | Human User Interface<br>API interface (REQ/RSP-CRV) |
| Primary Flow | 1. The user specifies or selects the toll-free number, and the specific Effective Date and Time of the CR to be retrieved.<br>2. In embodiments, the system retrieves the indicated customer record, facilitates the user to view appropriate data (HUI case), or sends the appropriate data to the requesting external user system (API case).<br>(The Control toll-free service provider, customer, agent, and TFMP administration can retrieve/view all fields. Involved carriers and their associated toll-free service providers may view only those portions of the record relevant to their role, including their own CICs and the Destination Telephone Numbers to which the TFN routes via their CICs. Non-involved toll-free service providers can view only the TFN, Effective Date/Time, Control toll-free service provider, CR Status, and Approval Status.) Refer to functional requirements concerning returned information and restrictions for this use case. |
| Alternate Flows | E1: In Step 1, no CR with the TFN and effective date and time exists, so the record cannot be retrieved. A record not found indication or error is returned to the user.<br>E2: In Step 2, a requesting user is not from one of the specified types of entities that may be allowed to access CRs for the TFN, and therefore is denied access to the record. An error notification to this effect should be returned. In either case, further processing is stopped. |

An example use case to Create a New CR (Update Active or Pending toll-free service) is as follows:

| | |
|---|---|
| Use Case ID | CR-UC-3 |
| Use Case Name | Create a New CR (Update Active or Pending Toll-Free Service) |
| Use Case Description | The user creates a CR for a TFN (regular CR or PR) for which an ACTIVE record and/or other future PENDING records for that TFN already exist in the database. The CR can replace or become the active record at the future effective date and time. Relative to any earlier-effective record or the active record for the TFN, the differences in the CR's parameters may include, in Regular CRs, for example (but may be not limited to):<br>1. The addition of Destination Numbers and their related destination parameters.<br>2. Expanding or changing the Area of Service (AOS)<br>3. Changing other administrative parameters on the CR.<br>4. Adding a LAD portion, or adding or removing labels and argument lists from/to the LAD.<br>5. Adding or removing a CPR portion or a CPR section. |

103 -continued

| | |
|---|---|
| | 6. Changing the call routing (decision nodes, DNs, carriers, or announcement treatments in any of the CPR table rows defining the CPR tree). |
| MFS Reference | MFS 11; MFS 12 |
| Actor(s) | User (toll-free service provider or administrator) System (disclosed embodiment) |
| Functional Category | CR—Customer Record Administration |
| Assumptions and Pre-Conditions | In embodiments, the system verifies the identity and permissions of the user or has established the necessary API interface connectivity. An ACTIVE CR or one or more PENDING CRs already exist in the database for the TFN. No other PENDING CRs exist for that TFN with the same effective date and time. The user may be from the TFN's Control toll-free service provider entity or the administration, or may otherwise have update permission for the control toll-free service provider's CRs. |
| Post-Conditions | A CR for the TFN and with the effective date and time and with the updated CR data attributes can be created with an initial status of PENDING. (Its subsequent state in embodiments of the system and in the network can depend upon whether its validation and carrier approval processing has proceeded.) |
| Interface Considerations | Human User Interface API interface (REQ/RSP-CRA or REQ/RSP-CRC) |
| Primary Flow | 1. The user specifies the TFN, the requested effective date and time (NOW for immediate updates and a future effective date and time for future updates), all mandatory parameters, and any optional parameters for the CR's CAD or PAD portion. |
| | 2. For a regular CR, the user optionally populates a LAD portion of the CR specifying TFN-specific labels for use in CPR decision nodes. |
| | 3. For regular CRs, the user optionally populates a CPR portion to specify any complex call routing logic, including any LAD labels for decision and action nodes. |
| | 4. The user submits the completed CR, including all of its component portions to embodiments of the system for validation and processing. |
| | 5. In embodiments, the system validates the CR is correct and complete, per CR data requirements and per CR validations, and posts the validated CR to the database with an initial status of PENDING (future) or SENDING (immediate). |
| Alternate Flows | E1: In Step 1, the user does not have update permission for the TFN. Creation of the CR is not allowed, and an error indication returned to the user. E2: In Step 1, a CR with the TFN and same effective date and time already exists, so creation of a CR with the same key data is not allowed, and an error indication is returned to the user. E3: In Step 5, the CR data in the CAD (or PAD), LAD, or CPR portions may be invalid, missing, inconsistent or incomplete, and in embodiments, the system rejects the CR as invalid and returns an error response to the user. The CR enters the INVALID state and may be corrected (modified) and resubmitted as a subsequent update. In all cases, further processing is stropped. |

An example use case to Delete an Existing (Future) CR is as follows:

| | |
|---|---|
| Use Case ID | CR-UC-4 |
| Use Case Name | Delete an Existing (Future) CR |
| Use Case Description | The user deletes an existing CR (Regular CR or PR) with a given TFN and future Effective Date and Time. |

104 -continued

| | |
|---|---|
| MFS Reference | MFS 12 |
| Actor(s) | User (toll-free service provider or administrator) System (disclosed embodiment) |
| Functional Category | CR—Customer Record Administration |
| Assumptions and Pre-Conditions | In embodiments, the system verifies the identity and permissions of the user or has established the necessary API interface connectivity. The CR may exist in the database. The CR's current status may be one of PENDING, INVALID, MY CHECK, or HOLD so that its effective date and time is in the future. (The ACTIVE record may not be deleted.). The user may be from the TFN's Control toll-free service provider entity or the administration, or may otherwise have update permission for the control toll-free service provider's CRs. |
| Post-Conditions | The existing record is deleted from the database. |
| Interface Considerations | Human User Interface API interface (REQ/RSP-CRA or REQ/RSP-CRC) |
| Primary Flow | 1. The user specifies or selects the toll-free number, and the specific effective date and time of the CR to be deleted. |
| | 2. In embodiments, the system deletes the future CR and returns a confirmation of the action to the user. |
| Alternate Flows | E1: In Step 1, no CR with the TFN and Effective Date and Time exists, so the record cannot be deleted. A record not found indication or error is returned to the user. E2: In Step 1, if the user specifies a CR with a past effective date and time (ACTIVE, FAILED, OLD, SENDING, or HOLD), the deletion action may not be permitted and an error indication may be returned. Only the system's database purge process may be permitted to delete CRs with past EDTs. E3: In Step 1, the requesting user is not from the Control toll-free service provider entity or Administration, or does not otherwise have update permission for the CR, so the user is not authorized to delete the record. In all error cases, an appropriate error indication is returned on the requesting interface and further processing is stopped. |

An example use case for Query/View the List of CRs for a given TFN is as follows:

| | |
|---|---|
| Use Case ID | CR-UC-5 |
| Use Case Name | Query/View the List of CRs for a Given TFN |
| Use Case Description | The user selects or specifies a TFN and retrieves a list of all CRs (regular or PRs) that exist in the database for that TFN (aka CR Status Query). |
| MFS Reference | MFS 15 |
| Actor(s) | User (toll-free service provider or administrator) System (disclosed embodiment) |
| Functional Category | CR—Customer Record Administration |
| Assumptions and Pre-Conditions | In embodiments, the system verifies the identity and permissions of the user or has established the necessary API interface connectivity. |
| Post-Conditions | A list of CRs for the specified TFN is returned to the user, with their effective dates and times and CR status values. No information is changed in the system. |

| | |
|---|---|
| Interface Considerations | Human User Interface<br>API Interface (REQ/RSP-CRQ) |
| Primary Flow | 1. The user specifies or selects the toll-free number for the CR list to be retrieved and submits the request to the system.<br>2. In embodiments, the system retrieves the information, generates the CR list, and presents it to the user. The response may include:<br>   the retrieved TFN<br>   the Control toll-free service provider for the TFN<br>   the CR list<br>   Within the CR list, individual CRs may be sorted in ascending order by effective date, i.e., with the oldest record at the top and later effective-dated/timed records. The list may include for each CR:<br>    a. The Effective Date and Time<br>    b. The CR Order Type<br>    c. The CR Status<br>    d. The CR Carrier-Approval Status<br>    e. Indicators conveying the presence of CR component data portions (CAD or PAD, CPR, and LAD)<br>    f. A link or other mechanism by which the user may select the individual CR for retrieval and/or subsequent actions. (HUT case only)<br>   Additional requirements concerning the CR list response may be specified in the functional requirements. |
| Alternate Flows | E1: At Step 1, no CRs exist in the database for the specified TFN.<br>E2: At Step 1, embodiments of the system determine the user is not authorized to access the CR list for the TFN.<br>In either case an appropriate not-found or error indication is returned on the user interface and processing is stopped. |

An example use case for Disconnect Toll-Free Service is as follows:

| | |
|---|---|
| Use Case ID | CR-UC-6 |
| Use Case Name | Disconnect Toll-Free Service |
| Use Case Description | The user establishes a future or immediate disconnect date for a currently working TFN by populating the following Disconnect-related parameters in a PENDING disconnect CR with a future effective date and time:<br>Disconnect Referral Option<br>End-Intercept Date<br>(This may be regarded as a special case of CR-UC-3. Create a New (Future) CR (Update Toll-Free Service), in which a CR for a working or assigned number can be created to populate the disconnect-related parameters and becomes a "Disconnect record.") |
| MFS Reference | MFS 11; MFS 12 |
| Actor(s) | User (toll-free service provider or administrator)<br>System (disclosed embodiment) |
| Functional Category | CR—Customer Record Administration |
| Assumptions and Pre-Conditions | In embodiments, the system has verified the identity and permissions of the user or has established the necessary API interface connectivity.<br>The current Number Status is WORKING or ASSIGNED, and there is either an ACTIVE CR or one or more future PENDING CRs for the TFN in the database.<br>The user may be from the TFN's Control toll-free service provider entity or the administration, or may otherwise have update permission for the control toll-free service provider's CRs.<br>In the ACTIVE CR or latest future CR, none of the disconnect-related parameters may be yet populated. |
| Post-Conditions | A CR for the TFN, and with the effective date and time and with populated disconnect-related CR parameters can be created in embodiments of the system with an initial status of PENDING. (At the effective date and time, the CR status can become DISCONNECT. At the End Intercept Date it can be deleted from the SCPs and transition to CR status OLD in the system.) |
| Interface Considerations | Human User Interface<br>API interface (REQ/RSP-CRA or REQ/RSP-CRC) |
| Primary Flow | 1. The user specifies or selects the TFN to be disconnected and the latest effective dated CR.<br>2. In embodiments, the system retrieves the CR and presents the CR view to the user. (HUI case only)<br>3. The user populates the effective date and time (either "now" or in the future) and the following disconnect-related parameters in the CR (assumed to be previously null or blank per pre-condition):<br>   Disconnect Referral Option is changed from blank (null/empty) to "Yes (with referral)" or "No (without referral)"<br>   The End-Intercept Date is populated and is greater than or equal to the effective date and time (when the End-Intercept Date is equal to the Effective Date the CR can be treated as an immediate disconnect without an intercept period.)<br>4. The user submits the CR update as a "disconnect request" with a future effective date and time or "now" for an immediate disconnect.<br>5. In embodiments, the system validates the TFN, user's toll-free service provider, and above Disconnect parameters, per procedures described in Section 4.5.2.1.8, and posts the validated CR to the database with an initial status of "PENDING.<br>Subsequent to this interaction:<br>   If the record is deemed valid at the intended effective date and time it goes active in the network with DISCONNECT status and applies the specified disconnect referral option, until the end-intercept date is reached.<br>   At the end intercept date, the CR is deleted from the SCPs. (If the End-Intercept Date is the same as the Effective Date and Time on the CR, the CR is deleted immediately from the SCP when the Effective Date and time is reached.) |
| Alternate Flows | E1: At Step 1, the user's toll-free service provider does not match the Control toll-free service provider entity for the TFN, or does not otherwise have update permission, such that access of the target CR is not allowed to issue the disconnect request.<br>E2: At step 1, no active CR or future CRs with the effective date and time exist in the database for the TFN.<br>E3: At Step 5, the specified End-Intercept Date is earlier than the current date or more than <m> months later than the effective date, and is considered invalid. (The limit m is administrator-configurable with a default of 4 months.) In these cases an appropriate error indication can be returned to the user interface and further processing stops. |

An example use case to Create a New Template Record is as follows:

| | |
|---|---|
| Use Case ID | CR-UC-7 |
| Use Case Name | Create a New Template Record (TR) |
| Use Case Description | The user creates a template record (TR) in embodiments of the system to establish or update a routing template that may then be referenced by multiple PRs, either immediately, or at a future effective date and time. |
| MFS Reference | MFS 14 |
| Actor(s) | User (toll-free service provider or administrator) System (disclosed embodiment) |
| Functional Category | CR—Customer Record Administration |
| Assumptions and Pre-Conditions | In embodiments, the system has verified the identity and permissions of the user or has established the necessary API interface connectivity. No TR with the requested Template Name and Effective Date and Time yet exist. |
| Post-Conditions | A TR with the given Template Name and with the current or future Effective Date and Time is created and stored in embodiments of the system with PENDING status for future activation or SENDING status for immediate activation in the network. (Its subsequent state in embodiments of the system can depend upon whether its validation processing has completed successfully.) |
| Interface Considerations | Human User Interface API interface (REQ/RSP-TRC) |
| Primary Flow | 1. The user enters the existing Template Name, a requested future Effective Date and Time (or NOW for an immediate activation), all mandatory parameters, and any optional parameters for the TR's TAD portion.<br>2. The user may also populate a LAD portion of the TR specifying record-specific labels for use in CPR decision and action nodes.<br>3. The user optionally populates a CPR portion to specify any complex call routing logic, including any LAD labels defined in the LAD portion for decision and action nodes. Note that all DTNs in the CPR may be either the TFN or the special argument "#DIAL" representing the TFN, i.e., the TR may specify turnaround routing per SCP limitations on the TR DTNs.<br>4. The user submits the completed TR, including all of its applicable component data portions to embodiments of the system for validation and processing.<br>5. In embodiments, the system validates that the CR is correct and complete, per TR Data Requirements specified in Sections 4.3.2.9 through 4.3.2.12, and per TR validations specified within Section 4.5.2.2. It generated a numeric Template ID and posts the validated TR to the database with an initial status of PENDING. |
| Alternate Flows | E1: In Step 1, the user does not have permission to create a TR, and the request is rejected with an error indication returned to the user.<br>E2: In Step 1, a CR with the same Template Name and Effective Date and time already exists, so creation of a TR with the same key data is not allowed, and an error indication is returned to the user.<br>E3: In Step 5, the TR data in its TAD LAD, or CPR portions may be invalid, missing, inconsistent, or incomplete, embodiments of the system rejects the TR as invalid. The TR enters the INVALID state and is stored in the database. It may be corrected (modified) and resubmitted in a separate update request.<br>In all cases, further processing is stopped. |

An example use case to Convert a Regular Customer Record to a Pointer Record is as follows:

| | |
|---|---|
| Use Case ID | CR-UC-8 |
| Use Case Name | Convert a Regular Customer Record to a Pointer Record |
| Use Case Description | The user converts a regular CR to a Pointer Record |
| MFS Reference | MFS 16 |
| Actor(s) | User (toll-free service provider or administrator) System (disclosed embodiment) |
| Functional Category | CR—Customer Record Administration |
| Assumptions and Pre-Conditions | In embodiments, the system has verified the identity and permissions of the user. The selected (source) regular CR already exists in thedatabase. If it's Effective Date and Time (EDT) is not being changed for the PR being created (it is to be converted "in place"), then its EDT may be in the future and so it may not be an OLD, ACTIVE, ENDING, or DISCONNECT record. If the selected source regular CR has different Effective Date. A corresponding Template Record to be referenced by the PR already exists and is ACTIVE in the network and has the same toll-free service provider entity as the control toll-free service provider of the source regular CR. The user's toll-free service provider may be part of the Control toll-free service provider entity of the TFN for both the converted CR and the Template Record to be referenced in the PAD, or administration, or the user may otherwise have update permission for the control toll-free service provider's CRs. |
| Post-Conditions | The PR is created in PENDING status and contains the subset of CAD parameter values applicable to a PAD data portion of the PR. The prior regular CR is either replaced by the CR (if it has the same future EDT), or is retained in the database unaffected. |
| Interface Considerations | Human User Interface API Interface (REQ-CRC) |
| Primary Flow | 1. The user specifies or selects the TFN and Effective Date and Time of the existing regular CR to be converted to a PR, the Template Name of the Template Record to be referenced by the PR, and (optionally) a future Effective Date and Time for the PR. (If not specified, embodiments of the system may retain the future date and time of the source regular CR.)<br>2. The user submits the request for the conversion action.<br>3. In embodiments, the system initially validates that the requesting user is from the Control toll-free service provider of the TFN for the record being converted, or the user otherwise has update permission, that the regular CR exists in the database and that the referenced Template Record (TR) exists in the ACTIVE state in the database and its Control toll-free service provider entity code matches that of the CR being converted. If the source regular CR's EDT is in the past it ensures a user-entered EDT is specified and is in the future.<br>4. In embodiments, the system performs the conversion action. It copies applicable parameters from the source CR's CAD to the CR's PAD, referencing the indicated Template ID, and removes any CPR or LAD data portions. In embodiments, the system facilitates only the TFN or the special argument #DIAL on the Destination Telephone Number List on the CAD to be copied to the PAD, or if neither may be on the CAD, it can substitute the TFN for the DTNs on the Destination List. |

|  |  |  |
|---|---|---|
|  | 5. | In embodiments, the system validates the PR in combination with its referenced Template Record is correct and complete as of the Effective Date and Time, per CR Data Requirements and per CR Validation Requirements. |
|  | 6. | In embodiments, the system posts the PR to the database with an initial status of PENDING. The original regular CR if previously PENDING, no longer exists in the database. Subsequent to this interaction, the newly created PENDING PR is activated at the new Effective Date and Time, replacing the prior ACTIVE CR, which transitions to OLD status. |
| Alternate Flows | E1: | In Step 1, the source CR does not exist, so the record cannot be retrieved and converted. A record not found indication or error is returned to the user and processing stops. |
|  | E2: | In Step 3, the initial validation conditions may be not met, the conversion action is rejected, an error response is returned to the user, and processing stops. |
|  | E3: | In Step 5, if the resulting PR/TR is found to be invalid, an error indication is returned to the user. In exception cases E2 and E3 above, the original regular CR remains in the database and is not removed/replaced by a valid PR. |

There may be additional features the embodiments of the disclosed architecture may support such as the examples that follow.

Customer Record Creation/Updating New Features Requirements - New Feature Set

| NFS # | Function | Description |
|---|---|---|
| NFS 8 | Change call routing anchoring from PSTN to E64 URI standard | With the expected movement from a PSTN based telephone routing to an IP based standard sometime in the future, it is important to build the ability to utilize an E64 URI routing platform using SIP protocol into disclosed embodiments while still supporting the current PSTN routing approach. |
| NFS 9 | Dynamic decision tree logic for building complex customer records. | Create a decision tree to assist the toll-free provider in creating a complex record by leading the user to routing decisions based upon information already provided. |
| NFS 10 | Default Customer Record | Allow the toll-free Provider the ability to create a default customer record that can be activated against newly reserved functionality should provide the user more numbers. This capabilities than they currently have with the Template functionality. |
| NFS 11 | Enhanced Route Management | Provide the toll-free provider additional decision points for routing decisions. Currently complex routing decisions can be made on the following data points: Originating State (STATE) Originating NPA (AREA CODE) Originating LATA (LATA) Originating POTS NXX (NXX) Originating POTS NPANXX (6-DIGIT#) Originating POTS number (10-DIGIT#) Specific date (DATE) Day(s) of the week (DAY) Time-of-day range (TIMES) There is a lot of additional metadata available to provide routing instructions on, especially given the future with IP routing. These metadata points can be defined at design. |
| NFS 12 | Automated Template Data Transfer | The system may enable the transfer of call routing information in the same action as the TFN transfer if that information is |

Customer Record Creation/Updating New Features Requirements - New Feature Set

| NFS # | Function | Description |
|---|---|---|
|  |  | documented via a Template when a toll-free provider is transferring a number to a different toll-free provider. Today, this is a multi-step process. |
| NFS12A | Template Record Wizard | The user will have a simplified approach to the creation of complex Template records using a Wizard like approach with "Suggestive" intelligence from template repository. |

Customer Record Administration: Record Processing/SCP Downloads

Requirements - Minimal Feature Set

| MFS # | Current state or New | Function | Description |
|---|---|---|---|
| MFS 18 | Current state | Customer Record Processing | In embodiments, the system may maintain internal business logic for tracking CR status. See the CRA Status and flow in the Overview section. |
| MFS 19 | Current state | Download Records to SCPs | Activation at EDT (Effective Date & Time). A subset of the active CR's data (defined in the TM-798 format) applicable to toll-free database query processing is then downloaded to the applicable SCPs in the public network, replacing (overwriting) any previous SCP customer record in effect for that TFN. Only one CR may be the active CR in embodiments of the system reflecting the current toll-free service for a given TFN |
| MFS 20 | Current state | Initial DB load to SCP | When a SCP is added to the CCS network, the CRs may be loaded in bulk as an "initial load." |
| MFS 21 | Current state | Customer Record Resend | A user may initiate the resend of a CR to all or some pertinent SCPs in the CR's AOS (area of service). CR resends can be initiated by the CR's Control toll-free service provider, the SCP O/O's for any CRs at their SCPs, and administration, subject to user security settings. |

The Customer Record (CR) Status indicates the status of the Customer Record with respect to its validation in embodiments of the system and its activation status at the SCPs. The CR Status is automatically generated by the current system. Because these states, as used by the legacy system, may be well known to the user community and may be regarded as fundamental to CR processing, they may be preserved as much as possible in the next generation system.

| Customer Record Status Definitions | |
|---|---|
| Status | Definition |
| Saved | The record is stored in embodiments of the system but is not yet validated, because it has not yet been submitted for validation and posting by the user after it was created or modified. This state applies to CRs that may not be completely built or previously SAVED or PENDING CRs that have been copied and/or modified from another CR but not submitted. |
| Pending | The record has passed all validations and has a future Effective Date and Time. A PENDING record can be accessed and modified. Records specified for immediate activation (with an Effective Date and Time of "now" may also pass through the PENDING state before they may be subject to activation processing and enter the SENDING state. |
| Sending | The record is being sent to all pertinent SCPs, but not all of those SCPs have responded with an OK status, meaning the CR may be activated in none or some, but less than all SCPs. Sending records cannot be modified. (Any changes to the customer's service for the toll-free number may be made by creating a future customer record, or "copying forward" the latest of the SENDING or ACTIVE customer records to a future effective date and time and then modifying it.) (When all the SCPs subsequently respond with an OK acceptance indication, the status can then transition to ACTIVE or DISCONNECT.) |
| Active | The one record for the TFN that is currently working in all pertinent SCPs. Only one active record can exist for a TFN at a given time. An active record cannot be modified. (Any changes to the customer's service for the toll-free number may be made by creating a customer record, or "copying forward" the latest of the SENDING or ACTIVE customer records to a future effective date and time and then modifying it.) |
| Old | A record whose status was previously ACTIVE, DISCONNECT, or SENDING, but which has since been replaced by another ACTIVE, DISCONNECT, or SENDING record with a later effective date and time, or has since been deleted at the SCPs due to service disconnection. Previously DISCONNECT records transition to OLD after their Disconnect End Intercept Date has been reached and they may be deleted from the SCPs. Previous ACTIVE records also transition to OLD if they may be immediately disconnected without intercept and may be deleted from the SCPs. OLD records cannot be modified. They may be temporarily maintained in the TFMP database for reference or copying for service rollback or recovery, and may be periodically purged from the TFMP database. |
| Invalid | The record did not pass validations after being submitted by the user and its effective date and time has not yet been reached. It remains in the database but cannot be sent to the SCPs if/when its effective date and time may be reached. Invalid records may be modified and resubmitted. |
| Disconnect | Normal service for the TFN has been discontinued and all callers may be receiving disconnected number or referral number announcements. This state is reached when a PENDING record with a populated Disconnect Intercept Indicator reaches its Effective Date and Time and is then successfully activated at all pertinent SCPs (The record in this state has a specified Disconnect Intercept End Date later than the Effective Date and Time.) Only one record for a given TFN can be in the DISCONNECT state. |
| Much Check | A previously validated and pending record may be revalidated as its data may no longer be appropriate since other pending CRs for the TFN with earlier or later effective dates and times have been defined (inserted) in the activation sequence. |
| Failed | The record has reached its Effective Date and Time, but has not been successfully activated at any SCP because it remained SAVED, INVALID, MAY CHECK, or PENDING without required carrier approval at that time, or was in the SENDING state and has been rejected by all SCPs to which it was sent. |

-continued

| Customer Record Status Definitions | |
|---|---|
| Status | Definition |
| Hold | The record has been placed on hold by request of the customer or the Control toll-free service provider, as indicated by the Hold Indicator in its CAD or PAD portion set to "Yes." A CR in the HOLD state is retained in the disclosed embodiment, but is not released (sent) to the SCPs at its Effective Date and Time, even if it is otherwise valid and approved. The HOLD status applies to regular CRs and Pointer Records, but not to Template Records. HOLD status facilitates users to indefinitely delay activation of a CR if there is some problem with other coordinated aspects of the toll-free subscriber service, such as the terminating lines or call centers not being ready to accommodate the service. CR database clean-up procedures described in Section 4.14.2.4 can remove HOLD records from embodiments of the system after a suitable administrator-defined interval (from 1-30 days) has passed beyond their Effective Dates and Times. Refer to that section for details. (State transitions from database clean-up procedures may be not reflected in the mainline status transition diagrams.) |

Figure 41:
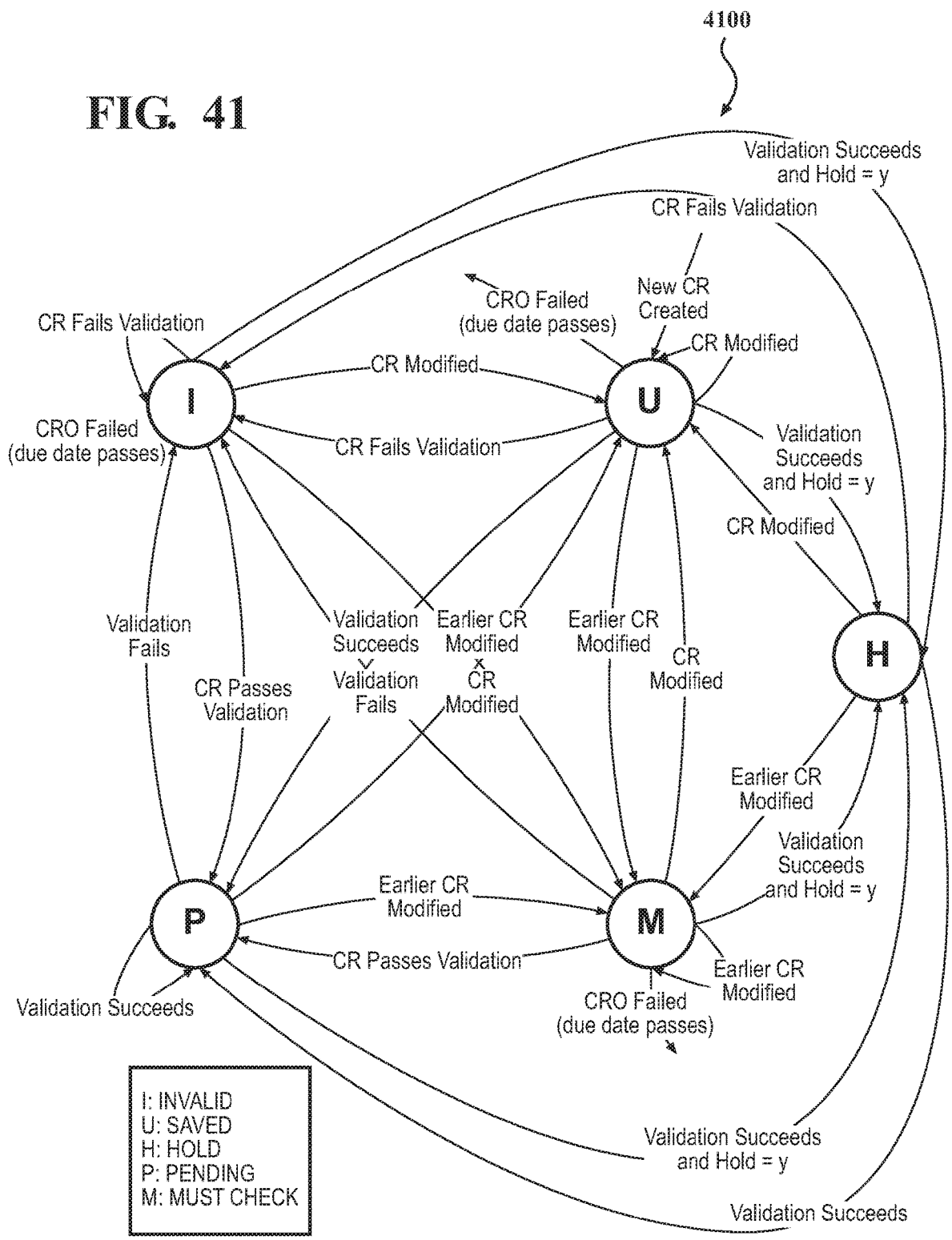
FIG. 41 depicts a Customer Record Status State Diagram.
Figure 42:
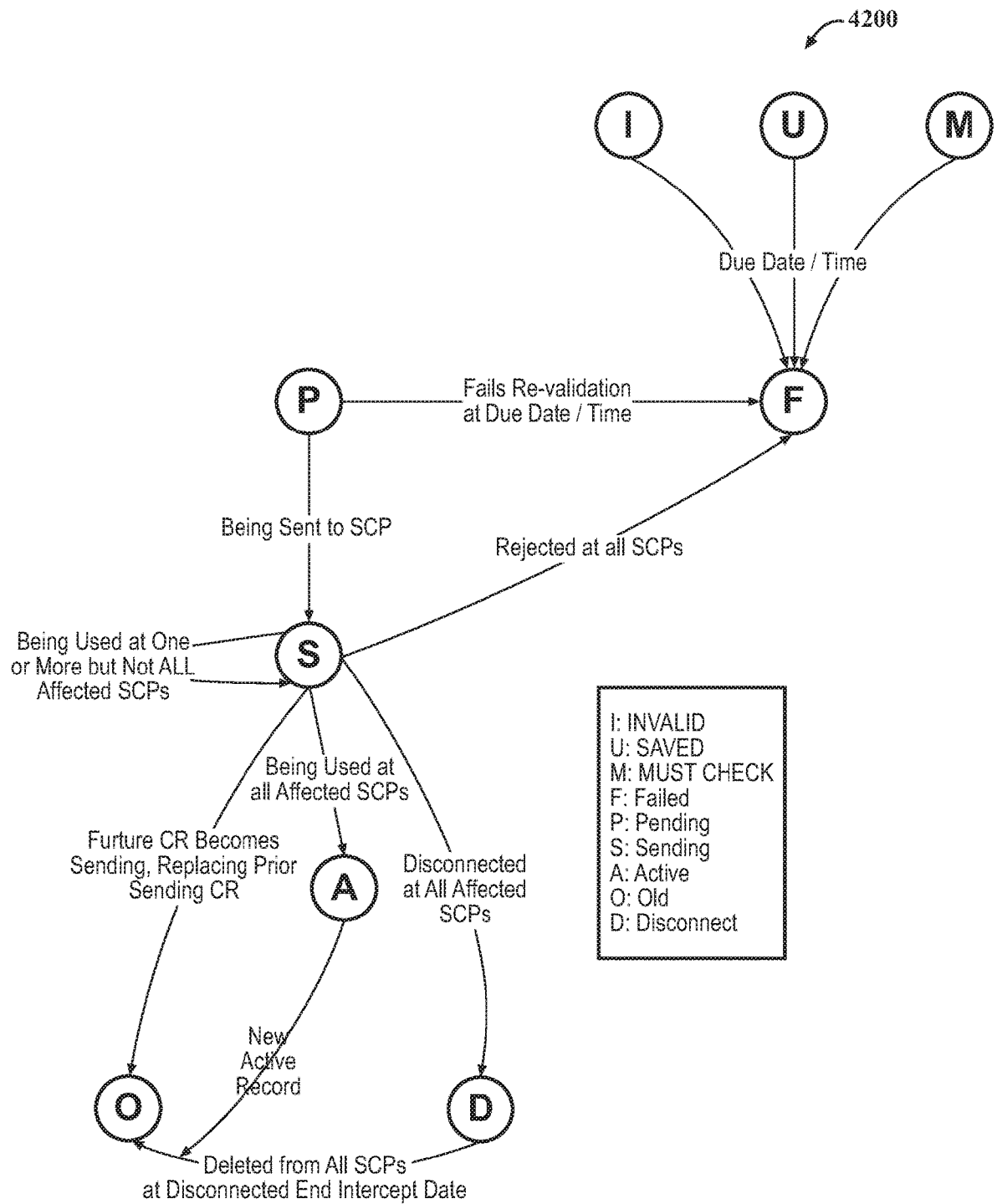
FIG. 42 depicts a Customer Record Status State Diagram.

With reference to FIGS. 41 and 42, customer record state diagrams for activation and output 4100, 4200, refer to the processes by which CRs can be translated and transmitted to the appropriate SCPs after they may be validated and receive any necessary carrier approvals through various nodes such as invalid, saved, hold, pending, and must check. This can occur when their Effective Dates and Times may be reached, or immediately in the case of CRs for which and Effective Date and Time of "now" has been specified by the user at input, and no carrier approvals may be required. Note that the standard processing of CR output (download) to SCPs is done via TM-798 data links.

In embodiments, the system may translate the information in the Customer record (either a CR, a TR (template record), or a PR (Pointer Record)) to the TM-798 format for transmission to the SCPs.

The CR SCP Resend function may be used to resend a single CR to specific SCPs and use the SCP's CR update confirmation responses to update the CR's activation status. At the end of the CR resend process for a CR, embodiments of the system may update the CR's activation status and time as maintained for each SCP on the CR's Active SCP list. An example use case is as follows:

| | |
|---|---|
| Use Case ID | CR-UC-9 |
| Use Case Name | Resend CR to SCP(s) |
| Use Case Description | A user requests that embodiments of the system resend a Customer Record (Regular CR, PR, or TR) to Service Control Points (SCPs). The request may be applied to specific SCPs or all SCPs in the CR's Area of Service (AOS). This capability is often used to clear CR's "stuck" in SENDING status due to problems at one or more SCPs in the CR's AOS. |
| MFS Reference | MFS 21 |
| Actor(s) | User (toll-free service provider, SCP network administrator, network manager, or administrator) System (disclosed embodiment) |

| Use Case ID | CR-UC-9 |
|---|---|
| Functional Category | CR - Customer Record Administration |
| Assumptions and Pre-Conditions | In embodiments, the system has verified the identity and permissions of the user or has established the necessary API interface connectivity.<br>The target CR exists in the database with status of SENDING, ACTIVE, DISCONNECT, or FAILED |
| Post-Conditions | A resend report is made available to the user regarding the results of the resend (update) action with respect to the requested SCP(s).<br>Log entries of the resend results at each SCP may be recorded.<br>The CR status may be updated for the SCP IDs on the CR's Active SCP List. |
| Interface Considerations | Human User Interface<br>API interface (REQ/RSP-SCP) |
| Primary Flow | 1. The user specifies or selects the TFN or Template Name of the CR for the resend request.<br>2. In embodiments, the system validates that the CR exists in the database in the ACTIVE, SENDING, DISCONNECT, or FAILED states, and that the user is generally authorized to perform the CR resend action.<br>3. In embodiments, the system retrieves the CR from the database, and determines the Control toll-free service provider and the SCPs in the CR AOS that may receive the resend. In embodiments, the system presents the list of SCPs defined in embodiments of the system to the user, with those SCPs from the CR's Active SCP list (for its Area of Service) identified, and with the CR's last known activation status at each SCP.<br>4. The user specifies or selects:<br>a. SCP List - the list of 1 or more SCP IDs for the resend, or all SCPs in the CR's AOS<br>b. Critical Indicator - Whether or not the request is to be processed by any SCPs in overload (deemed a "critical resend").<br>5. In embodiments, the system validates that the user is authorized to request the re-send for the CR at the indicated SCPs (the Control toll-free service provider, an SCP administrator or network manager at the SCP O/O, or from administration sources). If a Template Record is being re-sent, embodiments of the system validates that the specified SCPs support template records.<br>6. In embodiments, the system confirms to the user that the resend request has been accepted and is being processed.<br>7. In embodiments, the system interacts with the SCPs via the TM-798 UPD-CPR and RSP-RCU messages to resend the CR to each SCP and logs the results.<br>8. In embodiments, the system updates the CR's activation status at each SCP and logs each SCP's resend result for the CR. It compiles the results for the TFN or Template Name across all target SCPs.<br>9. The results of the resend at each SCP may be presented or made available to the user. |
| Alternate Flows | E1: At step 1, embodiments of the system determines that no CR corresponding to the TFN or Template Name exists in the database in the SENDING, ACTIVE, DISCONNECT or FAILED states, or that one exists but the user is not authorized to initiate resends for it. An appropriate not-found or error indication is returned, and processing stops.<br>E2: At Step 5, embodiments of the system determines the user is not authorized to perform the resend to one or more of the specified SCPs. An error indication is returned with the SCP IDs indicated, and processing stops.<br>E3: At Step 5 embodiments of the system determines the user has requested to resend a Template Record to an SCP that does not support Template Records, and an error indication is returned with the SCP IDs indicated, and processing stops. A1. In Step 7, one or more SCPs either fail to respond to the CR update command, and embodiments of the system times out and stops waiting for the responses, logs the non-responses, and completes Steps 8 and 9 with the information available. |

There may be a number of tasks where a system administrator enters values for configuration parameters that control an aspect of system functionality. A pre-condition is that the user is a system administrator with permissions to perform the specific administrative task.

For each administrative use case, the following sequence of steps applies:

Step 1: The user enters values;

Step 2: The system verifies the user input; and

Step 3: The system accepts the parameter values and notifies the user of success.

If the user input is not valid or some other condition prevents successful completion of the use case, embodiments of the system inform the user of an error.

| | | Requirements - Minimal Feature Set | |
|---|---|---|---|
| MFS # | Current state or New | Function | Description |
| MFS 22 | Current state | Annual Customer Record Audit | Annual audit between system and SCP using 798. Record Key audit only. Compare keys. Resend CR gaps. |
| MFS 23 | Current state | SCP-SMS Reverse Audit process | A separate SCP-SMS Reverse Audit process may input batch files of CRs extracted from the individual SCPs, compare them to those in the CR database and note any discrepancies in terms of the presence and Effective Dates/Times of the CRs, and (as a user option) verify the control toll-free service provider. |
| MFS 25 | Current state | Carrier Notification and Approval | As a carrier, I need to get paid every time you dip against me. This relates to inter-carrier compensation charges for providing call routing services through an SCP. The SCP provides a call processing record for every call that terminates to a toll-free number. Usually, carriers through their LECs handle all toll free call routing by "dipping" an SCP. When a RespOrg decides to route their calls through a carrier, it is required that they (the RespOrg) have a commercial agreement with that carrier. This administrative function allows a carrier to allow or disallow RespOrgs to use their network to deliver calls. |
| MFS 26 | Current state | CRA Logging | In embodiments, the system can be required to provide logging of detailed CRA activity. |

IntraLata (CIC 0110) Routing Support

| MFS # | Current state or New | Sub Function | Description |
|---|---|---|---|
| | | Requirements - Minimal Feature Set | |
| MFS 27 | Current state | CIC 0110 Support | IntraLATA routing support |

Figure 43:
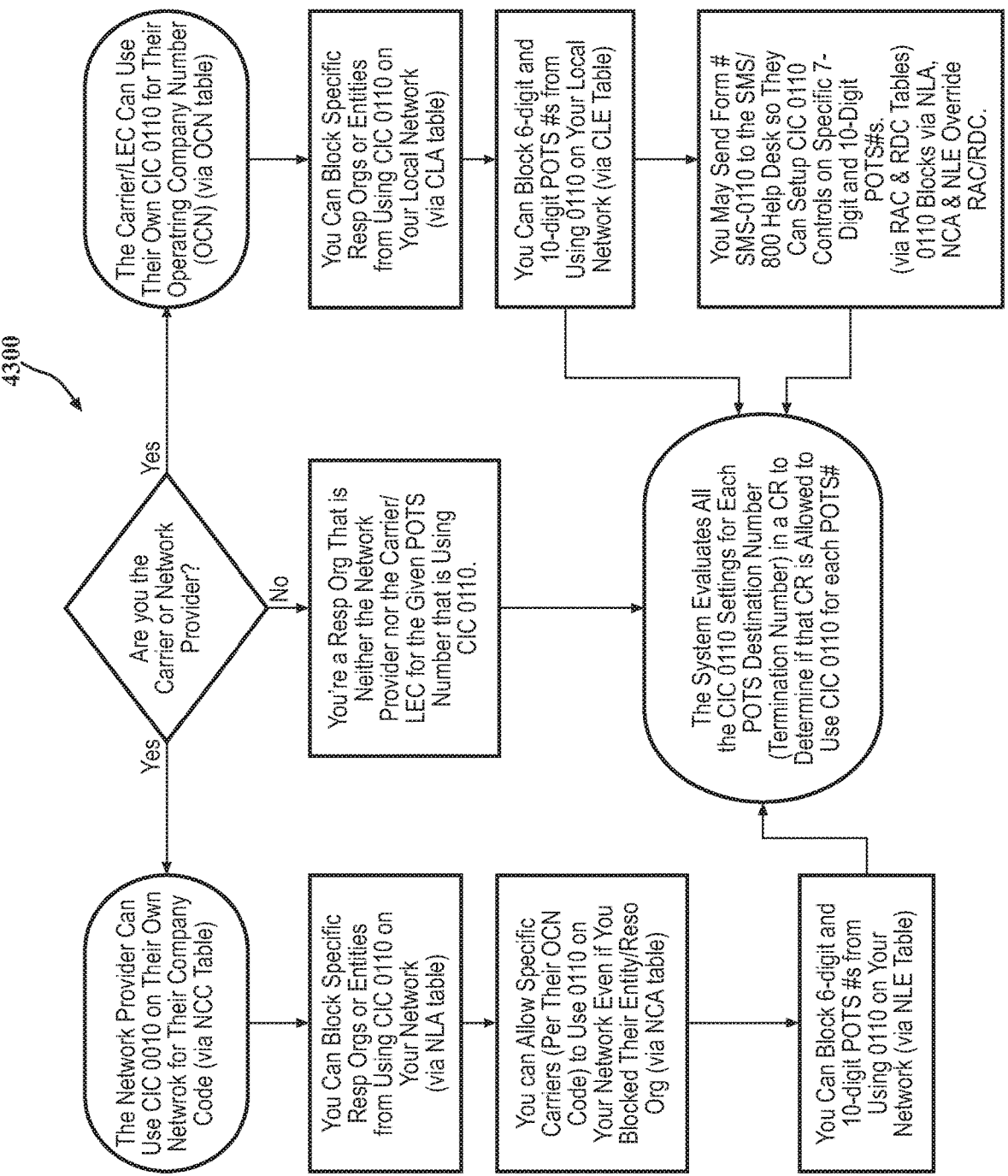
FIG. 43 depicts a schematic of a Carrier Identification Code (CIC) validations abbreviated summary flow from a service provider perspective.

With reference to FIG. 43, the CIC 0110 validations 4300 from the perspectives of each of the involved service providers, including the Incumbent LEC (ILEC)/CCS Network Provider that operates the SSP, the terminating CCS network (the "Network Provider"), the ILEC or CLEC that has been assigned the NPA-NXX code and offers service to the terminating subscriber lines (the "Carrier"), and their relationship to the CR's toll-free service provider Control toll-free service provider, which may all be the same or different entities.

Figure 44:
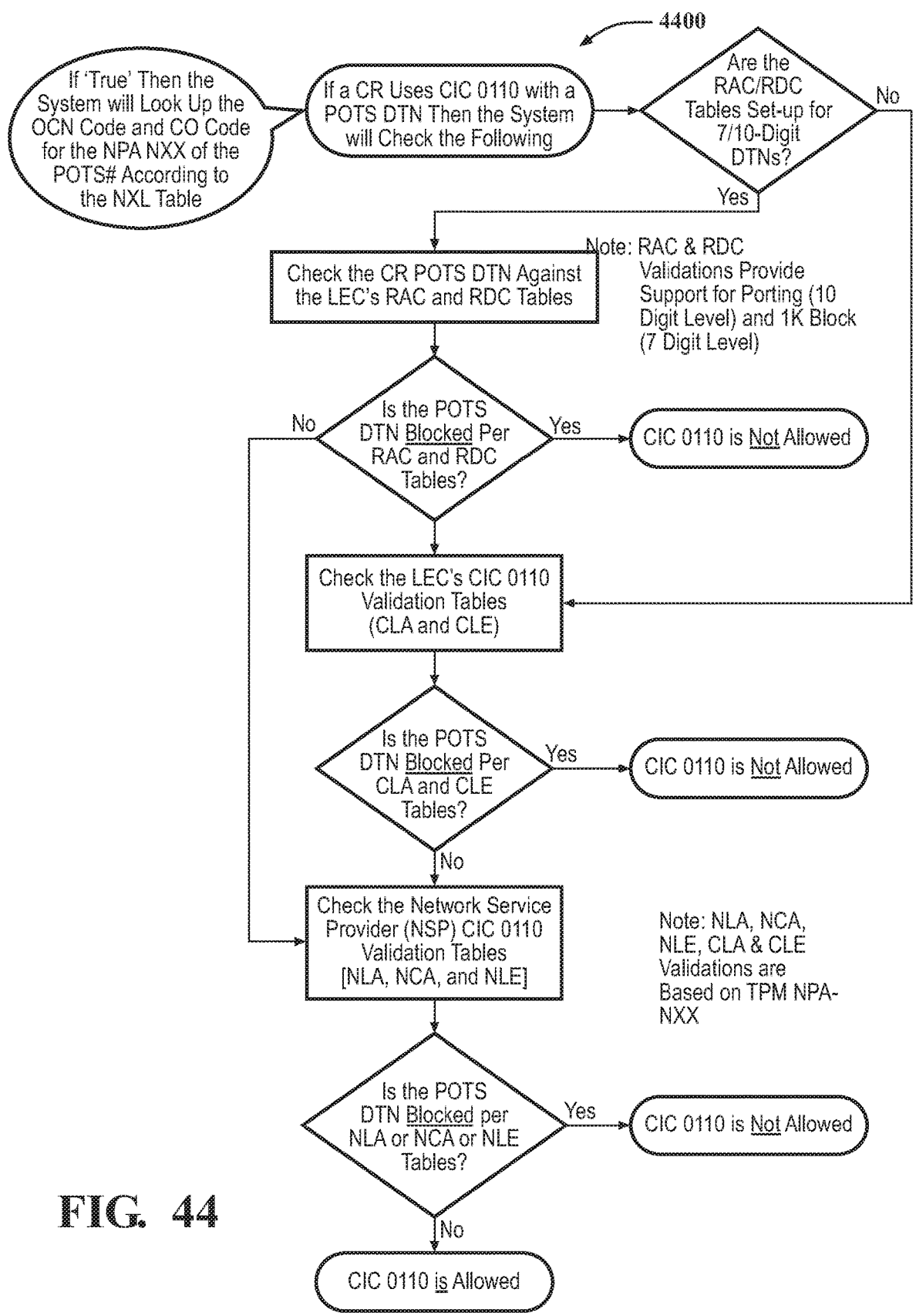
FIG. 44 depicts a schematic of a Carrier Identification Code (CR) validations flow.

With reference to FIG. 44, the series of reference data lookups that may be performed to validate the use of CIC code OTC-0110 with specified POTS destination telephone numbers in the CPR may be depicted. Functional requirements for the specifics of validation processing then follow.

| Use Case ID | CR-UC-10 |
|---|---|
| Use Case Name | Notify Affected Carrier of CIC Routing or Toll-Free Service Provider Change |
| Use Case Description | In embodiments, the system autonomously notifies a carrier's external system that another toll-free service provider's CR using its CICs has been pended in the database with a change requiring the carrier's approval, or has been activated in the network with a change requiring the carrier be notified. (The notification action also applies to cancellations of prior requests when subsequent CR changes or deletions result in a prior reported change no longer being applicable.) |
| MFS Reference | MFS 25 |
| Actor(s) | User (Carrier) System (disclosed embodiment) |
| Functional Category | CR - Customer Record Administration |
| Assumptions and Pre-Conditions | In embodiments, the system has verified the identity and permissions of the user or has established the necessary API interface connectivity. The Carrier has established Carrier Notification and Approval (CNA) controls for the CIC in question. |
| Post-Conditions | The notification is delivered to the carrier's external system or user mailbox. |
| Interface Considerations | Human User Interface API interface (UNS-SNA) |
| Primary Flow | 1. A CR with the carrier's CIC and presenting a change in service of the type requiring approval by the carrier is pended to the database, OR A CR with the carrier's CIC and presenting a change of the type requiring carrier notification is activated in the system. 2. An autonomous notification is generated and sent to the Carrier system to notify the Carrier user about the service change reflected in the CR update and when applicable, requesting their review and approval of the change. |

The Carrier notification function facilitates authorized carrier users to receive and review notifications about CR changes affecting their CICs. The Carrier Notification and Approval (CNA) functions allow telecom carriers to define business agreements with toll-free service providers, set up permissions for the use of their Carrier Identification Codes (CICs) in toll-free service CRs, receive notifications of when their CICs may be used or modified on CRs, and approve when their codes may be used on specific CR's controlled by other service providers.

In embodiments, the system can validate the CICs used in CRs to specify call routing, based on carrier permissions and restrictions specified in carrier and CNA reference data, generate notifications to the carriers, and correlate those against carrier approvals before the CRs containing the carrier's CICs may be activated.

The toll-free service providers' View of Carrier Approval Status facilitates toll-free service providers to query carrier approval status information for their CRs at both a summary level and a detailed level (per-carrier), when multiple carriers may be involved.

An example use case to notify an affected carrier of CIC routing or toll-free service provider change is as follows

| Use Case ID | CR-UC-11 |
|---|---|
| Use Case Name | Carrier Reviews Notifications |
| Use Case Description | A carrier selects, retrieves, and views a list of outstanding CNA notifications and approval requests for their CICs resulting from other service provider's CRs being pended or activated in the system, and selects one for viewing and follow-on activity. |
| MFS Reference | MFS 25 |
| Actor(s) | User (Carrier or administrator) System (disclosed embodiment) |
| Functional Category | CR - Customer Record Administration |
| Assumptions and Pre-Conditions | In embodiments, the system has verified the identity and permissions of the user. The Carrier has established Carrier Notification and Approval (CNA) controls for their CICs. |
| Post-Conditions | A summary list of outstanding CNA notifications and approval requests meeting the user's request criteria is returned/displayed, from which one may be selected. No change is made to the notification data. |
| Interface Considerations | Human User Interface |
| Primary Flow | 1. A carrier user enters or selects a CIC, an Effective Date range, and Toll-Free NPA filter for the desired list of CIC Routing or toll-free service provider Change notifications. 2. The user submits the request to the system. 3. In embodiments, the system validates that the user is from the carrier entity that controls the CIC, or is from SMS administration, and is authorized to access the notification list. 4. In embodiments, the system retrieves and displays the notification list, including for each notification: CR's TFN or Template Name CR's Effective Date and Time The Notification Reason (the CR's change condition) The CR's Carrier Approval Status An indication of whether the carrier's approval is requested/required A link or other mechanism by which the notifications may be selected for subsequent action. 5. The user then selects an individual notification to view and retrieves the notification details. Additional information requirements regarding the detailed notifications may be discussed in the functional requirements of Section 4.6.2.4. Subsequent to this interaction the user may conduct other follow-on activity concerning the notification such as viewing relevant portions of the CR, submitting an approval response, or deleting the notification. |
| Alternate Flows | E1: In Step 3, embodiments of the system determine the user is not authorized to access notifications for the selected CIC. An error response is returned and processing stops. E2: In Step 3, no notifications meeting the filter criteria may be found in the system, and a not-found indication is returned to the requesting user. |

Carrier Submits Approval or Denial of CR Update

| | |
|---|---|
| Use Case ID | CR-UC-12 |
| Use Case Name | Carrier Submits Approval or Denial of CR Update |
| Use Case Description | A carrier selects a CR approval request concerning their CIC(s) and submits the carrier's approval or denial for the CR. |
| MFS Reference | MFS 25 |
| Actor(s) | User (Carrier or administrator)<br>System (disclosed embodiment) |
| Functional Category | CR - Customer Record Administration |
| Assumptions and Pre-Conditions | In embodiments, the system has verified the identity and permissions of the user or has established API interface connectivity.<br>The Carrier has established Carrier Notification and Approval (CNA) controls for their CICs.<br>CR approval requests for one or more of their CICs exist in the database. |
| Post-Conditions | A status of "granted" or "denied" is assigned to the approval request with respect to the carrier, and can be correlated to the corresponding PENDING CR in the database. |
| Interface Considerations | Human User Interface<br>API Interface (REPT/RSP-APR) |
| Primary Flow | 1. A carrier user (or TFMP Administration user) searches (HUI case only) for one or more CR approval requests, based on one or more of the following search criteria:<br>CIC<br>TFN (or TF NPA, or TFN range), or Template Name<br>Effective Date and Time (EDT) or EDT range<br>Control toll-free service provider<br>Notification Time stamp<br>Current Request Approval Status (granted, denied, undetermined)<br>2. In embodiments, the system responds with one or more Approval Requests meeting the search criteria. (HUI case only)<br>3. The user specifies or selects a specific approval request (about a PENDING CR) to address.<br>4. In embodiments, the system validates that the user is from the carrier entity that controls the CIC, or is from TFMP administration, and is authorized to specify approvals for the CIC.<br>5. The user specifies or selects the desired approval status for the request (granted, denied), and if denied, the reason for the denial (a 2 character alphabetic, carrier-specific code for the reason).<br>6. The user submits the request to update the approval status.<br>7. In embodiments, the system responds, confirming the specified status value for the approval request, and logs the approval response action. |
| Alternate Flows | E1: In step 1, no requests match the search criteria, so a not-found indication is returned to the user and processing stops.<br>E2: In step 4, an embodiment of the system determines the user is not authorized to access/respond to the approval requests for the selected CIC. An error response is returned to the user. |

| | |
|---|---|
| Use Case ID | CR-UC-13 |
| Use Case Name | Notify Control toll-free service provider of Carrier Approval or Denial |
| Use Case Description | In embodiments, the system autonomously notifies a Control toll-free service provider user or external system that all carriers requiring approval have granted approval requests for a pending CR, or that one carrier has denied the request, so that the CR has transitioned from the AWAIT carrier approval status to the GRANTED or DENIED approval status (respectively). |
| MFS Reference | MFS 25 |
| Actor(s) | User (toll-free service provider)<br>System (disclosed embodiment) |
| Functional Category | CR - Customer Record Administration |
| Assumptions and Pre-Conditions | In embodiments, the system has verified the identity and permissions of the user or has established the necessary API interface connectivity.<br>The approval request(s) was/were previously generated by embodiments of the system as a result of CR creation or updates, combined with one or more carriers' CNA policies with respect to the toll-free service provider. |
| Post-Conditions | The notification is delivered to the toll-free service provider's external system or user mailbox. |
| Interface Considerations | Human User Interface<br>API interface (UNS-ACT) |
| Primary Flow | 1. The system, which tracks carrier responses to the approval requests, determines that either the last outstanding approval request for a given CIC on the CR has been granted, OR one of one of more carriers requiring approval has denied approval.<br>2. In embodiments, the system updates the CR's Carrier Approval Status from AWAIT to GRANTED or DENIED, respectively, and generates a notification of the event to the CR's TOLL-FREE SERVICE PROVIDER. The notification contains the following information about the CR:<br>The Control toll-free service provider<br>TFN or Template Name<br>Effective Date and Time<br>Date and time of receipt (denial or last grant)<br>Approval Indication (granted all carriers, denied by a carrier)<br>Denial information (if denied by a carrier):<br>CIC<br>Reason code (2-character carrier-specific reason code). |
| Alternate Flows | None identified. |

In embodiments, the system can be required to provide various logs of detailed CRA activity in order to support a number of key reports. In embodiments, the system can also provide a variety of measurements of CRA activity and associated resource usage, both in aggregate for the system, and where attributable to the respective toll-free service providers whose CRs may be being processed.

There may be certain items that may be validated in embodiments of the system as a result of outside carriers or partner's rules. One such rule is:

Requirements - Minimal Feature Set

| MFS # | Current state or New | Sub Function | Description |
|---|---|---|---|
| MFS 32 | Current state | Carrier business rules | AT&T accepts only turn-around records/validations. |

A Mass Change is an event that requires embodiments of the system to perform a large volume of changes in a short period of time. Depending on the Mass Change event, it may be necessary to update system reference data and a large number of impacted AoS labels and customer records. In embodiments, the system thus provides functionality for management and administration of Mass Changes.

The setup of Mass Changes may, for example, be performed online and the execution of the job processing the Mass change is done in the background.

Customer Record Mass Changes MFS

| MFS # | Current state or New | Sub Function | Description |
|---|---|---|---|
| MFS 28 | Current state | Owning toll-free service provider give away all numbers to another Provider (Mass toll-free service provider Change) | Convert all or subset of numbers and CRs from old toll-free service provider to new toll-free service provider |
| MFS 29 | Current state | POTS NPA Changes (not TF) | Updates CRs due to overlays. While NPA Splits may be unlikely to happen, support is provided to CR updates based on Overlays. |
| MFS 30 | Current state | 1. CR updates from Industry Network data changes. 2. Toll-free service provider driven CR updates | Industry data changes such as Overlays or Splits can cause CRs to be updated. Other industry data changes (reference data changes) can also cause CRs to require automatic updates. (POTS NPA Changes) and (CR updates due to industry data changes). Mass toll-free service provider Changes, Mass Carrier Change, Mass Disconnect & Spare. |
| MFS 31 | Current state | SCP Area of Service Definition/ Expansion | A CCS Network consists of SCPs that provide routing information for toll-free calls originated from a defined area of the POTS network, referred to as the SCP Area of Service. When a CCS Network is added or due to changes in the operations of CCS Networks, such as a merger or expansion, it is necessary to define or add to an SCP Area of Service |

This section has a sample of some of the many use cases that may be covered in this functionality. It does not represent every possible use case and should be but an example base for determining CRA functionality.

Example Set Criteria for a NPA Code Opening/Overlay Mass Change is as follows:

| Use Case ID | CR-UC-14 | |
|---|---|---|
| Use Case Name | NPA Code Opening/Overlay Mass Change Setup | |
| Use Case Description | Administrator prepares for and executes an upcoming NPA Code Opening/Overlay | |
| MFS Reference | MFS 29 | |
| Actor(s) | User (disclosed embodiment administrator) System (disclosed embodiment) | |
| Functional Category | CRA Mass Changes | |
| Pre-Conditions and Assumptions | The user has logged into the system. In embodiments, the system has verified identity and permissions of the specific user. | |
| Post-Conditions | Criteria for an NPA Code Opening/Overlay Mass Change may be set. | |
| Interface Considerations | Human User Interface | |
| Primary Flow | Step 1 | The user indicates the mass change is an NPA Code Opening/Overlay and enters the following information: New NPA Code New NPA State Existing NPAs to be overlaid CCS Networks for New NPA LATAs for New NPA |
| | Step 2 | The user enters the date the NPA code can be operational (Open date) and the number of days in advance for the beginning of Mass Change processing (used to calculate Open-X date). |
| | Step 3 | In embodiments, the system verifies that the data entered is valid and provides a response that the Mass Change criteria have been accepted. |
| | Step 4 | An identifier for the mass change operation is established and status is set to PENDING for the Mass Change. |
| Alternate Flows | E1: At Step 1, embodiments of the system may notify the user if any of the data entered is invalid, such as an incorrect state or existing NPAs, CCS networks, or LATAs that may be not operational in the indicated state. E2: At Step 2, embodiments of the system may notifies the user if the date information is not valid. The Open date and Open-X date may occur after the current date. | |

Example Set Criteria for a mass carrier change is as follows:

| Use Case ID | CR-UC-15 | |
|---|---|---|
| Use Case Name | Set Criteria for a Mass Carrier Change | |
| Use Case Description | Administrator sets up the criteria for a mass carrier change | |
| MFS Reference | MFS 28; MFS 29; | |
| Actor(s) | User (disclosed embodiment administrator) System (disclosed embodiment) | |
| Functional Category | CRA Mass Changes | |
| Pre-Conditions and Assumptions | The user has logged into the system. In embodiments, the system has verified identity and permissions of the specific user All reference data required to define a carrier has been entered for the Change-to Carrier. | |
| Post-Conditions | Criteria for a mass carrier change may be set. | |
| Interface Considerations | Human User Interface | |
| Primary Flow | Step 1 | The User indicates the mass change is a mass carrier change and enters the following information: One or more change-from carriers One change-to carrier for each change-from carrier One or more toll-free service provider entities or toll-free service provider units per change from/change-to carrier (optional) One or more LATAs per change from/ change-to carrier (optional) |
| | Step 2 | The user enters the date the carrier change can be completed (carrier date) and a number of days prior for when carrier changes can begin (carrier-X date). |
| | Step 3 | In embodiments, the system verifies that the data entered is valid and provides a response that the mass change criteria have been accepted. |
| | Step 4 | An identifier for the mass change operation is established and status is set to PENDING for the Mass Change. |
| Alternate Flows | E1: At Step 1, embodiments of the system notifies the user if any of the data entered is invalid, such as an invalid Carrier code. Toll-free service provider entity or Unit, or LATA. E2: At Step 2, embodiments of the system notifies the user if the date information is not valid. The Carrier and Carrier-X date may occur after the current date. | |

| Use Case ID | CR-UC-16 |
|---|---|
| Use Case Name | Set Criteria for a Mass Toll-Free Service Provider Change |
| Use Case Description | Administrator sets up the criteria for a mass toll-free service provider change |
| MFS Reference | MFS 28 |
| Actor(s) | User (disclosed embodiment administrator System (disclosed embodiment) |
| Functional Category | CRA Mass Changes |
| Pre-Conditions and Assumptions | The user has logged into the system. In embodiments, the system has verified identity and permissions of the specific user. |
| Post-Conditions | Criteria for a mass toll-free service provider change may be set. |
| Interface Considerations | Human User Interface |
| Primary Flow | Step 1 The user indicates the mass change is a mass toll-free service provider Change and enters the Change-from toll-free service provider entity or toll-free service provider Unit and corresponding Change-to toll-free service provider entity or toll-free service provider Unit
Step 2 The user enters the date the toll-free service provider Change can be completed (toll-free service provider date) and a number of days prior for when carrier changes can begin (toll-free service provider-X date).
Step 3 In embodiments, the system verifies that the data entered is valid and provides a response that the Mass Change criteria have been accepted.
Step 4 An identifier for the mass change operation is established and status is set to PENDING for the Mass Change. |
| Alternate Flows | E1: At Step 1, embodiments of the system notify the user if any of the toll-free service provider entity or toll-free service provider Units entered may be invalid.
E2: At Step 2, embodiments of the system notify the user if the date information is not valid. The toll-free service provider date and toll-free service provider-X date may occur after the current date. |

In embodiments, the system may identify records impacted by a mass change. Using the mass change criteria, embodiments of the system can search for records that may be impacted by the mass change and determine if the record can be updated for the mass change information or if manual intervention is required. The identification process can be repeated after verification of the results and manual action has been taken for those records that cannot be updated automatically.

In embodiments, the system can identify and update records that are impacted by a mass change. Updated records may be assigned an appropriate effective date and time.

An example use case that updates customer records impacted by a mass change is as follows:

| Use Case ID | CR-UC-17 |
|---|---|
| Use Case Name | Update Customer Records Impacted by a Mass Change |
| Use Case Description | Administrator executes a system process to update the customer records that may be impacted by a mass change |
| Actor(s) | User (disclosed embodiment administrator) System (disclosed embodiment) |
| Functional Category | CRA mass changes |
| Pre-Conditions and Assumptions | The user has logged into the system. In embodiments, the system has verified identity and permissions of the specific user. Customer records impacted by the mass change have been identified. |
| Post-Conditions | Customer records that may be impacted by a mass change may be updated and assigned an effective date and time. |
| Interface Considerations | Human User Interface |
| Primary Flow | Step 1 The user indicates the mass change for the customer record update process, the date to begin download of updated customer records and the number of customer records to download each quarter hour. For an SCP Area of Service Expansion, the user indicates if updated customer records may be to be sent over the links to SCPs (online update) or extracted to a file (offline update).
Step 2 The user specifies a start date and time for the process to begin (default is immediate).
Step 3 In embodiments, the system creates a version of Active, Sending, and Disconnect impacted customer records with the an effective date and a time calculated based on the indicated download start date, number of records and the indicated quarter hour quantity. Pending and Hold impacted customer records may be updated with no change to the effective date and time.
Step 4 In embodiments, the system provides an indication that processing is completed and that the results (customer records updated, customer records failed update) may be available for review. |
| Alternate Flows | E1: At Step 1 and 2, embodiments of the system notify the user if the mass change or the start date and time may be invalid.
E2: At Step 4, embodiments of the system notify the user if processing cannot begin or ends before completion. |

SCP administration and network management may be two important functions defined under SCP management. SCP administration functions in embodiments allow users to establish and modify SCP-related reference data in embodiments of the system and send messages to the SCP nodes and their Call Management Services Database (CMSDB) subsystems to manage data tables that reside there.

Network management functions for the toll-free Service involve the management of various parameters for automatic capabilities intended to monitor and control toll-free query traffic and calling volumes at the Service Control Points (SCPs), Service Switching Points (SSPs), terminating switches and terminating subscriber lines. When various call volume thresholds may be exceeded, the SCPs trigger Automatic Call Gapping (ACG) code controls at the originating SSPs.

The disclosed embodiment of the Network Management functions allow network managers to configure and adjust the relevant control parameters on SCP. Data collection at the SCPs can be configured through the disclosed embodiment to provide network managers with relevant surveillance information useful to monitor traffic and analyze problems, such as the detection of SCP overloads and excessive calling or excessive ineffective attempts to dialed codes.

Figure 45:
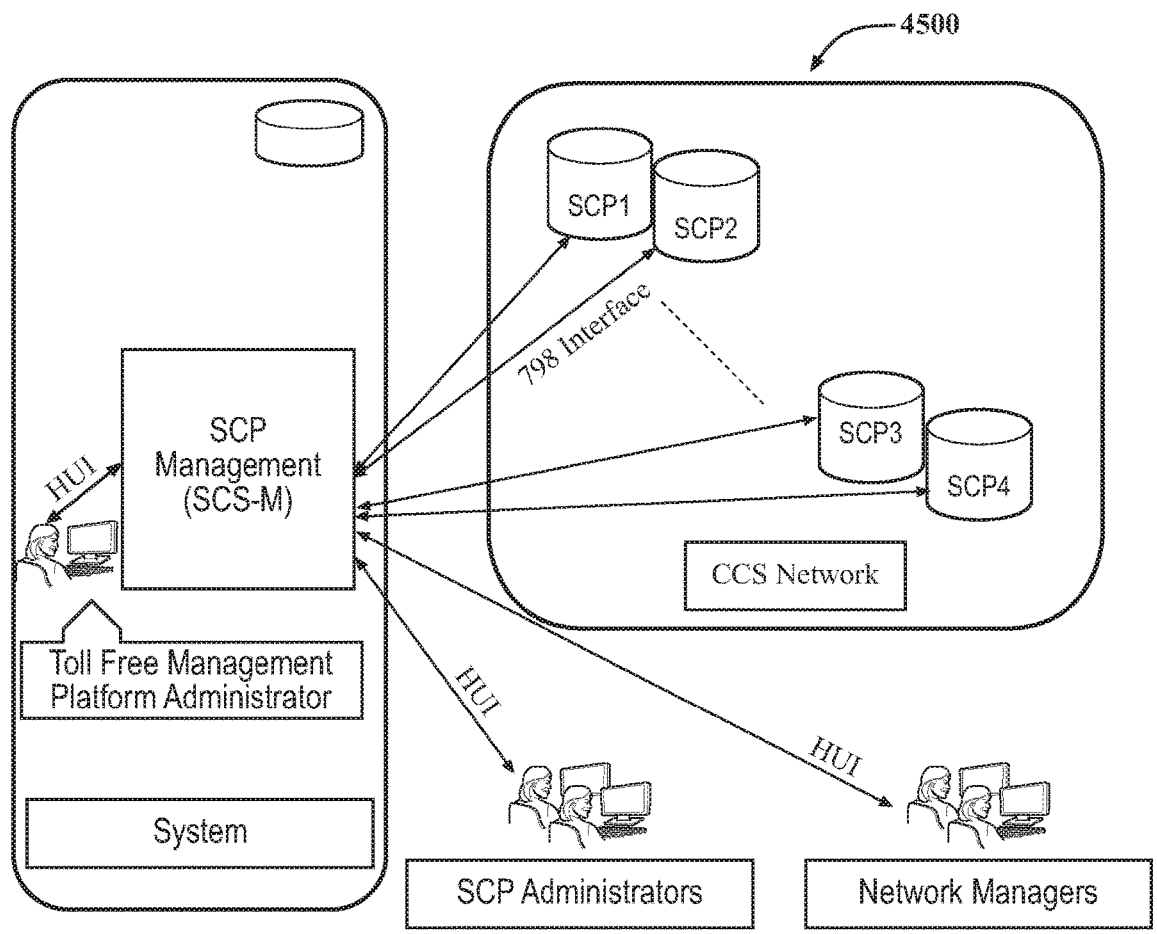
FIG. 45 depicts a schematic of Service Control Point (SCP) interactions.

The SCP Management (SCP-M) functions may be used by SCP administrators at the SCP Owner/Operator (SCP O/O) companies and by network managers for the SS7/CCS networks, which may be typically operated by the same SCP O/O entities or otherwise affiliated with them. SCP-M functions may interact directly with the SCPs via the SCP Interface as defined in TM-798. An example of these interactions is illustrated in FIG. 45.

| Requirements - Minimal Feature Set | | | |
|---|---|---|---|
| MFS # | Current state or New | Sub Function | Description |
| MFS 33 | Current state | SCP Administration | The definition and configuration of SCPs and related SCP informatiom |
| MFS 34 | Current state | Master Number List | In embodiments, the system may maintain for each managed SCP a list of toll-free NPAs, and for each NPA - an effective dated list of their contained NXXs for which toll-free Customer Records (CRs) may be loaded and for which toll-free database queried may be received. |
| MFS 35 | Current state | SCP Mated Pairs | SCP's may be generally defined in mated pairs. In embodiments, the system can need to keep track of this relationship. |
| MFS 36 | Current state | 798 Protocol | TM-798 Interface messaging, and others can be used for communicating and exchanging the messages between the disclosed embodiment and the SCP. |
| MFS 37 | Current state | Network Management | Network management is done by the SCP implementing overload controls whenever call volume thresholds may be exceeded. The disclosed embodiment defines the controls and sets thresholds. Data collection at the SCPs can be requested through disclosed embodiment to provide network managers with information to analyze problems. |

There may be additional features supported by the disclosed architecture such as the examples which follow:

| SCP Management - New Feature Set | | |
|---|---|---|
| NFS # | Function | Description |
| NFS 13 | Provide to the SCPs the ability to pull call routing details rather than only allowing a push | Today, all information sent to an SCP is sent via a push. In some cases the SCP requests this information, but they may wait till the request is processed before receiving the information. In embodiments, the system should allow an SCP to pull information directly from the system. Controls may be built into embodiments of the system to only allow records that may be released by the toll-free provider to be pulled. |

SCP administration functions of the disclosed embodiment allow users to establish and modify SCP-related reference data in embodiments of the system and send messages to the SCP nodes.

The principal users of SCP-M functionality may be assumed to be SCP administrators at the SCP Owner Operator (SCP O/O) companies and network managers at Network Management Centers (NMCs) or Network Operations Center (NOCs) at the telecom network providers who operate the SS7/Common Channel Signaling (CCS) networks. Secondary users may be administrators, who have global privileges to access the data and facilitate administrative and control actions of the SCP administrators and network managers.

The current system SCP Administration supports the management of SCP data tables or similar data structures. Functionality provided by a current system may be supported in embodiments of a new system. Design of disclosed embodiments may vary. These may include the following:

| Table | Description/Purpose |
|---|---|
| SCP ID Table | The SCP ID table defines SCPs managed by the disclosed embodiment and key parameters associated with each |
| SCP Mated Pair Table Active/Active Configuration) | The SCP Mated Pair Table is used to define active/active highly available relationships between individual SCPs within the same CCS network. |
| SSP Lists | For each CCS network, embodiments of the system can maintain a list of SSPs that may route Toll-Free Database queries to an SCP. This information is used to validate SSPs specified for SSP based special studies. |
| Toll-Free NPA-NXX Lists | The SCP Toll-Free NPA-NXX List contains the toll-free NPAs and their NXXs belonging to the SCP in the user's CCS network. This list specifies the domain of dialed codes whose customer records may be loaded at that SCP and whose toll-free database queries may be to be handled by that SCP. This is sometimes referred to as the SCP's Master Number List. |

A common practice among SCP owner-operators is the running of periodic (typically annual) batch audits of extracted files of SCP customer records against the database in order to detect outdated or missing SCP CRs. The process is known as a reverse audit, because it uses the extracted SCP records as a basis for the audit comparison instead of the database. The typical practice for each SCP O/O has been to periodically audit each toll-free NPA's range of CRs by extracting a SCP-generated CR audit file for that NPA.

The audit file is not a complete view of the CRs, but is rather an extracted listing of each loaded CR's Customer Record Number (CRN), i.e., the TFN or numeric Template ID in NPA-NXX-XXXX format, Effective Date and Time, and toll-free service provider ID. The audit file is then loaded to the TFMP administration. The reverse audit process then compares the records to the corresponding CRs. The discrepancies may then trigger CR resends to the target SCP via the TM-798 interface, or may be written to file for a subsequent batch resend.

The SCP Administration function supports actions performed by SCP administrators and disclosed embodiment administrators. The following may be sample use cases addressing SCPs, SCP mates, SSP lists and SCP-NPA NXX lists, among other administrative controls and limits for SCP Operations. These do not cover every possible action.

An example use case to define a SCP ID in the disclosed embodiment is as follows:

| | |
|---|---|
| Use Case ID | SM-UC-1 |
| Use Case Name | Define a SCP ID and its attributes within the disclosed embodiment. |
| Use Case Description | The administrator enters the information required to create an SCP into the disclosed embodiment. |
| MFS Reference | MFS 33 |
| Actor(s) | User (administrator system) System (disclosed embodiment) |
| Functional Category | SM - SCP Management. |
| Pre-Conditions/ Assumptions | User has logged on to embodiments of the system and has permissions to perform the requested action. The SCP ID has not been defined in the system. The CCS Network Id has already been defined in the system. |
| Post-Conditions | A SCP ID is defined in the system's database. |

| | |
|---|---|
| Interface Considerations | The user should be connected via a HUI (Human User Interface) to access the system. |
| Primary Flow | 1. The user enters the CCS Network ID, the parent object for which the SCP ID is being defined.<br>2. The user enters the information related to data elements to define a SCP ID:<br>Node Id<br>Template Record Indicator<br>3. The user submits all SCP information to the system.<br>4. In embodiments, the system validates the data elements per data requirements and that the SCP ID has not already been defined in the system.<br>5. In embodiments, the system validates the information provided and interacts with the SCP<br>6. In embodiments, the system returns a confirmation message to the user confirming creation of the SCP ID in embodiments of the system |
| Alternate Flows | E1: At Step 1, if the CCS Network Id is not found, embodiments of the system cannot allow the user to create the SCP.<br>E2: At Step 4, if system validation fails, then embodiments of the system cannot allow the user to create the SCP.<br>E4: At Step 5, if the SCP fails to interact with embodiments of the system or does not accept the information, then embodiments of the system cannot allow the user to create the SCP.<br>In all cases, an error indication is returned to the user and further processing stops. |

An example use case to Update the SCP ID data is as follows:

| | |
|---|---|
| Use Case ID | SM-UC-3 |
| Use Case Name | Update the SCP ID data in the disclosed embodiment. |
| Use Case Description | The TFMP administrator can update the SCP ID data in the disclosed embodiment. |
| MFS Reference | MFS 33; MFS 34 |
| Actor(s) | User (disclosed embodiment administrator)<br>System (disclosed embodiment) |
| Functional Category | SM - SCP Management. |
| Pre-Conditions/ Assumptions | User has logged on to embodiments of the system and has permissions to perform the requested action<br>The SCP ID, for which the update is being made, has been defined in the system.<br>The CCS Network ID has already been defined in the system.<br>The user can only update the queue status (from Queue to Not Queue) and Template Supported indicator in the SCP. |
| Post-Conditions | A SCP ID data is updated in the system |
| Interface Considerations | The user should be connected via a HUI (Human User Interface) to access the system. |
| Primary Flow | 1. The user enters the SCP Id to retrieve the SCP ID data from the system's database.<br>2. In embodiments, the system verifies if the user has permission to manage the above SCP Id.<br>3. User modifies the SCP ID data and submits the SCP ID information (Template Supported and Queue status) for validation and processing.<br>4. System validates the data elements per data requirements section and according to FR section.<br>5. In embodiments, the system returns a confirmation message to the user confirming modifications of the SCP ID data in the system. |
| Alternate Flows | E1: At Step 1, if the SCP ID does not match the system's database, then embodiments of the system cannot allow the user to retrieve/update the SCP ID data.<br>E2: At Step 2, if the SCP ID does not belong to the user's CCS network, then embodiments of the system cannot allow the user to retrieve the SCP ID data.<br>E3: At Step 3, if validation fails, then embodiments of the system cannot allow the user to modify the SCP ID data.<br>In all the above cases, an error indication is returned to the user and further processing is stopped. |

Establish or Update SCP mated pair inside the disclosed embodiment is as follows:

| | |
|---|---|
| Use Case ID | SM-UC-5 |
| Use Case Name | Establish or Update SCP mated pair inside the disclosed embodiment. |
| Use Case Description | The TFMP administrator or SCP administrator enters the SCP IDs to establish a relationship between two SCPs as SCP mates in the system. |
| MFS Reference | MFS 35 |
| Actor(s) | User (SCP administrator or disclosed embodiment administrator)<br>System (disclosed embodiment) |
| Functional Category | SM - SCP Management. |
| Pre-Conditions/ Assumptions | The SCPs to be defined as a mated pair should belong to the user's CCS network.<br>The SCP IDs that may be mated should have been defined in the SCP ID table.<br>The SCPs should not be a mated with any other SCPs.<br>User has logged on to embodiments of the system and has permissions to perform the requested action. |
| Post-Conditions | The SCP Mate relationship is now established in the system |
| Interface Considerations | The user should be connected via a HUI (Human User Interface) to access the system. |
| Primary Flow | 1. User enters or selects an SCP ID and a second (different) SCP ID for the SCP mate.<br>2. In embodiments, the system verifies that both SCP IDs may be managed by the same user of a CCS Network.<br>3. The user requests the two SCPs be defined as mated pair.<br>4. In embodiments, the system validates the mated pairs.<br>5. The system updates the table identifying these two SCPs as a mated pair.<br>6. The system returns a confirmation message to the user noting the establishment the SCP mated pair in the system. |
| Alternate Flows | E1: At step 1, if the entered SCP ID is not found in the table and an error or not-found indication is returned.<br>E2: At Step 2, if the SCP ID does not belong to the user's CCS network, then embodiments of the system cannot allow the user to mate the pair.<br>E3: At Step 4, If either SCP ID is already mated to another SCP ID or any other validations fail, then an error message is returned to the user indicating the SCPID is already mated.<br>In all the above cases, an error indication is returned to the user and further processing is stopped. |

The disclosed embodiment may interface with all the SCPs using the TM-798 standard interface protocol. The embodiments of the disclosed architecture can maintain that interface standard as have each SCP change the interface may not be a viable approach.

The SCP interface is a dedicated Wide-Area Network (WAN) link supporting the establishment of TCP/IP socket connections between embodiments of the system and each SCP. In embodiments, the system may maintain a set of data related to the interface for each SCP, such as an IP address and TCP port number, as described by SR-4959, SCP-TFMP TCP/IP Interface Specification.

The embodiments of the disclosed architecture may need to translate the necessary information from its internal data stores into a standard interface for transmission to the SCPs.

Network management is performed automatically by the SCP implementing overload controls whenever call volume thresholds may be exceeded. The disclosed embodiment defines the controls and sets thresholds. Data collection at the SCPs can be requested through disclosed embodiment to provide network managers with information to analyze problems.

Mass Calling Thresholds may be used to provide the SCPs with surveillance and control thresholds for each of 15 destination threshold level classes defined by the disclosed embodiment. Each of these thresholds is expressed in terms of the number of call attempts during, for example, a 2.5-minute period.

The disclosed embodiment automatically assigns a threshold level class to a particular destination telephone number of a toll-free-number, based on the number of lines associated with it, as specified on the Customer Record (CR).

The SCP detects focused overloads by counting call attempts for each destination number and comparing the accumulated count to the surveillance and control thresholds for the threshold level class assigned to the destination number.

If the call attempts during an example 2.5-minute measurement period exceed the surveillance threshold for a destination telephone number, then the number is placed on a surveillance list.

A destination telephone number remains on the surveillance list until it either does not exceed its surveillance threshold during a full 2.5-minute measurement period or it exceeds its control threshold when it's moved to the control list.

An example use case to Change the Mass Calling Threshold Data is as follows:

| | |
|---|---|
| Use Case ID | SM-UC-6 |
| Use Case Name | Change the Mass Calling Threshold Data |
| Use Case Description | The administrator changes the default values of Mass Calling Threshold Data like Surveillance Threshold, Control Threshold and Initial Gap Interval in the CCS network of its SCPs. |
| MFS Reference | MFS 37 |
| Actor(s) | User (disclosed embodiment administrator) System (disclosed embodiment) |
| Functional Category | SM - SCP Management. |
| Pre-Conditions/ Assumptions | The CCS Network ID has already been defined in the system. User can update the threshold values even when the SCPs may be overloaded. User has logged on to embodiments of the system and has permissions to perform the requested action. |
| Post-Conditions | The Mass Calling Threshold values may be updated. |
| Interface Considerations | The user should be connected via a HUI (Human User Interface) to access the system. |
| Primary Flow | 1. The user enters the CCS network ID, for which the thresholds need to be defined. 2. In embodiments, the system verifies if the user has permission to manage the above CCS network ID. 3. The user initiates to modify the Surveillance threshold data of a CCS network. 4. In embodiments, the system checks if the surveillance threshold values changed by the user for threshold levels 1 through 14 increases or remain the same with each threshold level increase and may be greater than their associated surveillance thresholds. Threshold level 15, which is used for study purposes and tele voting, is excluded from these cross field validations 5. The user now modifies the default Control threshold data. 6. In embodiments, the system checks if the control threshold values changed by the user for threshold levels 1 through 14 increases or remain the same with each threshold level increase and may be less than their associated control thresholds. Threshold level 15, which is used for study purposes, is excluded from these cross-field validations. 7. The user may also enter a value as initial gap interval. 8. The user submits all these changes to the system. 9. In embodiments, the system validates the information provided and interacts with all the SCPs. 10. In embodiments, the system sends these changes to all the SCPs in the CCS network and returns a confirmation message of the updated values. |
| Alternate Flows | E1: At Step 1, if the CCS Network ID is not found, embodiments of the system cannot allow the user to modify the threshold values. E2: At Step 4, if system validation fails, then embodiments of the system cannot allow the user to modify the threshold values. E3: At Step 6, if system validation fails, then embodiments of the system cannot allow the user to modify the threshold values. E4: At Step 9, if system validation fails, then embodiments of the system cannot allow the user to modify the threshold values. E5: At Step 10, if the SCP(s) fails to interact with embodiments of the system or does not accept the information, then embodiments of the system cannot allow the user to modify the threshold values. In all cases, an error indication is returned to the user and further processing stops. |

The Excessive Calling Controls may be used to set and change the calling thresholds for 6-digit and 10-digit vacant toll-free and out of area numbers. These excessive calling thresholds may be expressed in terms of the number of call attempts in a defined time interval (for e.g., 5 minute period). When the thresholds may be met, the numbers may be added to the control list and the calling rate is automatically limited by the SCP. In addition, a threshold is defined to automatically take these numbers off of the control list, when the calling rate decreases sufficiently.

The disclosed embodiment does not enforce the ACG (Automatic Call Gapping). A set of control parameter thresholds may be used to invoke the ACG. Once the thresholds may be reached, the ACG is triggered at the SCP-SSP level.

| | |
|---|---|
| Use Case ID | SM-UC-7 |
| Use Case Name | Changing Excessive Calling Controls |
| Use Case Description | The administrator or a network manager change the control and decontrol threshold values for a 6-digit and 10-digit vacant toll-free numbers. |
| Actor(s) | User (disclosed embodiment administrator/network manager) System (disclosed embodiment) |
| Functional Category | SM - SCP management. |
| Pre-Conditions/ Assumptions | The SCP to be defined should belong to the user's CCS network. User has logged on to embodiments of the system and has permissions to perform the requested action. User can override the threshold class assignments even when the SCP is overloaded. |

-continued

| | |
|---|---|
| Post-Conditions Interface Considerations Primary Flow | The desired controls of calling threshold for the vacant toll-free number may be changed.<br>The user should be connected via a HUI (Human User Interface) to access the system.<br>1. The user enters the CCS network ID, for which the thresholds need to be defined.<br>2. In embodiments, the system verifies if the user has permission to manage the above CCS network.<br>3. The user enters the SCP ID to set the Excessive Calling Thresholds.<br>4. User enters the control and decontrol threshold values.<br>5. The user updates the entered values.<br>6. In embodiments, the system validates the information provided and interacts with all the SCPs.<br>7. In embodiments, the system sends the updated threshold values to the desired SCP and returns a confirmation message of the updated control thresholds. |
| Alternate Flows | E1: At Step 1, if the CCS Network ID is not found, embodiments of the system cannot allow the user to modify the threshold values for vacant toll-free numbers.<br>E2: At Step 2, if system validation fails, then embodiments of the system cannot allow the user to modify the threshold values for vacant toll-free numbers.<br>E3: At Step 3, if the SCP ID entered incorrect or does not belongs to the CCS network, then embodiments of the system cannot allow the user to modify the threshold values for vacant toll-free numbers.<br>E4: At Step 6, if system validation fails, then embodiments of the system cannot allow the user to modify the threshold values for vacant toll-free numbers.<br>In all cases, an error indication is returned to the user and further processing stops. |

The Special Studies Request is done when a potential problem is suspected in the network and is done by sampling traffic to a specific number, Telecom Owner Operator Network or an SSP (Service Switching Point). A toll-free service provider, administrator, or a network manager can request an SCP owner operator for a special study into their SCP and they can either accept or reject the request to enable the study.

The study is conducted to allow a maximum of 100 calls in a maximum duration of 168 hours (7 days), which ever limit is reached first i.e., the collection of data can end when the specified number of call attempts have been monitored, or when the specified time limit is reached first.

The special study can be requested for a toll-free number, Destination Telephone Number, carrier, or for an SSP. A toll-free number or a Destination Telephone Number of either 6-digit (NPA-NXX) or a full 10-digit number (NPA-NXX-XXXX) can be requested for the study.

An example use case to Create a Special Study Request is as follows:

| | |
|---|---|
| Use Case ID | SM-UC-8 |
| Use Case Name | Create a Special Study Request |
| Use Case Description | The disclosed embodiment administrators or network managers create a Special Study Request for one or more SCPs |
| Actor(s) | User (disclosed embodiment administrator/network manager)<br>System (disclosed embodiment) |
| Functional Category | SM - SCP management. |
| Pre-Conditions/Assumptions | The network manager creating the special study should belong to the same CCS Network as the SCPs at which the study is requested.<br>User has logged on to embodiments of the system and has permissions to perform the requested action. |

-continued

| | |
|---|---|
| | The study is conducted to allow a maximum of 100 calls in a maximum duration of 168 hours (7 days), which ever limit is reached first i.e., the collection of data can end when the specified number of call attempts have been monitored, or when the specified time limit is reached first. |
| Post-Conditions | The Special Study Request is created in the desired SCPs. |
| Interface Considerations | The user should be connected via a HUI (Human User Interface) to access the system. |
| Primary Flow | 1. The user enters the CCS network ID, for which the Special Study need to be defined.<br>2. In embodiments, the system verifies if the user has permission to manage the above CCS network Id.<br>3. The user enters the SCP ID for the Special Study.<br>4. In embodiments, the system verifies if the user has permission to manage the above SCP ID.<br>5. For one or more desired SCPs, the user requests a special study for a certain 10-digit or 6-digit toll-free or destination code, carrier, or SSP.<br>6. The user submits the request to the system.<br>7. In embodiments, the system validates the special study and interacts with the SCP.<br>8. In embodiments, the system accepts the information, activates the study at the SCPs, and returns a confirmation message to the user.<br>9. At the end of the special study, embodiments of the system sends the results of the special study to the user. |
| Alternate Flows | E1: At Step 1, if the CCS Network ID is not found, embodiments of the system cannot allow the user to create a special study.<br>E2: At Step 2, if system validation fails, then embodiments of the system cannot allow the user to create a special study.<br>E3: At Step 4, if the SCP ID entered incorrect or does not belong to the CCS network, then embodiments of the system cannot allow the user to create a special study.<br>E4: At Step 8, If the Special Study limit maximum allowed quantity for an SCP has been exceeded, embodiments of the system rejects the request and indicates this to the User.<br>E5: At Step 8, if system validation fails, then embodiments of the system cannot allow the user to create a special study.<br>In all cases, an error indication is returned to the user and further processing stops. |

In embodiments, the system is operable to generate a billing event record whenever an event occurs that results in a charge to toll-free service provider entity in control of a toll-free number. Billing event records may be collected and transferred to an external billing system. Currently, not all billable events result in a billing event record being generated by embodiments of the system and a manual Billing event record may be generated external to the current system. It may be desirable to automate the creation of as many of the billing event records as possible.

In embodiments, the system generates a record when an event related to a billable function occurs. The event record can provide the information needed to calculate a bill for the charges incurred by each organization that makes use of the embodiments of the disclosed architecture according to embodiments. The event record can include the identification of the user, the action performed, and the date and time of the occurrence.

| Events Related to Billing Calculations per FCC Tariff | | | |
|---|---|---|---|
| | Supported Billing Calculation | | |
| Event | Non-Recurring Charge | Monthly Charge* | Notes |
| Establishment of a system Logon ID | Charge per Logon ID | Non-dedicated access charge | Billing event data currently provided by the TFMP Help Desk/Data Center, no record generated by disclosed embodiment |
| Suspension of System Access | None | Non-dedicated access charge | Billing event data currently provided by the TFMP Help Desk/Data Center, no record generated by disclosed embodiment |
| Re-establishment of System Access | Service restoration charge | Non-dedicated access charge | Billing event data currently provided by the TFMP Help Desk/Data Center, no record generated by disclosed embodiment |
| Deletion of a System Login ID | None | Non-dedicated access charge | Billing event data currently provided by the TFMP Help Desk/Data Center, no record generated by disclosed embodiment |
| Assignment of a Smart Card for System Access | Charge per Smart Card | Non-dedicated access charge | Billing event data currently provided by the TFMP Help Desk/Data Center, no record generated by disclosed embodiment |
| Establishment of a Dedicated Interface | None | Dedicated access charge | Billing event data currently provided by the TFMP Help Desk/Data Center, no record generated by disclosed embodiment |
| Deletion of a Dedicated Interface | None | Dedicated access charge | Billing event data currently provided by the TFMP Help Desk/Data Center, no record generated by disclosed embodiment |
| Reservation of a Number | None | Customer Record Admin charge | Billing event record generated by system |
| Number Status Changed to Spare | None | Customer Record Admin charge | Billing event record generated by system |
| Report Request | Charge per report | None | Billing event data currently provided by the TFMP Help Desk/Data Center, no record generated by disclosed embodiment |
| Change of Toll-free Service Provider for a Number | Charge per toll-free service provider change per number | Customer Record Admin charge* | Billing event record generated by system |
| Bulk Operation Request | Non-recurring charge per bulk operation | None | Billing event data currently provided by the TFMP Help Desk/Data Center, no record generated by disclosed embodiment |

NOTE:
A tariff may define dedication and non-dedicated access as follows: "Access to TFMP can be via non-dedicated or dedicated connections. Dedicated access requires use of a dedicated port on the disclosed embodiment on a full-time basis, other forms of access share ports and other access resources."

The interface to the billing system should remain intact and require minimal changes to the current billing system to support disclosed embodiments. The current Billing system Interface format of the file and the records it contains is described in TM-NWT-021766, and TFMP-Bill/800 Interface Requirements.

A summary of the current Billing Event record data elements may be as follows:

| Billing Event Record Data Elements | | |
|---|---|---|
| Billing Event | Data Element | Description and Usage |
| Toll-Free Number Billing Event | Date and time of event | |
| | Controlling toll-free service provider entity | Current toll-free service provider entity associated with toll-free number |
| | Toll-free service provider unit | Current toll-free service provider Unit associated with toll-free number |
| | Responsible user login ID | Identifies user who initiated event, indication of "system" for system initiated events |
| | Toll-free number | Number involved in billing event |
| | Toll-free number current status | Status of toll-free number involved in billing event |
| | Toll-free number previous status | If event involves a status change |
| | Previous toll-free service provider entity | If event is toll-free service provider entity change |
| | Previous toll-free service provider unit | If event is toll-free service provider Unit change |
| System Access Billing Event | Date and time of event | |
| | Access type | Indicates the type of access involved in the billing event - login ID, dedicated, Smart Card |
| | Toll-free service provider entity | Toll-free service provider entity involved in access event |
| | Access action | Indicates action taken regarding the access type - suspend, restore, delete |
| | Access identifier | Identifier for the access involved in the billing event (i.e., login ID), value of "All", and others can be used for suspend and restore actions |
| Report or Bulk Operation Event | Date and time of event | |
| | Toll-free service provider entity | Toll-free service provider entity requesting report of bulk operation |
| | Responsible user login ID | Identifies user who requested report or bulk operation |
| | Report or operation requested | Report or bulk operation requested |

Billing Event records illustrate changes to toll-free service provider entity control of toll-free numbers that may be used to calculate charges to toll-free service provider Entities. On a periodic basis and in response to an on-demand request, embodiments of the system can compile a list of toll-free numbers with the controlling toll-free service provider entity, current status, and date the number entered that status and transfer the data to an external billing system. Only numbers with a controlling toll-free service provider entity may be included.

In one example, a system administrator can specify when billing audit data is to be collected and transferred. It is also possible to make an on-demand request for data to be collected and transferred as in the example use case as follows.

| | |
|---|---|
| Use Case ID | BR-UC-1 |
| Use Case Name | Schedule Periodic Billing Audit Data Collection and Transfer |
| Use Case Description | Administrator specifies the frequency for the collection of billing audit data and the timing for the data to be transferred. |
| Actor(s) | User (disclosed embodiment administrator) System (disclosed embodiment) |

| | -continued |
|---|---|
| Pre-Conditions and Assumptions | The User has logged into the system. In embodiments, the system has verified identity and permissions of the specific user. |
| Post-Conditions | Billing audit data collection frequency and transfer time for billing data may be set. |
| Interface Considerations | None identified |
| Primary Flow | Step 1 The User enters the billing audit data collection frequency and the corresponding transfer. Possible values are: None (audit data not collected) Weekly with day of week and time of day for collection and transfer[1] Monthly with date of them month and time of day for collection and transfer Step 2 In embodiments, the system verifies that the data entered is valid and provides a response that the collection frequency and transfer time is accepted. |
| Alternate Flows | E1: At Step 2, embodiments of the system notify the user if data entered is not correctly formatted. |

Due to the localized nature of call routing prior to the introduction of centralized routing databases, the same toll-free number may need to be controlled by a different toll-free service provider and provide service to a different toll-free subscriber in different geographic regions. In some instances arrangements still exist where the same number supports different toll-free service in different U.S. states and different service in the U.S. and Canada and other jurisdictions. A number involved in this type of arrangement is referred to as a duplicate number. The terms toll-free number, toll-free system, toll-free telecommunications network, toll-free carrier, and related terms as used herein are not limited to the United States or North America, but have equivalents throughout the world in other political, geographic, and technological regions. The methods, systems and functionalities, as described herein, are applicable to and operable within such equivalent jurisdictions.

On a periodic basis, embodiments of the system can compile a list of duplicate numbers and transfer the data to an external billing system. The data consists of the toll-free number providing duplicate service, the toll-free service provider entity for the number, the current status of the number, and data related to the Customer Record for the number. The CR data includes the status of the CR and the effective date and time of the CR. For the current system, this also includes indications if the CR includes Call Processing Record (CPR) and Label Definition (LAD) structures. Additional data is included from remarks entered in the CR that indicates the actual toll-free service provider that controls the number for each area where service is provided.

In embodiments of the disclosed architecture a subset of the series of reports can be provided. The system will provide a warehouse of data for reporting and analytics. The warehouse will enable a user to pull either standard (aka canned) reports or to generate user specific reports. Listed below are a series of reports that the current TFMP system provides. As an example of what reporting may be required, is a high level description of the reporting of the disclosed embodiment provides the following types of reports:

| Report Type | Description |
|---|---|
| On-demand Reports | The disclosed embodiment generates on-demand report when a "system user" requests the report. The on-demand reports may be not stored in the disclosed embodiment since they may be created on user's request. Results of the on-demand reports may be not stored in the disclosed embodiment |
| Scheduled Reports | The scheduled reports may be generated by the disclosed embodiment operational personnel on scheduled basis (i.e., daily, weekly, monthly, etc.). A user can request a scheduled report to get the most recently generated report by the disclosed embodiment. Results of the scheduled reports may be stored in the disclosed embodiment. |
| Exception Reports | Reports that may be automatically generated by the disclosed embodiment when exclusive events occur either in the disclosed embodiment or in an SCP. The exception reports may be sent to the user's designated address information provided by the "system user" to the disclosed embodiment. |
| Industry Reports | Reports required by the Industry: Weekly Number Admin Report - Distributed to industry, including FCC Auto Return to Spare Report - Distributed to FCC monthly, identifies TFNs in reserved status that have exceeded the 45 day limit and may be automatically returned to the spare pool |
| Miscellaneous Reports | Reports may be requested by the user himself through accessing the database tables and extracting the information needed through querying data |

Most scheduled reports can also be accessed on-demand. The differences are how the report is kicked off and where the results of the report are sent/stored. The reports below are required at a minimum, but the Provider is expected to propose additional reports, for example:

| Report type | Specific Reports |
|---|---|
| Network Management Reports | Mass Calling Summary for Toll-Free Numbers Under Control report. This report is available on-demand. Summary for Out of Area Toll-Free Numbers Under Control report. This report is available on-demand. Summary for Vacant Codes Under Control report. This report is available on-demand. Manual Control List report. This report is available on-demand. Special Studies List report. This report is available on-demand. Special Study Summary report. This report is available on-demand. POTS Number to Toll-Free Number Inquiry report. This report is available on-demand. SCP List report. SSP List report. |
| SCP Administration Reports | Customer Record Execution Error Summary report. Low Sample Space Summary report. Misrouted Query Summary. SCP Values Audit report. SCP NPA-NXX List report. SCP NPA-NXX List Audit report. SCP Status report. SCP Status Audit report. TFMP SCP CR Confirmation. |
| Number Administration Reports | Approaching Due report. Unavailable Numbers report. Reserved Numbers report. Assigned Numbers report. Transitional Numbers report. Number Administration Summary report. Daily Log Number Administration report. Daily Log Summary of Number Administration report. TFMP Number Administration Confirmation report. |

-continued

| Report type | Specific Reports |
| --- | --- |
| Customer Record Reports | CAD Only report.<br>CPR Only report.<br>LAD Only Report.<br>PAD Only Report.<br>TAD Only Report.<br>Whole Customer Record Report.<br>Whole Template Record Report.<br>Customer Record Audit Results report.<br>Customer Record Activation reports.<br>Area of Service Label List reports.<br>Deficient Customer Record report.<br>Destination NPA-NXX Report.<br>POTS to Toll-Free number Inquiry Report.<br>Sending Customer Record Report.<br>AOS Label to Toll-Free Number Inquiry (AIR).<br>Template Records List Report.<br>Pointer Records List report.<br>Daily Log of Customer Record report.<br>Daily Log Summary of Customer Record.<br>Validation Results report.<br>Affected CR By NPA-NXX-LATA Activity.<br>Failed CR By NPA-NXX-LATA Move report.<br>Directory Assistance NPA Selection List.<br>Carrier Information List.<br>CCS Network-State-NPA Report.<br>CCS Network-LATA Report.<br>Toll-free service provider List report.<br>Logon ID List report.<br>Telephone Company List report. |
| Carrier Notification and Approval Reports | Allowable CICs for CR Input & Approval report |
| Administration Reports | Scheduled Activities report is an on-demand report.<br>NXX Percent Used report.<br>SCP-SMS Audit Results report.<br>Security User Data report. |
| Service Maintenance Reports | Past Due toll-free service provider Change Requests report.<br>Denied toll-free service provider Change Requests report. |

The Exception reports may be automatically generated by embodiments of the system when exclusive events occur either in the disclosed embodiment or in an SCP. For example, the Misrouted Queries Exception Report is sent each time an SCP receives a call processing query for a toll-free number having NXX not in the SCP's database.

| Report type | Specific Reports |
| --- | --- |
| Network Management Exception Reports | SCP Status Change report.<br>Threshold Level Class Override report.<br>Failed Requests report. |
| SCP Administration Exception Reports | Customer Record Execution Error report.<br>Low Sample Space Exception report.<br>Misrouted Query Exception report. |
| Customer Record Exception Reports | Customer Record Activation Failure report.<br>CNA toll-free service provider Change Notification to Involved Carriers report. |
| Security Administration Exception Reports | Unsuccessful Logons.<br>Unsuccessful Password Change. |

The user can query the database tables and extract information, as mentioned in the following examples:

In embodiments, the system logs specific number administration events as history records e.g., status change and ownership changes. The users can access this data to create their own reports.

In embodiments, the system logs specific customer record events as history records e.g., status change and ownership changes. The users can access this data to create their own reports.

In embodiments, the system logs logon ID locking history that the administrator can access and query reports from.

In embodiments, the system logs specific template record events as history records e.g., status change and ownership changes. The users can access this data to create their own reports.

There may be additional features that the embodiments of the disclosed architecture may support such as the examples which follow:

| Reporting - New Feature Set | | |
| --- | --- | --- |
| NFS # | Function | Description |
| NFS 14 | Toll-free Provider Dashboard | Currently, toll-free provider reporting data is not available for up to 24 hours. The embodiments of the disclosed architecture should provide to its users the ability to obtain status information about is numbers, number statuses, recent activity, and other relevant information in near real time. This should be done via a feature called the toll-free provider dashboard. |

The system will provide a platform for Analytics of TFMP data and usage. The Analytics platform should be flexible in providing some canned analytics as well as to allow the user to define and produce analytics on an ad hoc basis. The analytics should be able to be reports on current day actions as well as historical actions. Categories of analytic reports are:

Individual toll-free Provider specific information on usage, TFNs, activity

All or multiple selected toll-free providers information on usage, TFNs, activity SCP activity System performance information In embodiments, the system is architected, designed, and implemented with security as a key attribute. The system shall ensure the confidentiality, integrity, and availability of information assets. Controls will be implemented that protect IP and data against unauthorized use, disclosure, transfer, modification, or destruction. Measures will be implemented such that legitimate users continue to have access to the system for the expected services levels. The security functionality will address two perspectives. One is the potential security threats and types of attacks that may be targeted at the system or service. The other is a framework for a systematic analysis of the measures available to protect the system or service from attack. One is the potential security threats and types of attacks that may be targeted at embodiments of the system or service. The other is a framework for a systematic analysis of the measures available to protect embodiments of the system or service from attack.

All aspects of a system, including the physical plant and facilities, operating system and application software, signaling interfaces and protocols, operations interfaces for configuration, surveillance, and administration, and data storage and processing functions, have security vulnerabilities that could potentially be exploited.

At a high-level, the security threats include: damage or destruction of information and/or other system or service resources, corruption or modification of information, illicit use, theft, or removal of information and/or other system or service resources, disclosure of information, and denial or interruption of services.

A security framework identifies the aspects of a system or service that require security and the methods available to address the security threats for each. From a security perspective, a system or service can be viewed as consisting of User, Control and Management planes. Each plane includes infrastructure, services, and application layers.

Security services provide capabilities to prevent attacks. At each plane and layer, one or more of the following example security services may be applicable:

| Service | Description |
| --- | --- |
| Authentication | Authentication is used to validate the identity presented or asserted by an entity attempting to initiate communications with a system or service or identified as the source of data presented as input to a system or service. Peer entity authentication occurs at the initiation, or potentially during, communication between entities. Authentication can be one-way or mutual. Data origin authentication attempts to verify the source of data. |
| Access Control | Access control is used to protect against unauthorized access to system resources, including functional components, stored information, information flows, services, and applications. Role-Based Access Control (RBAC) is a mechanism to provide different levels of authorization based on the entity attempting to gain access and the function or information to be accessed. RBAC is configured based upon the designated role or job function of the entity accessing the system |
| Data Confidentiality | Data confidentiality prevents unauthorized disclosure of data. Mechanisms for data confidentiality apply for data stored by a system and data as it is being transferred from or to a system. Confidentiality can apply for selected fields of data as well as protect information that can be derived from observation of traffic flows |
| Integrity | Data integrity focuses on modification, insertion, deletion, and replay of data. Like confidentiality, data integrity can apply for stored data, data as it is transferred, and for selected data elements or fields. Data integrity mechanisms may include capabilities for data recovery. |
| Non-repudiation & Logging | Non-repudiation provides a means to verify the entity involved in messages or data exchanges or responsible for activities performed by the system. A receiver of data can be provided with proof of origin of the message, while a sender can be provided with proof of receipt. Audits and logs support non-repudiation for access to embodiments of the system and actions taken by users. |
| Communication Security | Communication security ensures that information is exchanged only between authorized endpoints and is not diverted or intercepted |
| Availability | Security measures associated with availability may be intended to ensure there is no denial of authorized access to system functionality and stored information due to events impacting the system |
| Privacy | Sensitive information about a system and its users should be protected. Privacy is concerned with protecting information so that it cannot be gathered through network observation or other means. |

Requirements - Minimal Feature Set

| MFS # | Sub Function | Description |
| --- | --- | --- |
| MFS 39 | Authentication & Access Controls | The system shall require authenticated identity to allow access to the system.<br>The system shall use role-based permissions to control access to system functions and data.<br>The system shall support the modification of user credentials via automated password reset as well as Password reset from a system help desk.<br>The system will support user ID locking/unlocking for reasons typically such as non-payment or 6 months of non-use.<br>The system shall allow an authorized TFMP Administrator to perform the following functions:<br>    Remove a lock from a specific user ID(s)<br>    Manually lock a specific user ID(s)<br>    Manually exempt a specific user ID(s) from being automatically locked<br>The system shall automatically close user sessions due to an extended period of inactivity. The system will provide capability to configure the 'inactive time' after which user sessions are closed.<br>The system shall support capabilities to detect, provide notification and proactively manage a |

Requirements - Minimal Feature Set

| MFS # | Sub Function | Description |
|---|---|---|
| | | potential DoS (Denial of Service) attack. The system shall track login account type and permissions by interface. |
| MFS 40 | Data Confidentiality, Integrity and Availability | The system shall restrict the access and display of stored data to maintain data confidentiality based on authenticated and authorized identity. The system shall use firewalls and virus protection software to protect against corrupt or malicious software. The system shall ensure information integrity, accuracy and consistency is maintained over its life cycle. Information cannot be modified in an unauthorized or undetected manner. The system shall be available when it is needed. This means the system with its data, security controls and communication channels must be functioning correctly at all times as specified by the SLAs. |
| MFS 41 | Communication Security | The system shall provide for encryption for data transferred across interfaces that cross trust domain boundaries. All sensitive information will be protected with transmission encryption. |
| MFS 42 | Non-repudiation & Logging | The system will generate a log message for actions taken by users that identify the user, the interface, the action taken and parameters provided by the user, and the date and time. The system will log all potential, suspected or know security incidents. The system must be able to integrate with Incident management tools. |
| MFS 43 | Password policy compliance | The system shall allow for configurable password rules and will force users to change passwords periodically and enforce minimum password strength requirements. The system shall encrypt all passwords. |
| MFS 44 | Role Based Access Control | Create, Manage, Assign roles to users including RO's, Carriers, SCP O/O, Ops. Permissions will be based upon Roles. |
| MFS 45 | Support Tariff Requirements | There is proprietary info per a tariff that needs to be maintained such as logon ID codes, list of customers, CPRs information & other related information capable of being displayed in tabular form |
| MFS 56 | Audit requirements | The system shall maintain audit trail of all transactions that result in access, modification and/or deletion of information. The audit trail should have the following minimum information<br>Type of event<br>Date time of event<br>Source of the event<br>Outcome of the event<br>Identity of user/subject associated with the event<br>Audit logs must be read-only and protected from unauthorized access. |
| MFS 57 | Physical Security | The system shall be housed in a secure facility with physical safeguards and access controls. Unauthorized access to the facility housing the system will not be permitted. |
| MFS 58 | Vulnerability Management | The system shall expect security patches (application and infrastructure software included) to be applied on a regular basis. And should be architected to minimize downtime during these events. Application code will be regularly scanned with at least one static code analysis tool to ensure good security practices are being followed. All assets will be regularly scanned to ensure no malware or trojans are present. A proactive threat management solution (e.g.: SIEM) shall be implemented to identify threats and manage compliance |
| MFS 59 | Backup and Disaster Recovery | The system shall be architected to continue functioning even in case of a disaster at its primary site. The system and its data will be regularly stored at an off-site location. Backup mechanism and procedures should be developed, documented and implemented as part of the solution. |

There may be additional features the embodiments of the disclosed architecture may support such as the examples that follow:

system Security - New Feature Set

| NFS # | Function | Description |
|---|---|---|
| NFS 15 | Single Sign-on | In embodiments, the system may authenticate the source for all attempts to access embodiments of the system via multi-factor authentication. Methods include, but may be not limited to items such as a certificate provided by a credentialing authority, a login ID and password or other known approaches. |
| NFS 16 | Self-Serve Password Reset | Provide the ability for self-service password resets and the ability to unlock logon IDs when all issues with it have been resolved without Help desk intervention. |
| NFS 17 | Additional User Management | Allow a toll-free provider the ability to identify a "super user" ID for their organization and allow the super user additional capabilities in managing the users under this provider. These capabilities could include, but may be not limited to:<br>Deactivating user IDs<br>Activating user IDs<br>Resetting passwords<br>Restricting access (i.e., can search, but not reserve, cannot modify an existing record, can only search and not create customer records, |

Some primary functions provided by the embodiments of the disclosed architecture include the ability to search for and reserve toll-free numbers and provision customer records that may be uploaded to SCPs to enable toll-free service. This can be done via an online interface (HUI) as well as by a machine-to-machine (API) interface. These interfaces allow manual and mechanized access to embodiments of the system for these functions such as those that follow:

Requirements - Minimal Feature Set

| MFS # | Sub Function | Description |
|---|---|---|
| MFS 47 | Number Administration | Online ability to provide all the user functionality described in the Number Administration section of this document. |
| MFS 48 | Customer Record | Online ability to provide all the user functionality described in the Customer Record Administration section of this document. |
| MFS 49 | System Administration | Online ability to provide all the user functionality needed to perform embodiments of the system administration functions of this system. |
| MFS 50 | Reporting | Online ability to provide all the user functionality described in the Reporting section of this document. |

| | | Requirements - New Feature Set |
|---|---|---|
| MFS # | Sub Function | Description |
| NFS 19 | Single Sign-on | Allow the ability for a user to login once and have access to any and all areas of the system that they have permission to access without a separate login. |
| NFS 20 | Ease Of Use | The user and administrator interfaces should be designed in such a way as to provide an easy and intuitive interface for users. Considerations should include, but are not limited to:<br>Prompts for entries<br>Intuitive defaults based upon user characteristics.<br>Suggestive entries based upon previous user actions. |

The embodiments of the disclosed architecture may include a Web Services API for functionality supported in the Human User Interface (HUI).

The Human User Interface (HUI) provides user interface functions to the human users to access the system. The HUI may be accessed by many types of users. For example, a user can be administrator, a toll-free service provider user, SCP administrator, and network manager. Access to the HUI functions by a user can depend on the security permissions that have been assigned for the user by the administrator.

The HUI provides the following logical groups of functions which can be accessed by a user: User Profile and Security Administration; Number Administration Customer Record Administration; SCP Management; Reports; and Administration The administrator and/or others may use the user profile and security administration functions provided by the HUI to protect embodiments of the system data from being viewed or updated/deleted by unauthorized users. The user profile and security administration grants permissions to different groups of users to access embodiments of the system to create, view, update and activate certain functions. The system can implement a role-based access control mechanism.

The HUI provides functions to perform number search, reserve or cancel reservation for one or more toll-free numbers, change parameters associated with already reserved numbers, and query numbers for determining the number status and other number administration parameters. The HUI interacts with the "Number Administration Requirements" functional area to perform the number administration functions.

The HUI interacts with the "Customer Record Administration" functional area to perform the functions described in this section.

The CAD function is used to enter the date and time for the toll-free number service, subscriber/customer information for the toll-free number, the Areas of Service (AOS) to be supported for the toll-free number, the carriers that, and others can be used to route calls to the toll-free number, and other associated service data for the toll-free number.

An example CAD can be associated with a Call Processing Record (CPR) for complex call routing data and can be associated with a Labels Definition (LAD) record for additional complex call routing data that is entered on the CPR.

The HUI interacts with the "SCP Management Requirements" functional area to perform the Service Control Point administration and network management functions.

The administrator or other toll-free service provider's users can request the Scheduled and On-demand reports via the Report Request function of the HUI. The HUI interacts with the "Reporting Requirements" functional area to perform RRR request.

The disclosed embodiment Administration functions of the HUI may be used for Bulletin Board Messages, System Processing Options (SPO) and Downtime/Default Effective Time for CR (DDT). An Administrative Console may facilitate the system administrators and Help Desk personnel administrative functions for managing the system.

There may be additional features the embodiments of the disclosed architecture may support such as the examples that follow:

| | | Administration Features Requirements - New Feature Set |
|---|---|---|
| NFS # | Function | Description |
| NFS 18 | Click to Chat | Enable end users to quickly contact a support representative through the user interface. This feature can provide an immediate channel to a support representative. |

Figure 46:
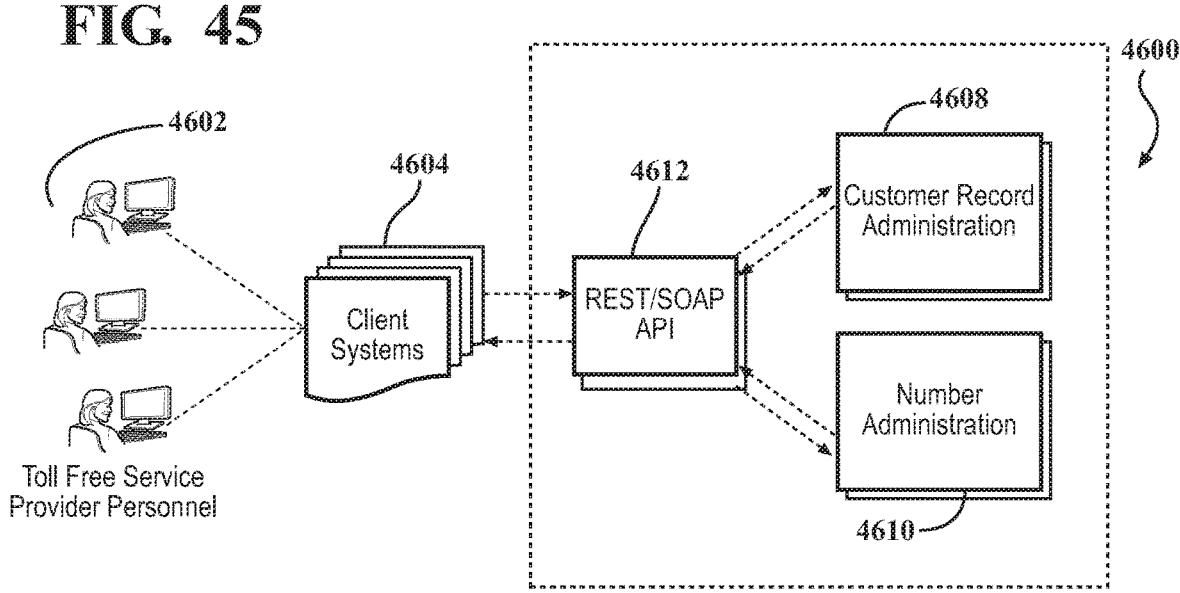
FIG. 46 depicts a schematic of an API interface used by Customer Record Administration and Number Administration components of the disclosed embodiment.

The API interface 4600 operates as a liaison between the toll-free service provider client systems (CS) 4602 and the disclosed embodiment (disclosed embodiments), thereby providing a mechanism through which interactions between the client systems 4604 and embodiments of the architecture can take place. The API interface 4612 may, for example, be used by Customer Record Administration 4608 and Number Administration 4610 components of the disclosed embodiment on one end, and the toll-free service provider client systems on the other end. This interaction is schematically illustrated in FIG. 46.

It is expected that disclosed embodiments can define a REST/SOAP API for machine interfaces. There is a current Mechanized Generic Interface (MGI) interface that supports many of our customers today and the embodiments of the disclosed architecture according to embodiments. The MGI interface is being used across the network by all client systems and there has to be backward compatibility. The move from MGI to an API interface cannot be overnight and has to be phased accordingly. The MGI Interface specification is available in SR 4592 MGI Interface specification.

In embodiments, the system provided alerts for certain situations. These alerts can be in the form of emails or via a logon notification or a console alert. Examples of these alerts may include:

| | | Requirements - Minimal Feature Set |
|---|---|---|
| MFS # | Sub Function | Description |
| MFS 51 | API notifications | The system may support notifications back to the user when background functionality is completed. |
| MFS 52 | SCP queuing | If queue builds for a specific SCP toll-free service providers cannot see the confirmation of download and can tend to resend the CRs; an alert is sent to notify the community that the SCP is queuing. Not automated in current system. |
| MFS 53 | Report availability | Notification to user that a report is available |

-continued

Requirements - Minimal Feature Set

| MFS # | Sub Function | Description |
|---|---|---|
| MFS 54 | System outage notifications | Inform users when embodiments of the system can be down for scheduled maintenance. |
| MFS 55 | New feature or functionality notification | Let the users know that functionality is available. |

This section provides a summary of characteristics of reference data. This need not define the absolute data needs, but can provide some insight into the data stored and used.
Reference Data may fall into the following categories:
Network Administration reference data—primarily used to construct and/or validate Customer Records
CCS Network Information is used to identify the CCS network served by the SCPs
LATA to CCS Network Mapping is used to determine which networks and their SCPs can receive customer records for a specified LATA as the area-of-service
NPA to CCS Network Mapping is used to determine which CCS networks and their SCPs can receive customer records for a specified NPA as the area-of-service
Network Allowed Carriers is used to identify a subset of CICs that may be supported by a CCS network
NPA-NXX to LATA Information is used as reference data of NPA-NXXs in LATAs and the association with an Operating Company Number (OCN) code, Company Code (CO), and Effective Date
General reference data about each telecommunications carrier that may be involved in carrying toll-free calls and might thus be an involved carrier included in the CRs of various toll-free service providers:
Carrier Information
Toll-free service providers and associated carriers
Carrier Agreements with Entities For CR Input
Entity Agreements with Carriers for CR Input
IntraLATA carrier management reference data—Used to support Local-Exchange Carriers (LECs) and other network service providers with the capability to control and/or manage the use of their networks for IntraLATA toll-free calls to a destination POTS number that terminates on their network include:
Carrier Operating Company Numbers
Network Provider-SCP Owner/Operator Company Codes
Network Provider-SCP Owner/Operator Carrier Agreements
Network Provider-SCP Owner/Operator IntraLATA Agreements
Network Provider-SCP Owner/Operator IntraLATA Exceptions
Carrier IntraLATA Agreements
Carrier IntraLATA Exceptions
Toll-free Service Providers Allowed Carriers
Toll-free Service Providers Disallowed Carriers
Non-Functional Requirements
In order to run a system, there is a need to understand the performance requirements of embodiments of the system and the processing throughput. This includes embodiments of the system availability needs as well as the capacity and performance requirements. The performance of the system must meet or exceed the performance of the existing legacy system for all parameters described in this section.

This section addresses the expected availability of the disclosed embodiment. The approach used for this section is based on industry standards related to availability.

This section establishes an understanding of terminology and establish context in this area in order to provide clear requirements regarding the reliability of the disclosed embodiment. A defined time period is needed to support an availability measurement. A typical calculation involves setting an availability objective or determining the actual availability of a system or service over a year. It may be necessary to identify exclusions from the time period, such as planned periods when it is known that embodiments of the system or service cannot be available. It can also be specified that unexpected circumstances that would impact availability, such as excessive demand, unusual operating conditions, or unexpected or disastrous events (e.g., earthquake, fire etc.) may be to be excluded from availability calculations.

Discussion related to availability often involves a number of 9s, i.e., "five 9s" availability. This refers to an availability objective or measurement of 99.999%. Applied for a year, this means the availability subject can provide the expected functionality across the given domain for 525594.744 minutes and therefore not be available to provide the expected functionality across the given domain for 5.256 minutes during the year.

Availability: Definition

| Rating | UnPlanned | Planned |
|---|---|---|
| Very Good | Fewer than 61.32 hours* (99.3%) | Fewer than 200 hours |
| Outstanding | Fewer than 26.28 hours* (99.7%) | Fewer than 50 hours |
| Best in Class | Fewer than 4.38 hours* (99.95) | Fewer than 12 hours |
| Continuous Availability | Zero (100%) | Zero (100%) |

By definition, continuous availability is 100% IT service uptime
Based on 24/365 or 8,760 hours/year scheduled uptime When considering availability requirements, it is necessary to understand the functions it provides and its overall role in supporting toll-free service. Certain functions of the system, namely Number Administration, Customer Record Administration, and SCP Management, may be essential for supporting toll-free service. More specifically, the expected functions of embodiments of the system when it is available may be to:
Receive and process number search/reserve requests and customer record input and update requests;
Administer statuses for toll-free numbers and customer records based on user actions, effective dates and process rules applied by the system; and
Download customer record information to SCPs.
The disclosed embodiment may be considered an operations system. Unlike an SCP, it is not involved in real-time routing of toll-free calls. If this were not functioning, callers would still be able to make toll-free calls and the calls would be routed to the correct toll-free service subscriber. In embodiments, the system does, however, provide "real-time" services (such as toll-free number and customer record administration) to toll-free service providers. An additional consideration is that access to toll-free numbers may be provided to all users equally so that one toll-free service provider entity does not gain a competitive advantage over others for reserving desirable numbers. This underscores the importance of consistent availability across user interfaces.

| Category | Service | Requirement |
| --- | --- | --- |
| Availability | Unscheduled downtime for core functions and interfaces. Core functions are Number Administration, Customer Record Administration, SCP Management and any support functions that these core functions depend on (i.e., Authentication & Authorization) | Best-in-class availability defined as 99.95% (fewer than 262.8 minutes down per year, measured monthly) |
| | Unscheduled downtime for all non-core functions. Non-core functions can be identified as any function not identified as a core function (i.e., Reports, Billing). | Very good availability defined as 99.50% - (fewer than 2620.8 minutes down per year, measured monthly) |
| | Scheduled downtime for all functions and interfaces | Not to exceed on average 4 hours per month |

In embodiments, the system may also allow time and processing for the loading of industry reference data during routine maintenance windows.

Business continuity encompasses the strategic and tactical capability of the organization to plan for and respond to incidents and business disruptions in order to continue business operations at an acceptable predefined level.

Disaster recovery capabilities include the strategies and plans for recovering and restoring the organizations technological infrastructure and capabilities after a major system failure.

It may be necessary to establish objectives for unusual external events like earthquake or fire and non-routine activities like major infrastructure upgrades or transitions to new platforms. Overall solution design, including operations processes and procedures, may be needed to maintain business continuity during unusual circumstances and recover from disasters. Solution design considerations for business continuity and disaster recovery include geographic redundancy for solution components, deployment of backup systems and capabilities, and selection of the sites where equipment and operating personnel may be located.

Figure 47:
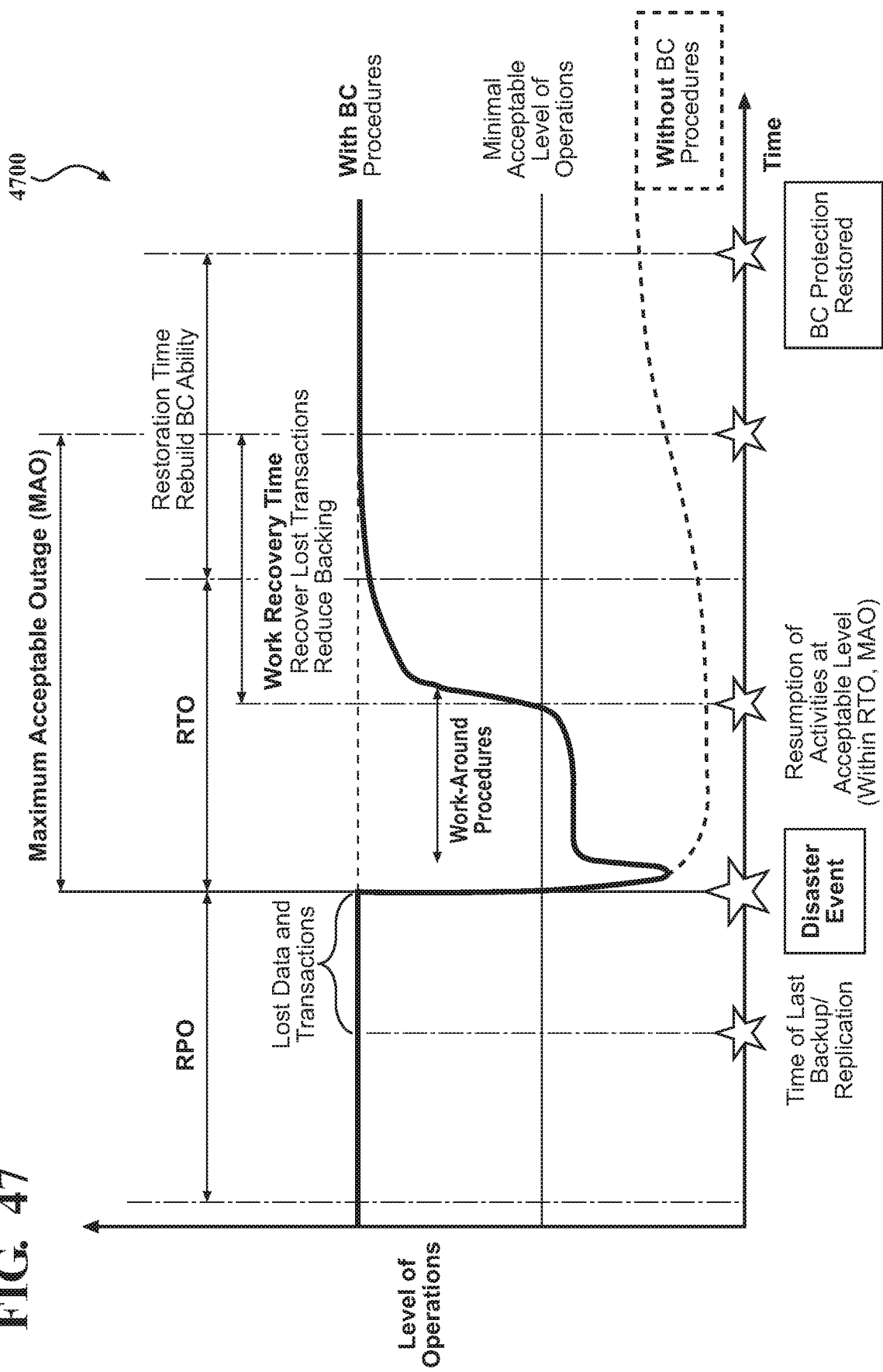
FIG. 47 depicts a schematic representation of a disaster recovery scenario.
Figure 48:
FIG. 48 is an example of hourly Responsible Organization Search activity.
Figure 49:
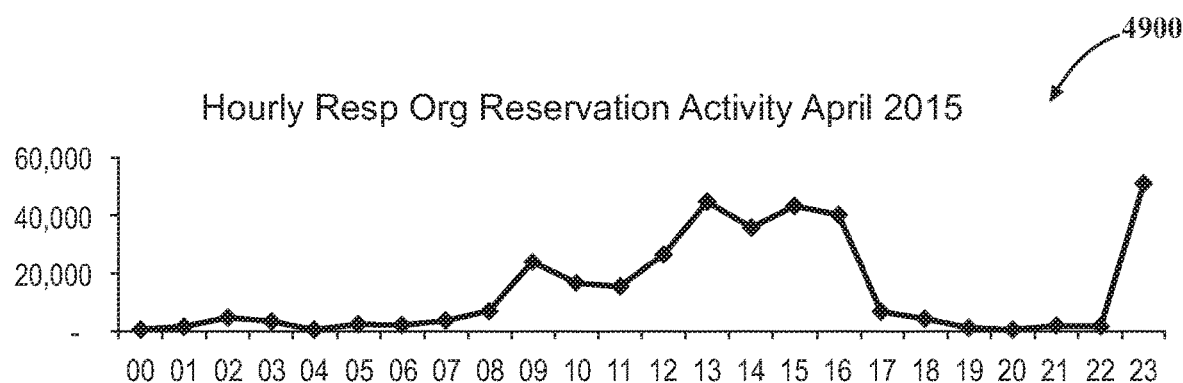
FIG. 49 is an example of hourly Responsible Organization Reservation activity.
Figure 50:
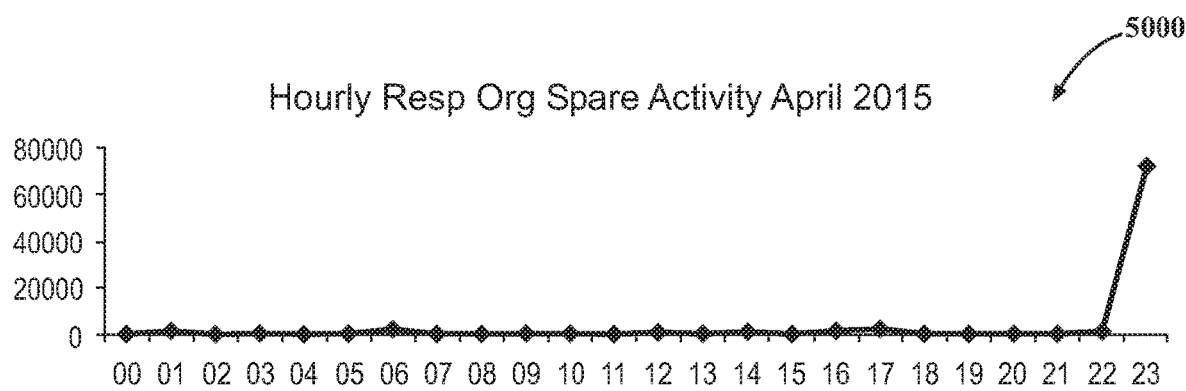
FIG. 50 is an example of hourly Responsible Organization Spare activity.
Figure 51:
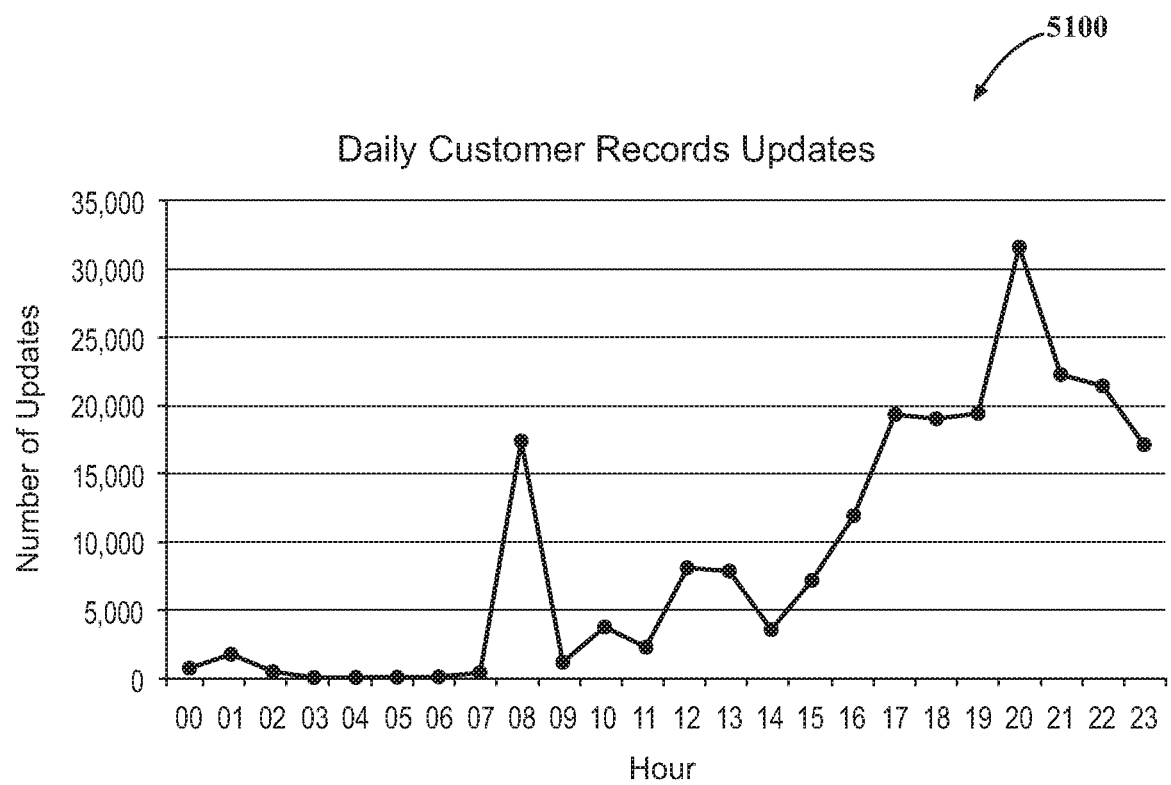
FIG. 51 depicts a graphical representation of daily customer records updates.

A pictorial view of a disaster recovery scenario is illustrated in FIG. 47 at 4700.

| Category | Service | Requirement |
| --- | --- | --- |
| Resiliency | System Recovery Time Objective (RTO) - Restore after a disaster or major disruption | Less than two (2) hours |
| | System Recovery Point Objective (RPO) - Maximum tolerable period in which data can be lost | 15 minutes |
| | Transaction error rate - percentage of transactions that may be not successful for any reason | Less than 0.001% |

In embodiments, the system can facilitate the required optimal use of disaster recovery sites and expenses such that analytics or other non-critical workloads can be run out of a warm/hot DR site, thus avoiding "Cold DR." Redundant/ disaster recovery site may be greater than 100 miles away (range listed in ISO 27001 as 30 to 100 miles)

Capacity planning involves a judgment regarding the anticipated usage of the functions of a system and a correlation to embodiments of the system resources needed to support the anticipated usage of a function. Based on the usage forecast, the quantity of each system resource needed to meet the demand is determined. Capacity is directly related to performance. If load or demand surpasses the level used to plan capacity, system resources can become overloaded and the ability of embodiments of the system to provide its intended function is likely to degrade. Once a system is operational, capacity management is a continuous operational process. Usage and performance may be monitored to recognize trends and capacity resource quantities may be adjusted accordingly. The objective is to maintain system performance and efficient use of resources as usage and demand change.

There may be a number of components that provide the resources needed to support the functionality provided by a system. Depending on embodiments of the system resource, capacity is expressed as a fixed size or quantity, or in terms of the demand, load, or usage the resource is expected to support. Capacity related to system usage is generally planned based on the average period of largest usage of the system, taking into account the cost of system resources, the probability of excessive usage beyond the average peak, and the impact of degraded performance when the anticipated peak is exceeded. For example, there may be three main areas for which the capacity may be considered as indicated in the following table:

| system Areas | Description |
| --- | --- |
| Processing | A system needs sufficient processing capacity to support usage of required functions. To quantify processing capacity requirements, it is necessary to determine the tasks that may be performed to support the functionality provided by embodiments of the system and quantify the relative processing capacity needed for each one. A complicated task can use more processing resources as compared to a simple task. Using forecasts of the volume and frequency of each task, a determination can be made regarding how much processing capacity is needed. |
| Memory | There may be a number of uses for system memory. Memory is needed to support real-time system processing, including storage for embodiments of the system software. Additional memory is needed for storage of data used by the system. Types of data used by a system include: Configuration data that facilitates users to access embodiments of the system and controls how embodiments of the system operate. Functional data that is entered by users and manipulated by the system. Reference data that provides information used to support each system function. Historical data such as log files retained by the system. |
| Interfaces | Systems include interfaces for users to access the functionality of embodiments of the system and for embodiments of the system to exchange information with other systems. It is important to understand the types and quantity of interfaces a system is expected to support to determine embodiments of the system hardware and software resources required. |

In order to understand the system capacity requirements some current metrics having to do with capacity and utilization are provided (FIGS. 48-51).

Capacity related to system usage is generally planned based on the average period of largest usage, taking into account the probability of excessive usage beyond the average peak, as well as the impact of degraded performance when the anticipated peak is exceeded. The following assumptions were made when developing the capacity and performance requirements. In embodiments, the performance of the system may meet or exceed the performance of the current system for parameters:

The initial processing capacity for the system can be engineered to include capacity for growth of 20% YOY.

The system must be able to deliver burstable capacity.

Assuming 7,988,500 usable toll-free numbers per NPA and 8 toll-free NPAs, the system must be engineered to maintain data for roughly 64 million usable toll-free numbers.

During peak usage periods, assume 25% of user logins are logged in.

It is assumed the system will have the capacity to support interfaces to 30 SCPs minimally.

| Transaction Data - April 2015 | | | |
|---|---|---|---|
| Transaction Type | Hourly Average | Peak Hour | Peak Hour Volume |
| Number Search | 2,234,000 | 22 | 5,700,000*** |
| Number Reserve | 13,900 | 23 | 51,000*** |
| Number Spare | 3,500 | 23 | 72,000 *** |
| Customer Record Updates | 6,360 | 20 | 31,600 |

*** Because a large volume of toll-free numbers are spared in hour 23, many toll-free service providers execute automated scripts to search and reserve for numbers that have just been spared.

| Category | Service | Current | Capacity Requirement |
|---|---|---|---|
| Capacity | # Toll-Free Numbers | 40 million | 64 million |
| | # Toll-Free Providers | 450 | 600 |
| | # SCP Owner/Operator Interfaces | 22 | 30 |
| | # Customer Records | 128 million | 192 million |
| | # Online User | 16,250 users | 24,360 users |
| | # Concurrent Online User Sessions | 4,875 users | 6,090 users |

| Toll-free Number Capacity - Minimal Feature Set | | |
|---|---|---|
| MFS # | Function | Description |
| MFS 60 | Toll-free Number Capacity | The volume of toll free numbers, currently at 40 million, are growing by an average 180,000 per month. This growth will continue as the system must be scaled to be able to be able to handle this growth as an expected activity. |

| Category | Service Level | Average Volume Requirement | Peak Hour Volume Requirement |
|---|---|---|---|
| Performance | Search transactions (all types) | 2.5 million per hour | 6.0 million per hour |
| | Number Reservation transactions | 14,000 per hour | 51,000 per hour |
| | Number Spare transactions | 3,500 per hour | 72,000 per hour |
| | Customer Record Updates | 6,500 per hour | 31,500 per hour |
| | # SCP Updated Customer Record downloads | 20/second | 30/second |

| Capacity & Performance - New Feature Set | | |
|---|---|---|
| MFS # | Function | Description |
| NFS 21 | Extreme system usage situation | In the event of an extreme system usage situation (i.e. NPA code opening) the system must be able to quickly scale up to handle up to four times (4X) the normal peak usage period. To illustrate extreme usage, in once case during the opening of toll-free NPA 844, a peak of 77,000 transactions per minute were received. |

Usage measurement and monitoring is required to provide fair and equal system access to all toll-free service providers. In order to do that, the system may measure, monitor, and alert the system usage for any instances where one provider's utilization is at a point where it is impacting the other provider's use of the system. The measurements must be on a toll-free service provider level.

| Usage Measurement and Monitoring - Minimal Feature Set | | |
|---|---|---|
| MFS # | Function | Description |
| MFS 38 | Usage Measurement & Monitoring | The system can must measure, monitor, and alert for any instances where one provider's utilization is at a point where it is impacting the other provider's use of the system. The measurements must be on a on a toll-free service provider level The alerting level should be a configurable setting in the system. |

Reference data may be required to represent routing and numbering in the POTS network and the service areas supported by SCP O/O networks. The information provides the relationships between SCP O/O CCS networks and the LATAs, NPAs and NPA-NXXs each network serves and is used to validate the information in customer records. There may be 8 CCS networks supported by the system.

There are 164 LATAs in the NANP, roughly 380 NPAs in use or planned for use for POTS call routing, and roughly 160,000 NPA-NXXs assigned to central offices for call routing.

The system can provide memory capacity for the reference data needed to capture the relationships between States, LATAs, NPAs, and NPA-NXXs required to represent the POTS network.

The system can provide memory capacity for the reference data required to represent the network relationships supported by each SCP O/O CCS network.

The system must also allow time and processing for the loading of industry reference data during routine maintenance windows.

In embodiments of the system, functional data is the data required by each function supported by the system. The system maintains functional data for each NPA-NXX within a toll-free NPA and each toll-free number with each NPA-NXX. Currently, the toll-free NPAs 800, 888, 877, 866, 855, and 844 are open and NPA 833 is anticipated to open in 2017, making a total of 7 toll-free NPAs. Note that 822 and 889 are also reserved as a potential future toll-free NPAs.

For each toll-free NPA, NXXs 000-199, 911, and 555 are not used. Additionally, in NXX 250, XXXX numbers 0000-1499 are not used. This results in 7,988,500 toll-free numbers per NPA. Assuming 8 toll-free NPA, the system will need to maintain data for roughly 64 million toll-free numbers.

In embodiments of the system, initial minimum memory capacity for the data required to support 64 million toll-free numbers. Toll-free service is enabled when a toll-free number is reserved by a toll-free service provider, a customer record is provisioned against the number, and information from the record is downloaded to SCPs. Numbers that are not currently controlled by a toll-free service provider (i.e., numbers in SPARE status) and numbers not available for toll-free service (i.e., numbers in UNAVAILABLE status) do not have customer records. Customer records are provisioned in advance of an effective date, and the system maintains current and pending customer records, so it is possible for multiple customer records to be associated with a number.

A percentage of toll-free numbers will be in SPARE status and therefore not have an associated customer record. Additionally, many working numbers have not had changes to the provided toll-free service and therefore have a single active customer record. However, some numbers may have an active and pending customer record, and old records are stored by the system for a period of time. For the purposes of capacity planning and to account for the differences in size between simple and complex customer records, it is assumed that there is an average of 2 customer records per toll-free number. Therefore, the system will need to maintain 128 million customer records.

The system can provide initial minimum memory capacity for the data required to support 128 million customer records.

During peak usage periods, 25% of user logins are logged into the system. The system must provide capacity for 16,250 login IDs and anticipating 30% peak concurrent usage, capacity for 4,875 concurrent HUI sessions. Note that not all users who are logged into the system will be actively and continuously sending requests to the system.

During a time of extreme usage, such as the opening of a new toll-free NPA, there will a significant increase in the number of concurrent sessions. In the event of an extreme system usage situation the system should be able to quickly scale up to handle up to four times (4X) the normal peak usage period.

Instantaneous response time is the time for a response when performing an action regarding objects on the screen, such as using a mouse to select on an on-screen object or drag a scroll bar.

When a human user takes an action related to an object on a screen, the system can provide an initial acknowledgment response in 0.1-0.2 seconds.

When a human user takes action to request an operation or execute a command requiring system process of the request, the system can provide a response in 0.5-1 second.

A feedback response provides information regarding the progress or completion of a requested action.

For transactions that take longer than 5 seconds—the system will provide the user feedback that the transaction has been accepted and that the response will be available at a later time.

In embodiments, the system can provide an API interface for machine-to-machine transaction processing. The system can provide resources to support having API connections from each toll-free Providers (number of expected providers defined above).

The system can minimally have the capacity to support interfaces to 30 SCPs at launch with the ability to add more as the number of users grow.

The table below presents example minimum data rates for the SCP interface as stated in Section 4.2.2 of TM-798. The performance of the system may meet or exceed the performance of the current system for all parameters described in this section.

| Minimum Non-Peak Data Rates for SCP Interface from TM-798 | |
| --- | --- |
| Transaction | Size/Data Rate |
| Customer Record Updates | 9.6 Kbytes/CR × 20 CR/sec |
| | Or 192 Kbytes/sec |
| | Or 1.536 megabits/sec |
| Other | 88 Kbytes/hour |

The system can provide the resources to support the data rate and message frequency for each SCP interface as specified.

| SCP Data Rates - Minimal Feature Set | | |
| --- | --- | --- |
| MFS # | Function | Description |
| MFS 46 | SCP Data Rates | The system must be able to process a minimum of 1200 commands per minute and a minimum of 20 customer record update (UPD-UCR) commands per second. The typical, non-peak message frequency is roughly 1 per second |

There are four main areas of data integrity that may need to be addressed and monitored. They are:

Latency: The time between when information is expected and when it is readily available for use.

Accuracy: Data accuracy refers to the degree with which data correctly represents the "real-life" objects they are intended to represent.

Timeliness: Refers to the time expectation for accessibility and availability of information. Timeliness can be measured as the time between when information is expected and when it is readily available for use.

Consistency: Two data values drawn from separate data sets must not conflict with each other, although consistency does not necessarily imply correctness.

| Acronyms & Glossary | |
| --- | --- |
| Acronym | Meaning |
| ACG | Automatic Call Gapping |
| ACNA | Access Customer Name Abbreviation |
| AIN | Advanced Intelligent Network |
| AOS | Area of Service (of customer record or CCS network) |
| ASCII | American Standard Code for Information Interchange |
| ASLs | Area-of-Service Labels |
| ATIS | Alliance for Telecommunications Industry Solutions |

Acronyms & Glossary

| Acronym | Meaning |
|---|---|
| BOC | Bell Operating Company |
| CAD | Customer Administrative Data (portion of Customer Record) |
| CAG | Carrier Agreements with Entities table |
| CAN | Customer Notification and Approval |
| CAT | Customer Acceptance Testing |
| CCP | Cost Causer Pays |
| CCI | (Mass) Carrier Change Information |
| CCS | Common Channel Signaling (is a standards terminology) |
| CIC | Carrier Identification Code (is an industry standard element) |
| CLLI | Common Language Location Identifier (is an industry standard element) |
| CLEC | Competing Local Exchange Carrier |
| CMSDB | Call Management Services Data Base |
| CNA | Carrier Notification and Approval |
| CO | Company Code (defined by the TPM industry data) |
| CO | Central Office |
| CPR | Call Processing Record |
| CR | Customer Record |
| CRA | Customer Record Administration |
| CRA/CRR | Customer Record Audit/Resend |
| CRA&O | Customer Record Activation and Output |
| CRB | Customer Record Benchmarks |
| CRN | Customer Record Number |
| CRO | Customer Record Output (process of CRA) |
| CS | Client system |
| CSE | Carrier Security Information |
| CSV | Comma Separate Variable |
| CVER | Conversion Error |
| d/b/a | "Doing Business As" operating units of carriers |
| DDT | Down & Default Time |
| DoS | Denial of Service |
| DTN | Destination Telephone Number |
| E2E | End-to-end system Integration Testing |
| EAG | Entity Agreements with Carriers (for CR Input) |
| EAP | TFN Exceptions for Approvals (for CNA process) |
| ECC | Excessive Calling Controls |
| EDR | Event Data Record |
| EDT | Effective Date and Time |
| EID | End Intercept Date |
| ENA | Entity Notification and Approval Set-up |
| ENO | TFN Exceptions for Notifications (for CNA process) |
| ENO/EAP | Exception Notification and Approval (by Toll-Free Numbers) |
| FA | Final Acceptance |
| FCAPS | Fault, Configuration, Accounting, Performance and Security management |
| FCC | Federal Communications Commission |
| FMO | Future Mode of Operation |
| FTP | File Transfer Protocol |
| GAN | M2M (MGI) Activation Notice Control table |
| GNA | Carrier General Notification and Approval Set-up |
| GUI | Graphical User Interface |
| HH:MM:SS | Hours, minutes, seconds |
| HPU | High Priority (CR) Updates |
| HTML | HyperText Markup Language |
| HUI | Human User Interface |
| IC | Inter-exchange Carrier |
| ICM | IntraLATA Carrier Management (CIC 0110 validations) |
| ID | Identification |
| ILEC | Incumbent Local Exchange Carrier |
| INWATS | Inward Wide Area Telephone Service |
| IOT | Inter-Operability Testing |
| IP | Internet Protocol |
| IPSec | Internet Protocol Security |
| KPI | Key Performance Indicators |
| LAD | Label Definitions |
| LAN | Local Area Network |
| LATA | Local Access and Transport Area |
| LECs | Local Exchange Carriers |
| LERG | Local Exchange Routing Guide |
| LSO | Local Serving Office |
| LT | Load Test |
| LUI | Locked and Inactive User IDs |
| M2M | Machine to Machine |
| MAS | Mass Calling Thresholds |
| MCC | Manual Control Request |
| MCP | Multi-Number Customer-to-Pointer Record Conversion |
| MGI | Mechanized Generic Interface |
| MHG | Multi-Line Hunt Group |
| MNA | Multi-Number Automation |
| MND | Multi-Dial Number Disconnect |
| MNL | Master Number List (supported TF NPANXX domain of an SCP) |
| MoP | Methods of Procedures |
| M&P | Methods and Procedures |
| MRO | Multi-Dial Number Resp Org Change |
| MRT | Migration Regression Test |
| MTBF | Mean Time Before Failure |
| MTTR | Mean Time To Repair |
| NA | Number Administration |
| NAC | Network Allowed Carriers table |
| NANP | North American Numbering Plan |
| NCA | Network Provider-SCP Owner/Operator Carrier Agreements table |
| NCC | Network Provider-SCP Owner/Operator Company Codes |
| NCN | NPA to CCS Network Mapping table |
| NDA | Non-Disclosure Agreement |
| NET | CCS Network Information table |
| NFY | Notify (CNA action indicator value) |
| NGN | Next Generation Networks |
| NLA | Network Provider-SCP Owner/Operator IntraLATA Agreements table |
| NLE | Network Provider-SCP Owner/Operator IntraLATA Exceptions table |
| NMC | Network Management Center or |
| NMC | Network Management Class (a/k/a Threshold Level Class) |
| NOC | Network Operation Center |
| NOF | Carrier Notification |
| NON | No notification (CNA action indicator value) |
| NPA | Numbering Plan Area |
| NPANXX | The leading 6-digits of a 10-digit NANP telephone number |
| NRC | Network Management Report Control |
| NRL | Network Management Report Limits |
| NXL | NPA-NXX to LATA Information table |
| NXX | The 4th through 6th digits of a NANP Telephone number |
| OAM&P | Operations, Administration, Maintenance and Provisioning |
| OCN | Operating Company Numbers |
| OEI | Other External Interfaces |
| ORC | Resp Org Control |
| ORG | Resp Org Info |
| OSI | Open systems Interconnect |
| PAD | Pointer Administrative Data |
| PMO | Present Mode of Operation |
| POTS | Plain Old Telephone Service |
| PR | Pointer Record |
| PRC | SCP Report Control |
| PRL | SCP Exception Report Control |
| PSTN | Public Switched Telephone Network |
| RA | Require approval (CNA action indicator value) |
| RAC | Resp Org Allowed Carriers (reference data table) |
| RAO | Revenue Accounting Office |
| RAT | Revenue Assurance Test |
| RBAC | Role Based Access Control |
| RDC | Resp Org Disallowed Carriers (reference data table) |
| Resp Org (RO) | Responsible Organization |
| RM | Removal of Invalid 6-Digits in AOS Labels |
| ROC | Resp Org Associated Carriers for View (reference data table) |
| ROI | (Mass) Resp Org Change Information (ROI) |
| ROP | Resp Org Profile |
| RRR | Report Request Reports |

Acronyms & Glossary

| Acronym | Meaning |
|---|---|
| RSP-RCU | Response to Customer Record Update message (SMS-SCP interface) |
| RSP-ROR | Response to Update Resp Org message (SMS-SCP interface) |
| RSS | Rich Site Summary |
| SAP/DAP | Summary and Detail of Carrier Approval Status |
| SCCP | Signaling Connection Control Part |
| SCP | Service Control Point |
| SCP-M | Service Control Point Management |
| SCP O/O | Service Control Point Owner/Operator |
| SEC/SUD | Security Control/Security User Data |
| SEP | Security Parameters |
| SFG | Simulated Facility Group |
| SID | SCP ID Definition |
| SLA | Service Level Agreement |
| SMS | Short Message Service |
| SMS/800 | Service Management system/800 |
| SPO | System Processing Options |
| SR | Special Report |
| SRC | SMS Administration Report Control |
| SS7 | Signaling System 7 |
| SSP | Service Switching Point |
| STD | Security Terminal Data |
| STN | Screening Telephone Number |
| STP | Signaling Transfer Point |
| SUD | Security User Data |
| TAD | Template Administrative Data (portion of a Template Record) |
| TAL | Template Allocation Limits |
| TCP | Transmission Control Protocol |
| TF | Toll Free |
| TFN | Toll-Free Number |
| TLC | Threshold Level Class |
| TM-798 | The - SCP/CMSDB Interface Specification |
| TLS | Transport Layer Security |
| TPM | Terminating Point Master |
| TR | Template Record |
| TRA | Telecom Routing Administration |
| UAL | User Application Layer |
| UC | Use Case |

| | |
|---|---|
| Advanced Intelligent Network (AIN) | Mechanism used with the Signaling system 7 to provide advanced call routing and processing |
| Area of Service (AOS) | Area from which a toll-free number can receive calls |
| Billing | Capability of the system to provide information required to calculate monthly bills |
| Carrier | Provider of telephone service, operator of a network that processes telephone calls |
| Customer Record | Defines routing of calls to a toll-free number, provisioned in the system and uploaded to SCPs |
| Customer Record Administration | Supports entry and update of customer records associated with a toll-free number |
| Local Access and Transport Area (LATA) | Geographic area of service for a local carrier |
| Local Exchange | End-office switching system in the telephone company network that provides service to telephone subscribers |
| Number Administration | Supports search, reserve, query and update of toll-free numbers and maintains number statuses |
| North American Numbering Plan (NANP) | Standard that describes the format and use of telephone numbers |
| Number portability | Ability to move the service associated with a telephone number from one carrier to another |
| Query | Request for the system to provide information about a number |
| Reporting | Capability of the system to provide data to users in the form of reports |
| Resp Org/toll-free Provider | User of the system to obtain control of toll-free numbers and provision customer records, sells service to toll-free subscribers |
| Search | Request for the system to find toll-free numbers that are not controlled by a Resp Org |
| SCP Management Function | Supports management of SCPs via the system |
| Service Switching Point | Local exchange switch supporting access to Signaling System 7 |
| Signaling system 7 (SS7) | Network architecture and protocol supporting out-of-band signaling for call setup and feature control |
| Signaling Control Point (SCP) | Database containing information used to route calls and provide features |
| Service Control Point Owner/Operator (SCP O/O) | Responsible for operation of SCPs |
| Signaling Transfer Point (STP) | Routes Signaling System 7 messages |
| Reserve | Request to take control of a toll-free number, number becomes associated with a toll-free service provider |
| Tandem | Switching system that provides interworking between other switching systems |
| Telephone number | Identifies telephone service and the unique network resources dedicated to providing the service, format is NPA-NXX-XXXX as described by the North American Numbering Plan 9 NANP) |
| Toll-free service | Type of telephone service where calls are billed to the terminating subscriber, not the caller |
| Toll-free subscriber | End-user for toll-free service, obtains service, including an associated toll-free number, from a toll-free service provider |
| User Interface Function | Supports mechanized access to the system via a machine-to-machine interface and manual access via a human user interface |

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

All documents referenced herein are hereby incorporated by reference.

What is claimed:
1. A method comprising:
retrieving an indication that a user desires to be alerted of an existence of a predicted phone number;
accessing a phone number search history, wherein the phone number search history includes at least one search parameter entered when searching for an available phone number;
identifying a criteria of a desired phone number based at least in part on the search parameter;
associating each of a plurality of phone numbers in a phone number inventory with at least one search parameter;
analyzing the phone number inventory for at least one predicted phone number having an associated at least one search parameter matching the criteria of the desired predicted phone number;
automatically reserving the predicted phone number; and
sending an alert to a client device associated with the user, wherein the alert includes a notification of the predicted phone number matching the criteria of the desired phone number.

2. The method of claim 1, wherein the alert is adapted to be presented to the user upon a user login at the client device.

3. The method of claim 2, wherein the alert is further adapted to be presented in combination with at least one of public domain third party data and social media data.

4. The method of claim 1, wherein the alert is adapted to present to the user at a predetermined time of day.

5. The method of claim 1, further comprising receiving an indication from the user of a desire to be included as a bidder for the available phone number.

6. The method of claim 1, wherein the alert is adapted for presentation via a customizable user interface.

7. The method of claim 6, wherein the customizable user interface is adapted to enable access to third party services.

8. The method of claim 6, wherein the customizable user interface is adapted to enable access to sponsored data.

9. The method of claim 6, wherein the customizable user interface is adapted to enable access to information derived from a toll-free communications network.

10. The method of claim 1 wherein the search history is the search history of the user.

11. The method of claim 1, wherein the steps of associating and analyzing are performed repeatedly.

12. A method comprising:
retrieving an indication that a user desires to be alerted of an existence of a predicted phone number;
accessing a phone number search history, wherein the phone number search history includes at least one search parameter entered when searching for an available phone number;
identifying a criteria of a desired phone number based at least in part on the at least one search parameter;
associating each of a plurality of phone numbers in a phone number inventory with at least one search parameter;
analyzing the phone number inventory for at least one predicted phone number having an associated at least one search parameter matching the criteria of the desired phone number; and
sending an alert to a client device associated with the user, wherein the alert includes a notification of the predicted phone number matching the criteria of the desired phone number.

13. The method of claim 12, wherein the alert is adapted to be presented to the user upon a user login at the client device.

14. The method of claim 13, wherein the alert is further adapted to be presented in combination with at least one of public domain third party data and social media data.

15. The method of claim 12, wherein the alert is adapted to present to the user at a predetermined time of day.

16. The method of claim 12, further comprising receiving an indication from the user of a desire to be included as a bidder for the available phone number.

17. The method of claim 12, wherein the alert is adapted for presentation via a customizable user interface.

18. The method of claim 17, wherein the customizable user interface is adapted to enable access to third party services.

19. The method of claim 17, wherein the customizable user interface is adapted to enable access to sponsored data.

20. The method of claim 17, wherein the customizable user interface is adapted to enable access to information derived from a toll-free communications network.

\* \* \* \* \*

UNITED STATES PATENT AND TRADEMARK OFFICE
CERTIFICATE OF CORRECTION

PATENT NO. : 10,560,583 B2
APPLICATION NO. : 16/177842
DATED : February 11, 2020
INVENTOR(S) : Sriram Sharma It is certified that error appears in the above-identified patent and that said Letters Patent is hereby corrected as shown below:

In the Drawings

Sheet 1 of 40, in Figure 1, reference numeral 130, Line 1, delete "Sevices" and insert -- Services --, therefor.

Sheet 1 of 40, in Figure 1, reference numeral 148, Line 2, delete "Enviroment" and insert -- Environment --, therefor.

Sheet 9 of 40, in Figure 11, Line 9, delete ""Avaliable" and insert -- Available --, therefor.

Sheet 9 of 40, in Figure 11, Line 20, delete "numbers" and insert -- numbers" --, therefor.

Sheet 10 of 40, in Figure 13, Line 2, delete "merchansed" and insert -- merchandise --, therefor.

Figure 16:
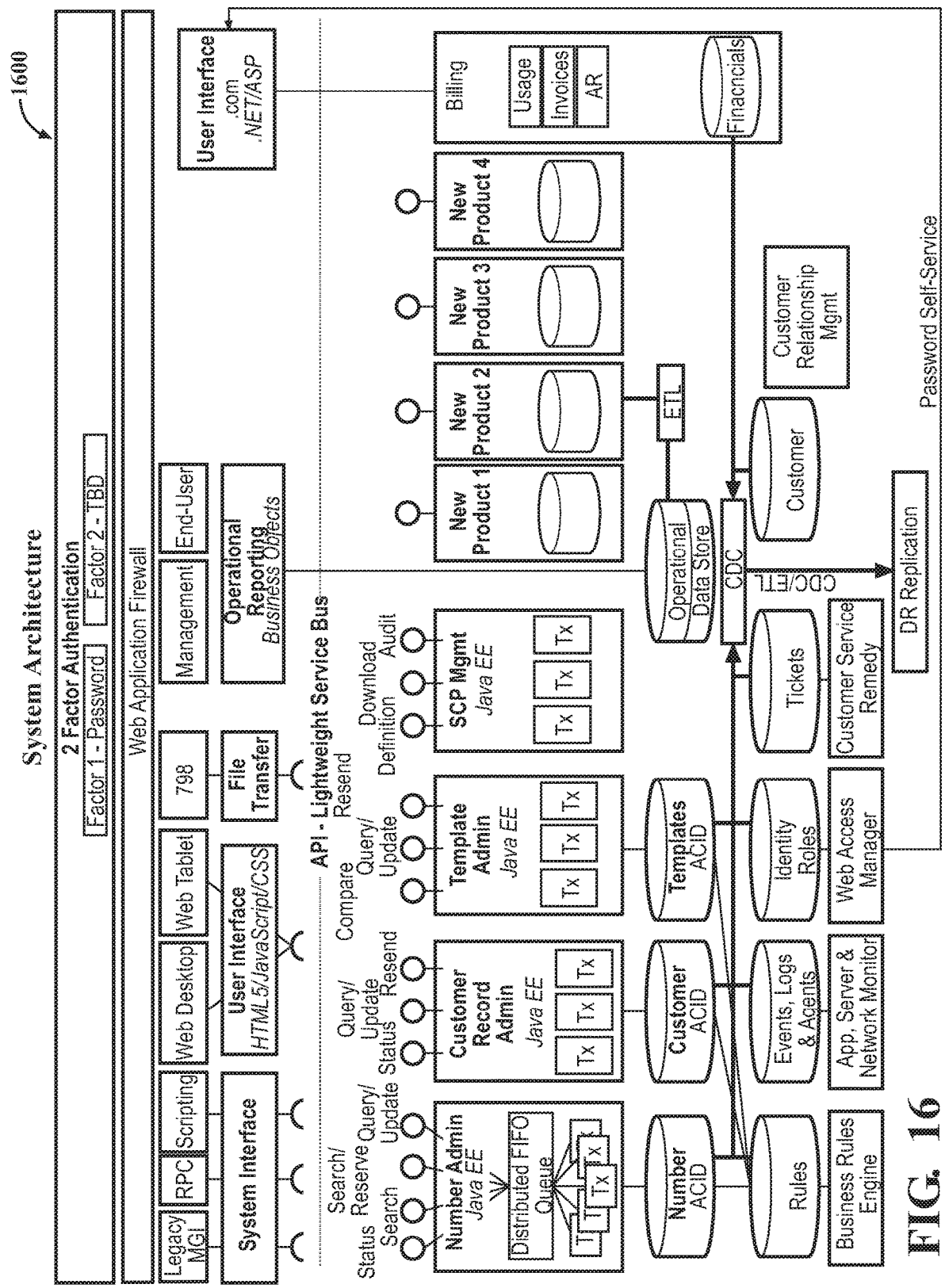
FIGS. 16-20 depict simplified schematic architecture views of toll-free Management Architectures.
Figure 17:
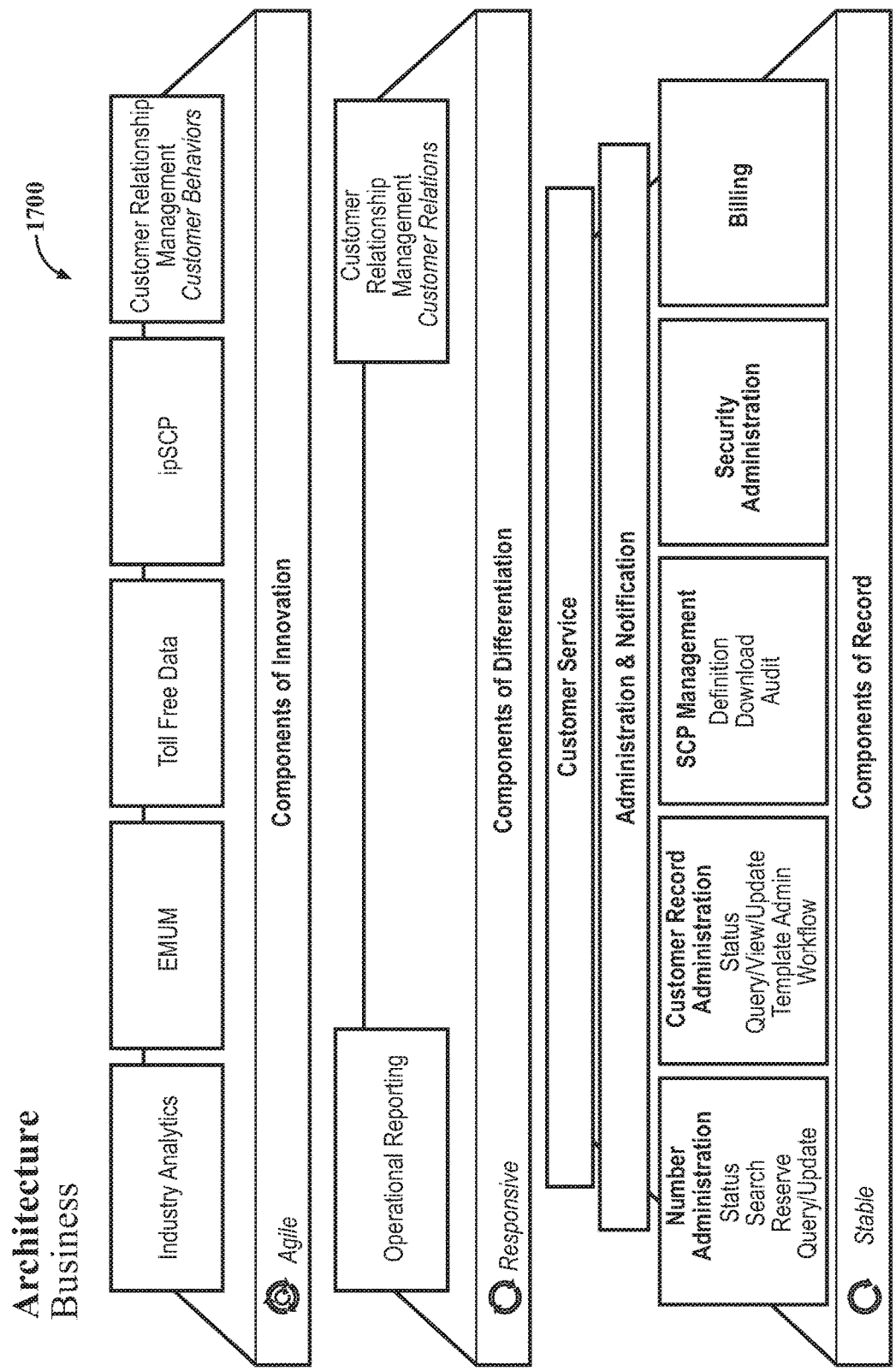

Sheet 13 of 40, in Figure 16, Line 20, delete "Finacncials" and insert -- Financials --, therefor.

Figure 18:
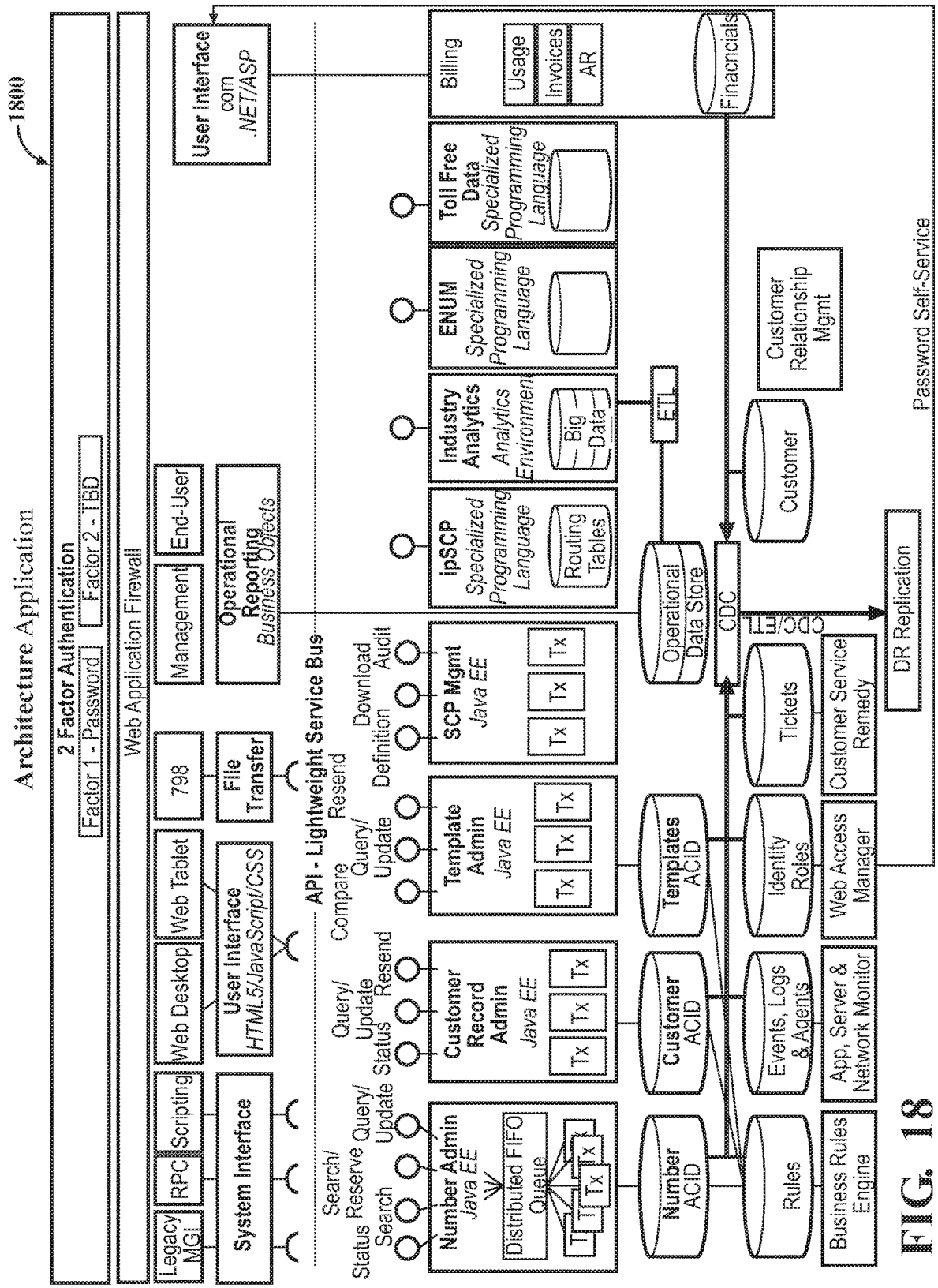

Sheet 15 of 40, in Figure 18, Line 20, delete "Finacncials" and insert -- Financials --, therefor.

Figure 19:
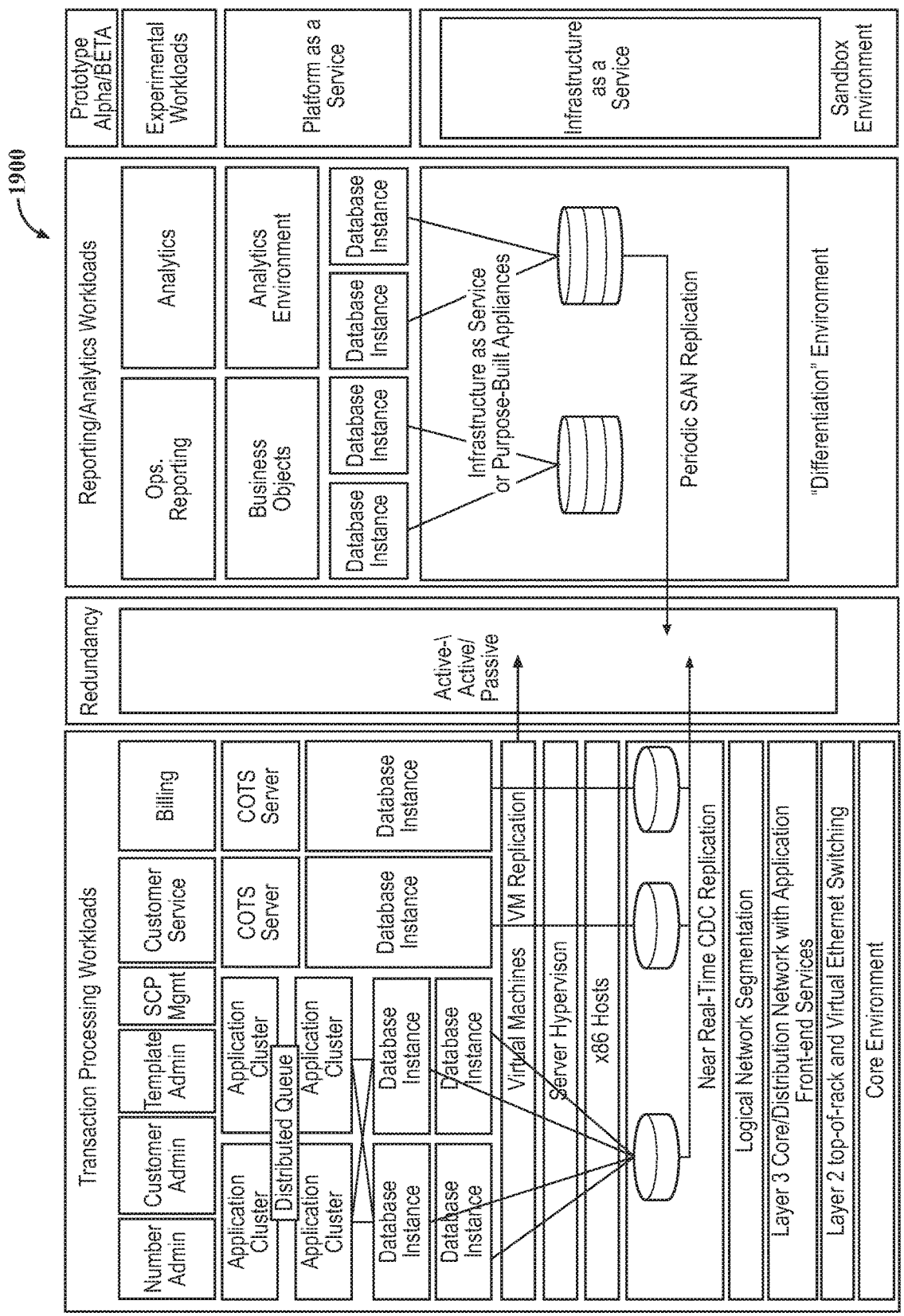
Figure 20:
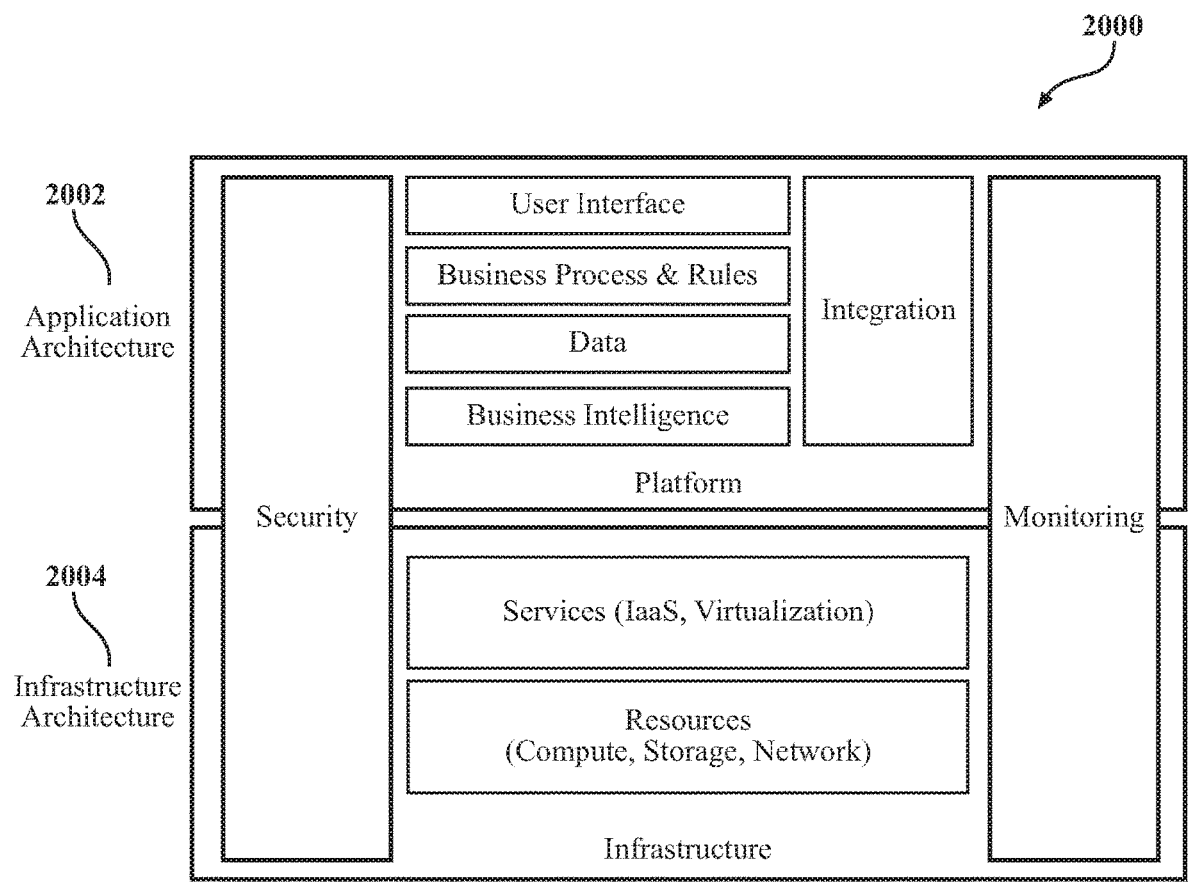

Sheet 16 of 40, in Figure 19, Line 15, delete "Hypervison" and insert -- Hypervisor --, therefor.

Sheet 18 of 40, in Figure 21, reference numeral 2101, Line 5, delete "INTEREXHANGE" and insert -- INTEREXCHANGE --, therefor.

Sheet 19 of 40, in Figure 23, Line 2, delete "FunctionCriteria" and insert -- Function Criteria --, therefor.

Sheet 19 of 40, in Figure 23, Line 27, after "5555" insert -- ) --.

Sheet 21 of 40, in Figure 26, Line 7, delete "SearchMask" and insert -- Search Mask --, therefor.

Signed and Sealed this
Fourteenth Day of April, 2020

Andrei Iancu
*Director of the United States Patent and Trademark Office*

CERTIFICATE OF CORRECTION (continued)
U.S. Pat. No. 10,560,583 B2

Sheet 34 of 40, in Figure 42, Line 12, delete "Furture" and insert -- Future --, therefor.

Sheet 35 of 40, in Figure 43, Line 3, delete "Netwrok" and insert -- Network --, therefor.

Sheet 35 of 40, in Figure 43, Line 3, delete "Operatring" and insert -- Operating --, therefor.

Sheet 35 of 40, in Figure 43, Line 16, delete "Entity/Reso" and insert -- Entity/Resp --, therefor.

In the Specification

Column 1, Line 11, delete "Dec. 30, 2015," and insert -- Oct. 24, 2017, --, therefor.

Column 4, Line 35, after "summary" insert -- . --.

Column 5, Line 11, after "keywords" insert -- . --.

Column 10, Line 44, after "device" insert -- . --.

Column 11, Line 15, after "communication" insert -- . --.

Column 13, Line 40, after "location" insert -- . --.

Column 20, Line 24, delete "numbers:" and insert -- numbers. --, therefor.

Column 23, Line 15, delete "staff'" and insert -- staff." --, therefor.

Column 30, Line 34, after "(TSS)" insert -- . --.

Column 34, Line 16, after "status" insert -- . --.

Column 36, Line 51, delete "MIMS" and insert -- MMS --, therefor.

Column 43, Line 58, delete "the a" and insert -- the --, therefor.

Columns 51-52, Line 66, delete "BusinesObjects" and insert -- BusinessObjects --, therefor.

Column 61, Line 18, after "technologies" insert -- . --.

Column 61, Line 27, after "value" insert -- . --.

Column 61, Line 29, after "time" insert -- . --.

Column 62, Line 19, after "resources" insert -- . --.

Column 67, Line 15, after "organisation" insert -- . --.

CERTIFICATE OF CORRECTION (continued)
U.S. Pat. No. 10,560,583 B2

Columns 77-78, Line 33, delete "pending," and insert -- pending. --, therefor.

Column 77, Line 38, above "Requirements- Minimal Feature Set" insert -- Number Administration: Query, Search, Reserve, and Search & Reserve --, as heading.

Columns 77-78, Line 60, above "Function" insert -- Functional Descriptions --, as heading.

Column 85, Line 61, delete "SearchMask" and insert -- Search Mask --, therefor.

Column 86, Line 62, delete "SearchMask" and insert -- Search Mask --, therefor.

Columns 87-88, Line 49, delete "that that" and insert -- that --, therefor.

Column 97, Line 39, after "SCPs" insert -- . --.

Column 98, Line 53, delete "'the" and insert -- the --, therefor.

Column 105, Line 29, delete "(HUT" and insert -- (HUI --, therefor.

Column 108, Line 13, delete "thedatabase." and insert -- the database. --, therefor.

Column 108, Line 17, delete "ENDING," and insert -- SENDING, --, therefor.

Column 110, Line 14, delete "NFS12A" and insert -- NFS 12A --, therefor.

Column 110, Line 46, after "TFN" insert -- . --.

Column 111, Line 51, delete "announcements.This" and insert -- announcements. This --, therefor.

Column 122, Line 18, delete "the an" and insert -- the --, therefor.

Column 123, Line 7, delete "informatiom" and insert -- information --, therefor.

Column 123, Line 14, delete "queried" and insert -- queries --, therefor.

Column 126, Line 47, delete "SCPID" and insert -- SCP ID --, therefor.

Column 134, Line 8, after "embodiment" insert -- . --.

Column 140, Line 38, delete "records," and insert -- records. --, therefor.

Column 141, Line 32, delete "Administration" and insert -- Administration. --, therefor.

Column 146, Line 2, delete "miles)" and insert -- miles). --, therefor.